US012586804B2

(12) United States Patent  
Yashima et al.

(10) Patent No.: US 12,586,804 B2  
(45) Date of Patent: Mar. 24, 2026

(54) SOLID ELECTROLYTE, ELECTROLYTE LAYER AND BATTERY

(71) Applicant: Institute of Science Tokyo, Tokyo (JP)

(72) Inventors: Masatomo Yashima, Tokyo (JP); Takafumi Tsujiguchi, Tokyo (JP); Kotaro Fujii, Tokyo (JP); Eiki Niwa, Tokyo (JP); Yuichi Sakuda, Tokyo (JP); Taito Murakami, Tokyo (JP); Yuta Yasui, Tokyo (JP); Yugo Kikuchi, Tokyo (JP); Yuki Suzuki, Tokyo (JP)

(73) Assignee: Institute of Science Tokyo, Tokyo (JP)

( * ) Notice: Subject to any disclaimer, the term of this patent is extended or adjusted under 35 U.S.C. 154(b) by 865 days.

(21) Appl. No.: 17/424,432

(22) PCT Filed: Jan. 24, 2020

(86) PCT No.: PCT/JP2020/002552  
§ 371 (c)(1),  
(2) Date: Jul. 20, 2021

(87) PCT Pub. No.: WO2020/153485  
PCT Pub. Date: Jul. 30, 2020

(65) Prior Publication Data  
US 2022/0115684 A1 Apr. 14, 2022

(30) Foreign Application Priority Data

Jan. 24, 2019 (JP) ................................. 2019-010280

(51) Int. Cl.  
*H01M 8/12* (2016.01)

(52) U.S. Cl.  
CPC ...... *H01M 8/12* (2013.01); *H01M 2008/1293* (2013.01); *H01M 2300/0074* (2013.01)

(58) Field of Classification Search  
None  
See application file for complete search history.

(56) References Cited

U.S. PATENT DOCUMENTS

| 2010/0291471 A1 | 11/2010 | Jacobson et al. |
| 2012/0135331 A1 | 5/2012 | Rosseinsky et al. |
| 2015/0053898 A1 | 2/2015 | Nada et al. |

FOREIGN PATENT DOCUMENTS

| CN | 103316668 A | 9/2013 |
| JP | H09183657 A | 7/1997 |

(Continued)

OTHER PUBLICATIONS

Sacha Fop, PhD thesis, Novel oxide ion conductors in the hexagonal perovskite family, University of Aberdeen, University of Aberdeen, Department of Chemistry, 2016 (Year: 2016).*

(Continued)

*Primary Examiner* — Zhongqing Wei  
(74) *Attorney, Agent, or Firm* — Blank Rome LLP

(57) ABSTRACT

A solid electrolyte having high electrical conductivity even in a low-temperature region is provided. A solid electrolyte containing a hexagonal perovskite-related compound, in which the compound is a compound represented by the following general formula (1), and an electrolyte layer and a battery using the solid electrolyte are disclosed. $Ba_{7-\alpha}Nb_{(4-x-y)}Mo_{(1+x)}M_yO_{(20+z)}$ (1), in the formula (1), M is a cation of at least one element; $\alpha$ represents a Ba deficiency amount and represents a value of 0 or more and 0.5 or less, x represents a value of −1.1 or more and 1.1 or less, y represents a value of 0 or more and 1.1 or less, and z represents an oxygen non-stoichiometry and represents a value of −2.0 or more and 2.0 or less, provided that in the formula (1), $|x|+y \geq 0.01$ is satisfied.

17 Claims, 61 Drawing Sheets

(56) References Cited

FOREIGN PATENT DOCUMENTS

| JP | H10182268 A | 7/1998 |
| JP | 2003-137641 A | 5/2003 |
| JP | 2003-146754 A | 5/2003 |
| JP | 2009-519191 A | 5/2009 |
| JP | 2010-170998 A | 8/2010 |
| JP | 2012-528438 A | 11/2012 |
| JP | 2015-41597 A | 3/2015 |
| JP | 6448020 B | 1/2019 |

OTHER PUBLICATIONS

Bernasconi et al., Inorganic Chemistry, 2018, 57, 6746-6752. (Year: 2018).*

Chambers et al., Mater. Chem. A, 2019, 7, 25503-25510. (Year: 2019).*

Search Report issued for European Application No. 20743953.0, dated May 17, 2023.

E. Garćia-González et al., "Crystal Structure of an Unusual Polytype: 7H—$Ba_7Nb_4Mo_{020}$," *Chemistry of Materials*, vol. 11, No. 2, pp. 433-437 (Feb. 1999).

Office Action issued in Japanese Patent Application No. 2020-567722 dated Jan. 9, 2024.

S. Fop, "Novel Oxide Ion Conductors in the Hexagonal Perovskite Family", UK. BI. Ethos. 701786, 2016.

N. Floros et al., "The n=2 Member of the New Layered Structural Family $Ba_{5+n}Ca_2Mn_{3+n}O_{3n+14}$ Derived from the Hexagonal Perovskite: $Ba_7Ca_2Mn_5O_{20}$", Journal of Solid State Chemistry, vol. 168, pp. 11 to 17, 2002.

International Search Report for Application No. PCT/JP2020/002552, dated Apr. 14, 2020.

Database WPI, Week 201054, Thomson Scientific, London, GB; AN 2010-J83646, XP002809191.

B. Mössner et al., "9R-Stapelvarianten Vom Typ $Ba_3(B,B')_2O_9$-y MIT B,B' $\equiv$ Mo, W, V, Ti", *Journal of the Less-Common Metals*, vol. 114, No. 2, Dec. 16, 1985, pp. 333-341.

Database WPI, Week 201379, Thomson Scientific, London, GB; AN 2013-W00868, XP002809192.

E. Gaudin et al., "Synthesis, crystal structure, and magnetic properties of the manganate $La_2Ca_2MnO_6(O_2)$ related to the hexagonal perovskite-type structure", *Journal of Solid State Chemistry*, vol. 175, No. 1, Oct. 1, 2003, pp. 124-131.

S. Fop et al., "High oxide ion and proton conductivity in a disordered hexagonal perovskite", *Nature Materials*, vol. 19, No. 7, Mar. 2, 2020, pp. 752-757.

T. Murakami, "High Oxide-Ion Conductivity in a Hexagonal Perovskite-Related Oxide $Ba_7Ta_{3.7}Mo_{1.3}O_{20.15}$ with Cation Site Preference and Interstitial Oxide Ions", *Small*, vol. 18, No. 10, Mar. 1, 2022, 202106785 pp. 1-8. URL:https://onlinelibrary.wiley.com/doi/full-xml/10.1002/smll.202106785.

Y. Masatomo et al., "High oxide-ion conductivity through the interstitial oxygen site in $Ba_7Nb_4MoO_{20}$-based hexagonal perovskite related oxides", *Nature Communications*, vol. 12, No. 1, Jan. 25, 2021. URL: https://www.nature.com/articles/s41467-020-20859-w.pdf.

* cited by examiner

FIG. 58

SOLID ELECTROLYTE, ELECTROLYTE LAYER AND BATTERY

BACKGROUND OF THE INVENTION

1. Field of the Invention

The present invention relates to a solid electrolyte used for a solid electrolyte layer such as a fuel cell, an electrolyte layer using the same, and a battery.

2. Description of the Related Art

Among fuel cells that have been studied in recent years, a solid oxide fuel cell (hereinafter, referred to as "SOFC") has particularly high power generation efficiency, does not require a fuel-reforming device, and has excellent long-term stability, and therefore, the SOFC has a possibility of being widely applied to home use and business use, and is attracting attention.

The SOFC is configured to include a solid electrolyte-electrode laminate provided with fuel and air electrodes on both sides of the solid electrolyte layer. Yttria-stabilized zirconia ($ZrO_2$—$Y_2O_3$) (hereinafter, referred to as "YSZ") is known as an oxide ion ($O^{2-}$) conductive ceramic for the solid electrolyte layer used in SOFC.

Other examples of solid electrolytes used in SOFC include compounds with high electrical conductivity, for example, compounds with high ion conductivity that conduct ions such as oxide ions ($O^{2-}$) and protons ($H^+$).

Japanese Patent No. 6448020 discloses a crystalline inorganic compound capable of conducting at least one carrier selected from the group consisting of anions, cations, protons, electrons, and holes.

S. Fop, "Novel oxide ion conductors in the hexagonal perovskite family," Bl. Ethos. 701786 (https://ethos.bl.uk/OrderDetails.do?uin=uk.bl.ethos.701786) discloses $Ba_7Nb_4MoO_{20}$, which is a hexagonal perovskite-related compound having high ion conductivity ($\sigma$).

A conventional SOFC using YSZ as a solid electrolyte needs to be operated at a high temperature in order to obtain sufficient performance. The reason for this is that YSZ requires a high temperature of approximately 700° C. or more in order to ensure the oxide ion conductivity necessary for the battery. Operating a battery at a high temperature of 700° C. or more requires an environment and space in which the battery can be operated, other devices for keeping the battery at a high temperature and shutting off or cooling the battery so that other environments do not have a high temperature, and the like.

It is expected that if SOFC can be operated at low temperatures, the restriction for operating at a high temperature described above will be reduced, and the usefulness of SOFC will be significantly increased. It is also expected that the range of application of solid electrolytes other than SOFC will be greatly expanded because they can be operated at a low temperature. Therefore, a solid electrolyte having high electrical conductivity at a low temperature is strongly desired.

The present invention has been made in view of the above circumstances, and an object of the present invention is to provide a solid electrolyte having high electrical conductivity even in a low-temperature region, and an electrolyte layer and a battery using the solid electrolyte.

SUMMARY OF THE INVENTION

In order to solve the above problems, the present invention has the following aspects.

[1] A solid electrolyte containing a hexagonal perovskite-related compound, in which the compound is a compound represented by the following general formula (1):

$$Ba_{7-\alpha}Nb_{(4-x-y)}Mo_{(1+x)}M_yO_{(20+z)} \quad (1)$$

in the formula (1), M is a cation of at least one element selected from the group consisting of Ag, Al, At, Au, Be, Bi, Br, Ca, Cd, Ce, Co, Cr, Cu, Dy, Er, Eu, Fe, Ga, Gd, Ge, Hf, Hg, Ho, I, In, Ir, La, Li, Lu, Mg, Mn, Na, Nb, Nd, Ni, Np, Os, P, Pb, Pd, Po, Pr, Pt, Pu, Re, Rh, Ru, S, Sb, Sc, Se, Si, Sm, Sn, Sr, Ta, Tb, Tc, Te, Ti, Tl, Tm, U, V, W, Xe, Y, Yb, Zn, and Zr; and $\alpha$ represents a Ba deficiency amount and represents a value of 0 or more and 0.5 or less, x represents a value of −1.1 or more and 1.1 or less, y represents a value of 0 or more and 1.1 or less, and z represents an oxygen non-stoichiometry and represents a value of −2.0 or more and 2.0 or less, provided that in the formula (1), $|x|+y\geq0.01$ is satisfied.

[2] A solid electrolyte containing a hexagonal perovskite-related compound, in which the compound is a compound represented by the following general formula (2):

$$Ba_{7-\alpha}Nb_{(4-x-y)}Mo_{(1+x)}M_yO_{(20+z)} \quad (2),$$

in the formula (2), M is a cation of at least one element selected from the group consisting of W, V, Cr, Mn, Ge, Si, and Zr; and a represents a Ba deficiency amount and represents a value of 0 or more and 0.5 or less, x represents a value of −1.1 or more and 1.1 or less, y represents a value of 0 or more and 1.1 or less and satisfying $|x|+y\geq0.01$, and z is an oxygen non-stoichiometry and represents a value of −2.0 or more and 2.0 or less.

[3] A solid electrolyte containing a hexagonal perovskite-related compound, in which the compound is a compound represented by any of the following general formulas (3) to (13):

$$Ba_7Nb_{(4-x)}Mo_{(1+x)}O_{(20+z)} \quad (3),$$

in the formula (3), x represents a value of −1.1 or more and −0.01 or less or 0.01 or more and 1.1 or less, and z is an oxygen non-stoichiometry and represents a value of −2.0 or more and 2.0 or less;

$$Ba_7Nb_{(4-y)}MoM_yO_{(20+z)} \quad (4),$$

in the formula (4), M is a cation of at least one element selected from the group consisting of V, Mn, Ge, Si, and Zr; and y represents a value of 0.01 or more and 1.1 or less, and z is an oxygen non-stoichiometry and represents a value of −2.0 or more and 2.0 or less];

$$Ba_7Nb_4Mo_{(1-y)}M_yO_{(20+z)} \quad (5),$$

in the formula (5), M is a cation of at least one element selected from the group consisting of V and Mn; and z is an oxygen non-stoichiometry and represents a value of −2.0 or more and 2.0 or less, and y represents a value of 0.01 or more and 1.1 or less;

$$Ba_7Nb_{(4-y)}MoCr_yO_{(20+z)} \quad (6),$$

in the formula (6), z is an oxygen non-stoichiometry and represents a value of −2.0 or more and 2.0 or less, and y represents a value of 0.01 or more and 1.1 or less;

$$Ba_7Nb_{(4-y)}MoW_yO_{(20+z)} \quad (7),$$

in the formula (7), z is an oxygen non-stoichiometry and represents a value of −2.0 or more and 2.0 or less, and y represents a value of 0.01 or more and 1.1 or less;

$$Ba_3W_{(1-x)}V_{(1+x)}O_{(8.5+z)} \tag{8}$$

in the formula (8), x represents a value of −0.8 or more and 0.2 or less, z is an oxygen non-stoichiometry and represents a value of −1.0 or more and 1.0 or less;

$$Ba_3Mo_{(1-x)}Ti_{(1+x)}O_{(8+z)} \tag{9}$$

in the formula (9), x represents a value of −0.3 or more and 0.1 or less, z is an oxygen non-stoichiometry and represents a value of −0.1 or more and 0.3 or less;

$$Ba_7Ca_2Mn_5O_{(20+z)} \tag{10}$$

in the formula (10), z is an oxygen non-stoichiometry and represents a value of −1.0 or more and 1.0 or less;

$$Ba_{2.6}Ca_{2.4}La_4Mn_4O_{(19+z)} \tag{11}$$

in the formula (11), z is an oxygen non-stoichiometry and represents a value of −1.0 or more and 1.0 or less;

$$La_2Ca_2MnO_{(7+z)} \tag{12}$$

in the formula (12), z is an oxygen non-stoichiometry and represents a value of −1.0 or more and 1.0 or less; and $$Ba_5M_2Al_2ZrO_{(13+z)} \tag{13}$$

in the formula (13), M represents any of Gd, Dy, Ho, Er, Tm, Yb, or Lu; and z is an oxygen non-stoichiometry and represents a value of −1.0 or more and 1.0 or less.

[4] The solid electrolyte according to [1] or [2], in which x is 0.06 or more and 0.30 or less.

[5] The solid electrolyte according to [3], in which the compound is a compound represented by the general formula (3), and x is 0.06 or more and 0.30 or less.

[6] The solid electrolyte according to [4] or [5], in which x is 0.19 or more and 0.21 or less.

[7] The solid electrolyte according to [2], in which in the compound, an a-axis length, a b-axis length, a c-axis length (Å), an α-angle, a β-angle, and a γ-angle (o) of a lattice constant are $5.35 < a < 6.56$, $5.35 < b < 6.56$, $15.14 < c < 18.52$, $89 < \alpha < 91$, $89 < \beta < 91$, and $119 < \gamma < 121$, for the formula (2), respectively.

[8] The solid electrolyte according to [3], in which in the compound, an a-axis length, a b-axis length, a c-axis length (Å), an α-angle, a β-angle, and a γ-angle (o) of a lattice constant are in the numerical range of $5.35 < a < 6.56$, $5.35 < b < 6.56$, $15.14 < c < 18.52$, $89 < \alpha < 91$, $89 < \beta < 91$, and $119 < \gamma < 121$, for the formulas (3) to (7), $5.23 < a < 6.4$, $5.23 < b < 6.4$, $18.96 < c < 23.19$, $89 < \alpha < 91$, $89 < \beta < 91$, and $119 < \gamma < 121$, for the formula (8), $5.34 < a < 6.54$, $5.34 < b < 6.54$, $19.12 < c < 23.39$, $89 < \alpha < 91$, $89 < \beta < 91$, and $119 < \gamma < 121$, for the formula (9), $5.23 < a < 6.41$, $5.23 < b < 6.41$, $46.23 < c < 56.51$, $89 < \alpha < 91$, $89 < \beta < 91$, and $119 < \gamma < 121$, for the formula (10), $8.85 < a < 10.83$, $5.11 < b < 6.26$, $14.07 < c < 17.21$, $89 < \alpha < 91$, $100 < \beta < 104$, and $89 < \gamma < 91$, for the formula (11), $5.05 < a < 6.19$, $5.05 < b < 6.19$, $15.57 < c < 19.03$, $89 < \alpha < 91$, $89 < \beta < 91$, and $119 < \gamma < 121$, for the formula (12), and $5.35 < a < 6.55$, $5.35 < b < 6.55$, $22.23 < c < 27.18$, $89 < \alpha < 91$, $89 < \beta < 91$, and $119 < \gamma < 121$, for the formula (13), respectively.

[9] The solid electrolyte according to any one of [1] to [8], in which the solid electrolyte is a solid electrolyte used as an oxide ion ($O^{2-}$) conductor and is used under a temperature condition of 300 to 1200° C.

[10] The solid electrolyte according to any one of [1] to [9], in which the solid electrolyte has an electrical conductivity represented by $\log [\sigma(Scm^{-1})]$ of −7 or more when measured at 300° C.

[11] The solid electrolyte according to any one of [1] to [10], in which the solid electrolyte is a solid oxide fuel cell (SOFC), a sensor, a battery, an electrode, an electrolyte, an oxygen concentrator, an oxygen separation membrane, an oxygen permeation membrane, an oxygen pump, a catalyst, a photocatalyst, an electric/electronic/communication device, an energy/environment-related device, or an optical device.

[12] The solid electrolyte according to any one of [1] to [11], in which the solid electrolyte is used for an electrolyte layer used in a solid oxide fuel cell (SOFC), a sensor, an oxygen concentrator, an oxygen separation membrane, an oxygen permeation membrane, or an oxygen pump.

[13] An electrolyte layer containing the solid electrolyte according to any one of [1] to [12].

[14] A battery including the electrolyte layer containing the solid electrolyte according to [13].

[15] The battery according to [14], in which the solid electrolyte is a solid oxide fuel cell (SOFC).

The present embodiment also has the following other aspects.

[1A] A solid electrolyte containing a hexagonal perovskite-related compound, in which the compound is a compound represented by the following general formula (1):

$$Ba_{7-\alpha}Nb_{(4-x-y)}Mo_{(1+x)}M_yO_{(20+z)} \tag{1}$$

in the formula (1), M is a cation of at least one element selected from the group consisting of Ag, Al, At, Au, Be, Bi, Br, Cd, Co, Cr, Cu, Fe, Ga, Ge, Hf, Hg, I, In, Ir, Li, Mg, Mn, Mo, Nb, Ni, Np, Os, P, Pb, Pd, Po, Pt, Pu, Re, Rh, Ru, S, Sb, Sc, Se, Si, Sn, Ta, Tb, Tc, Te, Ti, Tl, U, V, W, Xe, Zn, and Zr; and a represents a Ba deficiency amount and represents a value of 0 or more and 0.5 or less, x represents a value of −0.15 or more and 0.01 or less or 0.01 or more and 0.35 or less, y represents a value of 0.01 or more and 0.35 or less, and z is an oxygen non-stoichiometry and represents a value of −0.2 or more and 0.2 or less.

[2A] A solid electrolyte containing a hexagonal perovskite-related compound, in which the compound is a compound represented by the following general formula (2):

$$Ba_{7-\alpha}Nb_{(4-x-y)}Mo_{(1+x)}M_yO_{(20+z)} \tag{2}$$

in the formula (2), M is a cation of at least one element selected from the group consisting of W, V, Cr, Ge, Si, and Zr; and a represents a Ba deficiency amount and represents a value of 0 or more and 0.5 or less, x represents a value of −0.15 or more and 0.01 or less or 0.01 or more and 0.35 or less, y represents a value of 0.01 or more and 0.35 or less, and z is an oxygen non-stoichiometry and represents a value of −0.2 or more and 0.2 or less.

[3A] A solid electrolyte containing a hexagonal perovskite-related compound, in which the compound is a compound represented by any of the following general formulas (3) to (6):

$$Ba_7Nb_{(4-x)}Mo_{(1+x)}O_{(20+z)} \tag{3}$$

in the formula (3), x represents a value of −0.15 or more and −0.01 or less or 0.01 or more and 0.20 or less, and z is an oxygen non-stoichiometry and represents a value of −0.2 or more and 0.2 or less;

$$Ba_7Nb_{(4-y)}MoM_yO_{(20+z)} \tag{4}$$

in the formula (4), M is a cation of at least one element selected from the group consisting of W, V, Ge, Si, and Zr; and y represents a value of 0.01 or more and 0.2 or less, and z is an oxygen non-stoichiometry and represents a value of –0.2 or more and 0.2 or less;

$$Ba_7Nb_4Mo_{(1-y)}V_yO_{(20+z)} \quad (5),$$

in the formula (5), z is an oxygen non-stoichiometry and represents a value of –0.2 or more and 0.2 or less, and y represents a value of 0.01 or more and 0.2 or less;

$$Ba_7Nb_{(4-y)}MoCr_yO_{(20+z)} \quad (6),$$

in the formula (6), z is an oxygen non-stoichiometry and represents a value of –0.2 or more and 0.2 or less, and y represents a value of 0.01 or more and 0.35 or less;

[4A] The solid electrolyte according to any one of [1A] to [3A], in which x is 0.06 or more and 0.12 or less.

[5A] The solid electrolyte according to [4A], in which x is 0.09 or more and 0.11 or less.

[6A] The solid electrolyte according to any one of [1A] to [5A], in which in the compound, an a-axis length, a b-axis length, a c-axis length (Å), an α-angle, a β-angle, and a γ-angle (o) of a lattice constant are in the numerical range of $5.83<a<6.08$, $5.83<b<6.08$, $16.4<c<17.17$, $89<\alpha<91$, $89<\beta<91$, and $119<\gamma<121$, respectively.

[7A] The solid electrolyte according to any one of [1A] to [6A], in which the solid electrolyte has an electrical conductivity represented by log $[\sigma(Scm^{-1})]$ of –6.2 or more when measured at 300° C.

Advantageous Effects of Invention

According to the present invention, a solid electrolyte having high electrical conductivity even in a low-temperature region, and an electrolyte layer and a battery using the solid electrolyte can be obtained.

BRIEF DESCRIPTION OF THE DRAWINGS

FIG. 58 shows the total electrical conductivity of $Ba_{2.6}Ca_{1.4}La_4Mn_4O_{19}$ of Test Example 72 in a temperature-dependent manner.

DETAILED DESCRIPTION OF THE PREFERRED EMBODIMENTS

Figure 1:
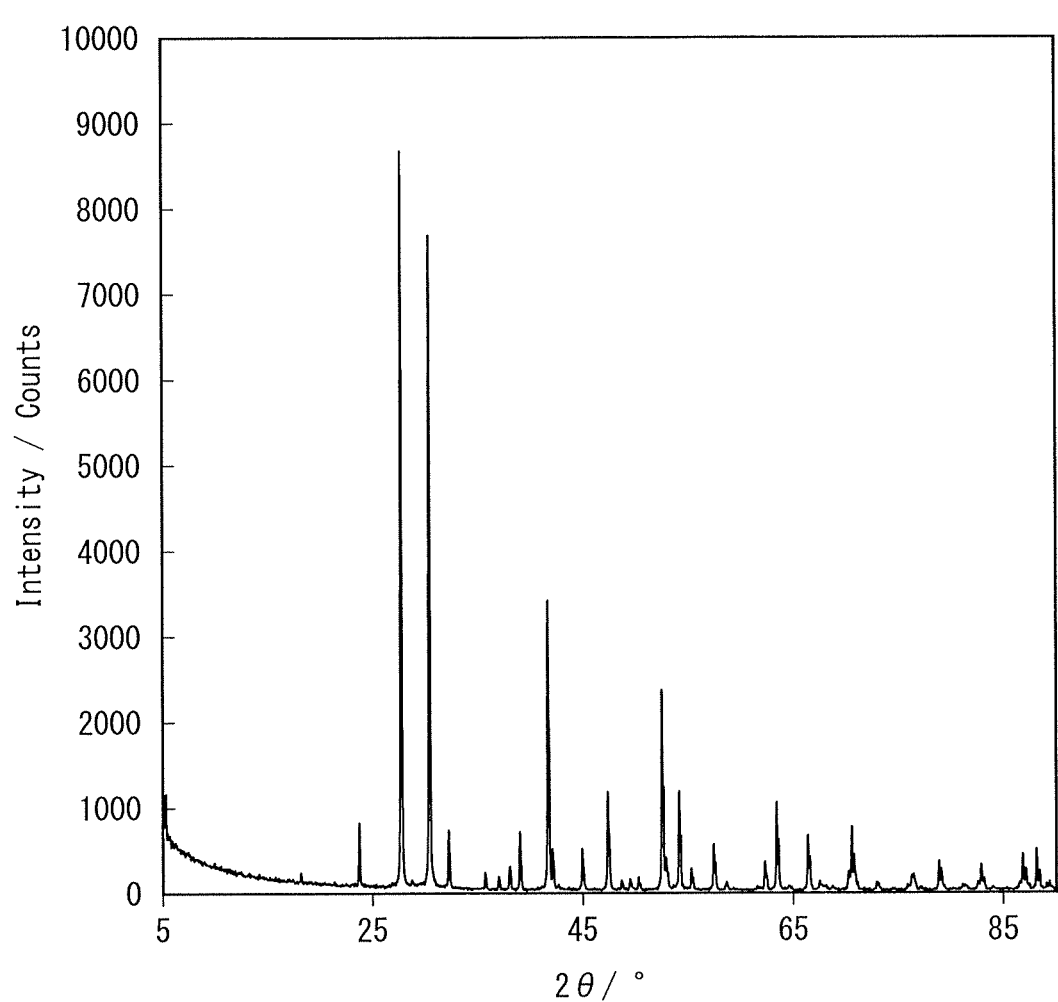
FIG. 1 is a graph showing an X-ray diffraction (XRD) pattern of Test Example 1 of the present example.
Figure 2:
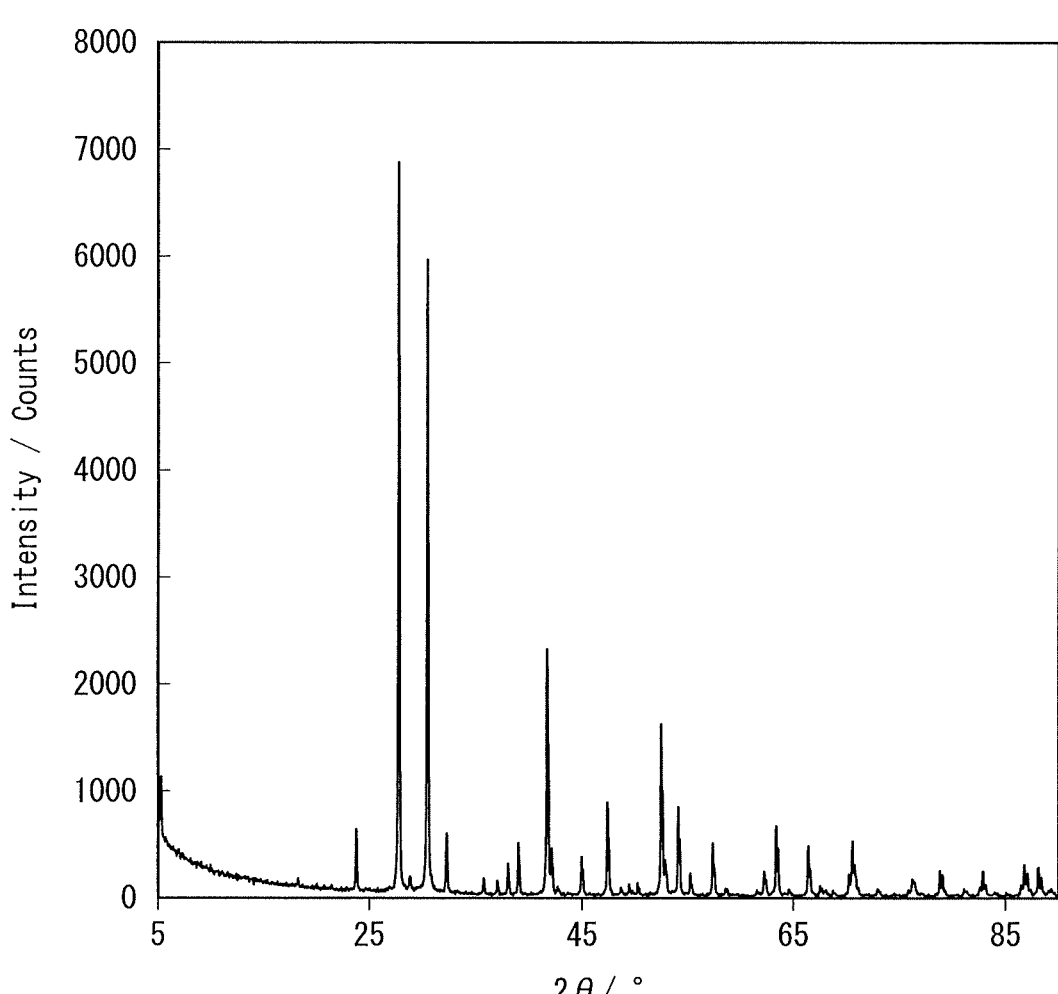
FIG. 2 is a graph showing the XRD pattern of Test Example 2 of the present example.
Figure 3:
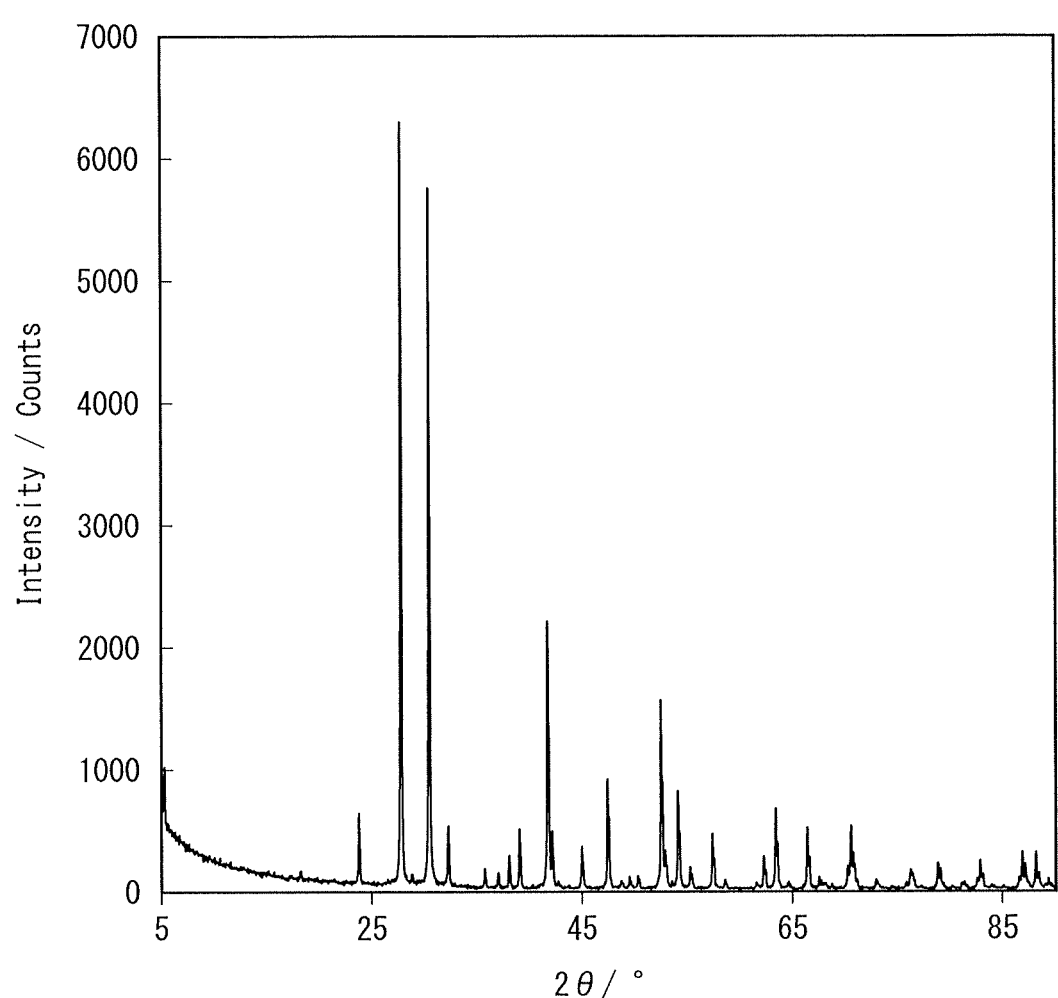
FIG. 3 is a graph showing the XRD pattern of Test Example 3 of the present example.
Figure 4:
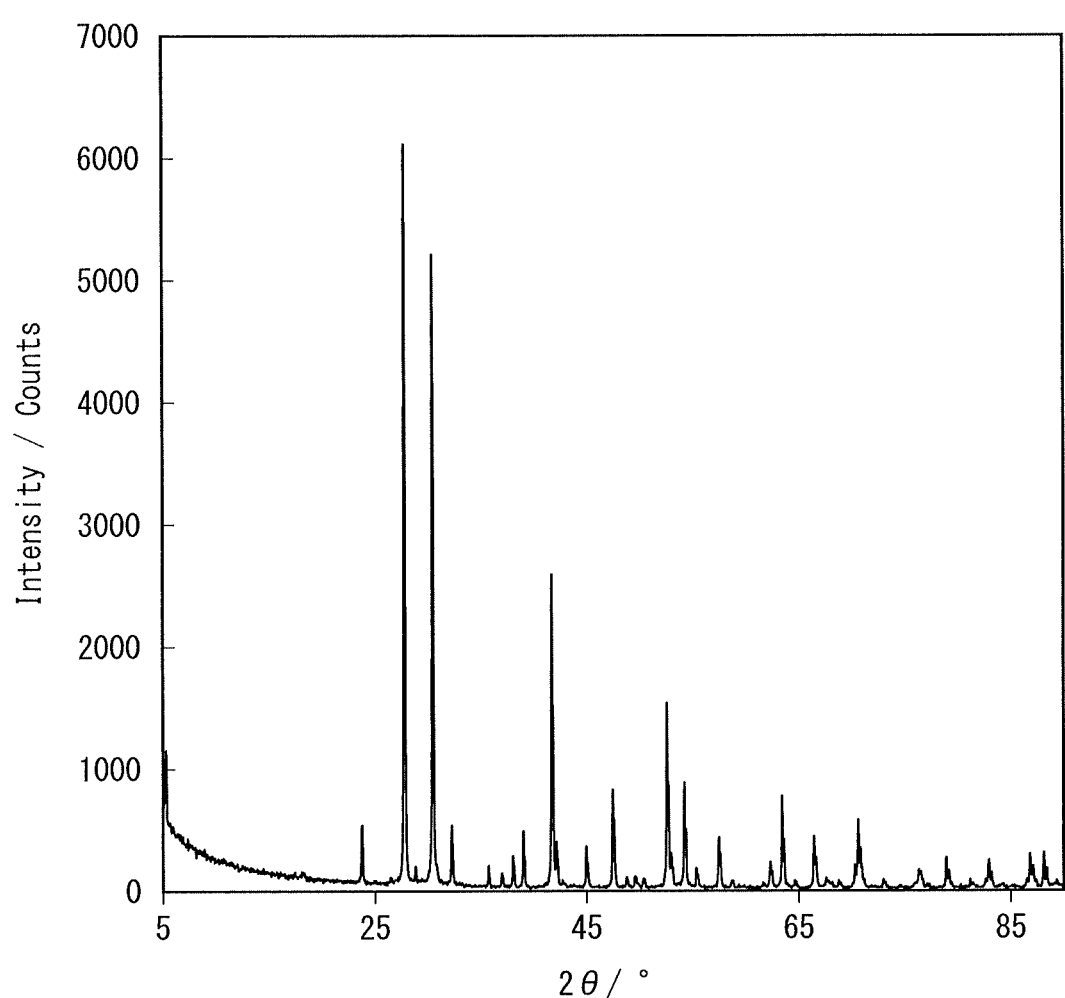
FIG. 4 is a graph showing the XRD pattern of Test Example 4 of the present example.
Figure 5:
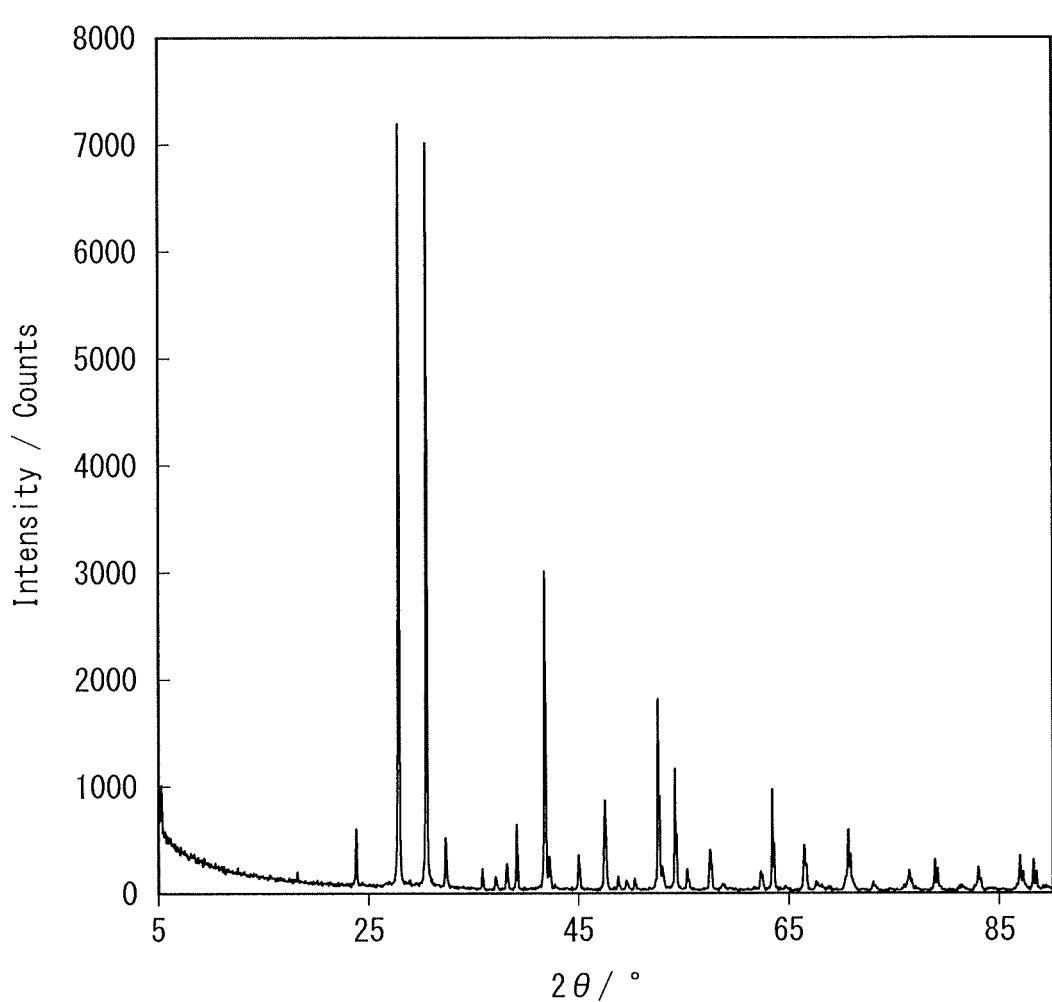
FIG. 5 is a graph showing the XRD pattern of Test Example 5 of the present example.
Figure 6:
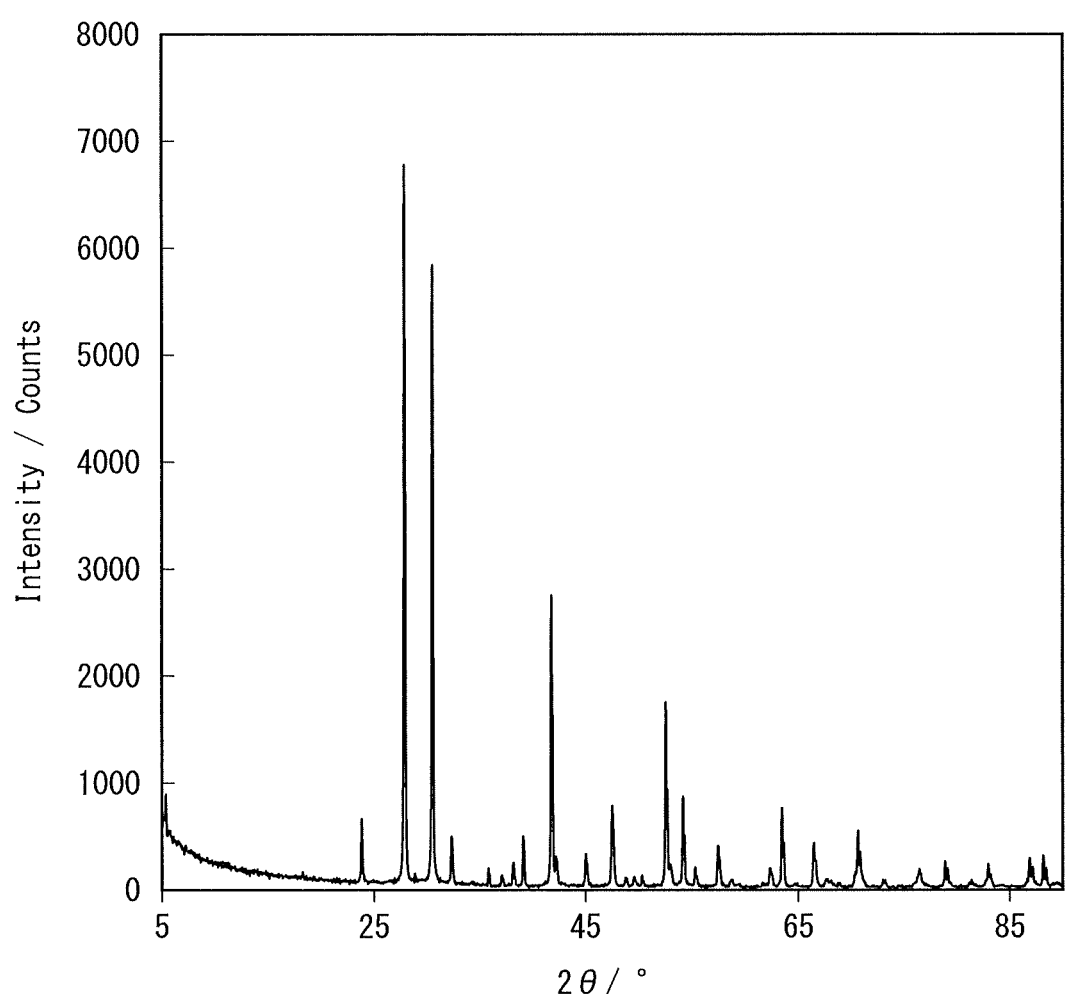
FIG. 6 is a graph showing the XRD pattern of Test Example 6 of the present example.
Figure 7:
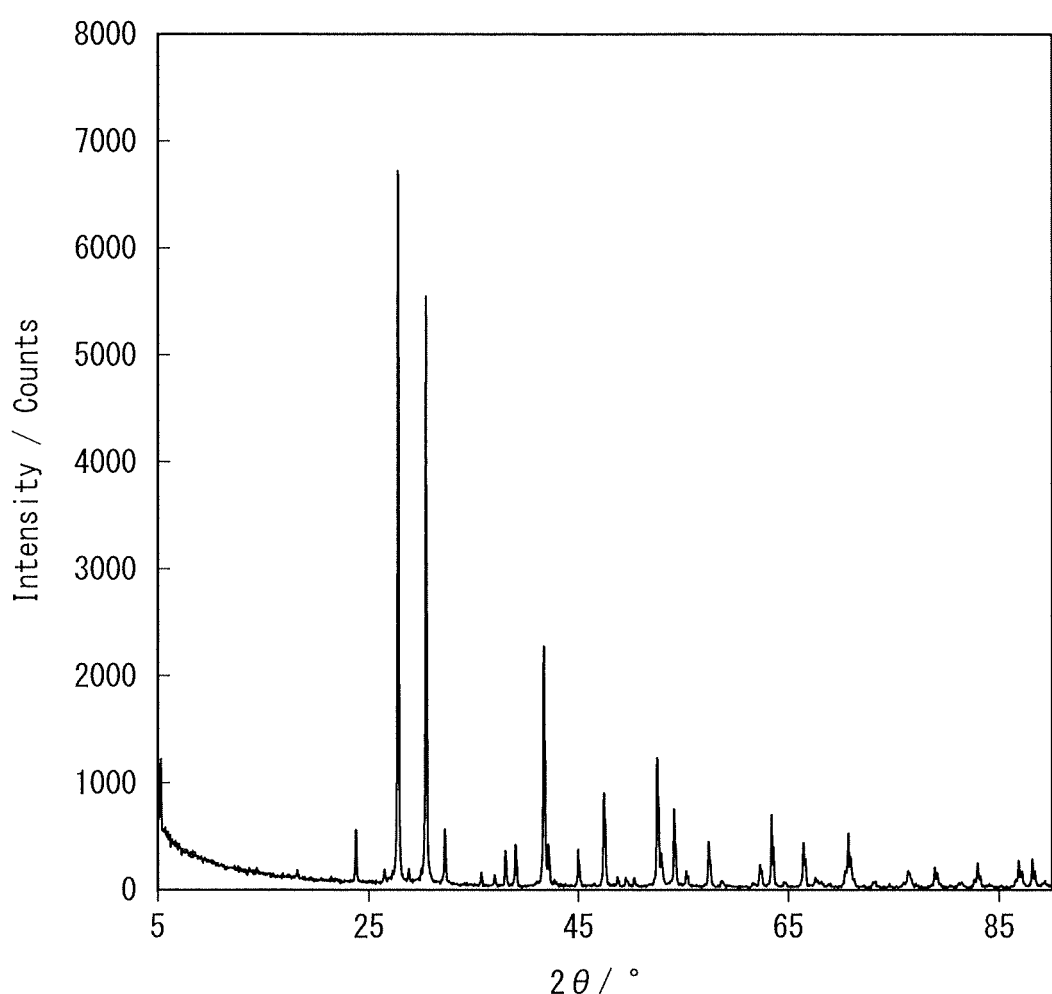
FIG. 7 is a graph showing the XRD pattern of Test Example 7 of the present example.
Figure 8:
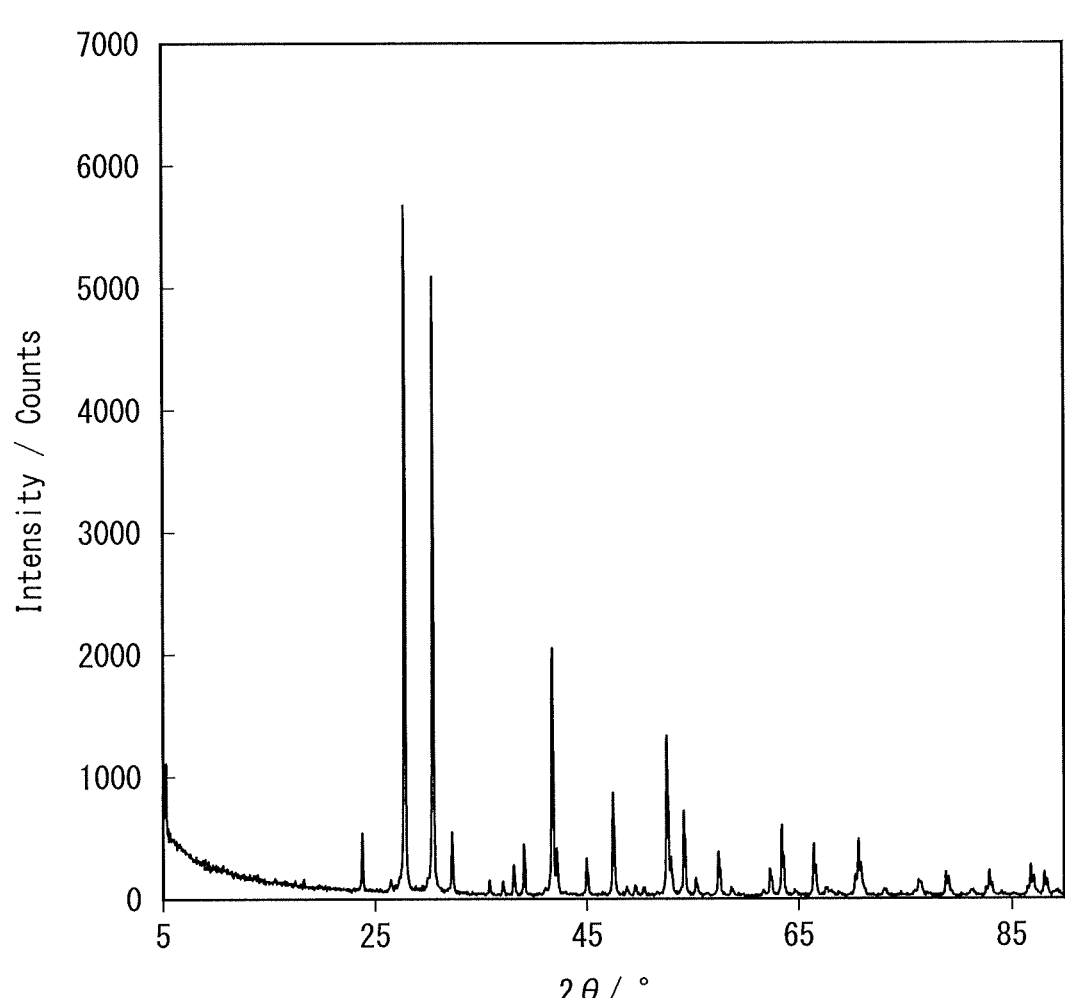
FIG. 8 is a graph showing the XRD pattern of Test Example 8 of the present example.
Figure 9:
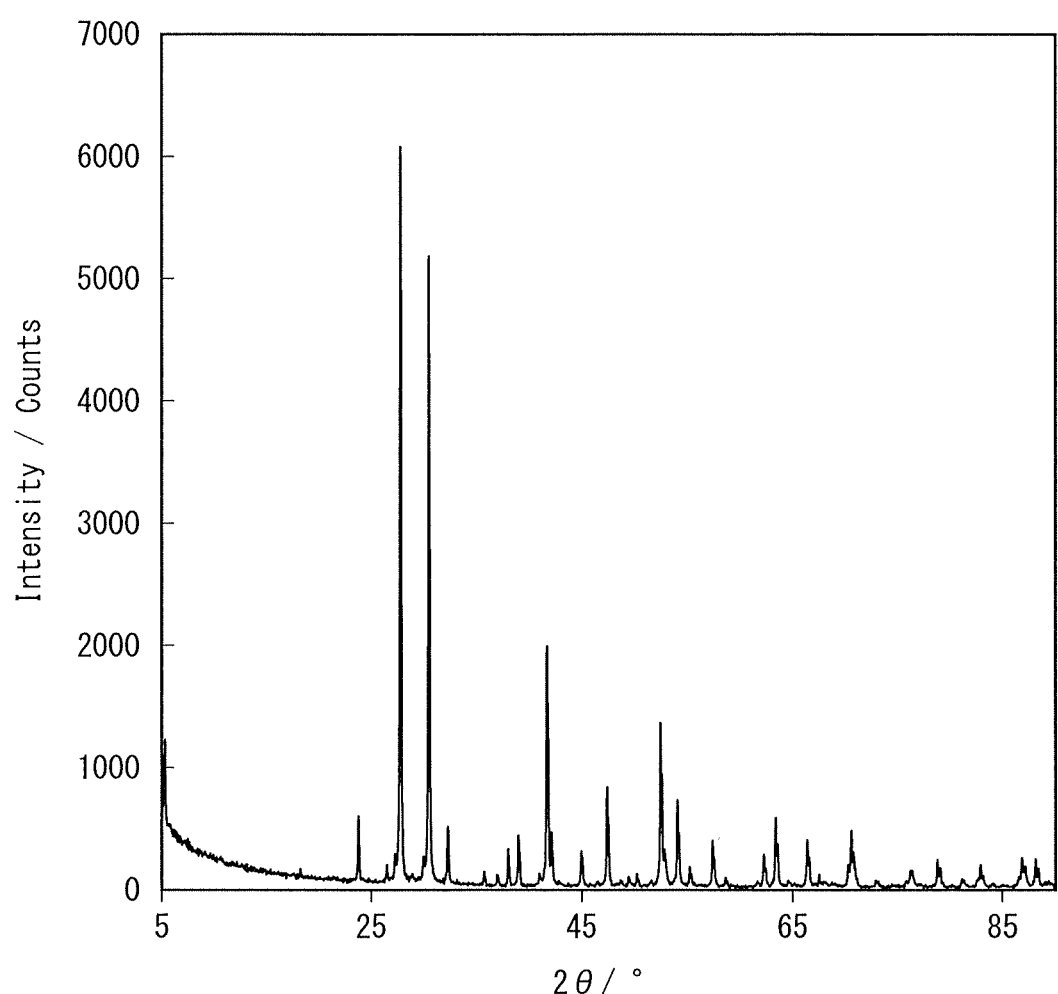
FIG. 9 is a graph showing the XRD pattern of Test Example 9 of the present example.
Figure 10:
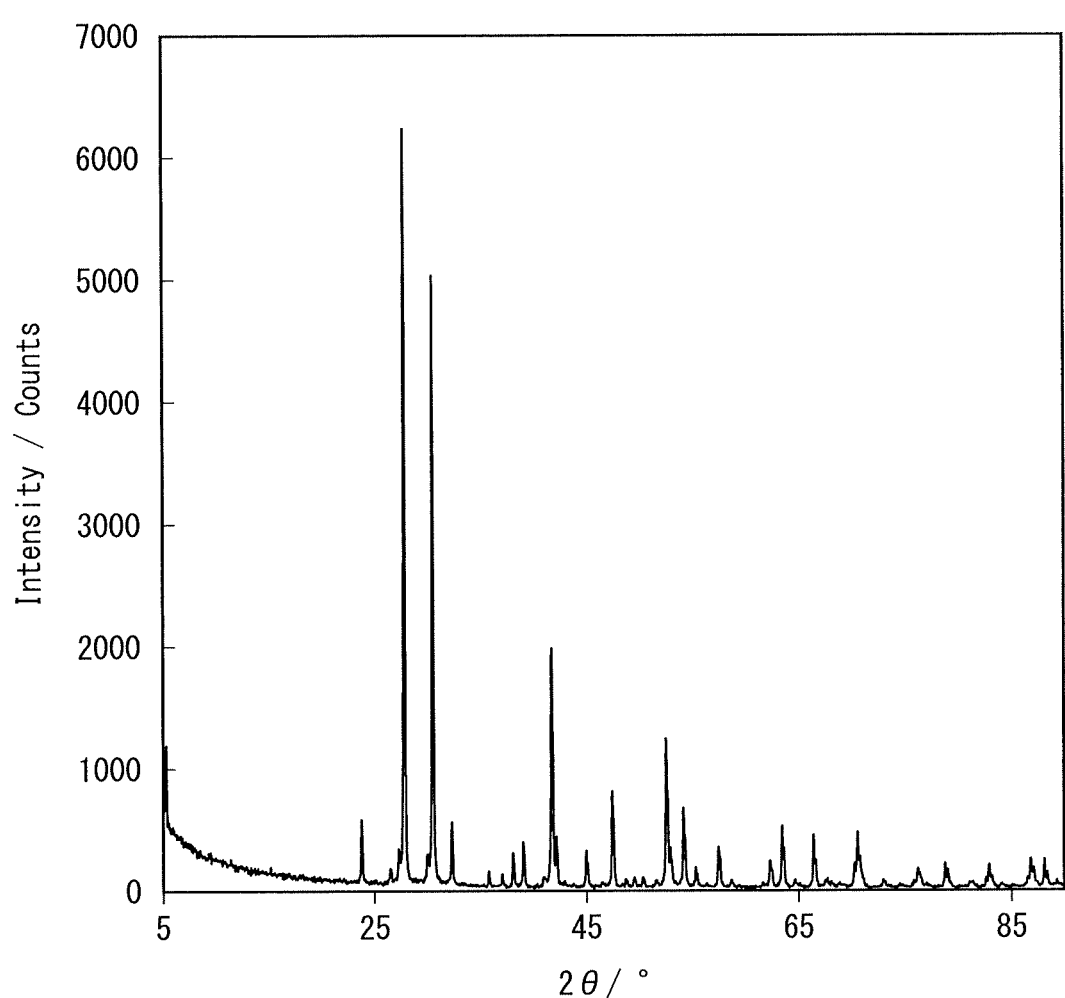
FIG. 10 is a graph showing the XRD pattern of Test Example 10 of the present example.
Figure 11:
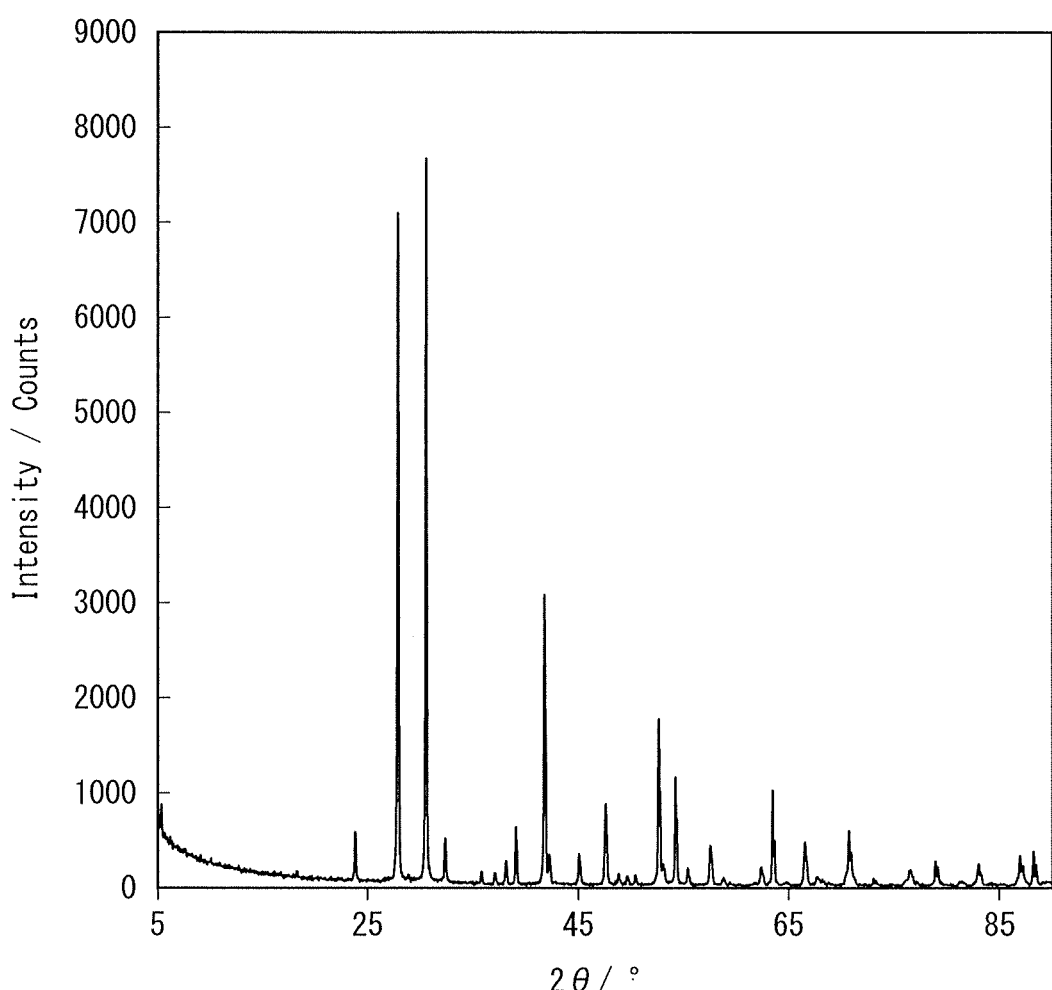
FIG. 11 is a graph showing the XRD pattern of Test Example 11 of the present example.
Figure 12:
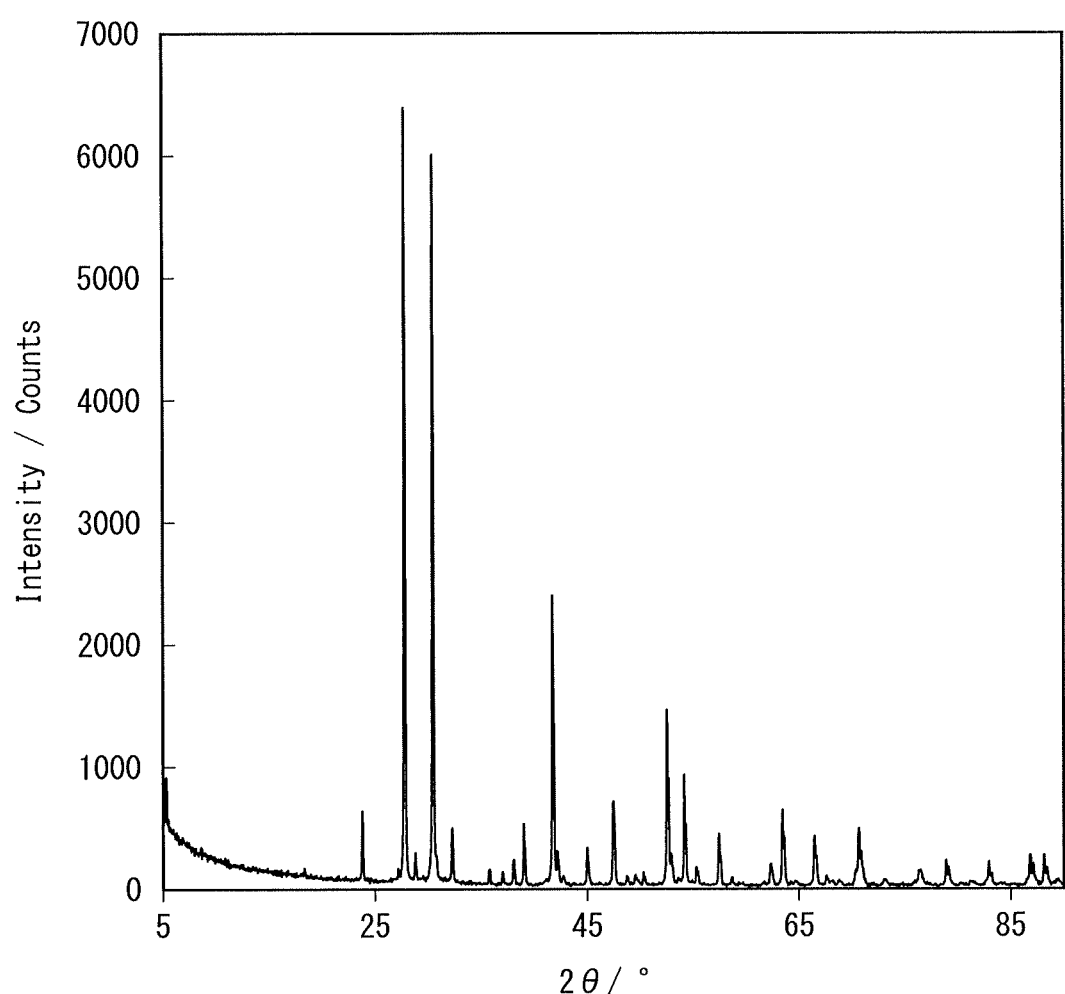
FIG. 12 is a graph showing the XRD pattern of Test Example 12 of the present example.
Figure 13:
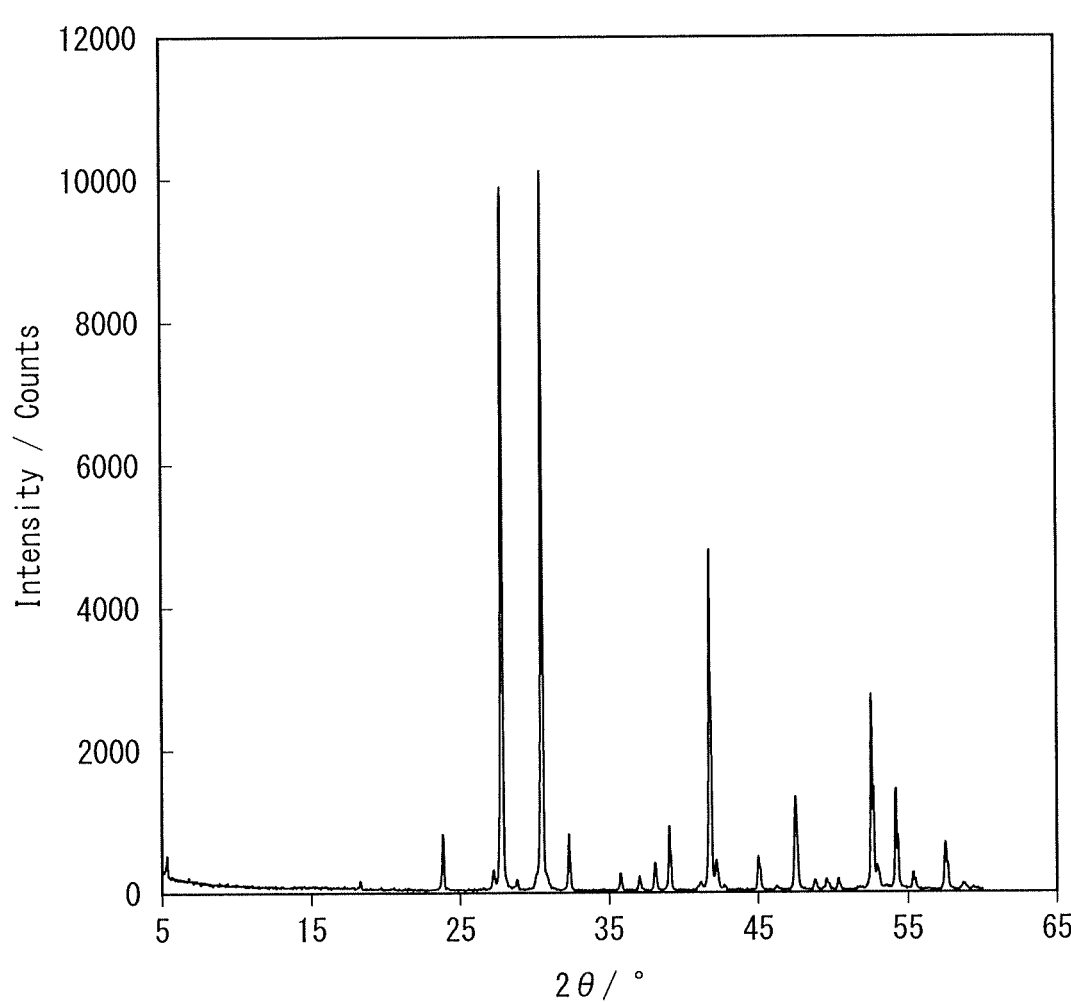
FIG. 13 is a graph showing the XRD pattern of Test Example 13 of the present example.
Figure 14:
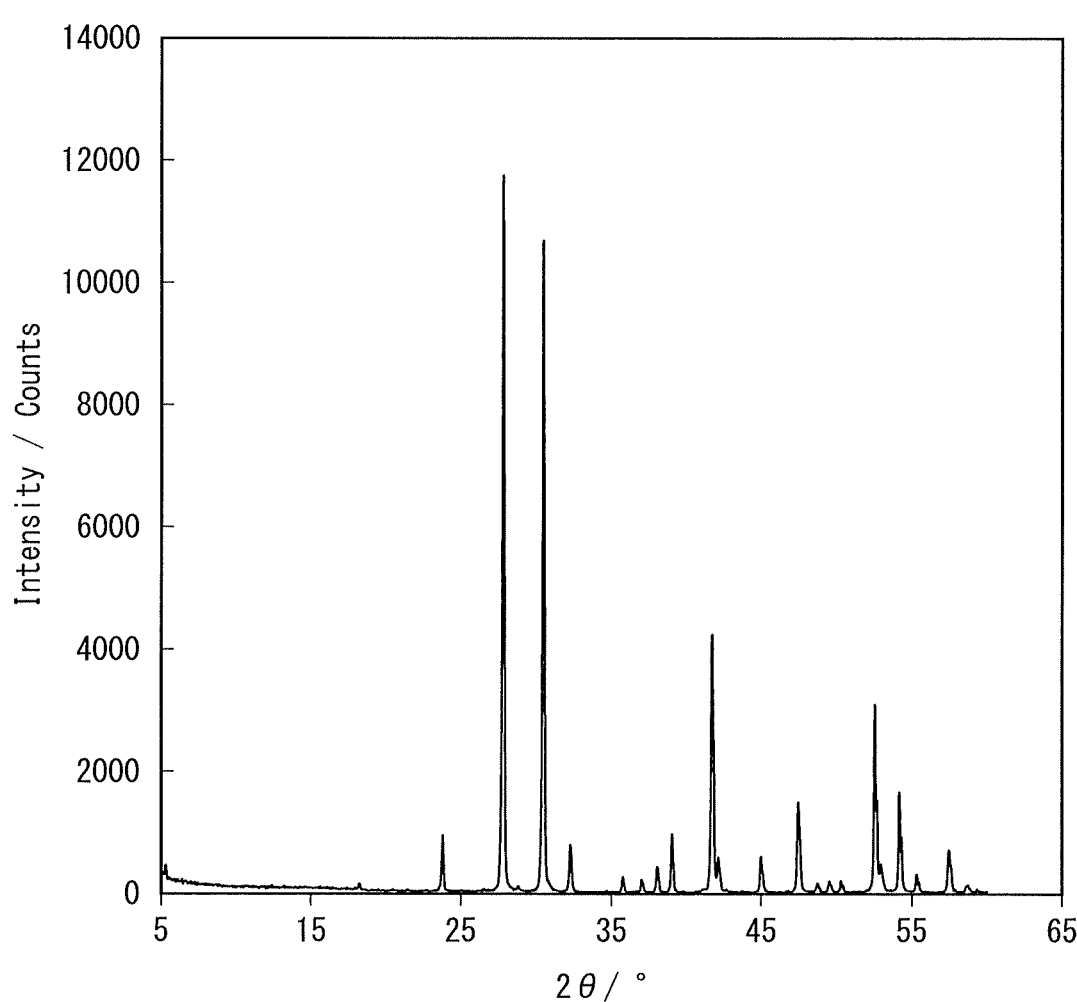
FIG. 14 is a graph showing the XRD pattern of Test Example 14 of the present example.
Figure 15:
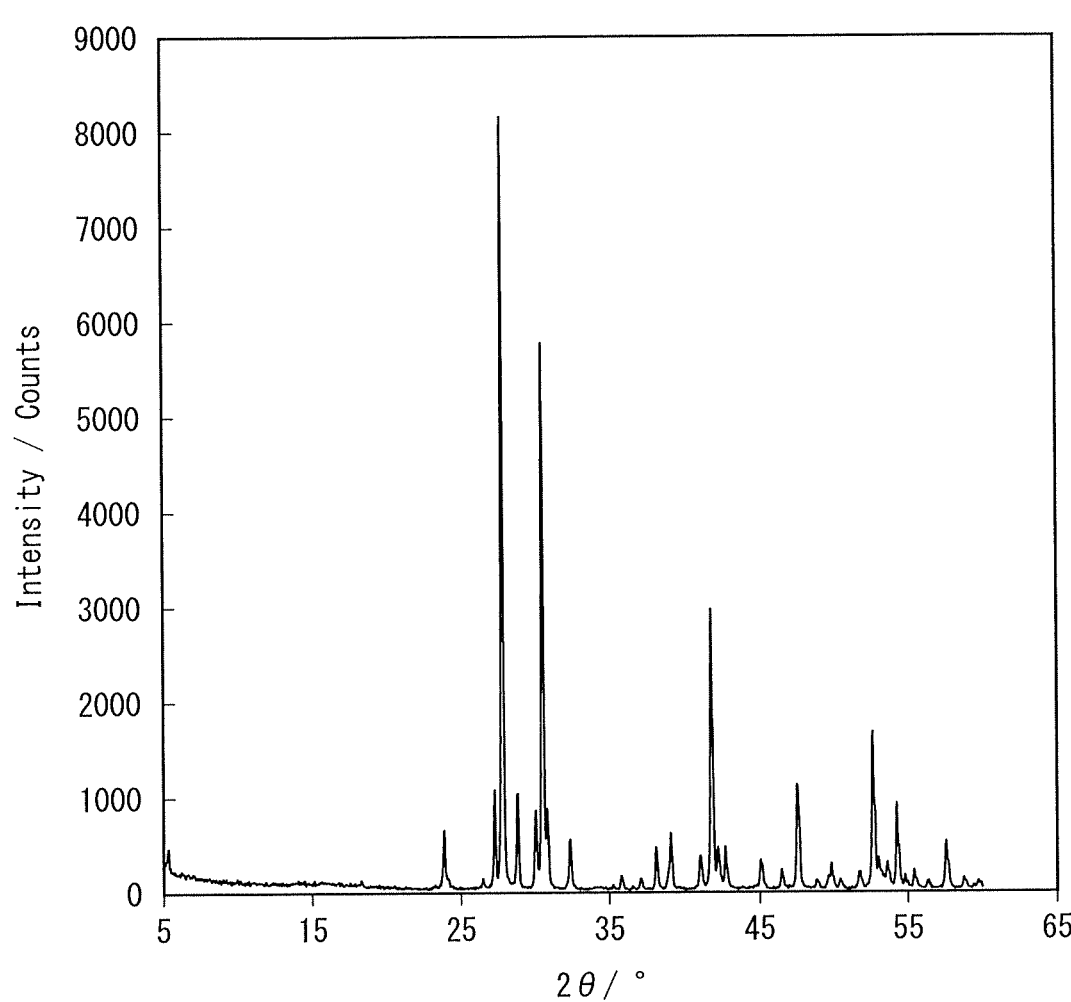
FIG. 15 is a graph showing the XRD pattern of Test Example 15 of the present example.
Figure 16:
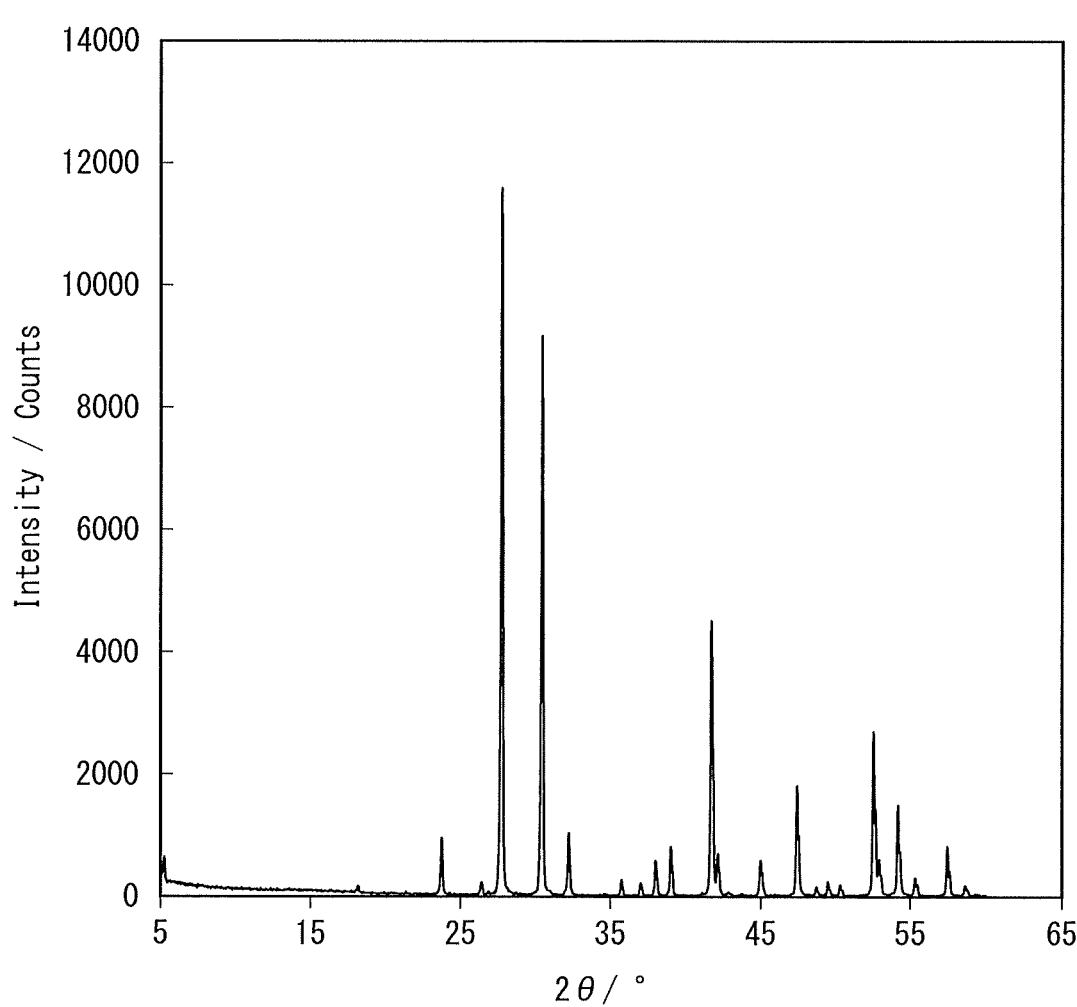
FIG. 16 is a graph showing the XRD pattern of Test Example 16 of the present example.
Figure 17:
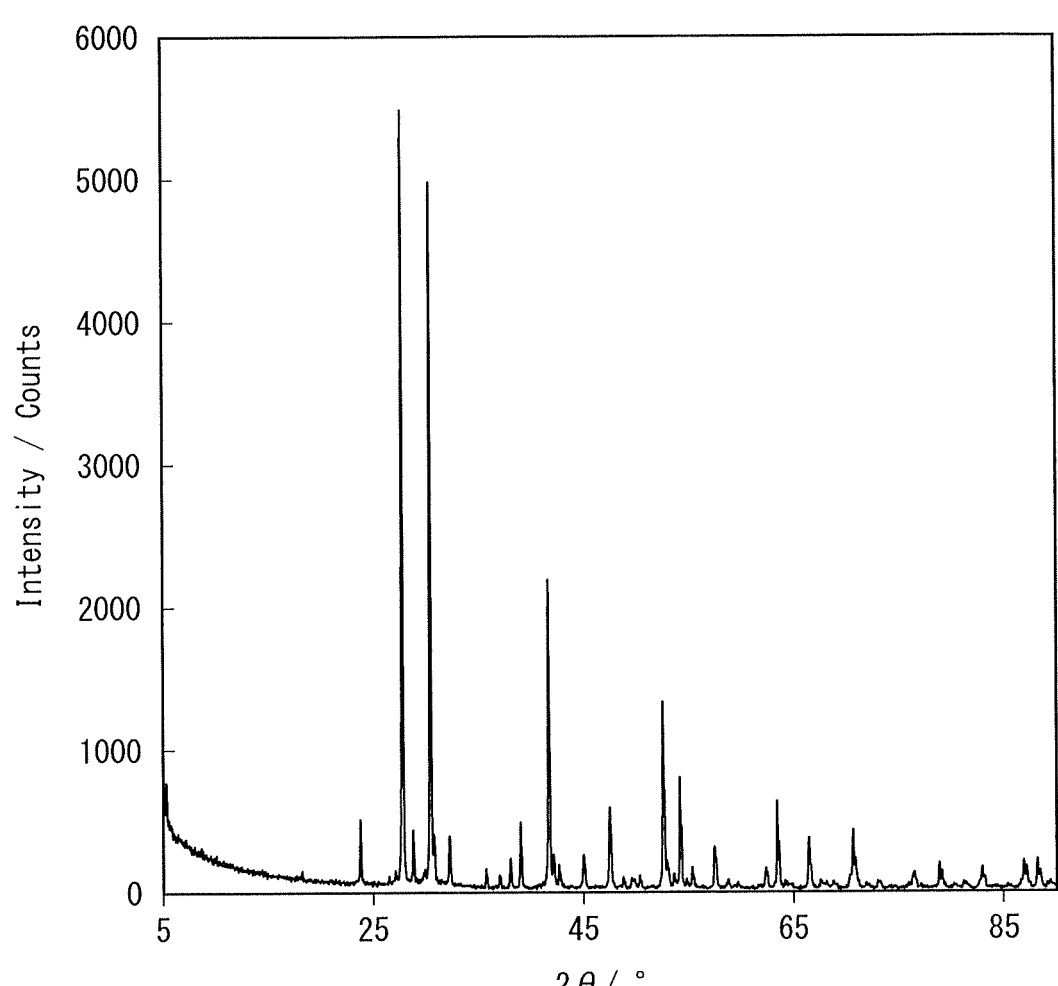
FIG. 17 is a graph showing the XRD pattern of Test Example 17 of the present example.
Figure 18:
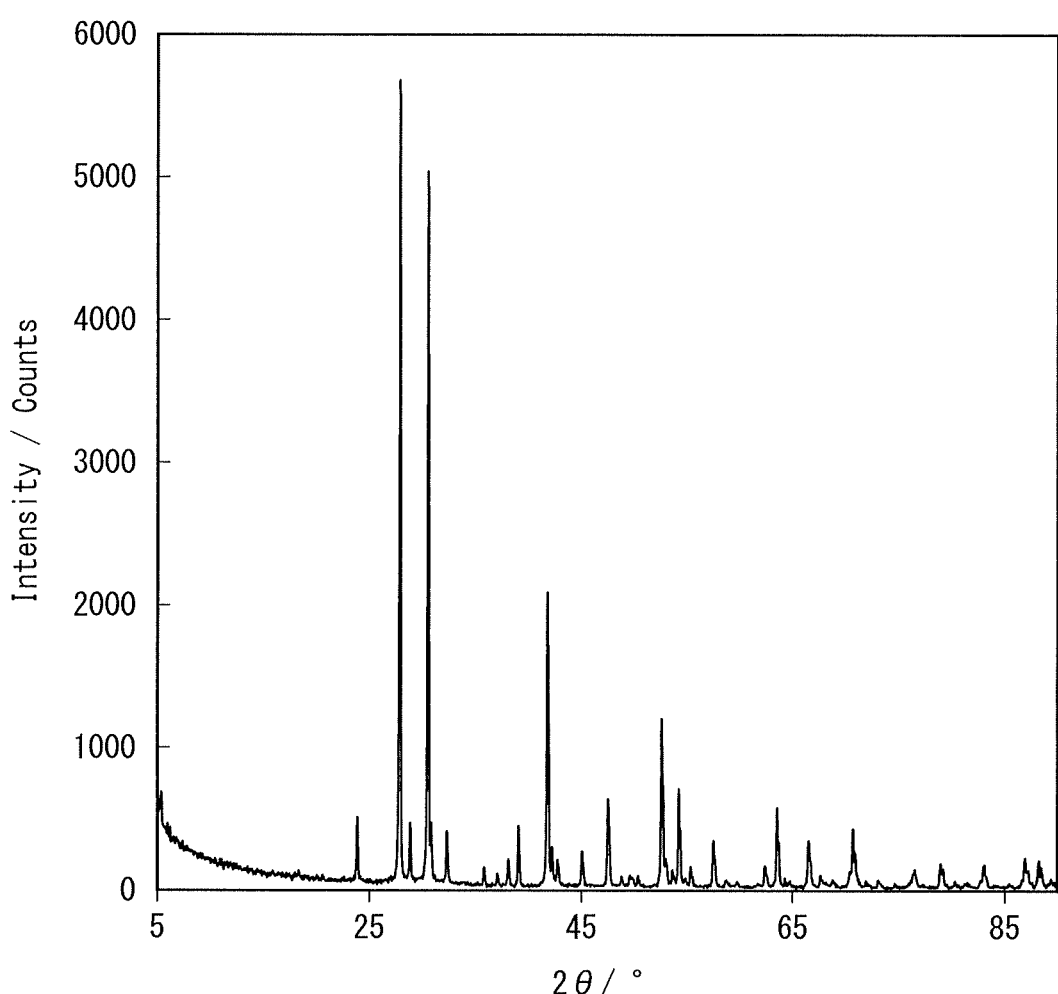
FIG. 18 is a graph showing the XRD pattern of Test Example 18 of the present example.
Figure 19:
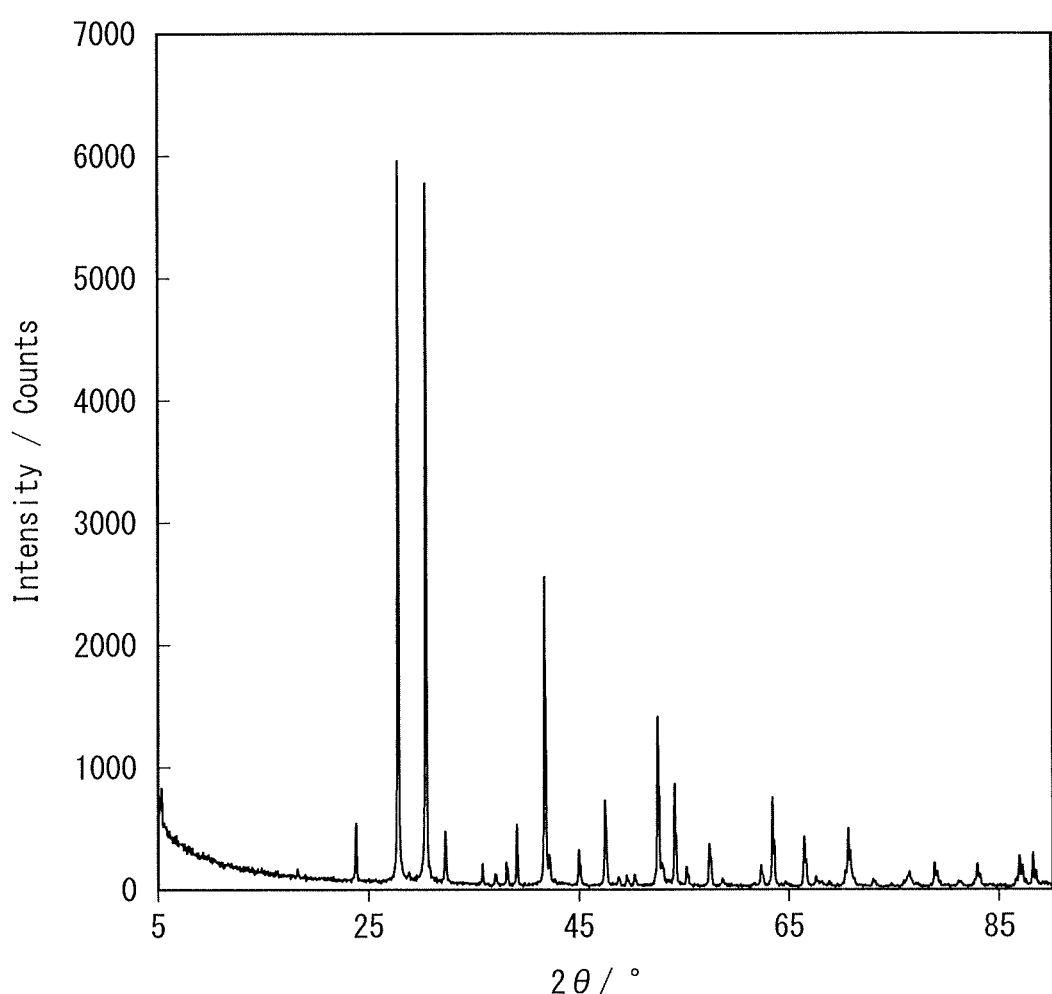
FIG. 19 is a graph showing the XRD pattern of Test Example 19 of the present example.
Figure 20:
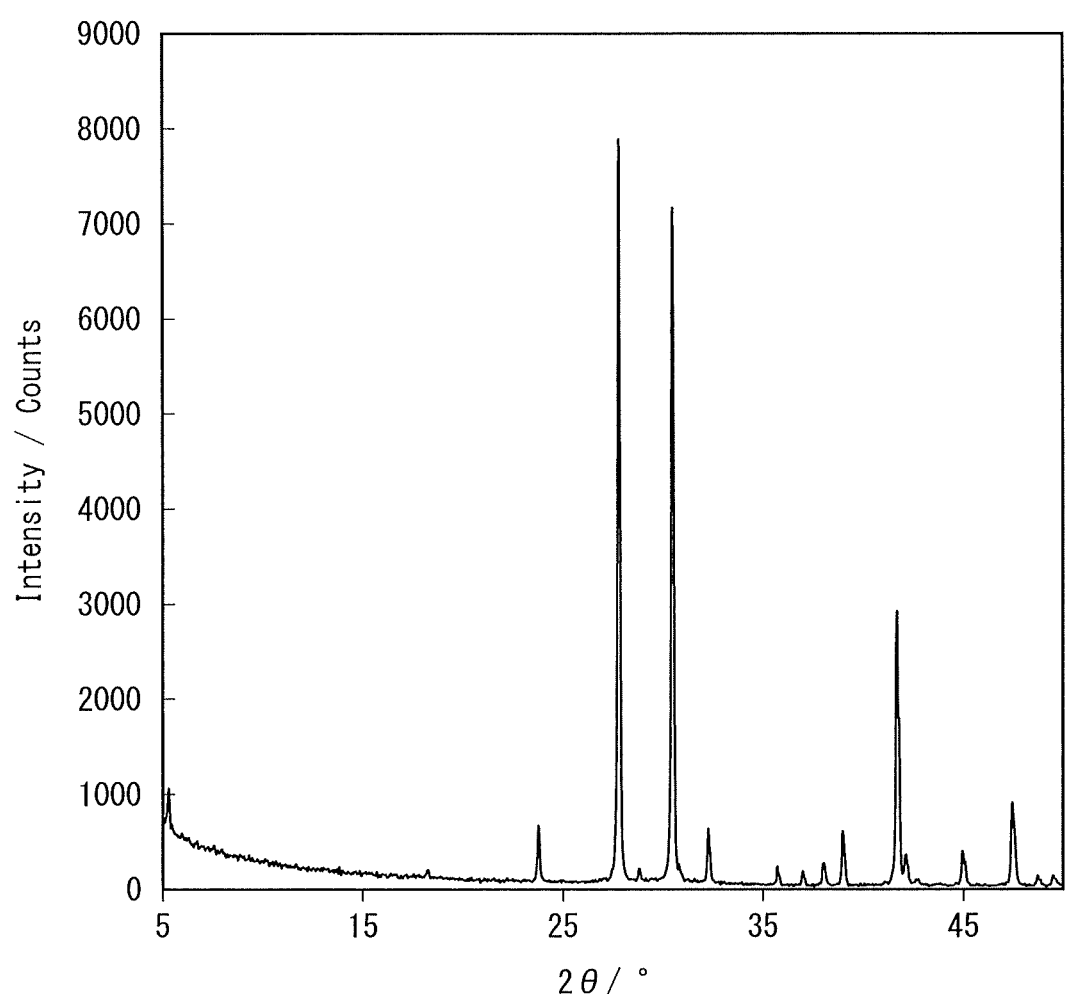
FIG. 20 is a graph showing the XRD pattern of Test Example 20 of the present example.
Figure 21:
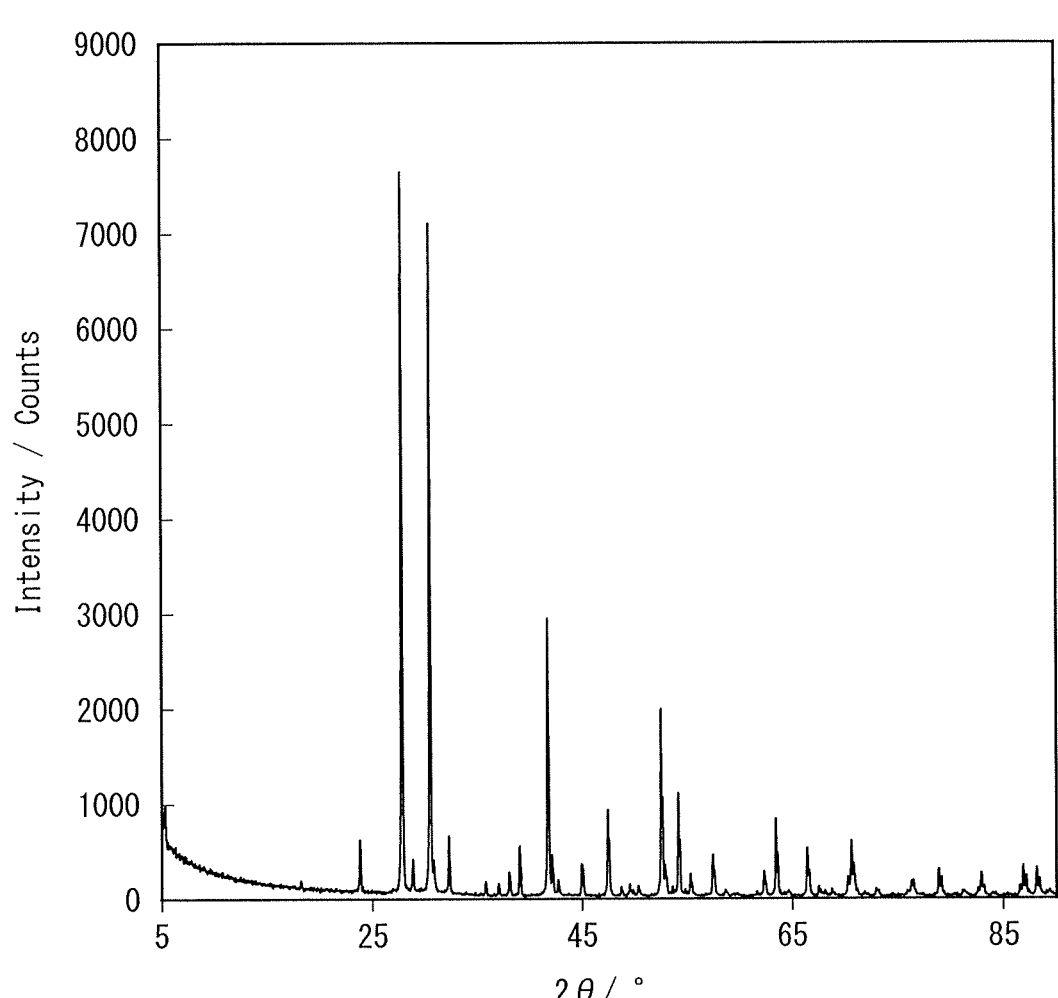
FIG. 21 is a graph showing the XRD pattern of Test Example 21 of the present example.

Hereinafter, a solid electrolyte, an electrolyte layer, and a battery according to the present invention will be described with reference to embodiments. However, the present invention is not limited to the following embodiments.
Solid Electrolyte A solid electrolyte of the present embodiment contains a hexagonal perovskite-related compound that includes a compound represented by a specific general formula described later. Here, the solid electrolyte is a material through which ions are conducted, and also includes a material through which both ions and (protons, electrons or holes thereof) are conducted. The hexagonal perovskite-related compound in the present embodiment is a compound having a layered structure containing a hexagonal perovskite unit or a compound having a similar structure.

The hexagonal perovskite-related compound in the solid electrolytes of the present embodiment has a composition in which the Nb concentration or the Mo concentration is increased or decreased and/or the concentration of one or more cation-forming elements is increased with respect to conventionally known $Ba_7Nb_4MoO_{20}$. The cation-forming element described above is preferably at least one element selected from the group consisting of Ag, Al, At, Au, Be, Bi, Br, Ca, Cd, Ce, Co, Cr, Cu, Dy, Er, Eu, Fe, Ga, Gd, Ge, Hf, Hg, Ho, I, In, Ir, La, Li, Lu, Mg, Mn, Na, Nb, Nd, Ni, Np, Os, P, Pb, Pd, Po, Pr, Pt, Pu, Re, Rh, Ru, S, Sb, Sc, Se, Si, Sm, Sn, Sr, Ta, Tb, Tc, Te, Ti, Tl, Tm, U, V, W, Xe, Y, Yb, Zn, and Zr, and more preferably at least one element selected from the group consisting of W, V, Cr, Mn, Ge, Yb, Zn, and Zr.

Specifically, the solid electrolyte of the present embodiment contains a hexagonal perovskite-related compound represented by any of the following general formulas (1) to (13).

$$Ba_{7-\alpha}Nb_{(4-x-y)}Mo_{(1+x)}M_yO_{(20+z)} \tag{1}$$

in the formula (1), M is a cation of at least one element selected from the group consisting of Ag, Al, At, Au, Be, Bi, Br, Ca, Cd, Ce, Co, Cr, Cu, Dy, Er, Eu, Fe, Ga, Gd, Ge, Hf, Hg, Ho, I, In, Ir, La, Li, Lu, Mg, Mn, Na, Nb, Nd, Ni, Np, Os, P, Pb, Pd, Po, Pr, Pt, Pu, Re, Rh, Ru, S, Sb, Sc, Se, Si, Sm, Sn, Sr, Ta, Tb, Tc, Te, Ti, Tl, Tm, U, V, W, Xe, Y, Yb, Zn, and Zr; and a represents a Ba deficiency amount and represents a value of 0 or more and 0.5 or less, x represents a value of $-1.1$ or more and 1.1 or less, y represents a value of 0 or more and 1.1 or less, and z represents an oxygen non-stoichiometry and represents a value of $-2.0$ or more and 2.0 or less, provided that in the formula (1), $|x|+y\geq0.01$ is satisfied.

$$Ba_{7-\alpha}Nb_{(4-x-y)}Mo_{(1+x)}M_yO_{(20+z)} \tag{2}$$

in the formula (2), M is a cation of at least one element selected from the group consisting of W, V, Cr, Mn, Ge, Si, and Zr; and a represents a Ba deficiency amount and represents a value of 0 or more and 0.5 or less, x represents a value of $-1.1$ or more and 1.1 or less, y represents a value of 0 or more and 1.1 or less and satisfying $|x|+y\geq0.01$, and z is an oxygen non-stoichiometry and represents a value of $-2.0$ or more and 2.0 or less.

$$Ba_7Nb_{(4-x)}Mo_{(1+x)}O_{(20+z)} \tag{3}$$

in the formula (3), x represents a value of $-1.1$ or more and $-0.01$ or less or $0.01$ or more and $1.1$ or less, and z is an oxygen non-stoichiometry and represents a value of $-2.0$ or more and $2.0$ or less.

$$Ba_7Nb_{(4-y)}MoM_yO_{(20+z)} \quad (4),$$

in the formula (4), M is a cation of at least one element selected from the group consisting of V, Mn, Ge, Si, and Zr; and y represents a value of $0.01$ or more and $1.1$ or less, and z is an oxygen non-stoichiometry and represents a value of $-2.0$ or more and $2.0$ or less.

$$Ba_7Nb_4Mo_{(1-y)}M_yO_{(20+z)} \quad (5),$$

in the formula (5), M is a cation of at least one element selected from the group consisting of V and Mn; and z is an oxygen non-stoichiometry and represents a value of $-2.0$ or more and $2.0$ or less, and y represents a value of $0.01$ or more and $1.1$ or less.

$$Ba_7Nb_{(4-y)}MoCr_yO_{(20+z)} \quad (6),$$

in the formula (6), z is an oxygen non-stoichiometry and represents a value of $-2.0$ or more and $2.0$ or less, and y represents a value of $0.01$ or more and $1.1$ or less].

$$Ba_7Nb_{(4-y)}MoW_yO_{(20+z)} \quad (7),$$

in the formula (7), z is an oxygen non-stoichiometry and represents a value of $-2.0$ or more and $2.0$ or less, and y represents a value of $0.01$ or more and $1.1$ or less].

In the formulas (1), (2), and (3), x is preferably $0.01$ or more and $0.34$ or less, more preferably $0.18$ or more and $0.22$ or less, and particularly preferably $0.19$ or more and $0.21$ or less. When x is the above value, particularly a value close to $0.20$, the electrical conductivity at a low temperature becomes particularly high.

In the formulas (1) and (2), y is preferably $0.06$ or more and $0.24$ or less, more preferably $0.08$ or more and $0.22$ or less, and particularly preferably $0.09$ or more and $0.21$ or less. When y is the above value, particularly a value of $0.1$ or more and $0.2$ or less, the electrical conductivity at a low temperature becomes particularly high.

In the formulas (4) and (5), y is preferably $0.06$ or more and $0.14$ or less, more preferably $0.08$ or more and $0.12$ or less, and particularly preferably $0.09$ or more and $0.11$ or less. When y is the above value, particularly a value close to $0.10$, the electrical conductivity at a low temperature becomes particularly high.

In the formulas (6), y is preferably $0.16$ or more and $0.24$ or less, more preferably $0.18$ or more and $0.22$ or less, and particularly preferably $0.19$ or more and $0.21$ or less. When y is the above value, particularly a value close to $0.20$, the electrical conductivity at a low temperature becomes particularly high.

In the formulas (7), y is preferably $0.11$ or more and $0.19$ or less, more preferably $0.13$ or more and $0.17$ or less, and particularly preferably $0.14$ or more and $0.16$ or less. When y is the above value, particularly a value close to $0.15$, the electrical conductivity at a low temperature becomes particularly high.

It is also preferable that $$Ba_3W_{(1-x)}V_{(1+x)}O_{(8.5+z)} \quad (8),$$

in the formula (8), x is preferably $-0.8$ or more and $0.2$ or less, more preferably $-0.64$ or more and $-0.56$ or less, more preferably $-0.62$ or more and $0.58$ or less, and more preferably $-0.61$ or more and $-0.59$ or less; when x is a value particularly close to $-0.60$, the electrical conductivity at a low temperature becomes particularly high; and z is an oxygen non-stoichiometry and represents a value of $-1.0$ or more and $1.0$ or less be satisfied.

It is also preferable that $$Ba_3Mo_{(1-x)}Ti_{(1+x)}O_{(8+z)} \quad (9),$$

in the formula (9), x is preferably $-0.3$ or more and $0.1$ or less, more preferably $-0.14$ or more and $-0.06$ or less, more preferably $-0.12$ or more and $0.08$ or less, and more preferably $-0.11$ or more and $-0.09$ or less; when x is a value particularly close to $-0.10$, the electrical conductivity at a low temperature becomes particularly high; and z is an oxygen non-stoichiometry and represents a value of $-0.1$ or more and $0.3$ or less be satisfied.

It is also preferable that $$Ba_7Ca_2Mn_5O_{(20+z)} \quad (10),$$

in the formula (10), z is an oxygen non-stoichiometry and represents a value of $-1.0$ or more and $1.0$ or less be satisfied.

It is also preferable that $$Ba_{2.6}Ca_{2.4}La_4Mn_4O_{(19+z)} \quad (11),$$

in the formula (11), z is an oxygen non-stoichiometry and represents a value of $-1.0$ or more and $1.0$ or less be satisfied.

It is also preferable that $$La_2Ca_2MnO_{(7+z)} \quad (12),$$

in the formula (12), z is an oxygen non-stoichiometry and represents a value of $-1.0$ or more and $1.0$ or less be satisfied.

It is also preferable that $$Ba_5M_2Al_2ZrO_{(13+z)} \quad (13),$$

in the formula (13), M represents any of Gd, Dy, Ho, Er, Tm, Yb, or Lu; and z is an oxygen non-stoichiometry and represents a value of $-1.0$ or more and $1.0$ or less be satisfied.

Among the hexagonal perovskite-related compounds of the solid electrolytes of the present embodiment, preferred examples thereof include those in which the Mo/Nb ratio is increased with respect to conventionally known $Ba_7Nb_4MoO_{20}$. That is, when x in the general formula (3) is the excess amount x of Mo, x is preferably a positive value, specifically a value of $0.01$ or more and $0.50$ or less, more preferably a value of $0.01$ or more and $0.34$ or less, still more preferably $0.18$ or more and $0.22$ or less, and particularly preferably $0.19$ or more and $0.21$ or less. Specifically, when the excess amount x of Mo is $0.20$ with respect to $Ba_7Nb_4MoO_{20}$, particularly high electrical conductivity can be obtained.

In addition, the excess amount x of Mo may be appropriately adjusted within a range of $-1.1$ or more and $1.1$ or less depending on the raw materials used and the adjustment process so as to be easily produced. For example, the excess amount x may be a value of $0.01$ or more and $0.20$ or less, or may be a value of $0.09$ or more and $0.11$ or less, and even at these values, high conductivity can be obtained. Further, for example, when the excess amount x of Mo is $0.10$ with respect to $Ba_7Nb_4MoO_{20}$, high conductivity can be obtained.

Further, it may be selected from the above formulas (1) to (13) excluding $Ba_3W_{(1-x)}V_{(1+x)}O_{(8.5+z)}$ ($x=-0.75$, $-0.60$, $-0.50$, $-0.40$, $-0.25$, $-0.10$, $-0.05$, $0.0$, $0.05$, $0.10$) and $Ba_{2.6}Ca_{1.4}La_4Mn_4O_{19}$.

Further, in the hexagonal perovskite-related compound in the present embodiment, an a-axis length, a b-axis length, a c-axis length (Å), an $\alpha$-angle, a $\beta$-angle, and a $\gamma$-angle (o) of the lattice constant are preferably in the numerical range of $5.35 < a < 6.56$, $5.35 < b < 6.56$, $15.14 < c < 18.52$, $89 < \alpha < 91$, $89 < \beta < 91$, and $119 < \gamma < 121$, for the formulas (2) to (7), $5.23 < a < 6.4$, $5.23 < b < 6.4$, $18.96 < c < 23.19$, $89 < \alpha < 91$, $89 < \beta < 91$, and $119 < \gamma < 121$, for the formula (8), $5.34 < a < 6.54$, $5.34 < b < 6.54$, $19.12 < c < 23.39$, $89 < \alpha < 91$, $89 < \beta < 91$, and $119 < \gamma < 121$, for the formula (9), $5.23 < a < 6.41$, $5.23 < b < 6.41$, $46.23 < c < 56.51$, $89 < \alpha < 91$, $89 < \beta < 91$, and $119 < \gamma < 121$, for the formula (10), $8.85 < a < 10.83$, $5.11 < b < 6.26$, $14.07 < c < 17.21$, $89 < \alpha < 91$, $100 < \beta < 104$, and $89 < \gamma < 91$, for the formula (11), $5.05 < a < 6.19$, $5.05 < b < 6.19$, $15.57 < c < 19.03$, $89 < \alpha < 91$, $89 < \beta < 91$, and $119 < \gamma < 121$, for the formula (12), and $5.35 < a < 6.55$, $5.35 < b < 6.55$, $22.23 < c < 27.18$, $89 < \alpha < 91$, $89 < \beta < 91$, and $119 < \gamma < 121$, for the formula (13), respectively. Here, the lattice constant is a constant that defines the shape and size of the unit lattice of the present embodiment. $\alpha$ is an angle formed by the b-axis and the c-axis, $\beta$ is an angle formed by the a-axis and the c-axis, and $\gamma$ is an angle formed by the a-axis and the b-axis. The lattice constant can be obtained by using an XRD (X-ray diffraction) pattern in the present embodiment. The theoretically possible value of the lattice constant can also be obtained by structural optimization by density functional theory (DFT) calculation.

A compound having this lattice constant has the effect of having high electrical conductivity at low temperatures.

In the present embodiment, it is assumed that a compound having each of the above-described conditions provides effective electrical conductivity (oxide ion conductivity) when used as an oxide ion ($O^{2-}$) conductor or a solid electrolyte. Oxide ion ($O^{2-}$) conductors are compounds in which electricity is conducted by conduction (movement) of oxide ions. Further, the solid electrolyte using the compound of the present embodiment is preferably used under a temperature condition of 300 to 1200° C., more preferably used under a temperature condition of 300 to 1000° C., still more preferably used at 300° C. or more and less than 700° C., and particularly preferably used at 300 to 600° C. By using the solid electrolyte under these temperature conditions, it is possible to operate at a lower temperature than the conventional SOFC, so that there are few restrictions on the equipment and arrangement required for the operation, and a wide range of applications can be obtained. The solid electrolyte using the compound of the present embodiment can be operated at a temperature exceeding 600° C. as in a conventional SOFC.

When the electrical conductivity of the solid electrolyte of the present embodiment is measured at about 300° C., the electrical conductivity represented by log $[\sigma(\text{Scm}^{-1})]$ is preferably −7 or more, more preferably higher than −5.0, and particularly preferably −3.5 or more. Since the electrical conductivity at 300° C. is sufficiently high, the electrical conductivity is high at a low temperature, and it can be particularly preferably used for a battery or other device operating at a low temperature.

Solid Electrolyte Layer

Further, the solid electrolyte of the present embodiment can be used as a solid electrolyte layer by being formed in a layer shape or being formed so as to be included in a layered structure. The solid electrolyte layer may conductor another ion conductor or the like in addition to the solid electrolyte of the present embodiment. In order for a battery or the like using the solid electrolyte of the present embodiment to exhibit effective electrical conductivity and to effectively operate as a low-temperature operating battery described later in particular, it is preferable for the solid electrolyte layer to contain, for example, 50% by mass or more, preferably 70% by mass or more, of the solid electrolyte containing the hexagonal perovskite-related compound of the present embodiment.

Battery Containing Solid Electrolyte or Solid Electrolyte Layer

The solid electrolyte of the present embodiment, or the electrolyte layer containing the solid electrolyte, can be used for a battery containing the solid electrolyte. Of these, the solid electrolyte of the present embodiment can be particularly preferably used for a solid oxide fuel cell (SOFC) as described above.

The SOFC in the present embodiment means a battery in which all the electrodes and electrolytes constituting the battery are made of solid. In particular, the ionic conduction between the electrodes may be oxide ions.

The battery using the solid electrolyte in the present embodiment or the electrolyte layer containing the solid electrolyte can be particularly preferably used for a low-temperature operating battery. In the present embodiment, the low-temperature operating battery is a battery that operates at 300 to 1200° C., preferably 300 to 1000° C., more preferably 300 or more and less than 700° C., and particularly preferably 300 to 600° C., as described above.

The battery in the present embodiment includes, for example, an anode, a cathode, and the above-described solid electrolyte layer interposed therebetween. The cathode and the solid electrolyte may form an integrated cathode-solid electrolyte layer assembly.

Other Applications of Solid Electrolyte

Conventionally, perovskite-related compounds and solid electrolytes containing the perovskite-related compounds exhibit high ion conductivity, and thus are widely applied to batteries, sensors, ion concentrators, membranes used for ion separation, permeation, and the like, catalysts, and the like, and the solid electrolyte of the present embodiment can be applied in the same manner as these. For example, the solid electrolyte of the present embodiment can be used for other batteries, sensors, electrodes, electrolytes, oxygen concentrators, oxygen separation membranes, oxygen permeation membranes, oxygen pumps, catalysts, photocatalysts, electric/electronic/communication devices, energy/environment-related devices, and optical devices, in addition to the above-described solid oxide fuel cell (SOFC).

The solid electrolyte layer of the present embodiment described above can be used for a solid oxide fuel cell (SOFC), a sensor, an oxygen concentrator, an oxygen separation membrane, an oxygen permeation membrane, an oxygen pump, or the like.

The solid electrolyte of the present embodiment can be used as an electrolyte of a gas sensor, for example, as a sensor. A gas sensor, gas detector, or the like can be constituted by attaching a sensitive electrode corresponding to the gas to be detected on the electrolyte. For example, a carbon dioxide sensor can be obtained when a sensitive electrode containing carbonate is used, a NOx sensor can be obtained when a sensitive electrode containing a nitrate is used, and an SOx sensor can be obtained when a sensitive electrode containing sulfate is used. Further, by assembling the electrolytic cell, a collecting device or a decomposing device for NOx and/or SOx contained in exhaust gas can be constituted.

The solid electrolyte of the present embodiment can be used as an adsorbent or an adsorption-separation agent for ions or the like, various catalysts, or the like.

In the solid electrolyte of the present embodiment, various rare earths in the ion conductor may act as an activator forming a light emission center (color center). In this case, it can be used as a wavelength-changing material or the like.

The solid electrolyte of the present embodiment may also become a superconductor by doping with electron carriers or hole carriers.

Regarding the solid electrolyte of the present embodiment, it is also possible to fabricate an all-solid-state electrochromic element by, using the solid electrolyte as an ion conductor, attaching an inorganic compound or the like which is colored or discolored by insertion/desorption of conduction ions to the surface thereof, and forming a translucent electrode such as ITO thereon. By using this all-solid-state electrochromic element, it is possible to provide an electrochromic display having memory characteristics with reduced power consumption.

EXAMPLES

Sample Synthesis—Test Examples 1 to 21

The compounds shown in "Composition" of Test Examples 1 to 21 in Table 1 were prepared by the solid-phase reaction method. In the composition shown in Table 1, the oxygen amount calculated from the electrically neutral condition is shown assuming that the oxidation number of Ba is +2, the oxidation number of Nb is +5, the oxidation number of Mo is +6, the oxidation number of oxygen O is −2, the oxidation number of W is +6, the oxidation number of V is +5, the oxidation number of Cr is +6, the oxidation number of Ge is +4, the oxidation number of Si is +4, and the oxidation number of Zr is +4, but the oxygen amount $(20+z)$ is not limited to the values shown because the oxygen non-stoichiometry z depends on the cation molar ratio, temperature, oxygen partial pressure, synthesis method, and thermal history. $BaCO_3$, $Nb_2O_5$, $MoO_3$, $WO_3$, $V_2O_5$, $Cr_2O_3$, $GeO_2$, $SiO_2$, and $ZrO_2$ were used as starting materials. The starting materials were dried in advance in an electric furnace at 250 to 300° C. for 12 hours, and then weighed with an electronic balance so that the molar ratio of cations was at the desired chemical composition. Using an agate mortar, dry mixing and grinding and wet mixing and grinding using ethanol were repeatedly performed for 30 minutes to 2 hours. The obtained mixture was calcined in the air at 900° C. for 10 to 12 hours using an electric furnace. The calcined mixture was repeatedly subjected to wet mixing and grinding using ethanol and dry mixing and grinding in an agate mortar for 30 minutes to 2 hours. The mixture was molded into cylindrical pellets having a diameter of 10 to 20 mm by pressurizing at 62 to 150 MPa using a uniaxial press. The obtained pellets were placed in an electric furnace and sintered in the air at 1100° C. for 24 hours. As a result, pellets as a sintered body were obtained. In order to evaluate the product phase of the obtained compound by X-ray diffraction (XRD), a part of the sintered body was ground for 20 minutes by a grinder made of tungsten carbide (WC) and then ground for 30 minutes to 1 hour by an agate mortar.

For the compounds having the compositions of Test Examples 1 and 6, high-density samples were prepared by means of applying hydrostatic pressure once before sintering. On the other hand, a sample sintered without being subjected to hydrostatic pressure treatment before sintering is called a low-density sample. Assuming a theoretical density for each sample of 5.85 g/cm³, the following relative densities were calculated: 100×(density)/(theoretical density) %.

The high-density sample of Test Example 1 had a density of 5.2725 g/cm³ and a relative density of 90.1%.

The low-density sample of Test Example 1 had a density of 3.9659 g/cm³ and a relative density of 67.8%.

The high-density sample of Test Example 6 had a density of 5.5951 g/cm³ and a relative density of 95.6%.

The low-density sample of Test Example 6 had a density of 3.9165 g/cm³ and a relative density of 66.9%.

For each test example, XRD measurement was performed by a diffractometer Bruker D8. The obtained XRD pattern was indexed using DICVOL06 to obtain the lattice constant. The XRD pattern of Test Example 1 is shown in FIG. 1.

The results of XRD measurement of Test Examples 2 to 21 are also shown in FIGS. 2 to 21, respectively. The lattice constants were determined from the obtained XRD patterns. The lattice constants (a, b, c, $\alpha$, $\beta$, $\gamma$) and the lattice volume V of Test Examples 1 to 21 are shown in Table 1.

TABLE 1

| | | Crystal lattice | | | | | | |
|---|---|---|---|---|---|---|---|---|
| | Composition | a[Å] | b[Å] | c[Å] | α[°] | β[°] | γ[°] | V[Å³] |
| Test Example 1 | $Ba_7Nb_4MoO_{20}$ | 5.8602 | 5.8602 | 16.5311 | 90 | 90 | 120 | 491.72 |
| Test Example 2 | $Ba_7Nb_{3.98}Mo_{1.02}O_{20.01}$ | 5.8606 | 5.8606 | 16.5361 | 90 | 90 | 120 | 491.87 |
| Test Example 3 | $Ba_7Nb_{3.96}Mo_{1.04}O_{20.02}$ | 5.8605 | 5.8605 | 16.5406 | 90 | 90 | 120 | 491.99 |
| Test Example 4 | $Ba_7Nb_{3.94}Mo_{1.06}O_{20.03}$ | 5.8599 | 5.8599 | 16.5298 | 90 | 90 | 120 | 491.57 |
| Test Example 5 | $Ba_7Nb_{3.92}Mo_{1.08}O_{20.04}$ | 5.8598 | 5.8598 | 16.5288 | 90 | 90 | 120 | 491.50 |
| Test Example 6 | $Ba_7Nb_{3.9}Mo_{1.1}O_{20.05}$ | 5.8592 | 5.8592 | 16.5181 | 90 | 90 | 120 | 491.11 |
| Test Example 7 | $Ba_7Nb_{3.88}Mo_{1.12}O_{20.06}$ | 5.8601 | 5.8601 | 16.5315 | 90 | 90 | 120 | 491.65 |
| Test Example 8 | $Ba_7Nb_{3.86}Mo_{1.14}O_{20.07}$ | 5.8608 | 5.8608 | 16.5339 | 90 | 90 | 120 | 491.83 |
| Test Example 9 | $Ba_7Nb_{3.84}Mo_{1.16}O_{20.08}$ | 5.8605 | 5.8605 | 16.5337 | 90 | 90 | 120 | 491.78 |
| Test Example 10 | $Ba_7Nb_{3.82}Mo_{1.18}O_{20.09}$ | 5.8604 | 5.8604 | 16.5347 | 90 | 90 | 120 | 491.79 |
| Test Example 11 | $Ba_7Nb_{3.9}MoW_{0.1}O_{20.05}$ | 5.8585 | 5.8585 | 16.5038 | 90 | 90 | 120 | 490.56 |
| Test Example 12 | $Ba_7Nb_4Mo_{0.9}V_{0.1}O_{19.95}$ | 5.8584 | 5.8584 | 16.5259 | 90 | 90 | 120 | 491.19 |
| Test Example 13 | $Ba_7Nb_{3.9}MoV_{0.1}O_{20}$ | 5.8557 | 5.8557 | 16.5114 | 90 | 90 | 120 | 490.32 |
| Test Example 14 | $Ba_7Nb_{3.9}MoCr_{0.1}O_{20.05}$ | 5.8539 | 5.8539 | 16.5122 | 90 | 90 | 120 | 490.04 |
| Test Example 15 | $Ba_7Nb_{3.8}MoCr_{0.2}O_{20.1}$ | 5.8474 | 5.8474 | 16.4985 | 90 | 90 | 120 | 488.54 |
| Test Example 16 | $Ba_7Nb_{3.7}MoCr_{0.3}O_{20.15}$ | 5.8474 | 5.8474 | 16.5084 | 90 | 90 | 120 | 488.84 |
| Test Example 17 | $Ba_7Nb_{3.9}MoGe_{0.1}O_{19.95}$ | 5.8555 | 5.8555 | 16.5156 | 90 | 90 | 120 | 490.41 |
| Test Example 18 | $Ba_7Nb_{3.9}MoSi_{0.1}O_{19.95}$ | 5.8579 | 5.8579 | 16.5257 | 90 | 90 | 120 | 491.10 |
| Test Example 19 | $Ba_7Nb_{3.9}MoZr_{0.1}O_{19.95}$ | 5.8597 | 5.8597 | 16.5204 | 90 | 90 | 120 | 491.26 |
| Test Example 20 | $Ba_7Nb_{4.05}Mo_{0.95}O_{19.975}$ | 5.8557 | 5.8557 | 16.5206 | 90 | 90 | 120 | 490.59 |
| Test Example 21 | $Ba_7Nb_{4.1}Mo_{0.9}O_{19.95}$ | 5.8624 | 5.8624 | 16.5463 | 90 | 90 | 120 | 492.47 |

Measurement of Total Electrical Conductivity

The electrical conductivity of each test example in Table 1 excluding Test Example 21 was measured by the DC four-terminal method. After reducing the particle size of the sample prepared in the above (Sample Synthesis) using a ball-mill, the sample was molded into pellets having a 5 mm φ by uniaxial pressing and sintered to prepare a sample for conductivity measurement. Four platinum wires were wound around a sintered body for measuring total electrical conductivity by the DC four-terminal method, and platinum paste was applied on the platinum wires in order to bring the sample and the platinum wires into close contact with each other. In order to remove organic components contained in the platinum or gold paste, the paste was heated at 900° C.

for 1 hour. The electrical conductivity measured for each test example is shown in Tables 2 to 9. In the composition shown in Tables 2 to 9, the oxygen amount calculated from the electrically neutral condition is shown assuming that the oxidation number of Ba is +2, the oxidation number of Nb is +5, the oxidation number of Mo is +6, the oxidation number of oxygen O is −2, the oxidation number of W is +6, the oxidation number of V is +5, the oxidation number of Cr is +6, the oxidation number of Ge is +4, the oxidation number of Si is +4, and the oxidation number of Zr is +4, but the oxygen amount $(20+z)$ is not limited to the values shown because the oxygen non-stoichiometry $z$ depends on the cation molar ratio, temperature, oxygen partial pressure, synthesis method, and thermal history.

TABLE 2

| | Composition | Total electrical conductivity (=oxide ion conductivity) | |
| | | Temperature | log $(\sigma_{total}(S\ cm^{-1}))$ |
| --- | --- | --- | --- |
| Test Example 1 | $Ba_7Nb_4MoO_{20}$ (high density) | 408° C. | −3.8 |
| Test Example 1 | $Ba_7Nb_4MoO_{20}$ (high density) | 505° C. | −3.3 |
| Test Example 1 | $Ba_7Nb_4MoO_{20}$ (high density) | 605° C. | −2.9 |
| Test Example 1 | $Ba_7Nb_4MoO_{20}$ (high density) | 705° C. | −2.6 |
| Test Example 1 | $Ba_7Nb_4MoO_{20}$ (high density) | 804° C. | −2.4 |
| Test Example 1 | $Ba_7Nb_4MoO_{20}$ (high density) | 904° C. | −2.3 |
| Test Example 1 | $Ba_7Nb_4MoO_{20}$ (low density) | 307° C. | −5.7 |
| Test Example 1 | $Ba_7Nb_4MoO_{20}$ (low density) | 408° C. | −4.7 |
| Test Example 1 | $Ba_7Nb_4MoO_{20}$ (low density) | 509° C. | −4 |
| Test Example 1 | $Ba_7Nb_4MoO_{20}$ (low density) | 610° C. | −3.4 |
| Test Example 1 | $Ba_7Nb_4MoO_{20}$ (low density) | 709° C. | −3 |
| Test Example 1 | $Ba_7Nb_4MoO_{20}$ (low density) | 809° C. | −2.7 |
| Test Example 1 | $Ba_7Nb_4MoO_{20}$ (low density) | 908° C. | −2.6 |
| Test Example 2 | $Ba_7Nb_{3.98}Mo_{1.02}O_{20.01}$ | 305° C. | −4.9 |
| Test Example 2 | $Ba_7Nb_{3.98}Mo_{1.02}O_{20.01}$ | 406° C. | −3.8 |
| Test Example 2 | $Ba_7Nb_{3.98}Mo_{1.02}O_{20.01}$ | 506° C. | −3.1 |
| Test Example 2 | $Ba_7Nb_{3.98}Mo_{1.02}O_{20.01}$ | 608° C. | −2.8 |
| Test Example 2 | $Ba_7Nb_{3.98}Mo_{1.02}O_{20.01}$ | 708° C. | −2.7 |
| Test Example 2 | $Ba_7Nb_{3.98}Mo_{1.02}O_{20.01}$ | 808° C. | −2.6 |
| Test Example 2 | $Ba_7Nb_{3.98}Mo_{1.02}O_{20.01}$ | 908° C. | −2.5 |

TABLE 3

| | Composition | Total electrical conductivity (=oxide ion conductivity) | |
| | | Temperature | log $(\sigma_{total}(S\ cm^{-1}))$ |
| --- | --- | --- | --- |
| Test Example 3 | $Ba_7Nb_{3.96}Mo_{1.04}O_{20.02}$ | 307° C. | −4.7 |
| Test Example 3 | $Ba_7Nb_{3.96}Mo_{1.04}O_{20.02}$ | 410° C. | −3.6 |
| Test Example 3 | $Ba_7Nb_{3.96}Mo_{1.04}O_{20.02}$ | 510° C. | −2.9 |
| Test Example 3 | $Ba_7Nb_{3.96}Mo_{1.04}O_{20.02}$ | 610° C. | −2.6 |
| Test Example 3 | $Ba_7Nb_{3.96}Mo_{1.04}O_{20.02}$ | 710° C. | −2.5 |
| Test Example 3 | $Ba_7Nb_{3.96}Mo_{1.04}O_{20.02}$ | 809° C. | −2.4 |
| Test Example 3 | $Ba_7Nb_{3.96}Mo_{1.04}O_{20.02}$ | 909° C. | −2.3 |
| Test Example 4 | $Ba_7Nb_{3.94}Mo_{1.06}O_{20.03}$ | 302° C. | −5.2 |
| Test Example 4 | $Ba_7Nb_{3.94}Mo_{1.06}O_{20.03}$ | 406° C. | −3.9 |
| Test Example 4 | $Ba_7Nb_{3.94}Mo_{1.06}O_{20.03}$ | 506° C. | −3.2 |
| Test Example 4 | $Ba_7Nb_{3.94}Mo_{1.06}O_{20.03}$ | 607° C. | −2.7 |
| Test Example 4 | $Ba_7Nb_{3.94}Mo_{1.06}O_{20.03}$ | 708° C. | −2.5 |
| Test Example 4 | $Ba_7Nb_{3.94}Mo_{1.06}O_{20.03}$ | 808° C. | −2.4 |
| Test Example 4 | $Ba_7Nb_{3.94}Mo_{1.06}O_{20.03}$ | 905° C. | −2.4 |
| Test Example 4 | $Ba_7Nb_{3.92}Mo_{1.08}O_{20.04}$ | 306° C. | −4.4 |
| Test Example 5 | $Ba_7Nb_{3.92}Mo_{1.08}O_{20.04}$ | 408° C. | −3.4 |
| Test Example 5 | $Ba_7Nb_{3.92}Mo_{1.08}O_{20.04}$ | 510° C. | −2.8 |
| Test Example 5 | $Ba_7Nb_{3.92}Mo_{1.08}O_{20.04}$ | 609° C. | −2.5 |
| Test Example 5 | $Ba_7Nb_{3.92}Mo_{1.08}O_{20.04}$ | 709° C. | −2.4 |
| Test Example 5 | $Ba_7Nb_{3.92}Mo_{1.08}O_{20.04}$ | 809° C. | −2.3 |
| Test Example 5 | $Ba_7Nb_{3.92}Mo_{1.08}O_{20.04}$ | 908° C. | −2.2 |

TABLE 4

| | Composition | Total electrical conductivity (=oxide ion conductivity) | |
| --- | --- | --- | --- |
| | | Temperature | $\log(\sigma_{total}(\text{S cm}^{-1}))$ |
| Test Example 6 | $Ba_7Nb_{3.9}Mo_{1.1}O_{20.05}$ (high density) | 280° C. | −3.7 |
| Test Example 6 | $Ba_7Nb_{3.9}Mo_{1.1}O_{20.05}$ (high density) | 358° C. | −3.2 |
| Test Example 6 | $Ba_7Nb_{3.9}Mo_{1.1}O_{20.05}$ (high density) | 457° C. | −2.7 |
| Test Example 6 | $Ba_7Nb_{3.9}Mo_{1.1}O_{20.05}$ (high density) | 561° C. | −2.3 |
| Test Example 6 | $Ba_7Nb_{3.9}Mo_{1.1}O_{20.05}$ (high density) | 658° C. | −2.1 |
| Test Example 6 | $Ba_7Nb_{3.9}Mo_{1.1}O_{20.05}$ (high density) | 721° C. | −2 |
| Test Example 6 | $Ba_7Nb_{3.9}Mo_{1.1}O_{20.05}$ (high density) | 840° C. | −1.9 |
| Test Example 6 | $Ba_7Nb_{3.9}Mo_{1.1}O_{20.05}$ (high density) | 878° C. | −1.9 |
| Test Example 6 | $Ba_7Nb_{3.9}Mo_{1.1}O_{20.05}$ (high density) | 307° C. | −5.5 |
| Test Example 6 | $Ba_7Nb_{3.9}Mo_{1.1}O_{20.05}$ (low density) | 409° C. | −4.4 |
| Test Example 6 | $Ba_7Nb_{3.9}Mo_{1.1}O_{20.05}$ (low density) | 509° C. | −3.8 |
| Test Example 6 | $Ba_7Nb_{3.9}Mo_{1.1}O_{20.05}$ (low density) | 610° C. | −3.2 |
| Test Example 6 | $Ba_7Nb_{3.9}Mo_{1.1}O_{20.05}$ (low density) | 710° C. | −2.9 |
| Test Example 6 | $Ba_7Nb_{3.9}Mo_{1.1}O_{20.05}$ (low density) | 809° C. | −2.7 |
| Test Example 6 | $Ba_7Nb_{3.9}Mo_{1.1}O_{20.05}$ (low density) | 909° C. | −2.5 |
| Test Example 7 | $Ba_7Nb_{3.88}Mo_{1.12}O_{20.06}$ | 305° C. | −5 |
| Test Example 7 | $Ba_7Nb_{3.88}Mo_{1.12}O_{20.06}$ | 406° C. | −3.7 |
| Test Example 7 | $Ba_7Nb_{3.88}Mo_{1.12}O_{20.06}$ | 507° C. | −3 |
| Test Example 7 | $Ba_7Nb_{3.88}Mo_{1.12}O_{20.06}$ | 607° C. | −2.6 |
| Test Example 7 | $Ba_7Nb_{3.88}Mo_{1.12}O_{20.06}$ | 707° C. | −2.4 |
| Test Example 7 | $Ba_7Nb_{3.88}Mo_{1.12}O_{20.06}$ | 808° C. | −2.3 |
| Test Example 7 | $Ba_7Nb_{3.88}Mo_{1.12}O_{20.06}$ | 908° C. | −2.2 |

TABLE 5

| | Composition | Total electrical conductivity (=oxide ion conductivity) | |
| --- | --- | --- | --- |
| | | Temperature | $\log(\sigma_{total}(\text{S cm}^{-1}))$ |
| Test Example 8 | $Ba_7Nb_{3.86}Mo_{1.14}O_{20.07}$ | 308° C. | −4.6 |
| Test Example 8 | $Ba_7Nb_{3.86}Mo_{1.14}O_{20.07}$ | 408° C. | −3.4 |
| Test Example 8 | $Ba_7Nb_{3.86}Mo_{1.14}O_{20.07}$ | 508° C. | −2.8 |
| Test Example 8 | $Ba_7Nb_{3.86}Mo_{1.14}O_{20.07}$ | 608° C. | −2.5 |
| Test Example 8 | $Ba_7Nb_{3.86}Mo_{1.14}O_{20.07}$ | 708° C. | −2.3 |
| Test Example 8 | $Ba_7Nb_{3.86}Mo_{1.14}O_{20.07}$ | 808° C. | −2.1 |
| Test Example 8 | $Ba_7Nb_{3.86}Mo_{1.14}O_{20.07}$ | 907° C. | −2.1 |
| Test Example 9 | $Ba_7Nb_{3.84}Mo_{1.16}O_{20.08}$ | 304° C. | −4.5 |
| Test Example 9 | $Ba_7Nb_{3.84}Mo_{1.16}O_{20.08}$ | 406° C. | −3.4 |
| Test Example 9 | $Ba_7Nb_{3.84}Mo_{1.16}O_{20.08}$ | 506° C. | −2.7 |
| Test Example 9 | $Ba_7Nb_{3.84}Mo_{1.16}O_{20.08}$ | 607° C. | −2.4 |
| Test Example 9 | $Ba_7Nb_{3.84}Mo_{1.16}O_{20.08}$ | 707° C. | −2.2 |
| Test Example 9 | $Ba_7Nb_{3.84}Mo_{1.16}O_{20.08}$ | 807° C. | −2.2 |
| Test Example 9 | $Ba_7Nb_{3.84}Mo_{1.16}O_{20.08}$ | 906° C. | −2.1 |
| Test Example 10 | $Ba_7Nb_{3.82}Mo_{1.18}O_{20.09}$ | 307° C. | −4.3 |
| Test Example 10 | $Ba_7Nb_{3.82}Mo_{1.18}O_{20.09}$ | 408° C. | −3.3 |
| Test Example 10 | $Ba_7Nb_{3.82}Mo_{1.18}O_{20.09}$ | 509° C. | −2.7 |
| Test Example 10 | $Ba_7Nb_{3.82}Mo_{1.18}O_{20.09}$ | 610° C. | −2.4 |
| Test Example 10 | $Ba_7Nb_{3.82}Mo_{1.18}O_{20.09}$ | 709° C. | −2.3 |
| Test Example 10 | $Ba_7Nb_{3.82}Mo_{1.18}O_{20.09}$ | 809° C. | −2.2 |
| Test Example 10 | $Ba_7Nb_{3.82}Mo_{1.18}O_{20.09}$ | 908° C. | −2.1 |

TABLE 6

| | Composition | Total electrical conductivity (=oxide ion conductivity) | |
| --- | --- | --- | --- |
| | | Temperature | $\log(\sigma_{total}(\text{S cm}^{-1}))$ |
| Test Example 11 | $Ba_7Nb_{3.9}MoW_{0.1}O_{20.05}$ | 306° C. | −4.1 |
| Test Example 11 | $Ba_7Nb_{3.9}MoW_{0.1}O_{20.05}$ | 409° C. | −3.3 |
| Test Example 11 | $Ba_7Nb_{3.9}MoW_{0.1}O_{20.05}$ | 508° C. | −2.8 |
| Test Example 11 | $Ba_7Nb_{3.9}MoW_{0.1}O_{20.05}$ | 608° C. | −2.5 |
| Test Example 11 | $Ba_7Nb_{3.9}MoW_{0.1}O_{20.05}$ | 707° C. | −2.2 |
| Test Example 11 | $Ba_7Nb_{3.9}MoW_{0.1}O_{20.05}$ | 808° C. | −2 |
| Test Example 11 | $Ba_7Nb_{3.9}MoW_{0.1}O_{20.05}$ | 907° C. | −1.9 |

TABLE 6-continued

| | | Total electrical conductivity (=oxide ion conductivity) | |
| | Composition | Temperature | $\log(\sigma_{total}(\text{S cm}^{-1}))$ |
|---|---|---|---|
| Test Example 12 | $Ba_7Nb_4Mo_{0.9}V_{0.1}O_{19.95}$ | 306° C. | −5.4 |
| Test Example 12 | $Ba_7Nb_4Mo_{0.9}V_{0.1}O_{19.95}$ | 409° C. | −4.2 |
| Test Example 12 | $Ba_7Nb_4Mo_{0.9}V_{0.1}O_{19.95}$ | 508° C. | −3.5 |
| Test Example 12 | $Ba_7Nb_4Mo_{0.9}V_{0.1}O_{19.95}$ | 608° C. | −3.2 |
| Test Example 12 | $Ba_7Nb_4Mo_{0.9}V_{0.1}O_{19.95}$ | 707° C. | −3.2 |
| Test Example 12 | $Ba_7Nb_4Mo_{0.9}V_{0.1}O_{19.95}$ | 806° C. | −3.1 |
| Test Example 12 | $Ba_7Nb_4Mo_{0.9}V_{0.1}O_{19.95}$ | 908° C. | −2.9 |
| Test Example 13 | $Ba_7Nb_{3.9}V_{0.1}MoO_{20}$ | 304° C. | −5.8 |
| Test Example 13 | $Ba_7Nb_{3.9}V_{0.1}MoO_{20}$ | 405° C. | −4.8 |
| Test Example 13 | $Ba_7Nb_{3.9}V_{0.1}MoO_{20}$ | 506° C. | −4.2 |
| Test Example 13 | $Ba_7Nb_{3.9}V_{0.1}MoO_{20}$ | 607° C. | −3.6 |
| Test Example 13 | $Ba_7Nb_{3.9}V_{0.1}MoO_{20}$ | 707° C. | −3.1 |
| Test Example 13 | $Ba_7Nb_{3.9}V_{0.1}MoO_{20}$ | 807° C. | −2.9 |
| Test Example 13 | $Ba_7Nb_{3.9}V_{0.1}MoO_{20}$ | 908° C. | −2.8 |

TABLE 7

| | | Total electrical conductivity (=oxide ion conductivity) | |
| | Composition | Temperature | $\log(\sigma_{total}(\text{S cm}^{-1}))$ |
|---|---|---|---|
| Test Example 14 | $Ba_7Nb_{3.9}Cr_{0.1}MoO_{20.05}$ | 304° C. | −5.5 |
| Test Example 14 | $Ba_7Nb_{3.9}Cr_{0.1}MoO_{20.05}$ | 402° C. | −4.5 |
| Test Example 14 | $Ba_7Nb_{3.9}Cr_{0.1}MoO_{20.05}$ | 505° C. | −3.6 |
| Test Example 14 | $Ba_7Nb_{3.9}Cr_{0.1}MoO_{20.05}$ | 605° C. | −3 |
| Test Example 14 | $Ba_7Nb_{3.9}Cr_{0.1}MoO_{20.05}$ | 706° C. | −2.6 |
| Test Example 14 | $Ba_7Nb_{3.9}Cr_{0.1}MoO_{20.05}$ | 807° C. | −2.4 |
| Test Example 14 | $Ba_7Nb_{3.9}Cr_{0.1}MoO_{20.05}$ | 907° C. | −2.3 |
| Test Example 15 | $Ba_7Nb_{3.8}Cr_{0.2}MoO_{20.1}$ | 309° C. | −5 |
| Test Example 15 | $Ba_7Nb_{3.8}Cr_{0.2}MoO_{20.1}$ | 410° C. | −3.7 |
| Test Example 15 | $Ba_7Nb_{3.8}Cr_{0.2}MoO_{20.1}$ | 509° C. | −3 |
| Test Example 15 | $Ba_7Nb_{3.8}Cr_{0.2}MoO_{20.1}$ | 610° C. | −2.6 |
| Test Example 15 | $Ba_7Nb_{3.8}Cr_{0.2}MoO_{20.1}$ | 710° C. | −2.3 |
| Test Example 15 | $Ba_7Nb_{3.8}Cr_{0.2}MoO_{20.1}$ | 809° C. | −2.2 |
| Test Example 15 | $Ba_7Nb_{3.8}Cr_{0.2}MoO_{20.1}$ | 908° C. | −2.2 |
| Test Example 16 | $Ba_7Nb_{3.7}Cr_{0.3}MoO_{20.15}$ | 302° C. | −4.6 |
| Test Example 16 | $Ba_7Nb_{3.7}Cr_{0.3}MoO_{20.15}$ | 401° C. | −3.9 |
| Test Example 16 | $Ba_7Nb_{3.7}Cr_{0.3}MoO_{20.15}$ | 505° C. | −3.1 |
| Test Example 16 | $Ba_7Nb_{3.7}Cr_{0.3}MoO_{20.15}$ | 607° C. | −2.7 |
| Test Example 16 | $Ba_7Nb_{3.7}Cr_{0.3}MoO_{20.15}$ | 700° C. | −2.4 |
| Test Example 16 | $Ba_7Nb_{3.7}Cr_{0.3}MoO_{20.15}$ | 803° C. | −2.4 |
| Test Example 16 | $Ba_7Nb_{3.7}Cr_{0.3}MoO_{20.15}$ | 905° C. | −2.5 |

TABLE 8

| | | Total electrical conductivity (=oxide ion conductivity) | |
| | Composition | Temperature | $\log(\sigma_{total}(\text{S cm}^{-1}))$ |
|---|---|---|---|
| Test Example 17 | $Ba_7Nb_{3.9}Ge_{0.1}MoO_{19.95}$ | 303° C. | −5.6 |
| Test Example 17 | $Ba_7Nb_{3.9}Ge_{0.1}MoO_{19.95}$ | 406° C. | −4.7 |
| Test Example 17 | $Ba_7Nb_{3.9}Ge_{0.1}MoO_{19.95}$ | 506° C. | −4 |
| Test Example 17 | $Ba_7Nb_{3.9}Ge_{0.1}MoO_{19.95}$ | 607° C. | −3.5 |
| Test Example 17 | $Ba_7Nb_{3.9}Ge_{0.1}MoO_{19.95}$ | 707° C. | −3.3 |
| Test Example 17 | $Ba_7Nb_{3.9}Ge_{0.1}MoO_{19.95}$ | 808° C. | −3.1 |
| Test Example 17 | $Ba_7Nb_{3.9}Ge_{0.1}MoO_{19.95}$ | 908° C. | −2.9 |
| Test Example 18 | $Ba_7Nb_{3.9}Si_{0.1}MoO_{19.95}$ | 309° C. | −5.2 |
| Test Example 18 | $Ba_7Nb_{3.9}Si_{0.1}MoO_{19.95}$ | 409° C. | −4.1 |
| Test Example 18 | $Ba_7Nb_{3.9}Si_{0.1}MoO_{19.95}$ | 510° C. | −4.1 |
| Test Example 18 | $Ba_7Nb_{3.9}Si_{0.1}MoO_{19.95}$ | 610° C. | −4 |
| Test Example 18 | $Ba_7Nb_{3.9}Si_{0.1}MoO_{19.95}$ | 709° C. | −3.6 |
| Test Example 18 | $Ba_7Nb_{3.9}Si_{0.1}MoO_{19.95}$ | 809° C. | −3.5 |
| Test Example 18 | $Ba_7Nb_{3.9}Si_{0.1}MoO_{19.95}$ | 908° C. | −3.3 |

TABLE 9

| | Composition | Total electrical conductivity (=oxide ion conductivity) | |
| --- | --- | --- | --- |
| | | Temperature | $\log (\sigma_{total}(S\ cm^{-1}))$ |
| Test Example 19 | $Ba_7Nb_{3.9}Zr_{0.1}MoO_{19.95}$ | 305° C. | −6.2 |
| Test Example 19 | $Ba_7Nb_{3.9}Zr_{0.1}MoO_{19.95}$ | 404° C. | −5.5 |
| Test Example 19 | $Ba_7Nb_{3.9}Zr_{0.1}MoO_{19.95}$ | 504° C. | −4.6 |
| Test Example 19 | $Ba_7Nb_{3.9}Zr_{0.1}MoO_{19.95}$ | 606° C. | −4 |
| Test Example 19 | $Ba_7Nb_{3.9}Zr_{0.1}MoO_{19.95}$ | 707° C. | −3.6 |
| Test Example 19 | $Ba_7Nb_{3.9}Zr_{0.1}MoO_{19.95}$ | 807° C. | −3.4 |
| Test Example 19 | $Ba_7Nb_{3.9}Zr_{0.1}MoO_{19.95}$ | 907° C. | −3.3 |
| Test Example 20 | $Ba_7Nb_{4.05}Mo_{0.95}O_{19.975}$ | 305° C. | −4.8 |
| Test Example 20 | $Ba_7Nb_{4.05}Mo_{0.95}O_{19.975}$ | 406° C. | −3.7 |
| Test Example 20 | $Ba_7Nb_{4.05}Mo_{0.95}O_{19.975}$ | 506° C. | −3 |
| Test Example 20 | $Ba_7Nb_{4.05}Mo_{0.95}O_{19.975}$ | 607° C. | −2.7 |
| Test Example 20 | $Ba_7Nb_{4.05}Mo_{0.95}O_{19.975}$ | 707° C. | −2.6 |
| Test Example 20 | $Ba_7Nb_{4.05}Mo_{0.95}O_{19.975}$ | 807° C. | −2.5 |
| Test Example 20 | $Ba_7Nb_{4.05}Mo_{0.95}O_{19.975}$ | 907° C. | −2.4 |

From Tables 2 to 9, for all of Test Examples 2 to 20, the electrical conductivity represented by $\log [\sigma(Scm^{-1})]$ in the temperature range of 280 to 909° C. was within the range of −7.0 to −1.0. In Test Examples 2 to 20, the electrical conductivity represented by $\log [\sigma(Scm^{-1})]$ obtained by extrapolation from the electrical conductivity at 300° C. or the above data and FIG. 22 to is −6.2 or more. Therefore, for all of Test Examples 2 to 20, high electrical conductivity can be obtained at a low temperature. Further, the electrical conductivity at 300° C. is higher than −5.0 in Test Examples 2, 3, 5, 6 (high density), 8 to 11, 16, and 20. Of all the test examples, the test example having the highest electrical conductivity at around 300° C. described above is Test Example 6, and the value of the electrical conductivity $\log [\sigma(Scm^{-1})]$ at 280° C. is −3.7. Although the electrical conductivity for Test Example 21 was not measured, it is considered that it exhibits electrical (ionic) conduction in the same manner as in $Ba_7Nb_{4.05}Mo_{0.95}O_{19.975}$ of Test Example 20.

Figure 22:
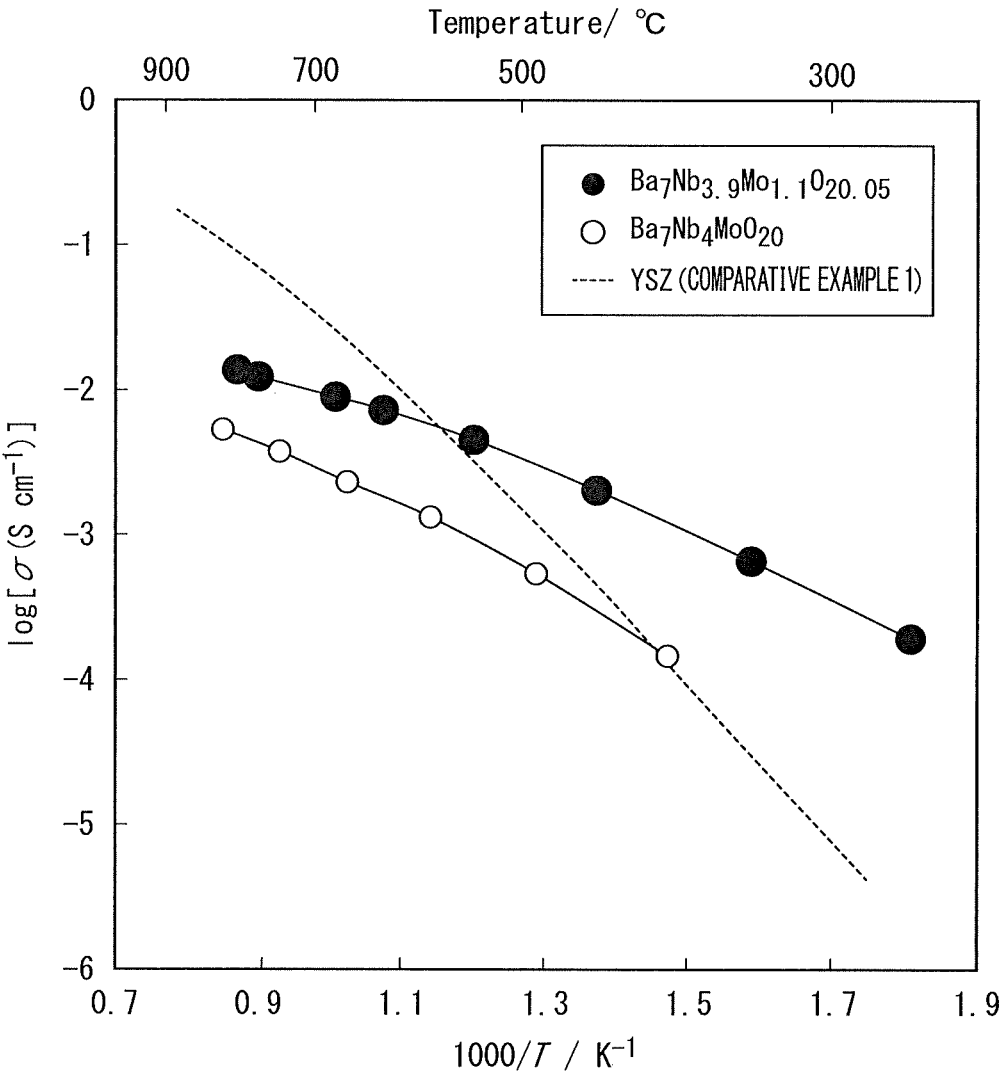
FIG. 22 is a graph showing a comparison of the electrical conductivity of Test Example 1 and Test Example 6 of the present example and YSZ.

FIG. 22 shows a graph (Arrhenius plot) in which $\log [\sigma(Scm^{-1})]$ is plotted on the vertical axis and $1000\ T^{-1}/K^{-1}$ is plotted on the horizontal axis for the absolute temperature T obtained from the temperature of the table for each electrical conductivity CS of conventionally used YSZ (Comparative Example 1), Test Example 1 ($Ba_7Nb_4MoO_{20}$) (high density), and Test Example 6 ($Ba_7Nb_{3.9}Mo_{1.1}O_{20.05}$) (high density).

From FIG. 22, the electrical conductivity increases as the temperature rises. At 600° C., the electrical conductivity a of Test Example 6, in which the excess amount x of Mo was 0.10, was 5.5 times higher than the electrical conductivity of $Ba_7Nb_4MoO_{20}$ of Test Example 1, indicating that the electrical conductivity was improved by increasing the Mo amount.

In the conventional Test Example 1, the $\log [\sigma (Scm^{-1})]=−2.7$ at 600° C. In Test Example 6, in which the excess amount x of Mo was set to 0.10, the $\log [\sigma(Scm^{-1})]$ was higher than those of YSZ and Test Example 1 at a temperature of 590° C. or less, indicating that the electrical conductivity was higher than that of a conventionally used electrolyte.

Figure 23:
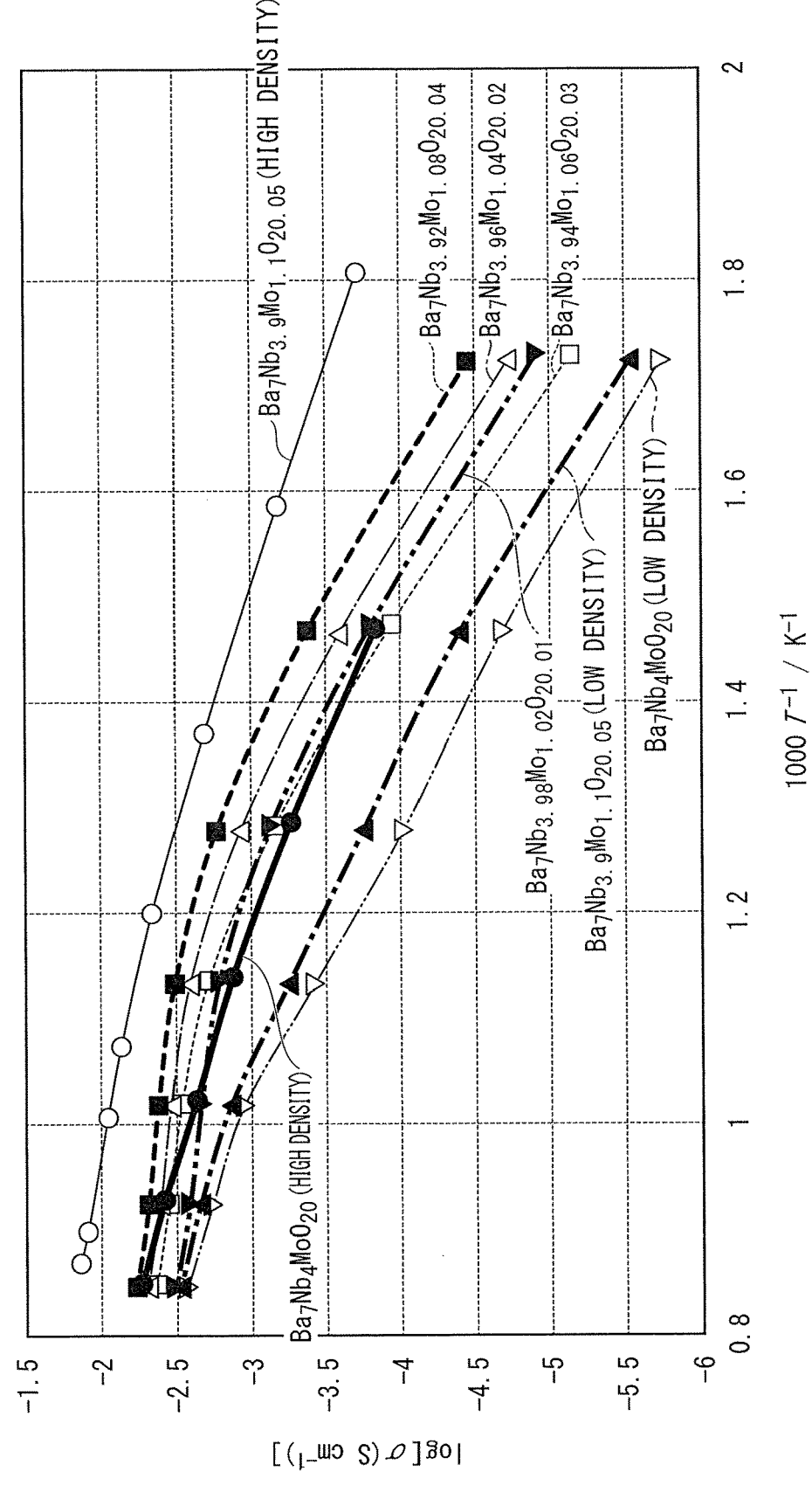
FIG. 23 is a graph showing the electrical conductivity of $Ba_7Nb_{(4-x)}Mo_{(1+x)}O_{(20+z)}$ in which the excess amount x of Mo in Test Examples of the present example is 0.02 to 0.10. For comparison, this graph also shows the electrical conductivity of $Ba_7Nb_4MoO_{20}$ in which the excess amount x of Mo of Test Examples of the present example is 0.0.
Figure 24:
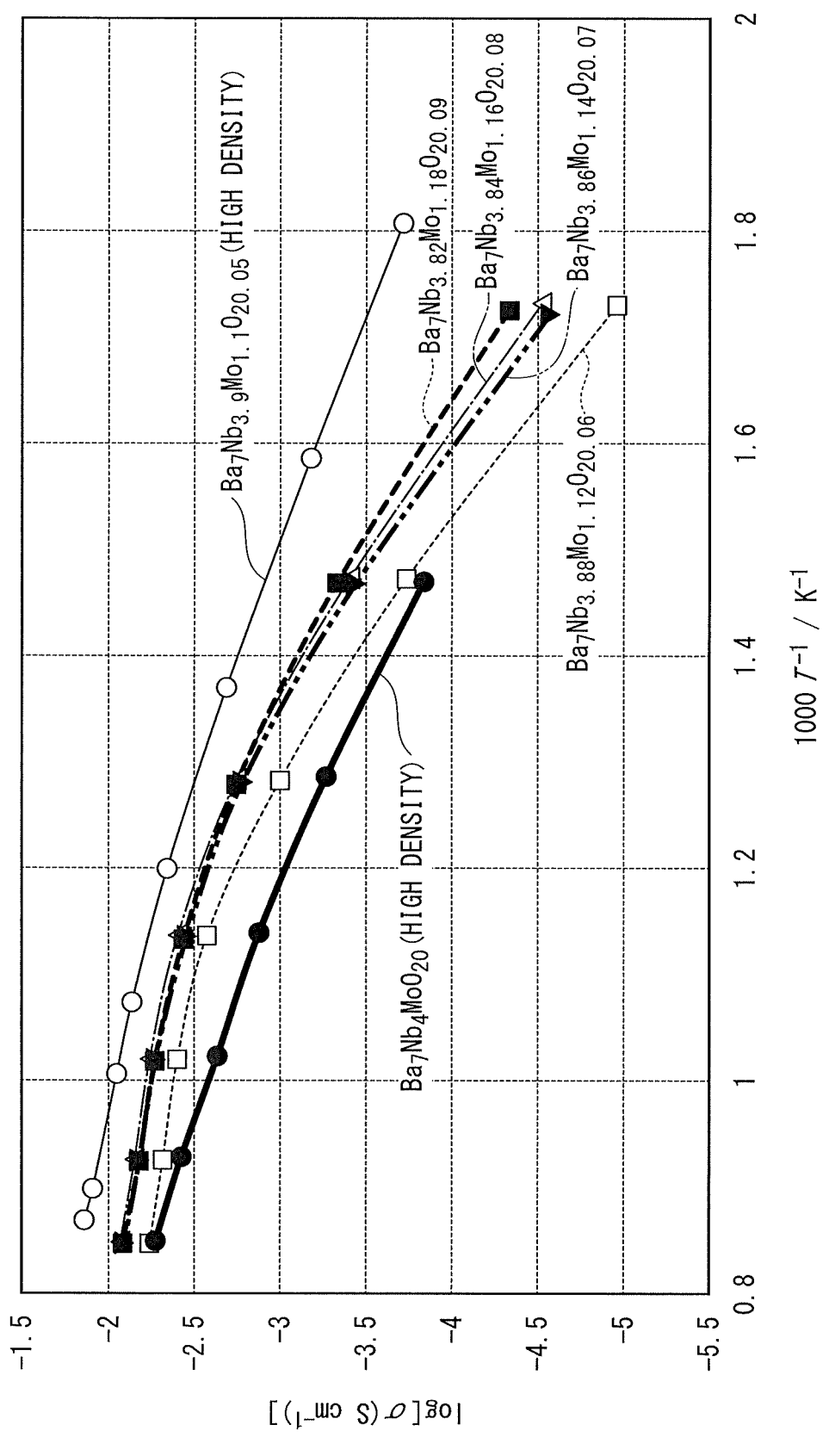
FIG. 24 is a graph showing the electrical conductivity of $Ba_7Nb_{(4-x)}Mo_{(1+x)}O_{(20+z)}$ in which the excess amount x of Mo in Test Examples of the present example is 0.10 to 0.18. For comparison, this graph also shows the electrical conductivity of $Ba_7Nb_4MoO_{20}$ in which the excess amount x of Mo of Test Examples of the present example is 0.0.

Further, FIG. 23 shows an Arrhenius plot of the electrical conductivity of $Ba_7Nb_4MoO_{20}$ in which the excess amount x of Mo is 0.02 to 0.10 in the general formula (7), and FIG. 24 shows an Arrhenius plot of the electrical conductivity of $Ba_7Nb_4MoO_{20}$ in which the excess amount x of Mo is 0.10 to 0.18. For comparison, FIGS. 23 and 24 also show the electrical conductivity of $Ba_7Nb_4MoO_{20}$ in which the excess amount x of Mo of Test Examples of the present example is 0.0. Test Examples 1 (high density, low density), 2, 3, 4, 5, 6 (high density, low density), 7, 8, 9, and 10 correspond to samples in which the excess amount x of Mo (x in $Ba_7Nb_{(4-x)}Mo_{(1+x)}O_{(20+z)}$ of the general formula (7)) is 0 (high density, low density), 0.02, 0.04, 0.06, 0.08, 0.10 (high density, low density), 0.12, 0.14, 0.16, and 0.18, respectively.

The electrical conductivity of Test Example 1 (x=0) and Test Example 6 (x=0.10) of the high-density sample is higher than that of the low-density sample at any temperature.

All of the samples in which the excess amount x of Mo is in the range of 0.02 to 0.18 (Test Examples 2 to 10) show higher electrical conductivity than the low-density sample of $Ba_7Nb_4MoO_{20}$ (Test Example 1) in which the excess amount x of Mo is 0. The high-density sample in which the excess amount x of Mo is 0.10 has the highest electrical conductivity, and high electrical conductivity is maintained even at a low temperature of about 300° C.

Figure 25:
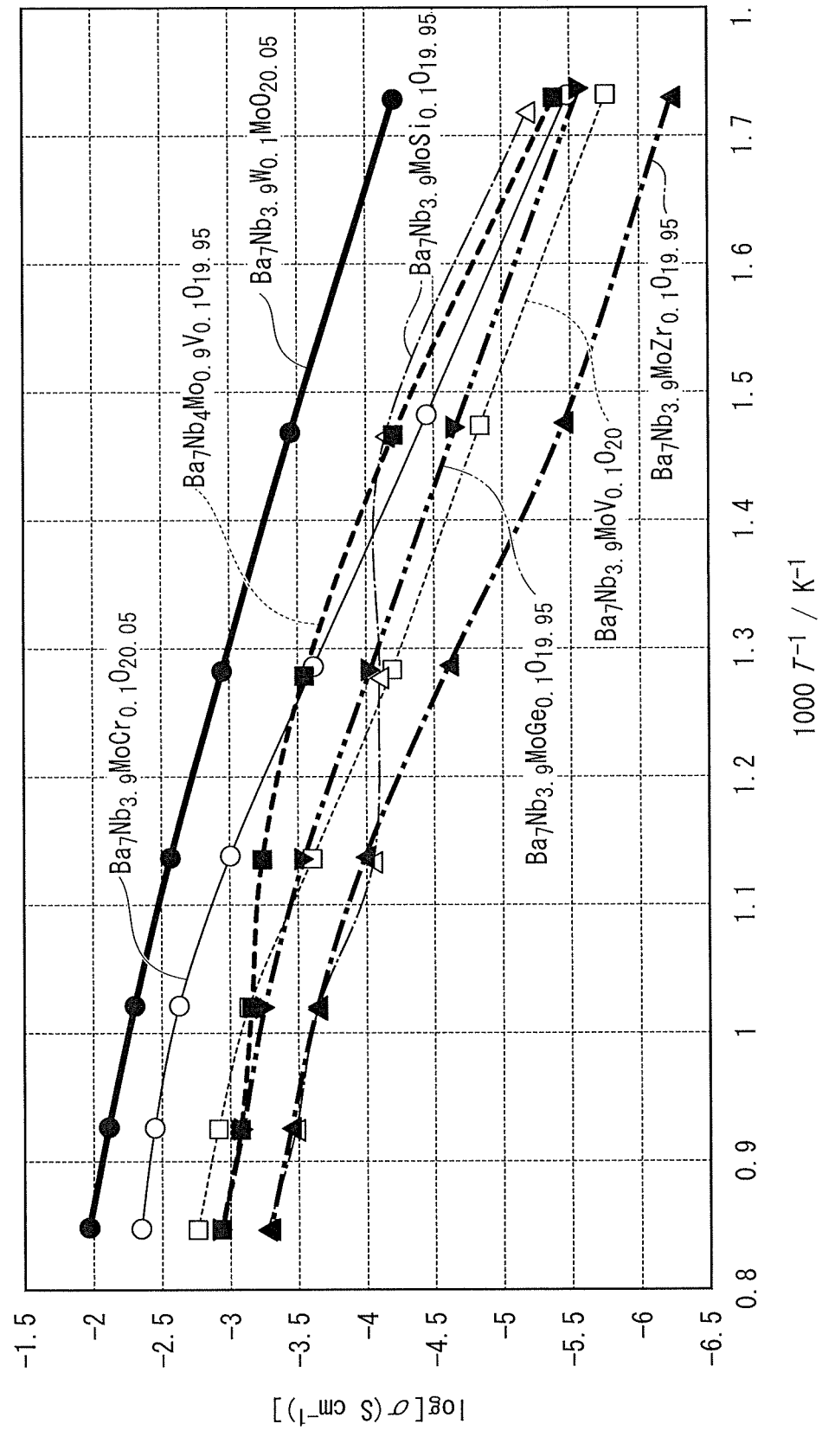
FIG. 25 is a graph showing electrical conductivity of $Ba_7Nb_{(4-y)}MoM_yO_{(20+z)}$ in which the doping amount y of cations of each element of Cr, W, V, Si, Ge, and Zr is 0.1 and $Ba_7Nb_4Mo_{(1-y)}V_yO_{(20+z)}$ in which the doping amount y of cations of V is 0.1 in Test Examples of the present example.

FIG. 25 shows an Arrhenius plot of the electrical conductivity of $Ba_7Nb_4MoO_{20}$ (y=0.10 in the general formulas (4) to (7)) in which the doping amount y of W, V (substituting part of Mo), V (substituting part of Nb), Cr, Si, Ge, and Zr is 0.1. Test Examples 11, 12, 13, 14, 17, 18, and 19 described above correspond to results of compounds doped with W (substituting part of Nb), V (substituting part of Mo), V, Cr, Ge, Si, and Zr (substituting part of Nb), respectively. Among these compounds, the compound doped with W has the highest electrical conductivity in all of the plotted temperature regions. In other Test Examples, the electrical conductivity of the compound doped with Cr and V (substituting part of Mo) is high at a high temperature, but the electrical conductivity of the compound doped with Si increases when $1000\ T^{-1}/K^{-1}$ becomes 1.4 or more, that is, at a low temperature of approximately 441° C. or less.

Figure 26:
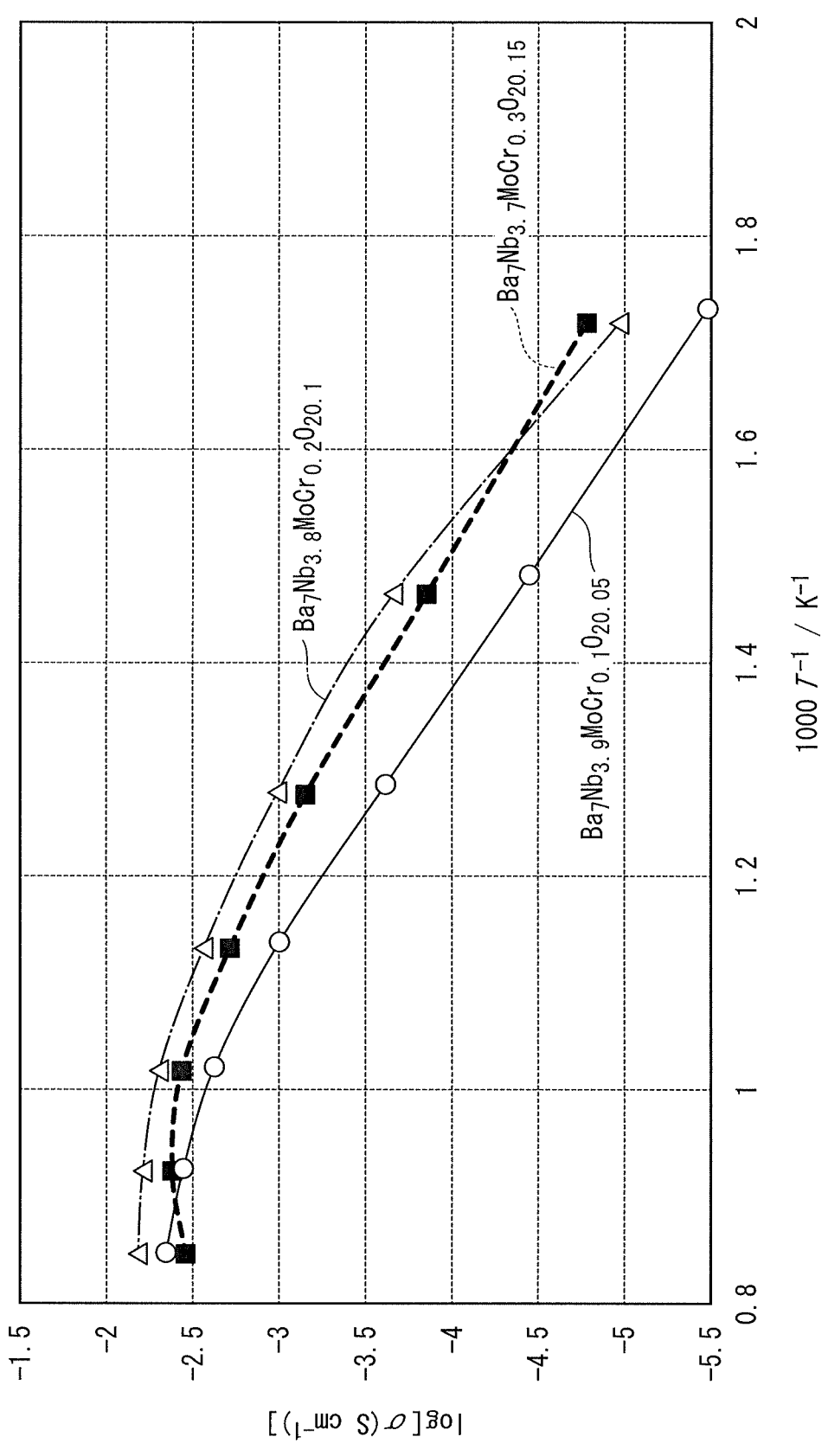
FIG. 26 is a graph showing the electrical conductivity of $Ba_7Nb_{(4-y)}MoCr_yO_{(20+z)}$ in which the doping amount y of Cr of Test examples of the present example is 0.10 to 0.30.

Further, FIG. 26 shows an Arrhenius plot of the electrical conductivity of $Ba_7Nb_4MoO_{20}$ in which the doping amount y of Cr is 0.10 to 0.30 ($Ba_7Nb_{(4-y)}MoCr_yO_{(20+z)}$ in which y=0.10 to 0.30 in the general formula (10)). Test Examples 14, 15, and 16 described above correspond to samples having a doping amount y of 0.10, 0.20, and 0.30, respectively. The electrical conductivity of $Ba_7Nb_4MoO_{20}$ (y=0.10 to 0.30) in which the doping amount y of Cr is 0.10 to 0.30 is higher than that of $Ba_7Nb_4MoO_{20}$ at 800° C. or lower.

Oxygen Partial Pressure Dependence of Total Electrical Conductivity

For Test Example 1, the oxygen partial pressure dependence of total electrical conductivity was measured. Samples were prepared in the same manner as described above (measurement of total electrical conductivity). The oxygen partial pressure was controlled by using an oxygen $O_2$ gas, a nitrogen $N_2$ gas, and an $N_2/H_2$ mixed gas.

The oxygen partial pressure dependence of total electrical conductivity was measured at an oxygen partial pressure range of $3.5 \times 10^{-25}$ to 0.2 atm and 900° C. The oxygen partial pressure was monitored using an oxygen sensor installed downstream of the device. The oxygen partial pressure was controlled by mixing a small amount of the $N_2/H_2$ mixed gas with the nitrogen gas.

Figure 27:
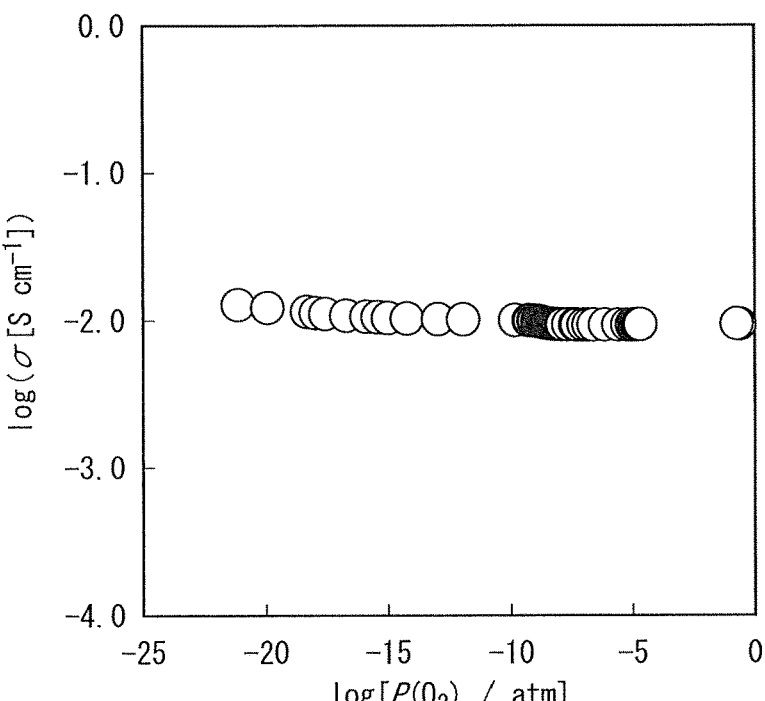
FIG. 27 is a graph showing the oxygen partial pressure dependence of electrical conductivity at 900° C. in Test Example 1 of the present example.

FIG. 27 shows a graph in which the measured electrical conductivity log $[\sigma(\text{Scm}^{-1})]$ is plotted on the vertical axis with respect to the oxygen partial pressure log $[P(O_2)/\text{atm}]$ on the horizontal axis. It was strongly suggested that oxide ions were the dominant carriers in the electrical conduction of the compound of Test Example 1 because the total electrical conductivity was almost constant regardless of the oxygen partial pressure. Test Examples 2 to 21 having similar crystal structures are also considered to be compounds having oxide ions as dominant carriers.

Evaluation of Oxide Ion Transference Number

For Test Example 6, in order to determine the oxide ion transference number, the electromotive force was measured by an oxygen concentration cell using air gas and an $N_2/O_2$ mixed gas. After reducing the particle diameter of the sample prepared in the above-mentioned (Sample Synthesis) using a ball-mill, the sample was molded into pellets having a 25 mm φ by uniaxial pressing, and hydrostatic pressure was applied. The sample was sintered at 1200° C. for 12 hours to prepare a high-density sample of Test Example 6 for measuring electromotive force. The surface of the sample was scraped with a diamond slurry to make it smooth. The relative density of the pellets of Test Example 6 was 96.0%. A Pt paste having a diameter of about 10 mm was applied to the center of the pellet and heated at 1000° C. for 1 hour in order to remove the organic component contained in the platinum paste. The platinum paste and the platinum electrode were bonded with instant adhesives, and the alumina tube, glass seal, and sample were also bonded with instant adhesives and the platinum electrode was attached. A clamp made of alumina was used as a presser for the measurement. After heating at 1000° C. for 1 hour for adhesion of the glass seal, the oxide ion transference number of Test Example 6 was determined at 800° C. and 900° C. by measuring the electromotive force with an oxygen concentration cell.

Figure 28:
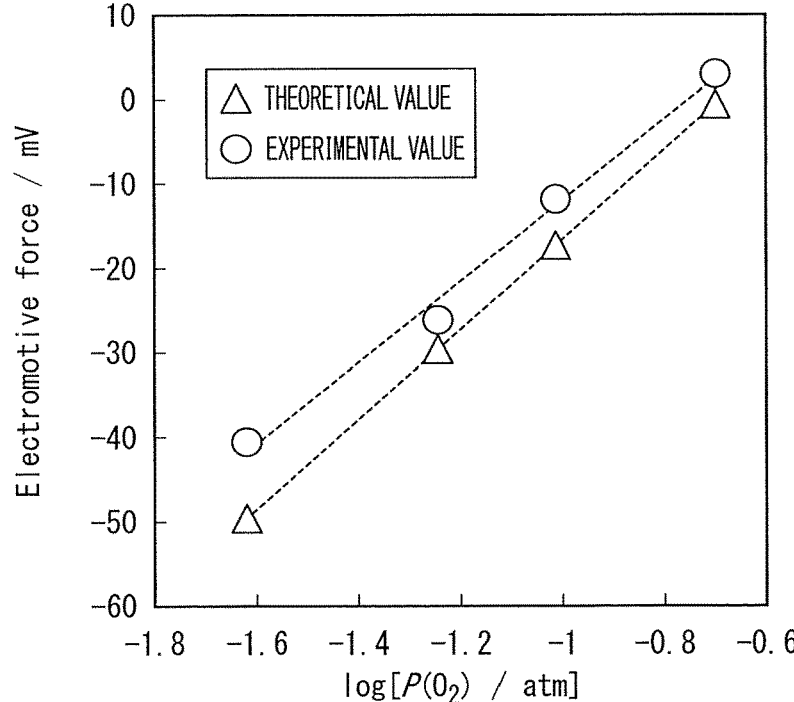
FIG. 28 is a graph showing the relationship between the electromotive force and the oxygen partial pressure of the oxygen concentration cell at 800° C. in Test Example 6 of the present example.
Figure 29:
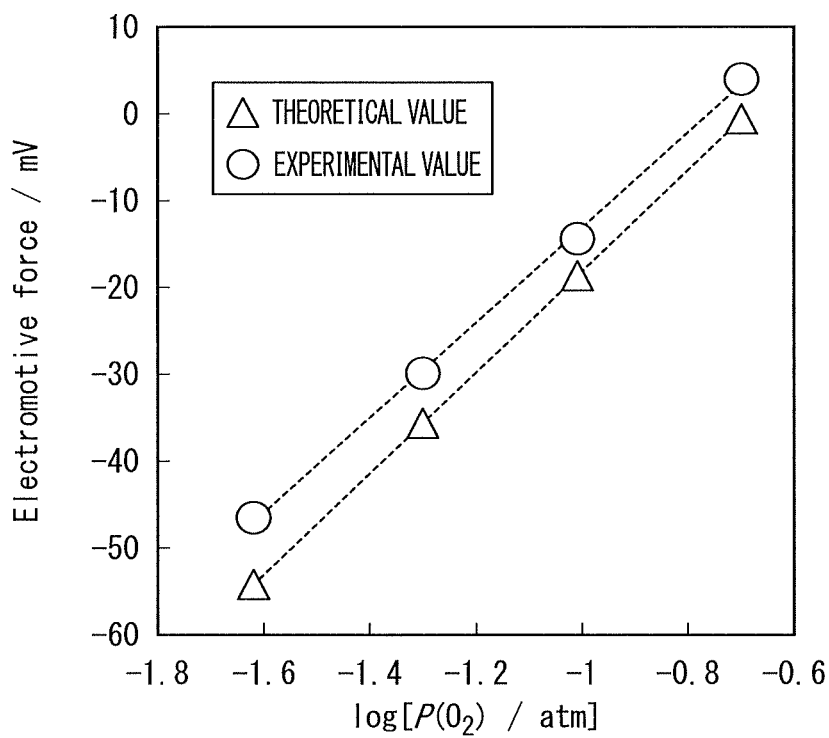
FIG. 29 is a graph showing the relationship between the electromotive force and the oxygen partial pressure of the oxygen concentration cell at 900° C. in Test Example 6 of the present example.

FIG. 28 and FIG. 29 respectively show the electromotive force/mV plotted on the vertical axis and the oxygen partial pressure log $[P(O_2)/\text{atm}]$ plotted on the horizontal axis for the result of electromotive force measurement of the oxygen concentration cell of Test Example 6 at temperatures of 800° C. and 900° C. The measured values showed that the electromotive force obtained was close to the theoretical value, in particular, the transference number of oxide ions at 900° C. was 94%, indicating that the oxide ions were the dominant carriers in the electrical conduction of the compound of Test Example 6, and that the compound of Test Example 6 was an oxide ion conductor. It is considered that the same transference numbers are shown for Test Examples 1 to 5 and 7 to 21 having similar crystal structures.

Structural Optimization by Density Functional Theory Calculation

Structural optimization calculations based on density functional theory were performed on $Ba_7Nb_3MoMO_{20}$. Here, M is a cation of at least one element selected from the group consisting of Ag, Al, At, Au, Be, Bi, Br, Ca, Cd, Ce, Co, Cr, Cu, Dy, Er, Eu, Fe, Ga, Gd, Ge, Hf, Hg, Ho, I, In, Ir, La, Li, Lu, Mg, Mn, Mo, Na, Nb, Nd, Ni, Np, Os, P, Pb, Pd, Po, Pr, Pt, Pu, Re, Rh, Ru, S, Sb, Sc, Se, Si, Sm, Sn, Sr, Ta, Tb, Tc, Te, Ti, Tl, Tm, U, V, W, Xe, Y, Yb, Zn, and Zr. Structural optimization calculation was further performed on $Ba_7Nb_3Mo_2O_{20}$. Density functional theory calculation using generalized gradient approximation and PBE functional was performed using the program VASP. Tables 10 to 12 and 33 to 36 show the results of the lattice constants obtained by the structural optimization. The optimized structures of all compositions retain the crystal structure of the original hexagonal perovskite-related compounds, indicating the possibility that these compositions can be synthesized. These compositions are also considered to exhibit oxide ion conduction.

TABLE 10

| Composition | Lattice constant | | | | | |
|---|---|---|---|---|---|---|
| | a(Å) | b(Å) | c(Å) | $\alpha$(°) | $\beta$(°) | $\gamma$(°) |
| $Ba_7Nb_3MoAgO_{20}$ | 5.939903 | 5.939903 | 16.7929 | 90 | 90 | 120 |
| $Ba_7Nb_3MoAlO_{20}$ | 5.900404 | 5.900404 | 16.743176 | 90 | 90 | 120 |
| $Ba_7Nb_3MoAtO_{20}$ | 6.010514 | 6.010514 | 16.860586 | 90 | 90 | 120 |
| $Ba_7Nb_3MoAuO_{20}$ | 5.94045 | 5.94045 | 16.776655 | 90 | 90 | 120 |
| $Ba_7Nb_3MoBeO_{20}$ | 5.904266 | 5.904266 | 17.167325 | 90 | 90 | 120 |
| $Ba_7Nb_3MoBiO_{20}$ | 5.992008 | 5.992008 | 16.836163 | 90 | 90 | 120 |
| $Ba_7Nb_3MoBrO_{20}$ | 5.944914 | 5.944914 | 16.810687 | 90 | 90 | 120 |
| $Ba_7Nb_3MoCdO_{20}$ | 6.00439 | 6.00439 | 16.915417 | 90 | 90 | 120 |
| $Ba_7Nb_3MoCoO_{20}$ | 5.881562 | 5.881562 | 16.737701 | 90 | 90 | 120 |
| $Ba_7Nb_3MoCrO_{20}$ | 5.883503 | 5.883503 | 16.738325 | 90 | 90 | 120 |
| $Ba_7Nb_3MoCuO_{20}$ | 5.906161 | 5.906161 | 16.761878 | 90 | 90 | 120 |
| $Ba_7Nb_3MoFeO_{20}$ | 5.883343 | 5.883343 | 16.73495 | 90 | 90 | 120 |
| $Ba_7Nb_3MoGaO_{20}$ | 5.933736 | 5.933736 | 16.764084 | 90 | 90 | 120 |
| $Ba_7Nb_3MoGeO_{20}$ | 5.902295 | 5.902295 | 16.768693 | 90 | 90 | 120 |
| $Ba_7Nb_3MoHfO_{20}$ | 5.968976 | 5.968976 | 16.790997 | 90 | 90 | 120 |
| $Ba_7Nb_3MoHgO_{20}$ | 5.987396 | 5.987396 | 16.86409 | 90 | 90 | 120 |
| $Ba_7Nb_3MoIO_{20}$ | 5.989267 | 5.989267 | 16.824409 | 90 | 90 | 120 |
| $Ba_7Nb_3MoInO_{20}$ | 5.993478 | 5.993478 | 16.823355 | 90 | 90 | 120 |

TABLE 11

| Composition | Lattice constant | | | | | |
|---|---|---|---|---|---|---|
| | a(Å) | b(Å) | c(Å) | α(°) | β(°) | γ(°) |
| $Ba_7Nb_3MoIrO_{20}$ | 5.921031 | 5.921031 | 16.776358 | 90 | 90 | 120 |
| $Ba_7Nb_3MoLiO_{20}$ | 5.973454 | 5.973454 | 16.848625 | 90 | 90 | 120 |
| $Ba_7Nb_3MoMgO_{20}$ | 5.962221 | 5.962221 | 16.770124 | 90 | 90 | 120 |
| $Ba_7Nb_3MoMnO_{20}$ | 5.885579 | 5.885579 | 16.746877 | 90 | 90 | 120 |
| $Ba_7Nb_3Mo_2O_{20}$ | 5.925905 | 5.925905 | 16.766074 | 90 | 90 | 120 |
| $Ba_7Nb_4MoO_{20}$ | 5.939187 | 5.939187 | 16.785091 | 90 | 90 | 120 |
| $Ba_7Nb_3MoNiO_{20}$ | 5.885521 | 5.885521 | 16.743637 | 90 | 90 | 120 |
| $Ba_7Nb_3MoNpO_{20}$ | 6.006428 | 6.006428 | 16.82175 | 90 | 90 | 120 |
| $Ba_7Nb_3MoOsO_{20}$ | 5.924442 | 5.924442 | 16.765013 | 90 | 90 | 120 |
| $Ba_7Nb_3MoPO_{20}$ | 5.84106 | 5.84106 | 16.713044 | 90 | 90 | 120 |
| $Ba_7Nb_3MoPbO_{20}$ | 6.006245 | 6.006245 | 16.85583 | 90 | 90 | 120 |
| $Ba_7Nb_3MoPdO_{20}$ | 5.923956 | 5.923956 | 16.778307 | 90 | 90 | 120 |
| $Ba_7Nb_3MoPoO_{20}$ | 6.006966 | 6.006966 | 16.867088 | 90 | 90 | 120 |
| $Ba_7Nb_3MoPtO_{20}$ | 5.92524 | 5.92524 | 16.779834 | 90 | 90 | 120 |
| $Ba_7Nb_3MoPuO_{20}$ | 6.004223 | 6.004223 | 16.827015 | 90 | 90 | 120 |
| $Ba_7Nb_3MoReO_{20}$ | 5.924747 | 5.924747 | 16.765651 | 90 | 90 | 120 |
| $Ba_7Nb_3MoRhO_{20}$ | 5.91523 | 5.91523 | 16.780144 | 90 | 90 | 120 |
| $Ba_7Nb_3MoRuO_{20}$ | 5.91787 | 5.91787 | 16.768206 | 90 | 90 | 120 |

TABLE 12

| Composition | Lattice constant | | | | | |
|---|---|---|---|---|---|---|
| | a(Å) | b(Å) | c(Å) | α(°) | β(°) | γ(°) |
| $Ba_7Nb_3MoSO_{20}$ | 5.993161 | 5.993161 | 17.062732 | 90 | 90 | 120 |
| $Ba_7Nb_3MoSbO_{20}$ | 5.945625 | 5.945625 | 16.788384 | 90 | 90 | 120 |
| $Ba_7Nb_3MoScO_{20}$ | 5.971676 | 5.971676 | 16.785252 | 90 | 90 | 120 |
| $Ba_7Nb_3MoSeO_{20}$ | 5.926511 | 5.926511 | 16.79729 | 90 | 90 | 120 |
| $Ba_7Nb_3MoSiO_{20}$ | 5.860383 | 5.860383 | 16.711353 | 90 | 90 | 120 |
| $Ba_7Nb_3MoSnO_{20}$ | 5.966884 | 5.966884 | 16.785986 | 90 | 90 | 120 |
| $Ba_7Nb_3MoTaO_{20}$ | 5.940375 | 5.940375 | 16.792127 | 90 | 90 | 120 |
| $Ba_7Nb_3MoTbO_{20}$ | 6.033514 | 6.033514 | 16.897624 | 90 | 90 | 120 |
| $Ba_7Nb_3MoTcO_{20}$ | 5.916867 | 5.916867 | 16.763218 | 90 | 90 | 120 |
| $Ba_7Nb_3MoTeO_{20}$ | 5.976477 | 5.976477 | 16.804157 | 90 | 90 | 120 |
| $Ba_7Nb_3MoTiO_{20}$ | 5.92103 | 5.92103 | 16.766404 | 90 | 90 | 120 |
| $Ba_7Nb_3MoTlO_{20}$ | 6.014835 | 6.014835 | 16.915364 | 90 | 90 | 120 |
| $Ba_7Nb_3MoUO_{20}$ | 6.007647 | 6.007647 | 16.826099 | 90 | 90 | 120 |
| $Ba_7Nb_3MoVO_{20}$ | 5.892306 | 5.892306 | 16.750264 | 90 | 90 | 120 |
| $Ba_7Nb_3MoWO_{20}$ | 5.92659 | 5.92659 | 16.751167 | 90 | 90 | 120 |
| $Ba_7Nb_3MoXeO_{20}$ | 6.074309 | 6.074309 | 16.752722 | 90 | 90 | 120 |
| $Ba_7Nb_3MoZnO_{20}$ | 5.955233 | 5.955233 | 16.784869 | 90 | 90 | 120 |
| $Ba_7Nb_3MoZrO_{20}$ | 5.978217 | 5.978217 | 16.793382 | 90 | 90 | 120 |

Test Examples 22 to 83

The compounds shown in the "Composition" of Test Examples 22 to 41 shown in Table 13, Test Examples 42 to 61 shown in Table 14, and Test Examples 62 to 83 shown in Table 15 were prepared according to the following procedure. In the composition shown in Tables 13 to 15, the oxygen amount calculated from the electrically neutral conditions is shown assuming that the oxidation number of Ba is +2, the oxidation number of Nb is +5, the oxidation number of Mo is +6, the oxidation number of oxygen O is −2, the oxidation number of W is +6, the oxidation number of V is +5, the oxidation number of Cr is +6, the oxidation number of Ge is +4, the oxidation number of Si is +4, the oxidation number of Zr is +4, the oxidation number of Ti is +4, the oxidation number of Al is +3, the oxidation number of Gd is +3, the oxidation number of Dy is +3, the oxidation number of Er is +3, the oxidation number of Ho is +3, the oxidation number of Tm is +3, the oxidation number of Yb is +3, and the oxidation number of Lu is +3, but the oxygen amount (20+z) is not limited to the values shown because the oxygen non-stoichiometry z depends on the cation molar ratio, temperature, oxygen partial pressure, synthesis method, and thermal history.

Test Examples 22 to 58 and 81 to 83

The compounds shown in "Composition" of Test Examples 22 to 41 in Table 13, Test Examples 42 to 58 in Table 14, and Test Examples 81 to 83 in Table 15 were prepared by the solid-phase reaction method. As starting materials, $BaCO_3$, $Nb_2O_5$, $MoO_3$, $WO_3$, $V_2O_5$, $Cr_2O_3$, $MnO_2$, $GeO_2$, $SiO_2$, and $ZrO_2$ were used. The starting materials were dried in advance in an electric furnace at 250 to 300° C. for 12 hours, and then weighed with an electronic balance so that the molar ratio of cations was at the desired chemical composition. Using an agate mortar, dry mixing and grinding and wet mixing and grinding using ethanol were repeatedly performed for 30 minutes to 2 hours. The obtained mixture was calcined in the air at 900° C. for 10 to 12 hours using an electric furnace. The calcined mixture was repeatedly subjected to dry mixing and grinding and wet mixing and grinding using ethanol in an agate mortar for 30 minutes to 2 hours. The mixture was molded into cylindrical pellets having a diameter of 10 to 20 mm by pressurizing at 62 to 150 MPa using a uniaxial press. The obtained pellets were placed in an electric furnace and sintered in the air at 1100° C. for 24 hours. As a result, pellets as a sintered body were obtained. In order to evaluate the product phase of the obtained compound by X-ray diffraction (XRD), a part of the sintered body was ground for about 20 minutes by a grinder made of tungsten carbide (WC) and then ground for 30 minutes to 1 hour by an agate mortar.

Test Examples 59 to 67

The compounds shown in "Composition" of Test Examples 59 to 61 in Table 14 and Test Examples 62 to 67 in Table 15 were prepared by the solid-phase reaction method. $BaCO_3$, $WO_3$, and $V_2O_5$ were used as starting materials. The starting materials were dried in advance in an electric furnace at 300° C. for 12 hours, and then weighed with an electronic balance so that the molar ratio of cations was at the desired chemical composition. Using an agate mortar, dry mixing and grinding and wet mixing and grinding using ethanol were repeatedly performed for 1 hour. The obtained mixture was calcined in the air at 950° C. for 15 hours using an electric furnace. The calcined mixture was repeatedly subjected to mixing and grinding in an agate mortar for 1 hour in a dry manner and in a wet manner using ethanol. The mixture was molded into cylindrical pellets having a diameter of 10 mm by pressurizing at 150 MPa using a uniaxial press. The obtained pellets were placed in an electric furnace and sintered in the air at 1020° C. for 24 hours. As a result, pellets as a sintered body were obtained. The electrical conductivity was measured using the obtained sintered body. In order to evaluate the product phase of the obtained compound by X-ray diffraction (XRD), a part of the sintered body was ground for about 20 minutes by a grinder made of tungsten carbide (WC) and then ground for about 1 hour by an agate mortar.

Test Examples 68 to 70

The compounds shown in "Composition" of Test Examples 68 to 70 in Table 15 were prepared by the solid-phase reaction method. $BaCO_3$, $TiO_2$, and $MoO_3$ were used as starting materials. The starting materials were dried in advance in an electric furnace at 250 to 300° C. for 12 hours, and then weighed with an electronic balance so that the molar ratio of cations was at the desired chemical composition. Using an agate mortar, dry mixing and grinding and wet mixing and grinding using ethanol were repeatedly performed for 30 minutes. The obtained mixture was calcined in the air at 900° C. for 12 hours using an electric furnace. The calcined mixture was repeatedly subjected to mixing and grinding in an agate mortar for about 1 hour in a dry manner and in a wet manner using ethanol. The mixture was molded into cylindrical pellets having a diameter of 20 mm by pressurizing at 150 MPa using a uniaxial press. The obtained pellets were placed in an electric furnace and sintered in the air at 1100° C. for 24 hours. The obtained sintered body was ground for 20 minutes by a grinder made of a tungsten carbide (WC), and then ground in an agate mortar for about 1 hour. The mixture was molded into cylindrical pellets having a diameter of 5 mm by pressurizing at 150 MPa using a uniaxial press. The obtained pellets were placed in an electric furnace and sintered in the air at 1100° C. for 12 hours. As a result, pellets as a sintered body were obtained. The electrical conductivity was measured using the obtained sintered body. In order to evaluate the product phase of the obtained compound by X-ray diffraction (XRD), a part of the sintered body was ground for 20 minutes by a grinder made of tungsten carbide (WC) and then ground for about 1 hour by an agate mortar.

Test Example 71

The compound shown in "Composition" of Test Example 71 in Table 15 was prepared by the solid-phase reaction method. $BaCO_3$, $MnO_2$, and $CaCO_3$ were used as starting materials. The starting materials were dried in advance in an electric furnace at 250 to 300° C. for 12 hours, and then weighed with an electronic balance so that the molar ratio of cations was at the desired chemical composition. Using an agate mortar, dry mixing and grinding and wet mixing and grinding using ethanol were repeatedly performed for about 1 hour. The obtained mixture was calcined in the air at 900° C. for 12 hours using an electric furnace. The calcined mixture was repeatedly subjected to dry mixing and grinding and wet mixing and grinding using ethanol in an agate mortar for 30 minutes. The mixture was molded into cylindrical pellets having a diameter of 20 mm by pressurizing at 150 MPa using a uniaxial press. The obtained pellets were placed in an electric furnace and sintered in the air at 1200° C. for 12 hours. The obtained sintered body was ground for 20 minutes by a grinder made of a tungsten carbide (WC), and then ground in an agate mortar for about 1 hour. The mixture was molded into cylindrical pellets having a diameter of 5 mm by pressurizing at 150 MPa using a uniaxial press. The obtained pellets were placed in an electric furnace and sintered in the air at 1400° C. for 24 hours. As a result, pellets as a sintered body were obtained. The electrical conductivity was measured using the obtained sintered body. In order to evaluate the product phase of the obtained compound by X-ray diffraction (XRD), a part of the sintered body was ground for 20 minutes by a grinder made of tungsten carbide (WC) and then ground for about 1 hour by an agate mortar.

Test Example 72

The compound shown in "Composition" of Test Example 72 in Table 15 was prepared by the solid-phase reaction method. $BaCO_3$, $MnO_2$, $La_2O_3$, and $CaCO_3$ were used as starting materials. The starting materials were dried in advance in an electric furnace at 250 to 300° C. for 12 hours, and then weighed with an electronic balance so that the molar ratio of cations was at the desired chemical composition. Using an agate mortar, dry mixing and grinding and wet mixing and grinding using ethanol were repeatedly performed for about 1 hour. The obtained mixture was calcined in the air at 900° C. for 10 hours using an electric furnace. The calcined mixture was repeatedly subjected to mixing and grinding in an agate mortar for about 1 hour in a dry manner and in a wet manner using ethanol. The mixture was molded into cylindrical pellets having a diameter of 5 mm by pressurizing at 150 MPa using a uniaxial press. The obtained pellets were placed in an electric furnace and sintered in the air at 1200° C. for 12 hours. The obtained sintered body was ground for 20 minutes by a grinder made of a tungsten carbide (WC), and then ground in an agate mortar for about 1 hour. The mixture was molded into cylindrical pellets having a diameter of 5 mm by pressurizing at 150 MPa using a uniaxial press. The obtained pellets were placed in an electric furnace and sintered in the air at 1200° C. for 12 hours. As a result, pellets as a sintered body were obtained. The electrical conductivity was measured using the obtained sintered body. In order to evaluate the product phase of the obtained compound by X-ray diffraction (XRD), a part of the sintered body was ground for 20 minutes by a grinder made of tungsten carbide (WC) and then ground for about 1 hour by an agate mortar.

Test Example 73

The compound shown in "Composition" of Test Example 73 in Table 15 was prepared by the solid-phase reaction method. $La_2CO_3$, $MnO_2$, and $CaCO_3$ were used as starting materials. The starting materials were dried in advance in an electric furnace at 250 to 300° C. for 12 hours, and then weighed with an electronic balance so that the molar ratio of cations was at the desired chemical composition. Using an agate mortar, dry mixing and grinding and wet mixing and grinding using ethanol were repeatedly performed for about 1 hour. The obtained mixture was calcined in the air at 900° C. for 12 hours using an electric furnace. The calcined mixture was repeatedly subjected to mixing and grinding in an agate mortar for about 1 hour in a dry manner and in a wet manner using ethanol. The mixture was molded into cylindrical pellets having a diameter of 5 mm by pressurizing at 150 MPa using a uniaxial press. The obtained pellets were placed in an electric furnace and sintered in the air at 1200° C. for 12 hours. As a result, pellets as a sintered body were obtained. In order to evaluate the product phase of the obtained compound by X-ray diffraction (XRD), a part of the sintered body was ground for 20 minutes by a grinder made of tungsten carbide (WC) and then ground for about 1 hour by an agate mortar. This compound also has a crystal structure similar to that of the compounds of Test Examples 1 to 21, and thus is considered to have oxide ion conductance.

Test Examples 74 to 80

The compounds shown in the "composition" of Test Examples 74 to 80 in Table 15 were prepared by the solid-phase reaction method. $BaCO_3$, $Al_2O_3$, $ZrO_2$, $Gd_2O_3$, $Dy_2O_3$, $Ho_2O_3$, $Er_2O_3$, $Tm_2O_3$, $Yb_2O_3$, and $Lu_2O_3$ were used as starting materials. The starting materials were dried in advance in an electric furnace at 300° C. for 12 hours, and then weighed with an electronic balance so that the molar ratio of cations was at the desired chemical composition. Using an agate mortar, dry mixing and grinding and wet mixing and grinding using ethanol were repeatedly performed for 30 minutes. The obtained mixture was calcined in the air at 900° C. for 10 hours using an electric furnace. The calcined mixture was subjected to mixing and grinding in an agate mortar for 30 minutes in a dry manner. The mixture was molded into cylindrical pellets having a diameter of 20 mm by pressurizing at about 50 MPa using a uniaxial press. The obtained pellets were placed in an electric furnace and sintered in the air at 1600° C. for 12 hours to obtain a sintered body. The electrical conductivity was measured using the obtained sintered body. In order to evaluate the product phase of the obtained compound by X-ray diffraction (XRD), a part of the sintered body was ground for 20 minutes by a grinder made of tungsten carbide (WC) and then ground for about 30 minutes by an agate mortar.

Each table also shows the lattice constant and the lattice volume V of Test Examples 22 to 83. Further, for some Test Examples, the activation energy Ea (eV) of conductivity estimated from the temperature dependence of the total electrical conductivity is also shown. The transference number of Test Example 27 at 900° C. was 100%.

Figure 30:
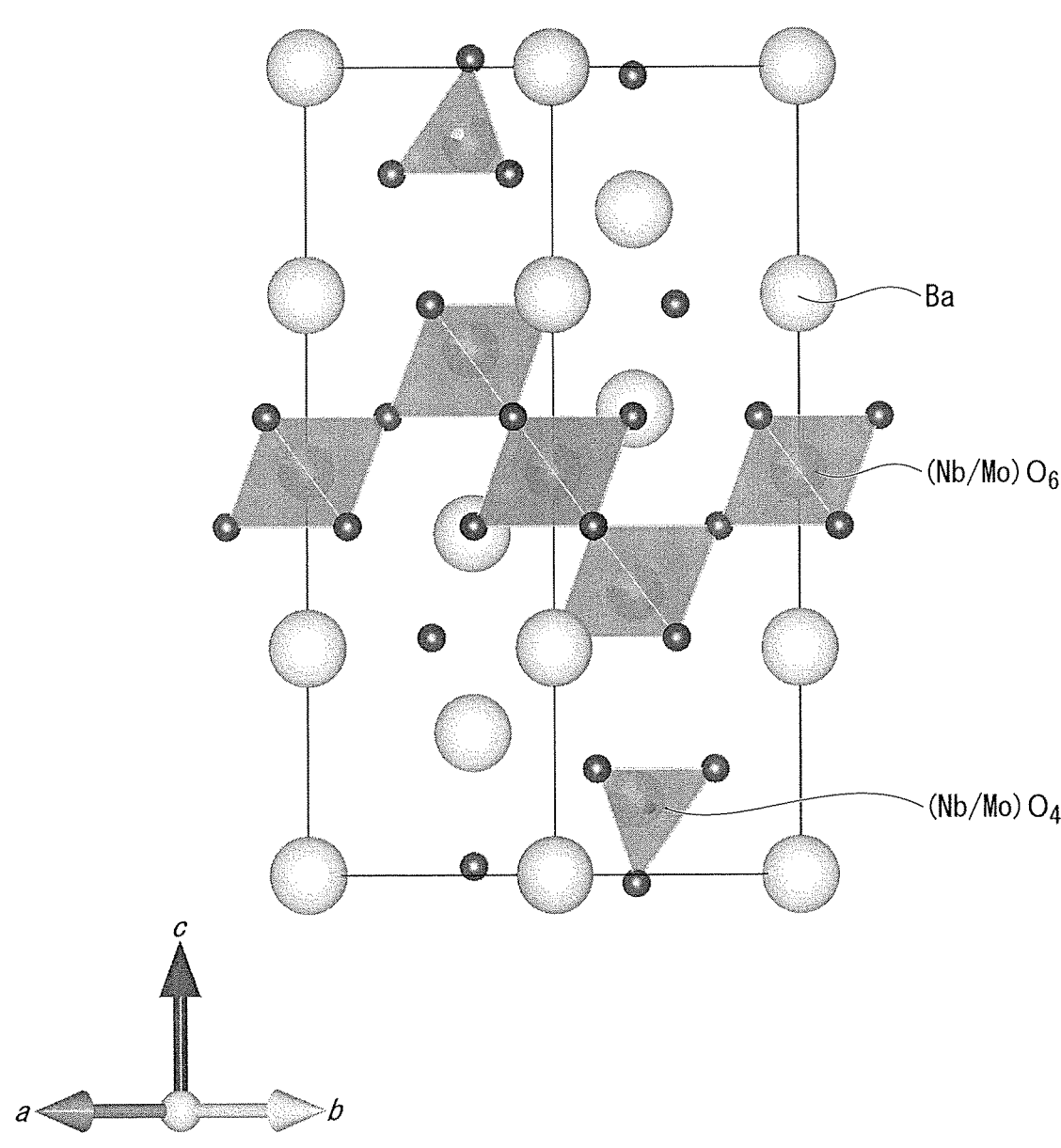
FIG. 30 shows the crystal structure of $Ba_7Nb_4MoO_{20}$ which is Test Example 22.
Figure 31:
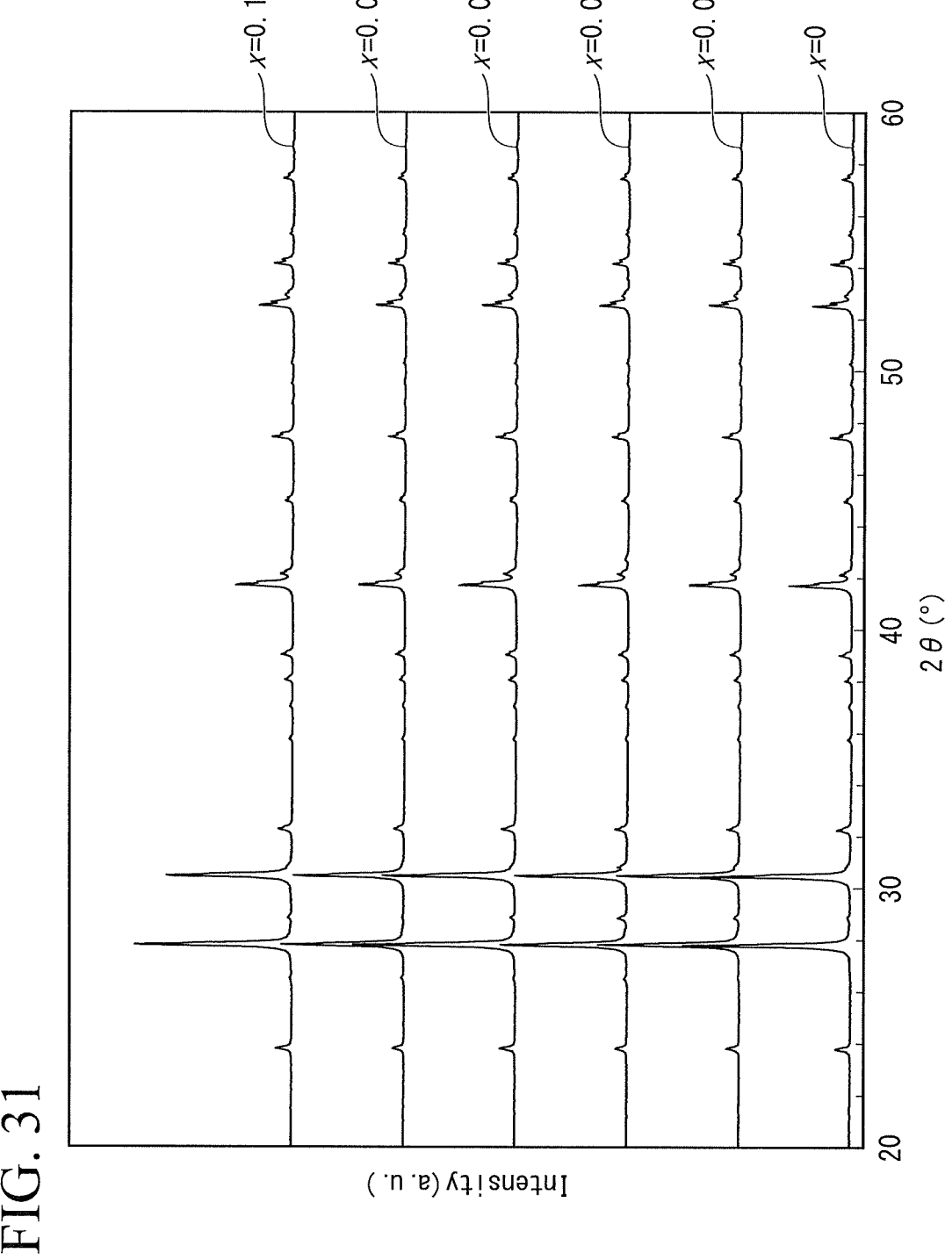
FIG. 31 is a graph showing the XRD patterns of $Ba_7Nb_{(4-x)}Mo_{(1+x)}O_{(20+z)}$ of Test Examples 22 to 27.
Figure 32:
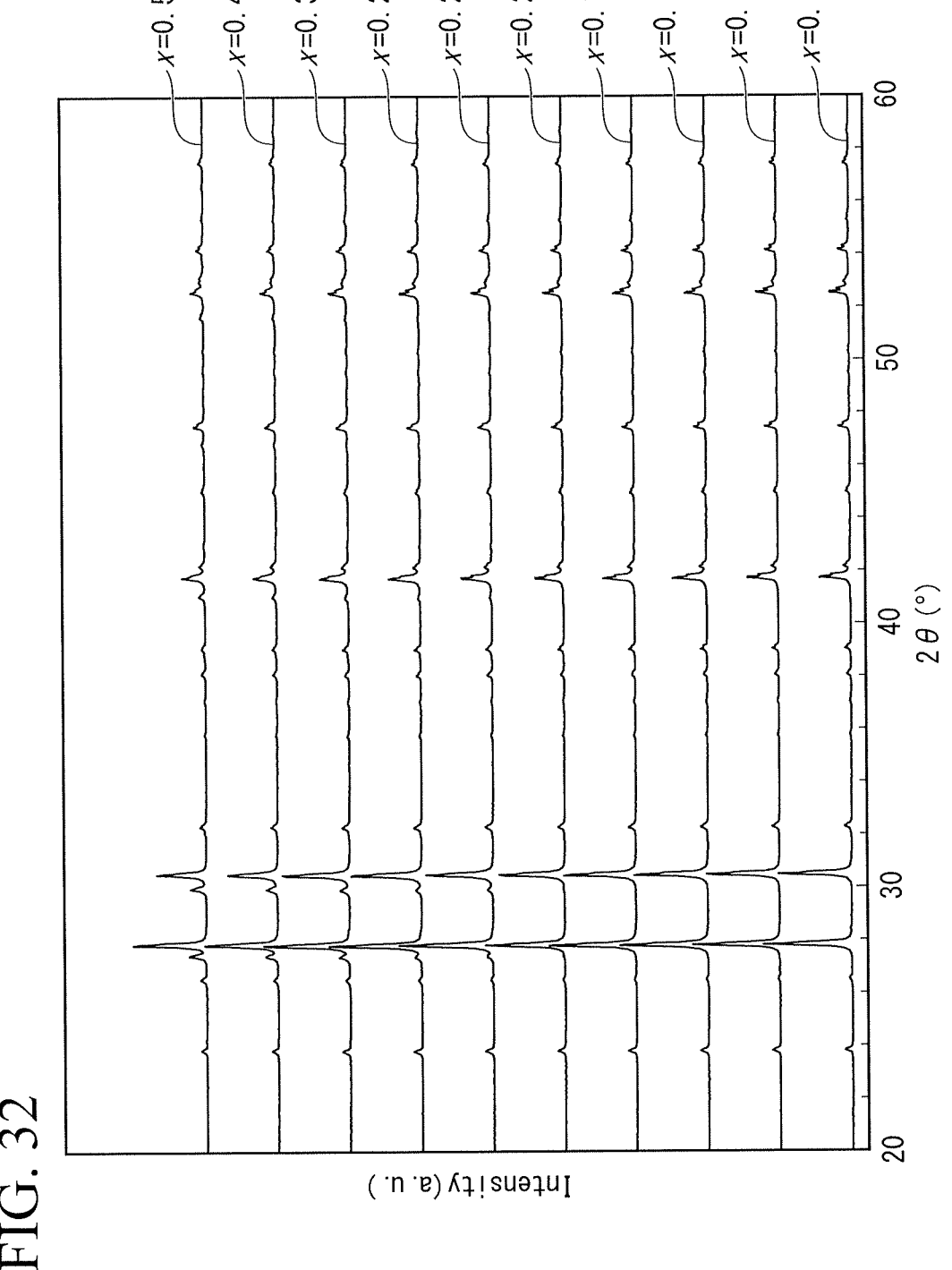
FIG. 32 shows XRD measurement charts of $Ba_7Nb_{(4-x)}Mo_{(1+x)}O_{(20+z)}$ for Test Examples 28 to 37 with different compositions.
Figure 33:
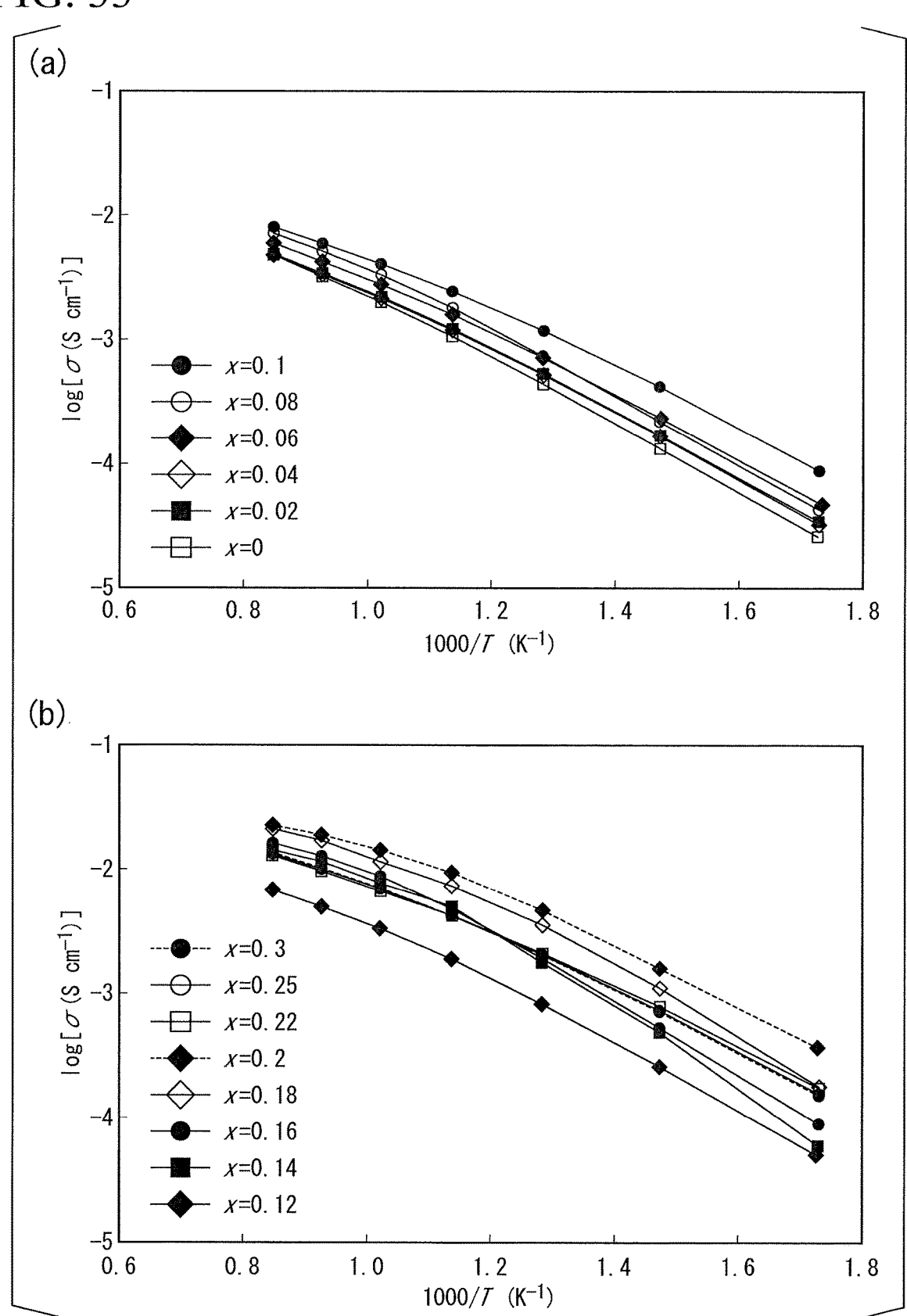
FIG. 33(a) shows the conductivity of $Ba_7Nb_{(4-x)}Mo_{(1+x)}O_{(20+z)}$ of Test Examples 22 to 27 in a temperature-dependent manner.
FIG. 33(b) shows the conductivity of $Ba_7Nb_{(4-x)}Mo_{(1+x)}O_{(20+z)}$ for Test Examples 28 to 35 having different compositions in a temperature-dependent manner.
Figure 34:
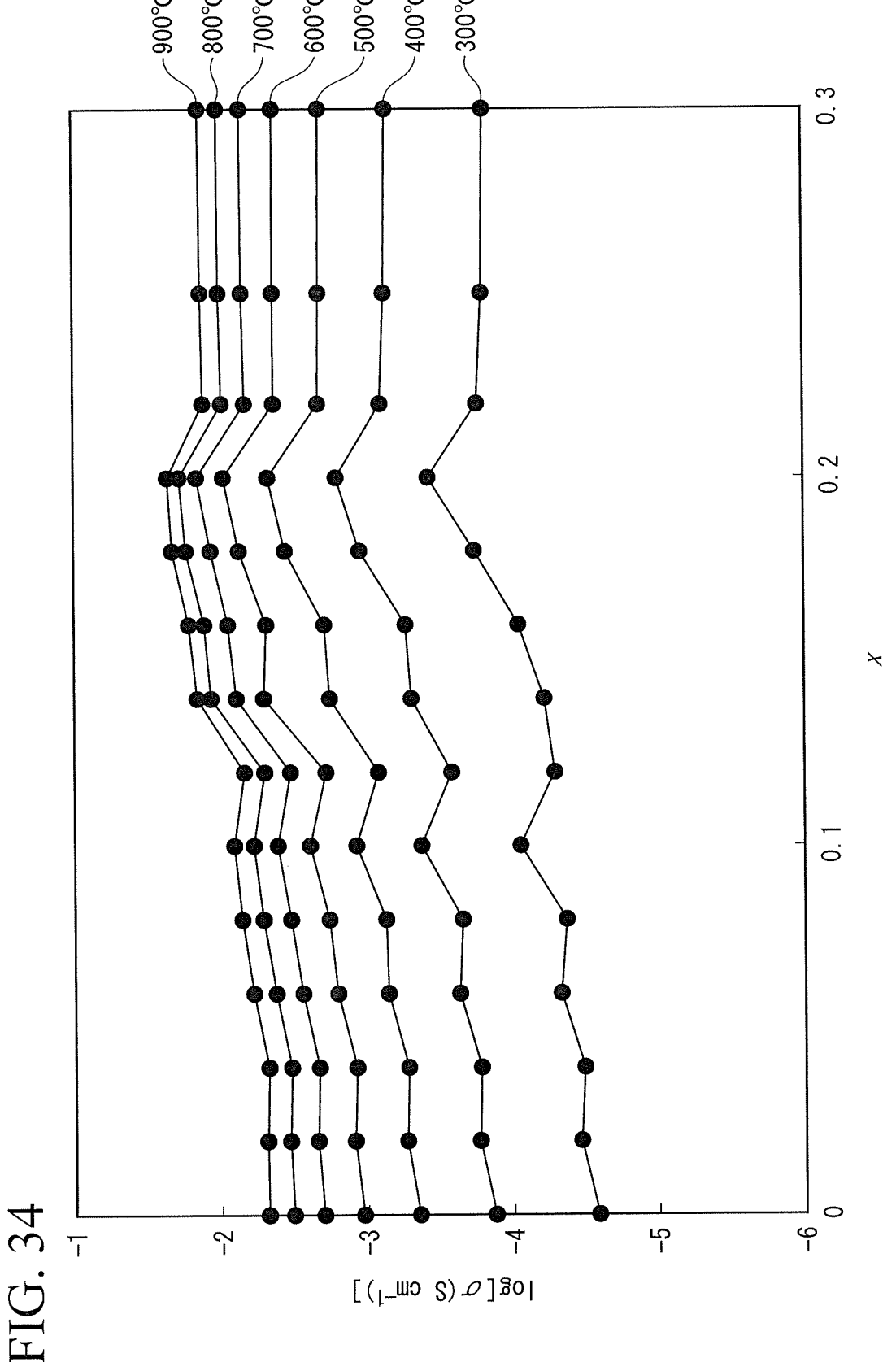
FIG. 34 shows the conductivity of $Ba_7Nb_{(4-x)}Mo_{(1+x)}O_{(20+z)}$ of Test Examples 22 to 35 at a certain temperature in a composition-dependent manner.

FIG. 30 shows a crystal structure of $Ba_7Nb_4MoO_{20}$ used in Test Example 22. In this figure, the space group is P-3m1 (No. 164), and the lattice constants are a=b=5.8602 Å and c=16.5311 Å. Test Examples 23 to 58 and 81 to 83, which are $Ba_7Nb_4MoO_{20}$-based materials, also have similar crystal structures. FIGS. 31 and 32 are a graph showing the XRD patterns of $Ba_7Nb_{(4-x)}Mo_{(1+x)}O_{(20+z)}$. FIG. 31 shows the measurement charts for x=0, 0.02, 0.04, 0.06, 0.08, 0.1, and FIG. 32 shows the measurement charts for x=0.12, 0.14, 0.16, 0.18, 0.2, 0.22, 0.25, 0.3, 0.4, 0.5. The conductivity of $Ba_7Nb_{(4-x)}Mo_{(1+x)}O_{(20+z)}$ is plotted in a temperature-dependent manner for each value of x in FIG. 33 and in a composition-dependent manner for each temperature value in FIG. 34.

Figure 35:
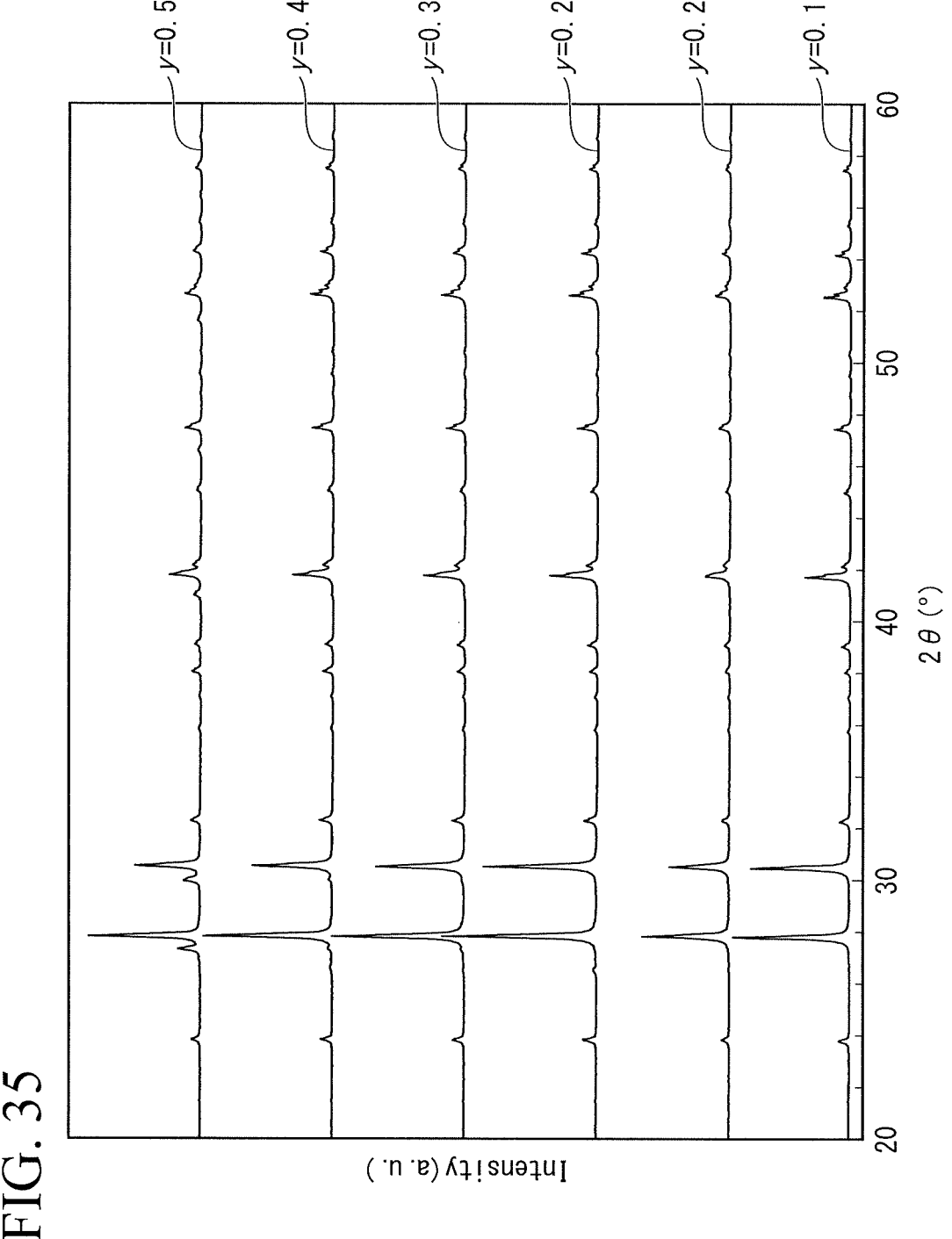
FIG. 35 is a graph showing the XRD patterns of $Ba_7Nb_{(4-y)}MoCr_yO_{(2+z)}$ of Test Examples 40 to 44 and 46.
Figure 36:
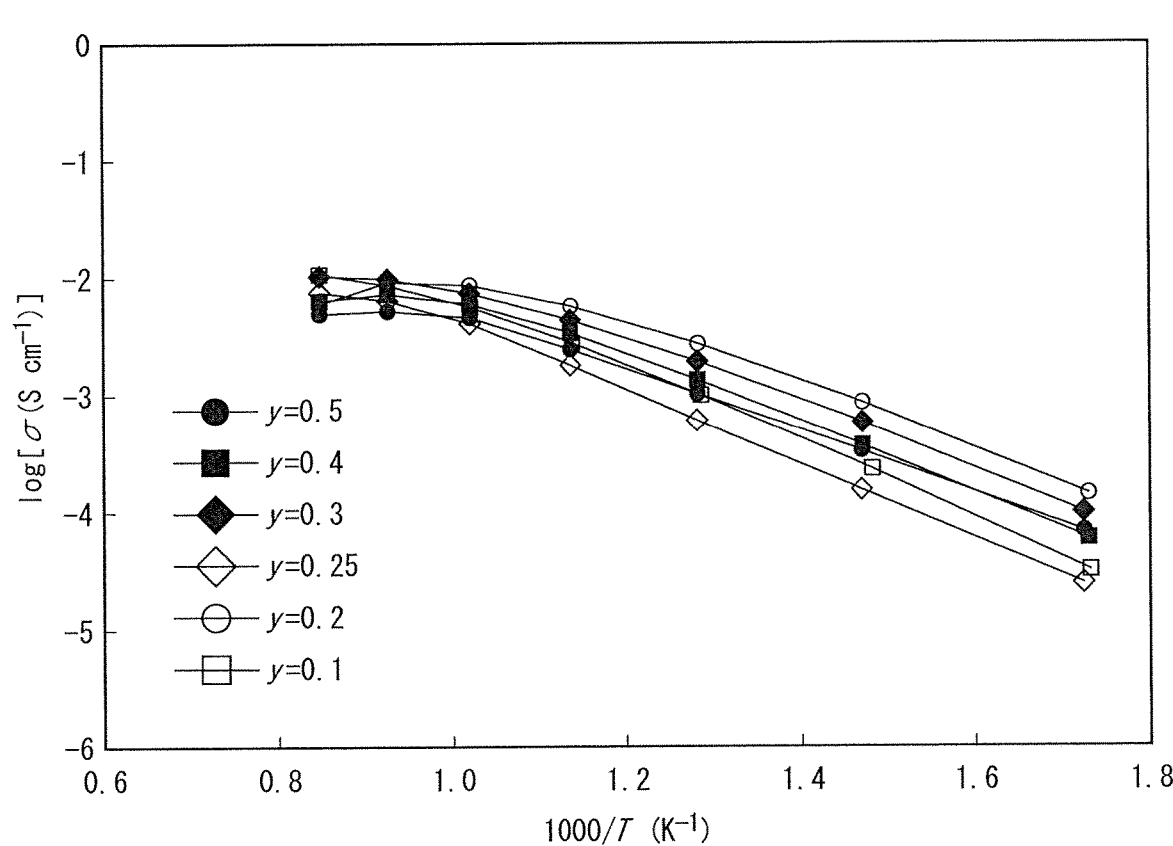
FIG. 36 shows the conductivity of $Ba_7Nb_{(4-y)}MoCr_yO_{(20+z)}$ of Test Examples 40 to 44 and 46 in a temperature-dependent manner.

FIG. 35 is a graph showing the XRD pattern of $Ba_7Nb_{(4-y)}MoCr_yO_{(2+z)}$ used in Test Examples 40 to 44 and 46. The measurement charts for x=0.1, 0.2, 0.25, 0.3, 0.4, 0.5 are shown. The conductivity of Ba7Nb(4−x)Mo(1+x)O(20+z) is plotted in a temperature-dependent manner in FIG. 36.

Figure 37:
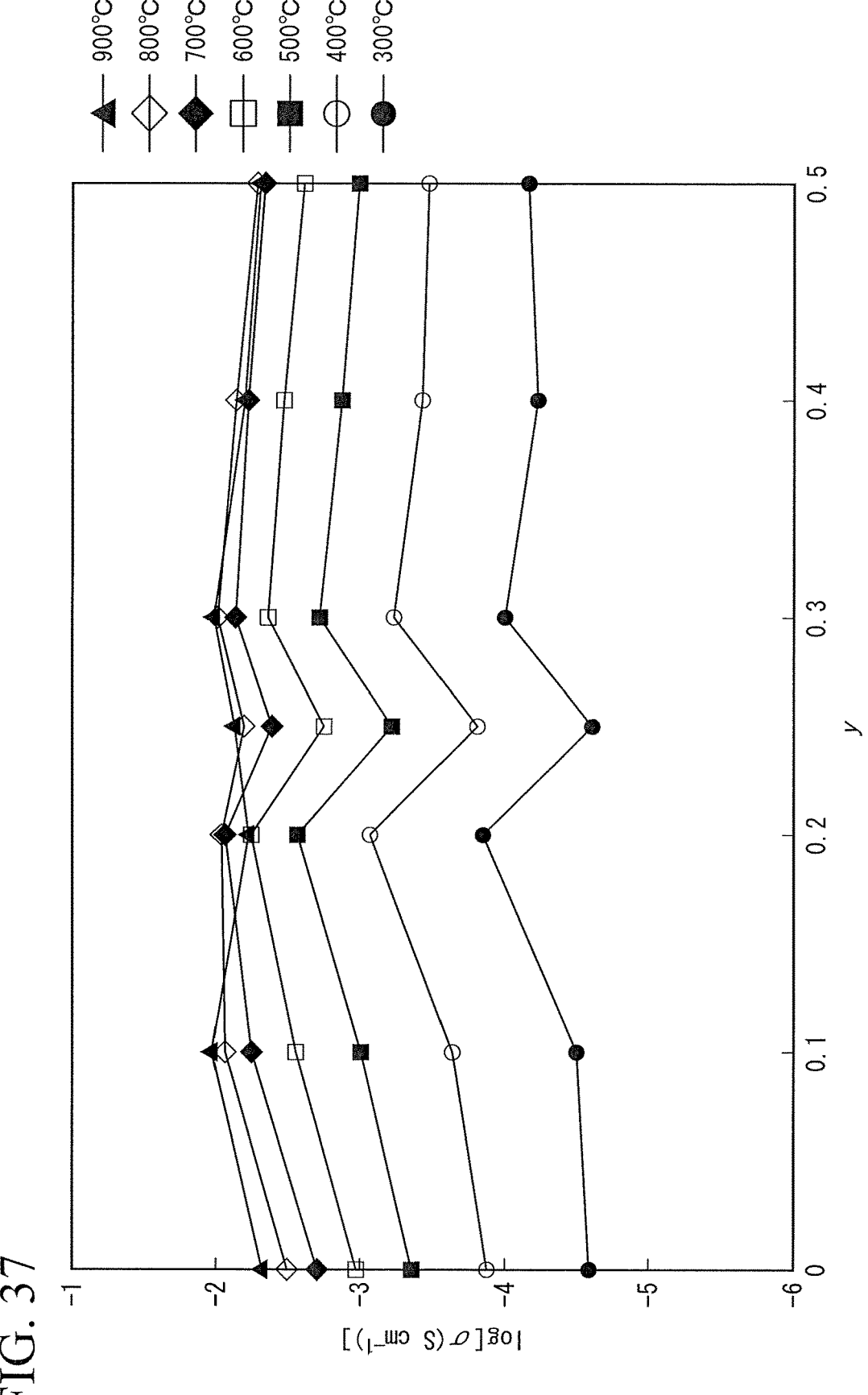
FIG. 37 shows the conductivity of $Ba_7Nb_{(4-y)}MoCr_yO_{(2+z)}$ of Test Examples 22, 40 to 44, and 46 in a composition-dependent manner.

The conductivity of $Ba_7Nb_{(4-y)}MoCr_yO_{(20+z)}$ used in Test Examples 22, 40 to 44, and 46 is plotted in a composition-dependent manner in FIG. 37.

Figure 38:
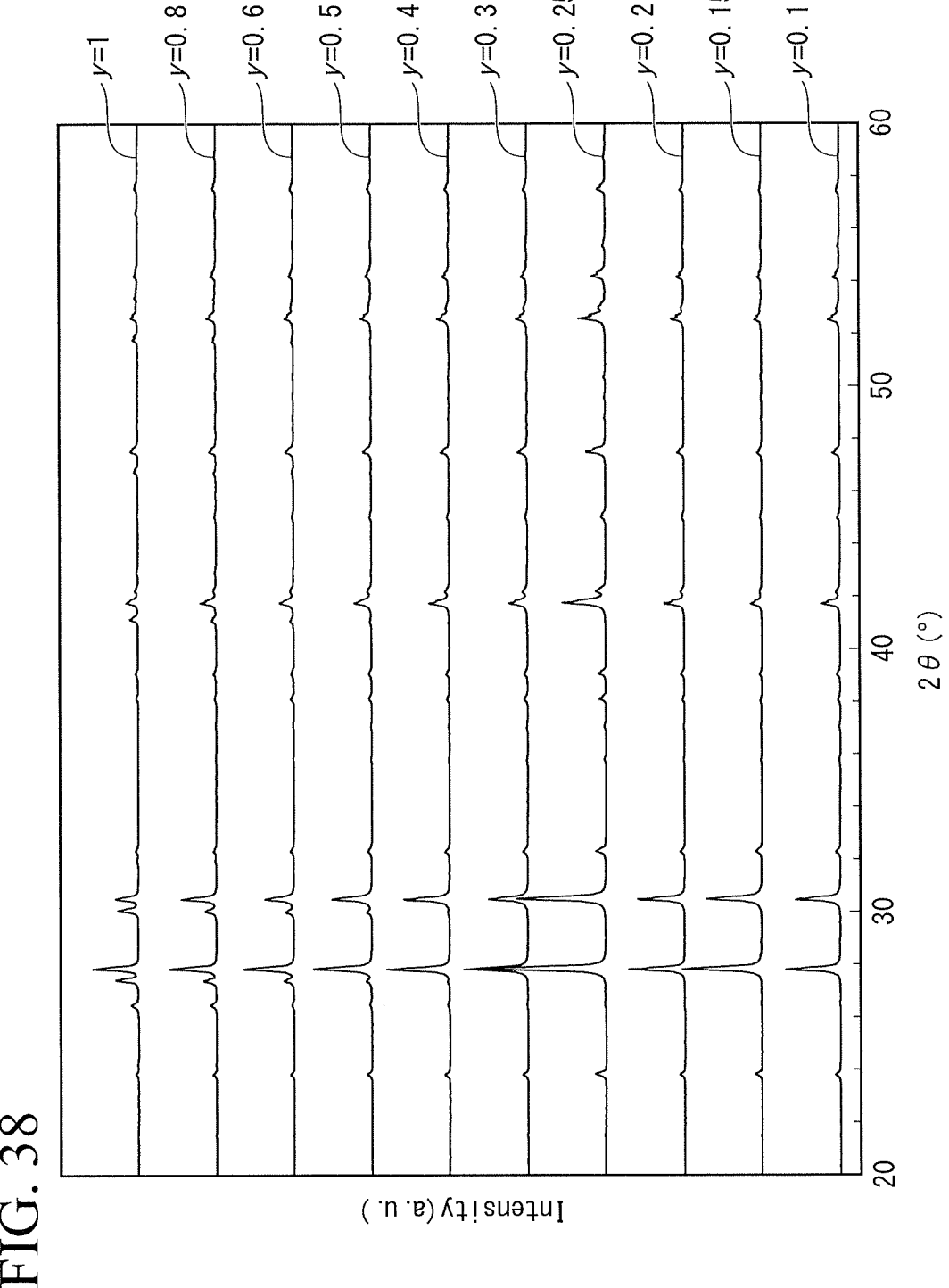
FIG. 38 is a graph showing the XRD patterns of $Ba_7Nb_{(4-y)}MoW_yO_{(20+z)}$ of Test Examples 52 to 58 and 81 and 83.
Figure 39:
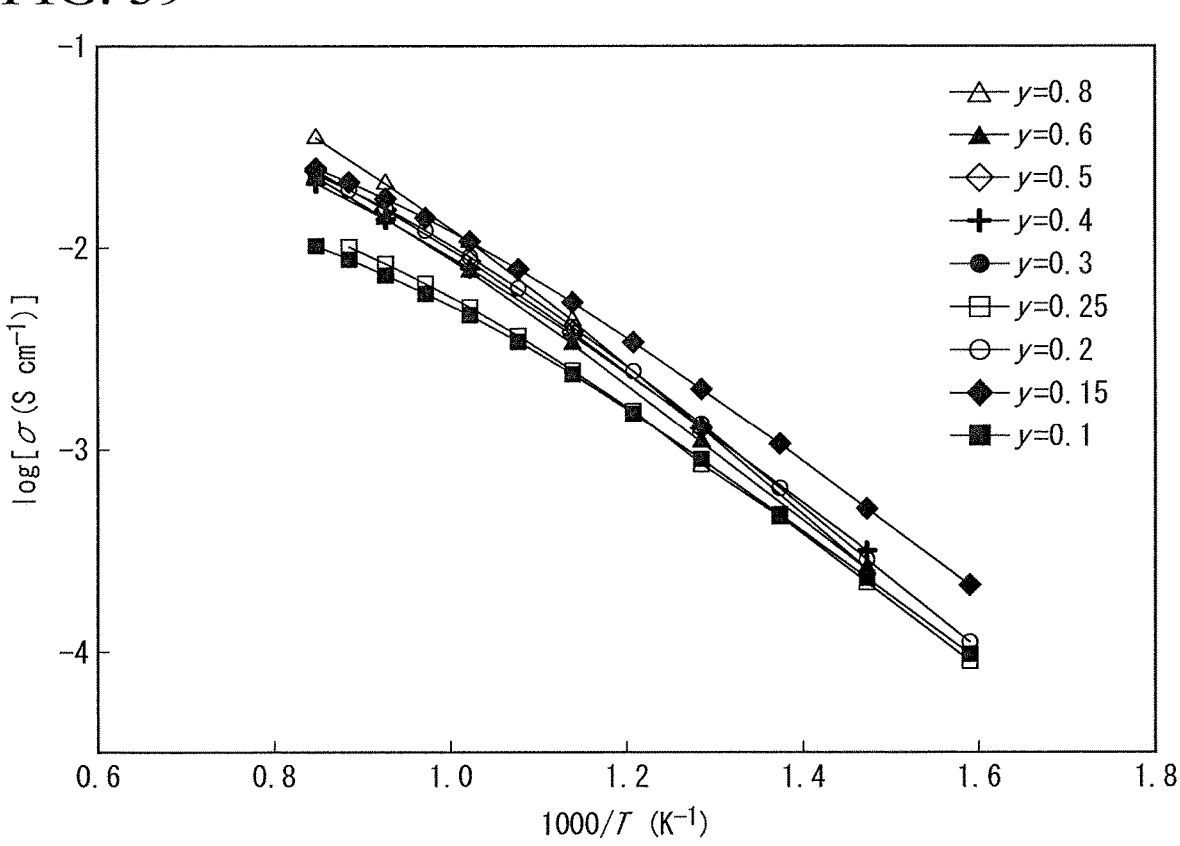
FIG. 39 shows the total electrical conductivity of Test Examples 52 to 58, 81, 82 of $Ba_7Nb_{(4-y)}MoW_yO_{(20+z)}$ in a temperature-dependent manner.
Figure 40:
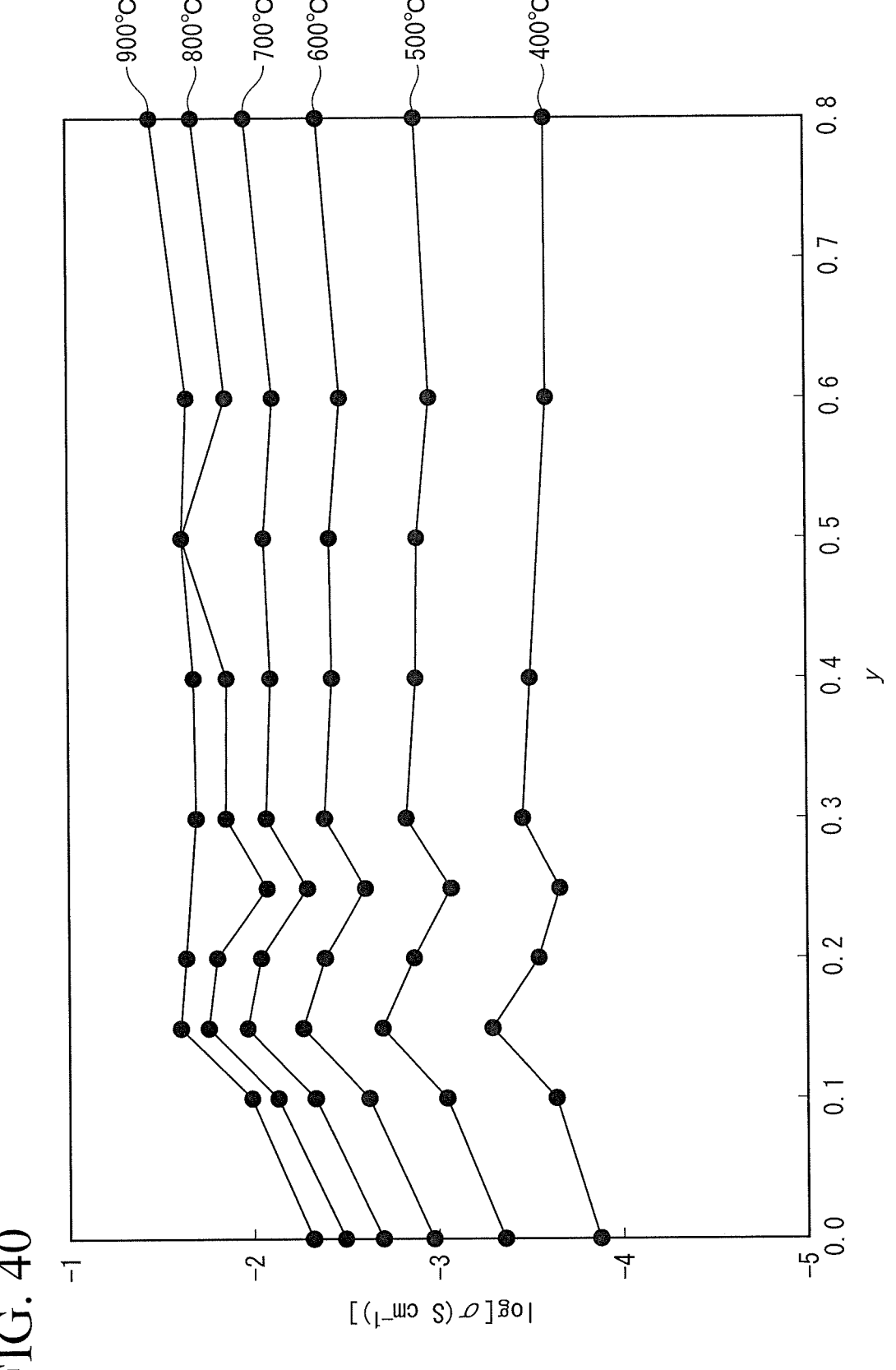
FIG. 40 shows the total electrical conductivity of $Ba_7Nb_{(4-y)}MoW_yO_{(20+z)}$ of Test Examples 22, 52 to 58, 81, and 82 in a composition-dependent manner.

FIG. 38 is a graph showing the XRD patterns of $Ba_7Nb_{(4-y)}MoW_yO_{(20+z)}$ used in Test Examples 52 to 58 and 81 and 83. FIG. 39 shows the total electrical conductivity of $Ba_7Nb_{(4-y)}MoW_yO_{(20+z)}$ in a temperature-dependent manner. FIG. 40 shows the total electrical conductivity of $Ba_7Nb_{(4-y)}MoW_yO_{(20+z)}$ in a composition-dependent manner.

Figure 41:
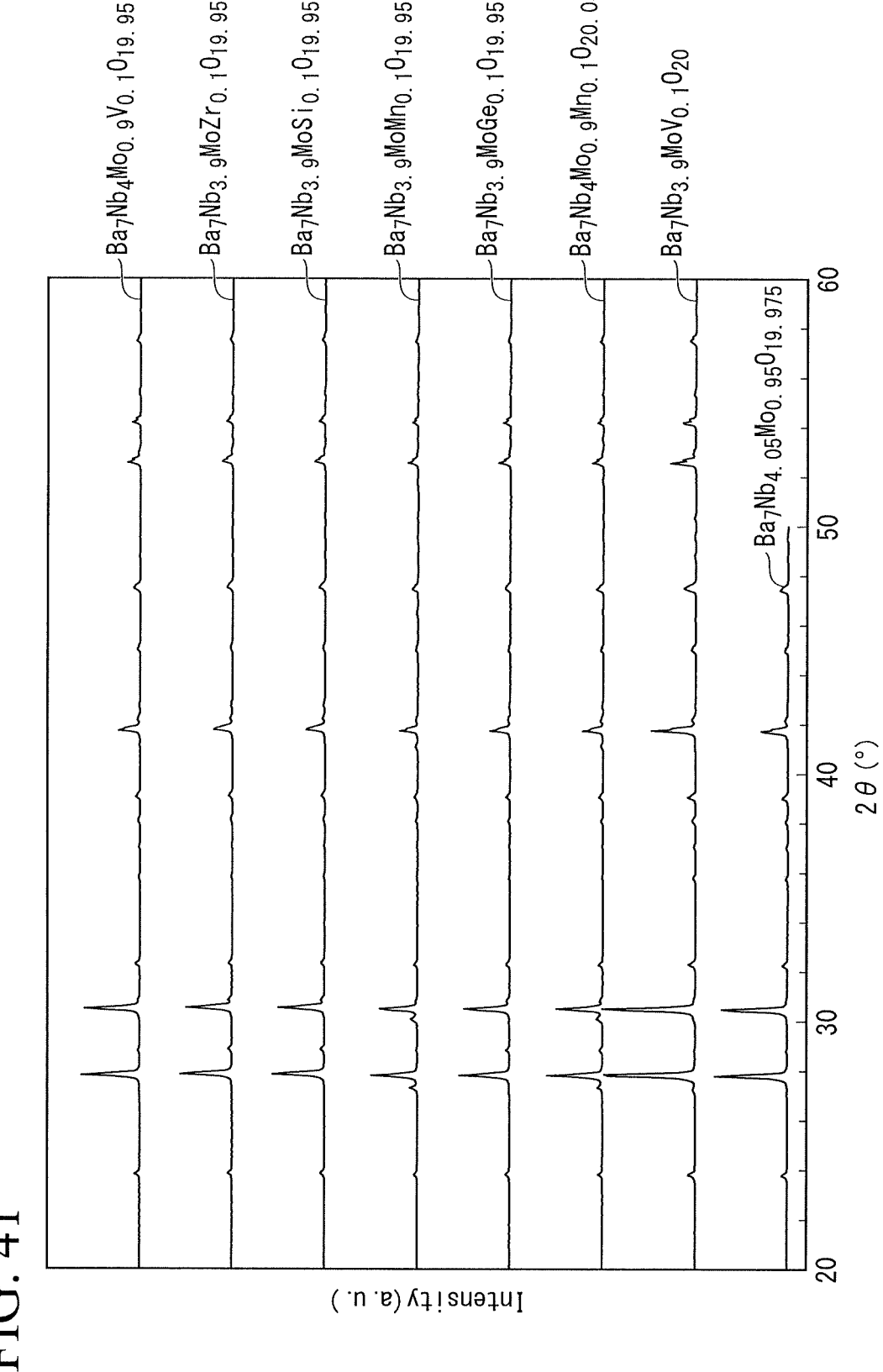
FIG. 41 is a graph showing the XRD patterns of Test Examples 38, 39, 45, 47 to 51.
Figure 42:
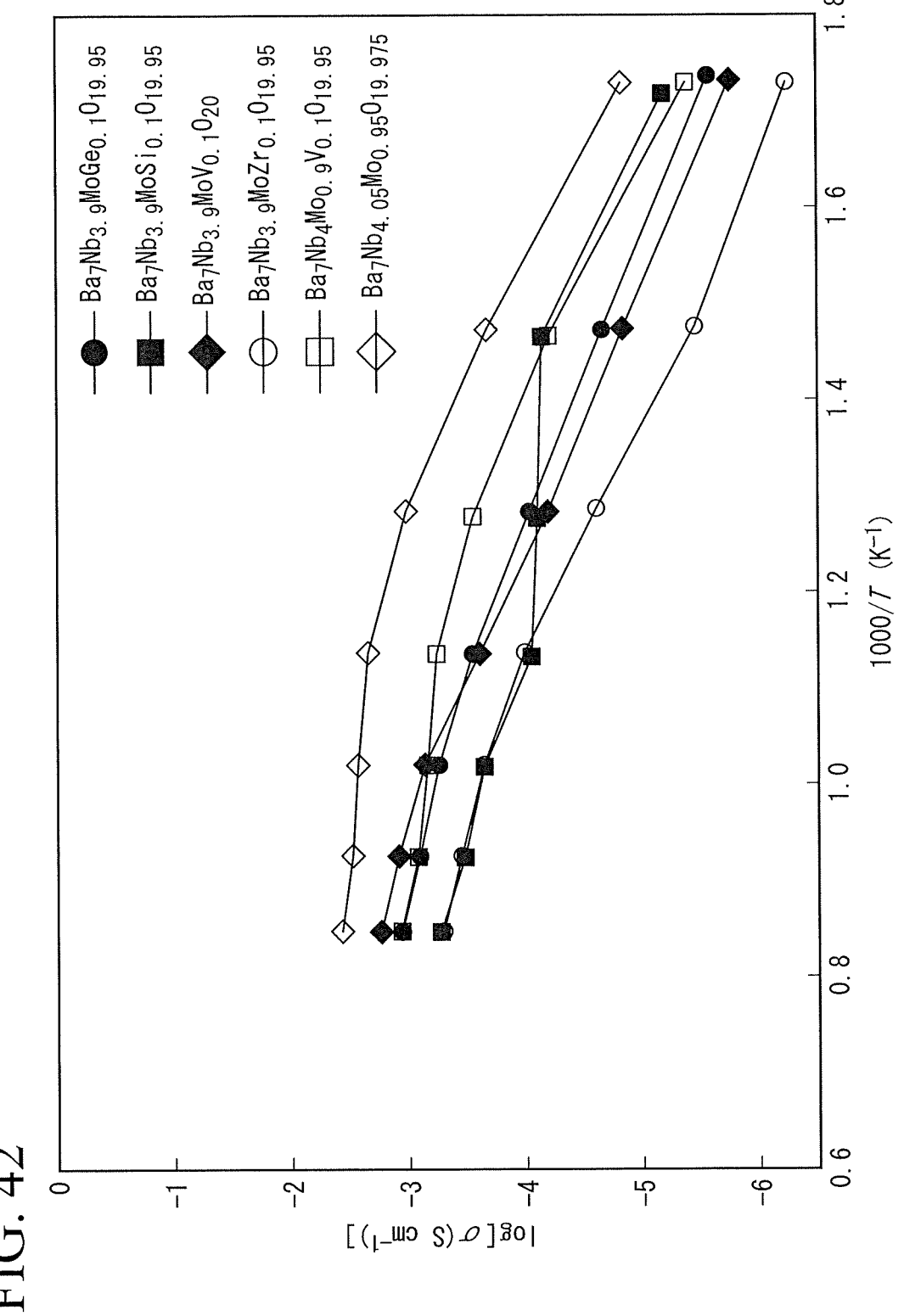
FIG. 42 shows the electrical conductivity of Test Examples 38, 39, and 47 to 50 in a temperature-dependent manner.

FIG. 41 is a graph showing XRD patterns of $Ba_7Nb_{3.9}MoM_{0.1}O_{(20+z)}$ (M is V, Mn, Ge, Si, or Zr), $Ba_7Nb_4Mo_{0.9}M_{0.1}O_{(20+z)}$ (M is V or Mn), and $Ba_7Nb_{4.05}Mo_{0.95}O_{(20+z)}$ as other solid solutions used in Test Examples 38, 39, 45, and 47 to 51. FIG. 42 shows the electrical conductivity of the solid solutions used in Test Examples 38, 39, and 47 to 50 in a temperature-dependent manner.

Figure 43:
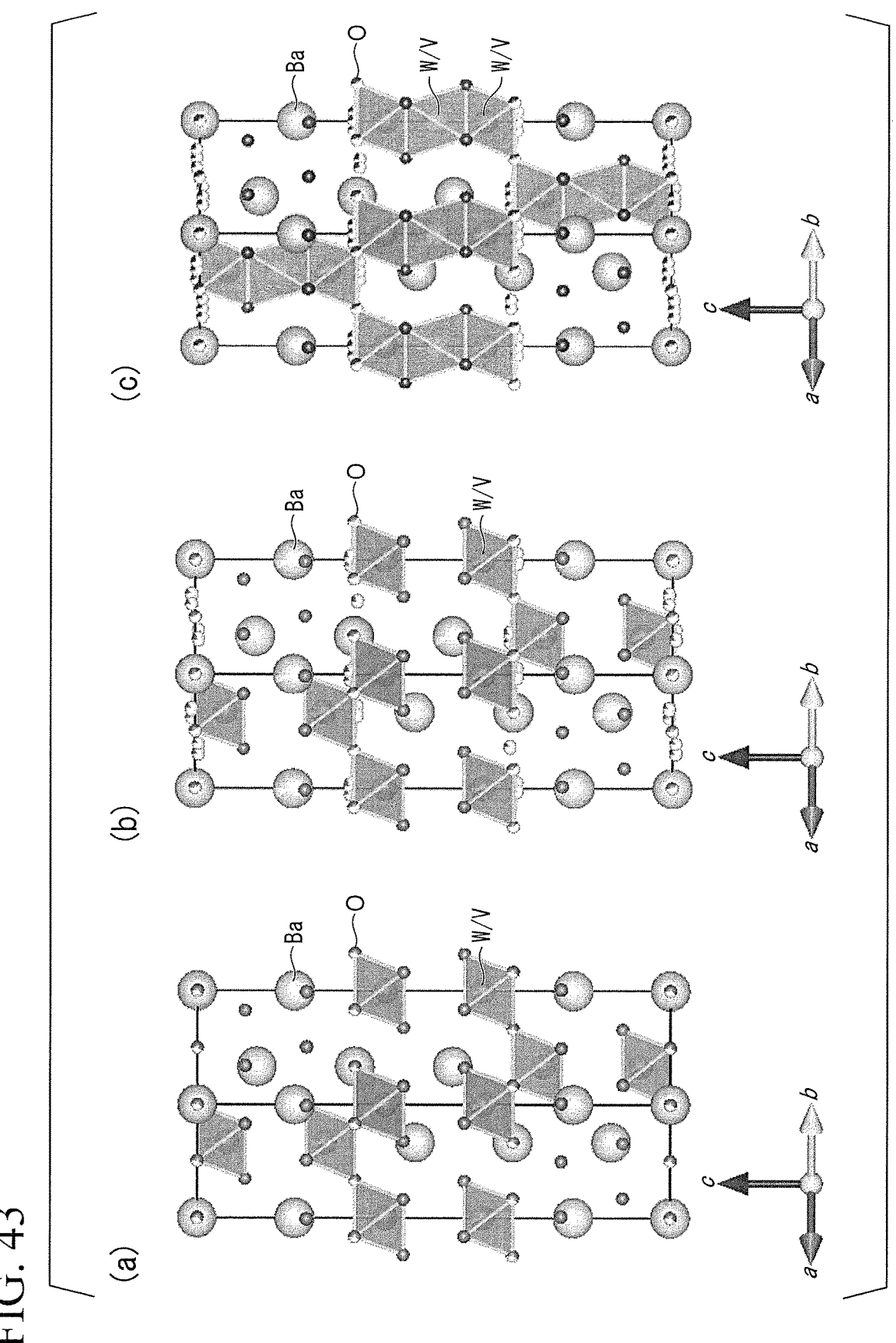
FIG. 43 shows the crystal structure of a $Ba_3WVO_{8.5}$-based material of Test Examples 59 to 67.
Figure 44:
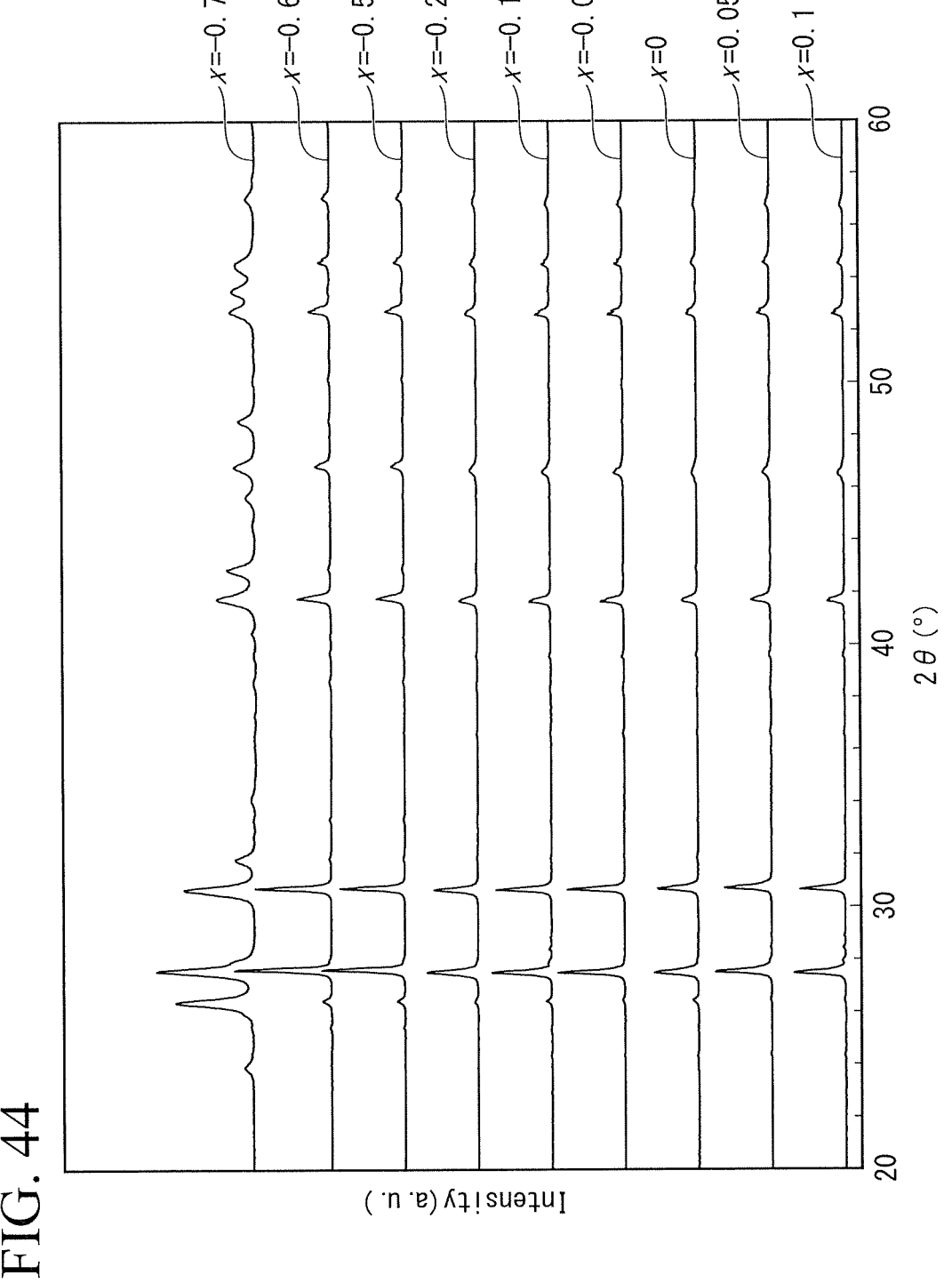
FIG. 44 is a graph showing the XRD patterns of $Ba_3W_{(1-x)}V_{(1+x)}O_{(8.5+z)}$ of Test Examples 59 to 67.
Figure 45:
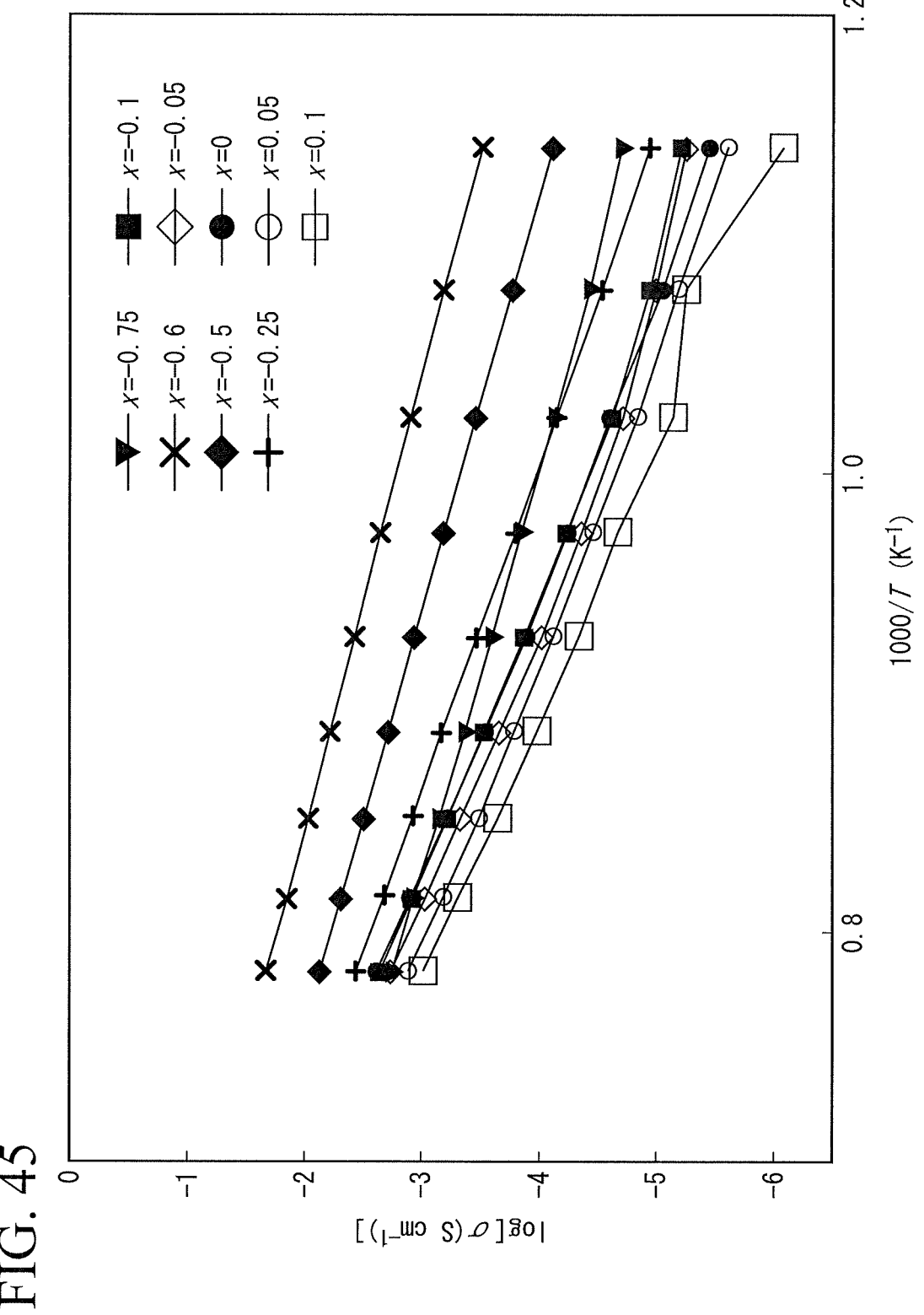
FIG. 45 shows the electrical conductivity of $Ba_3W_{(1-x)}V_{(1+x)}O_{(8.5+z)}$ of Test Examples 59 to 67 in a temperature-dependent manner
Figure 46:
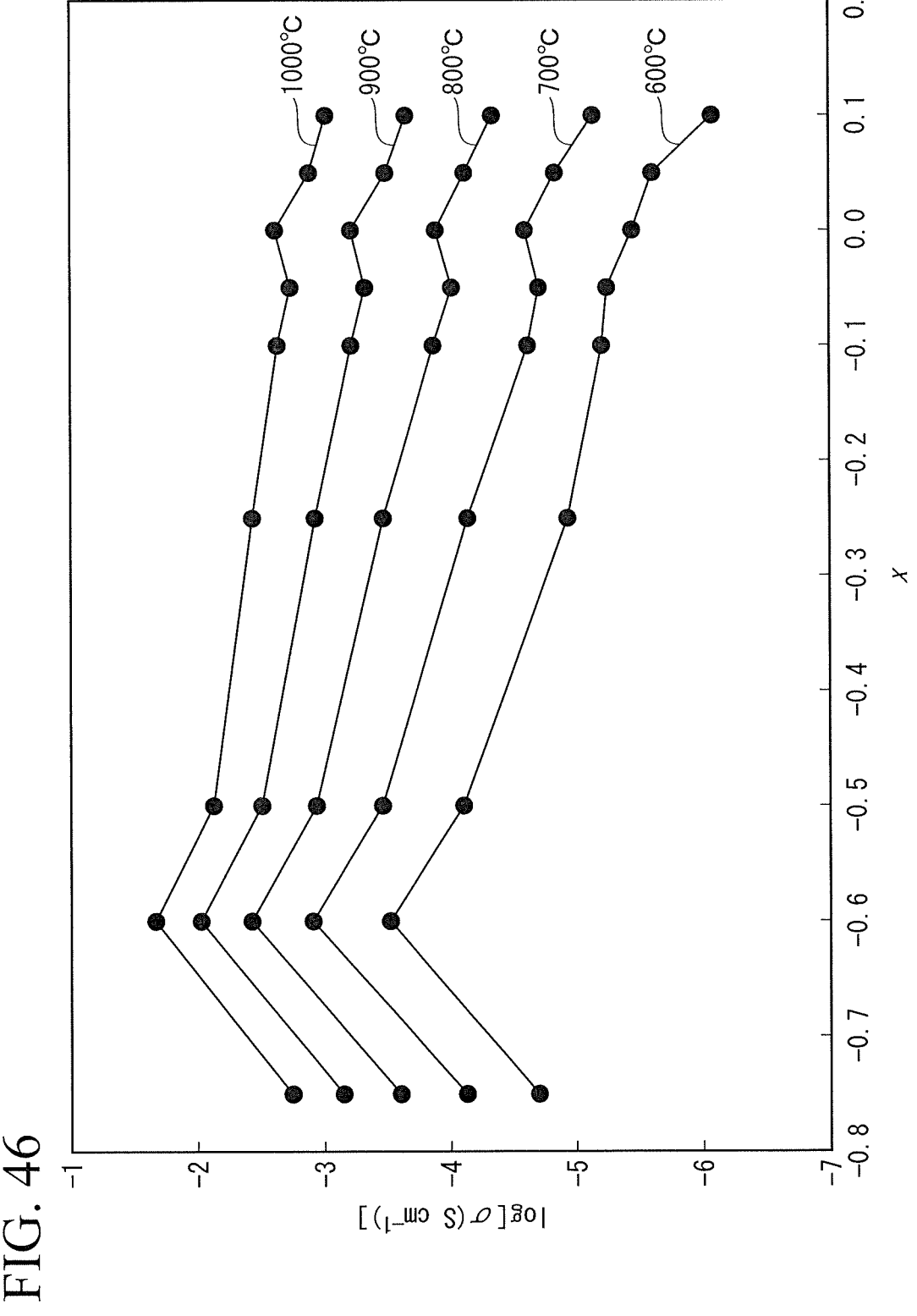
FIG. 46 shows the electrical conductivity of $Ba_3W_{(1-x)}V_{(1+x)}O_{(8.5+z)}$ of Test Examples 59 to 67 in a composition-dependent manner.

FIG. 43 shows the crystal structure of a $Ba_3WVO_{85}$-based material used in Test Examples 59 to 67. At present, the $Ba_3WVO_{8.5}$ system is said to have the crystal structure of FIG. 43(a), but the crystal structures of FIGS. 43(b) and (c) are proposed from the analysis results. In these figures, the space group is R-3m (No. 166), and the lattice constants are a=b=5.808130 (19) Å and c=21.094919 (21) Å. FIG. 44 is a graph showing the XRD patterns of $Ba_3W_{(1-x)}V_{(1+x)}O_{(8.5+z)}$. FIG. 45 shows the electrical conductivity in a temperature-dependent manner. FIG. 46 shows the electrical conductivity in a composition-dependent manner. The electrical conductivity increases as the temperature rises. At 600° C., the electrical conductivity a of $Ba_3W_{1.6}V_{0.4}O_{8.8}$ of Test Example 66 was 85 times higher than the electrical conductivity of $Ba_3WVO_{8.5}$ of Test Example 59, indicating that the electrical conductivity was improved by increasing the W amount. The same applies to Test Examples 59 to 65 and 67, which are also $Ba_3WVO_{8.5}$-based materials.

Figure 47:
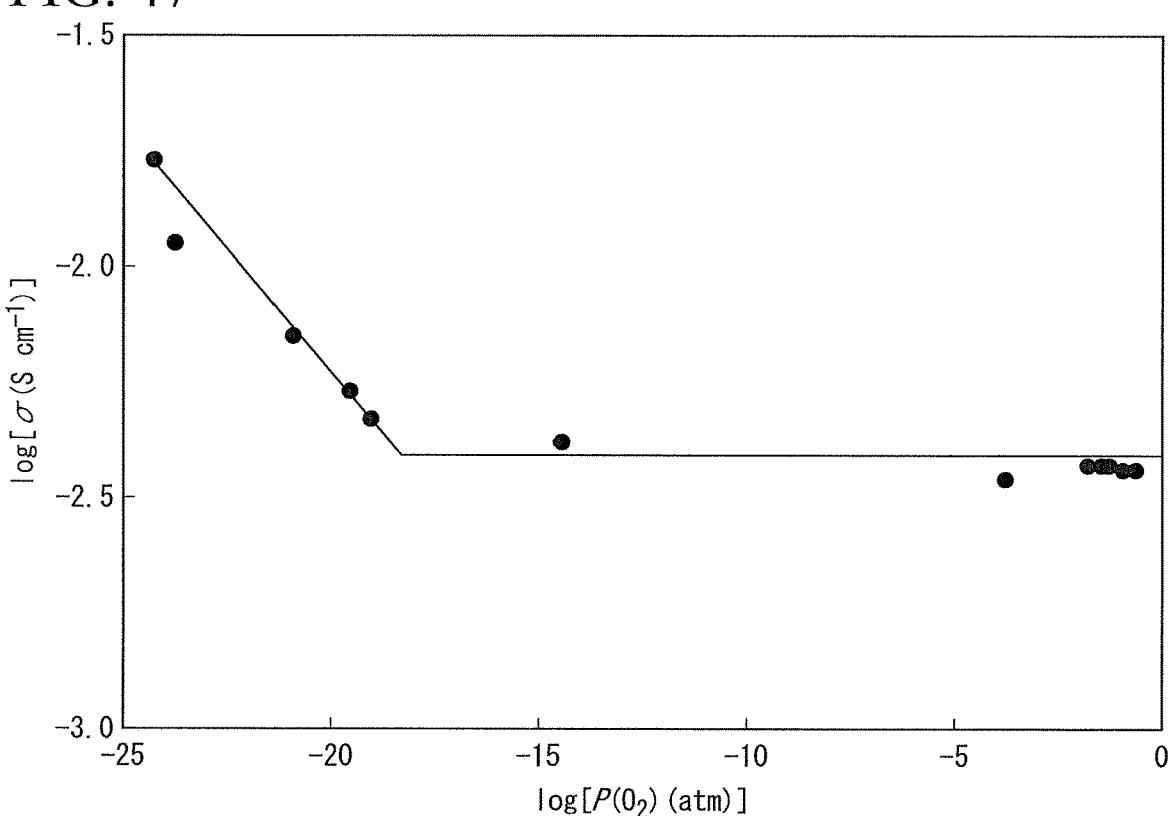
FIG. 47 shows the oxygen partial pressure P ($O_2$) dependence of total electrical conductivity for $Ba_3W_{1.6}V_{0.4}O_{8.8}$ of Test Example 66.
Figure 48:
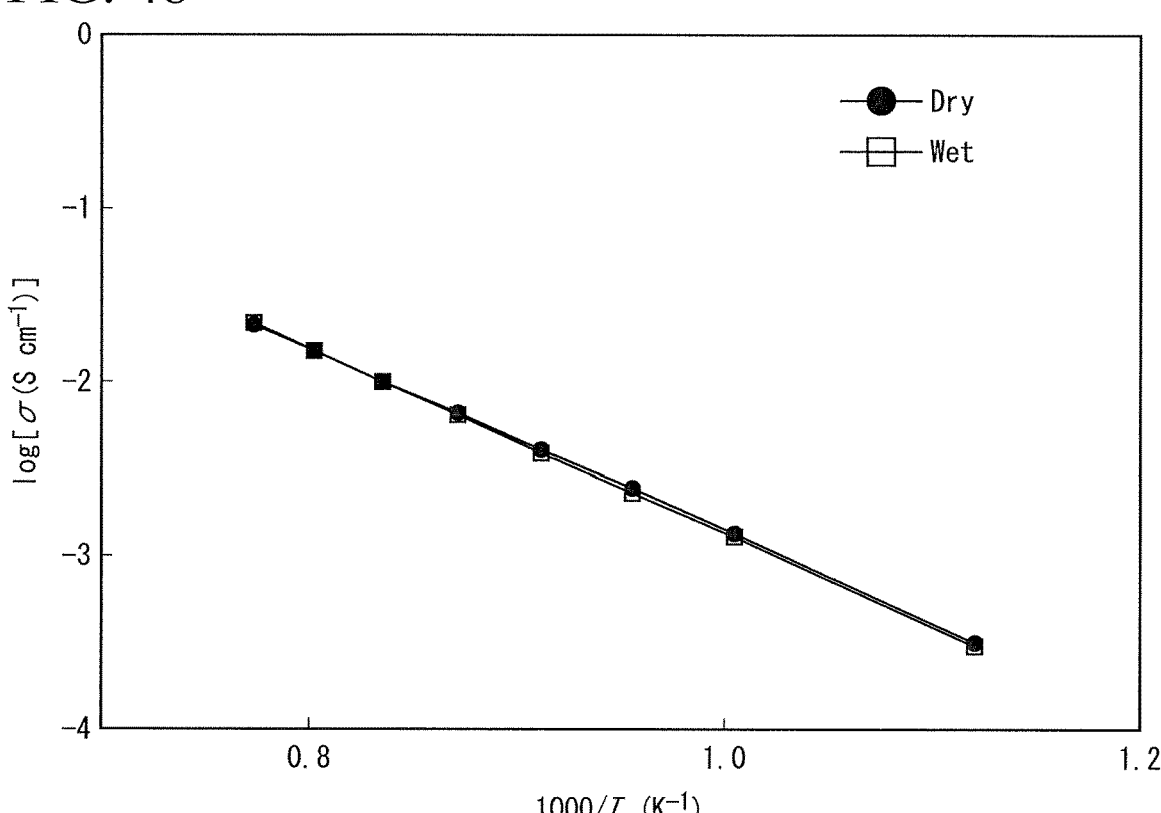
FIG. 48 shows the conductivity of $Ba_3W_{1.6}V_{0.4}O_{8.8}$ of Test Example 66 in dry air and in moist air in a temperature-dependent manner.

FIG. 47 shows the P ($O_2$) dependence of conductivity for $Ba_3W_{1.6}V_{0.4}O_{8.8}$ of Test Example 66. It is suggested that oxide ions are the dominant carriers in the region in the electrical conduction of the compound of Test Example 66 because there is a region where the total electrical conductivity is almost constant regardless of the oxygen partial pressure. FIG. 48 shows the conductivity of $Ba_3W_{1.6}V_{0.4}O_{8.8}$ in dry air and in moist air. No change in total electrical conductivity was observed in measurements in moist air and dry air with respect to Test Example 66, strongly suggesting that no proton conduction occurred in Test Example 66. The same applies to Test Examples 59 to 65 and 67, which are also $Ba_3WVO_{8.5}$-based materials.

Figure 49:
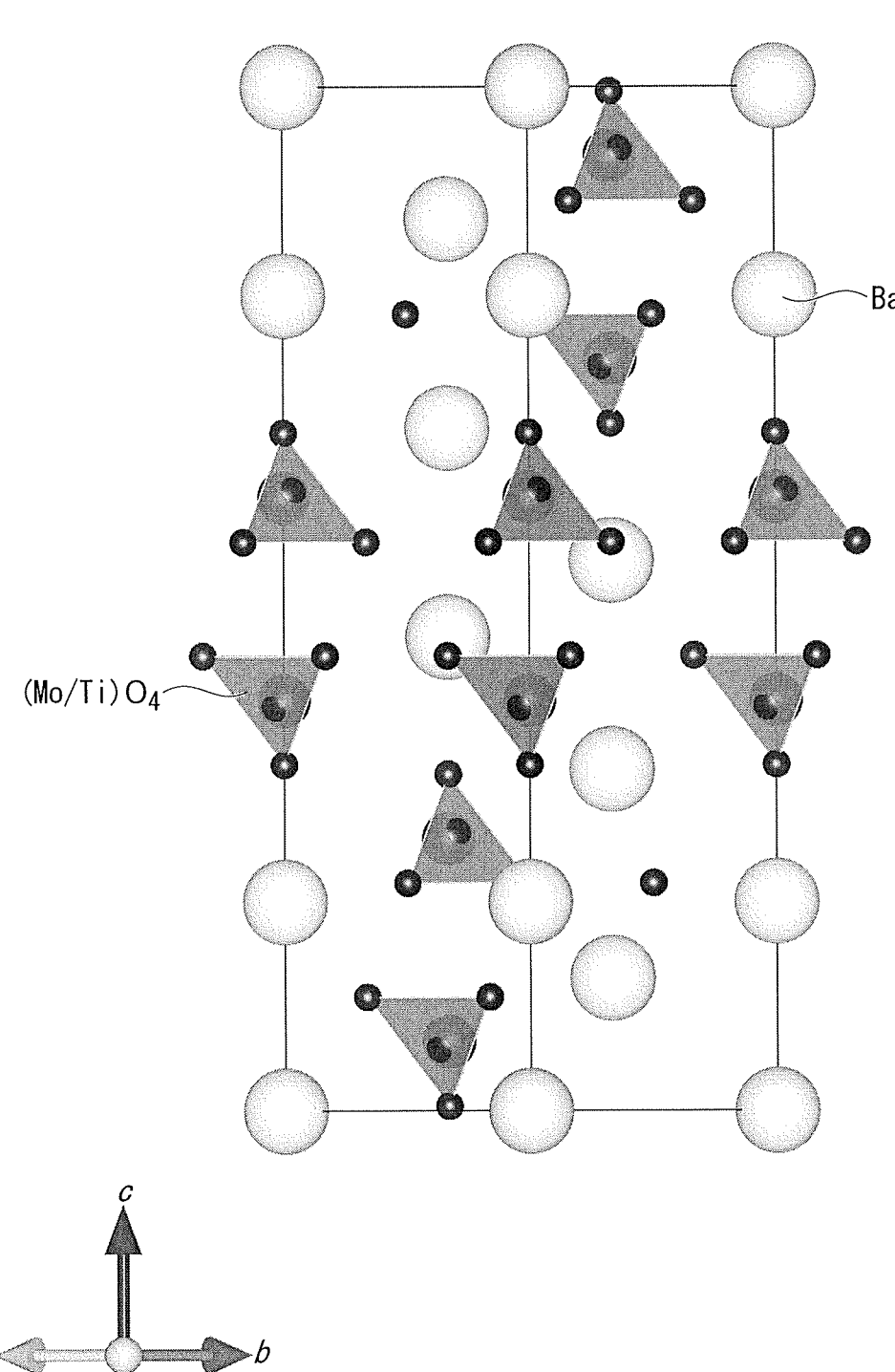
FIG. 49 shows the crystal structure of $Ba_3MoTIO_8$ of Test Example 68. $Ba_3Mo_{(1-x)}Ti_{(1+x)}O_{(8+z)}$ of Test Examples 69 and 70 also have a similar crystal structure.
Figure 50:
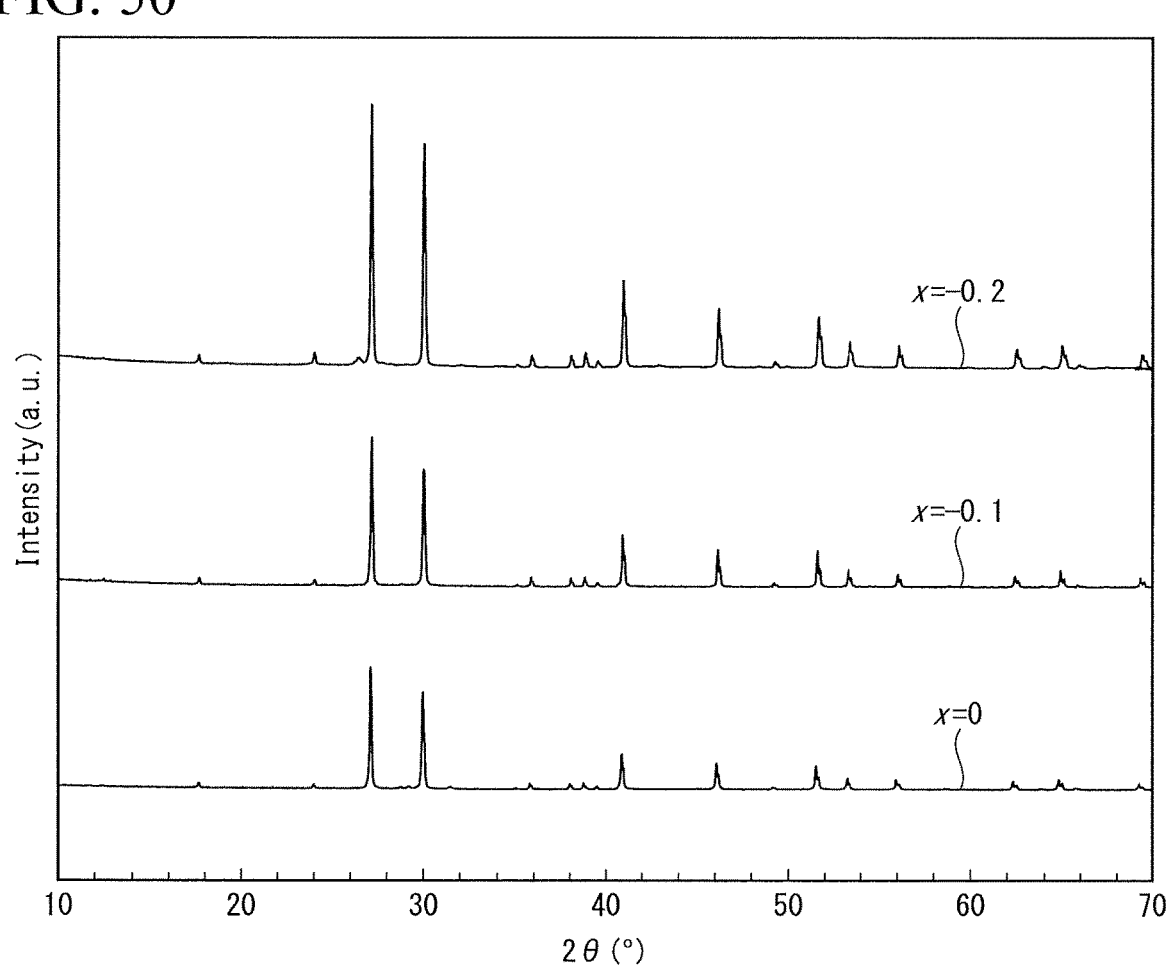
FIG. 50 is a graph showing the XRD patterns of $Ba_3Mo_{(1-x)}Ti_{(1+x)}O_{(8+z)}$ of Test Examples 68 to 70.

FIG. 49 shows the crystal structure of a $Ba_3MoTiO_8$-based material used in Test Examples 68 to 70. In this figure, the space group is R-3m (No. 166), and the lattice constants are a=b=5.9548 Å and c=21.2924 Å. FIG. 50 is a graph showing the XRD pattern of $Ba_3Mo_{(1-x)}Ti_{(1+x)}O_{(8+z)}$.

Figure 51:
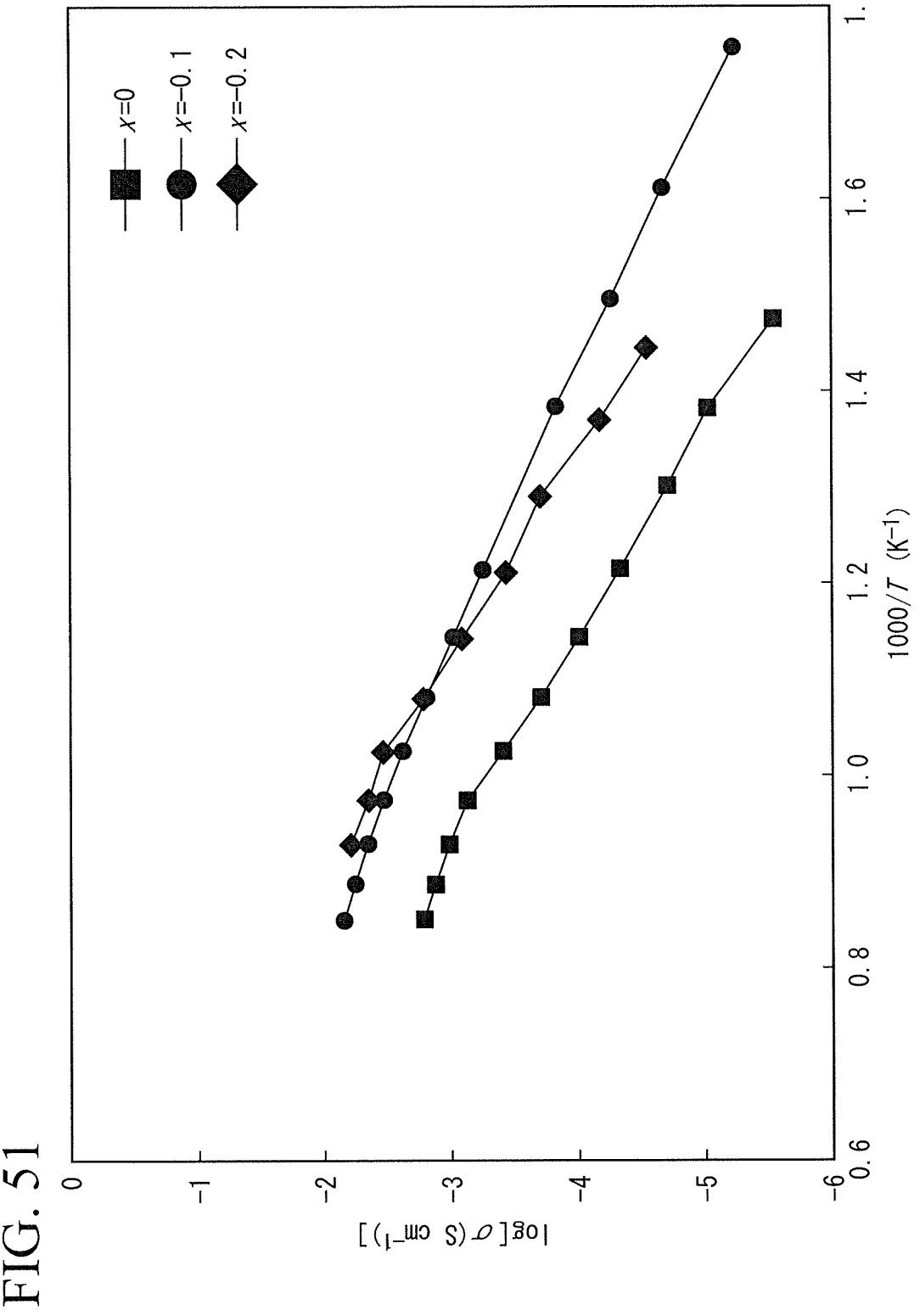
FIG. 51 shows the electrical conductivity of $Ba_3Mo_{(1-x)}Ti_{(1+x)}O_{(8+z)}$ of Test Examples 68 to 70 in a temperature-dependent manner.

FIG. 51 shows the temperature dependence of the electrical conductivity of $Ba_3Mo_{1.1}Ti_{0.9}O_{8.1}$ and $Ba_3Mo_{1.2}Ti_{0.8}O_{8.2}$ in which the excess amount x of Ti is −0.1 and −0.2. The temperature dependence of the electrical conductivity of $Ba_3MoTiO_8$ in which the excess amount x of Mo of Test Example of the present example is 0.0 is also shown. All of the samples in which the excess amount x of Mo is in the range of −0.1 and −0.2 show higher electrical conductivity than the sample of $Ba_3MoTIO_8$ (Test Example 68) in which the excess amount x of Mo is 0.0. At 620° C. or less, the sample in which the excess amount x of Mo is −0.1 has the highest electrical conductivity, and high electrical conductivity is maintained even at a low temperature of about 300° C.

Oxygen Partial Pressure Dependence of Total Electrical Conductivity

Figure 52:
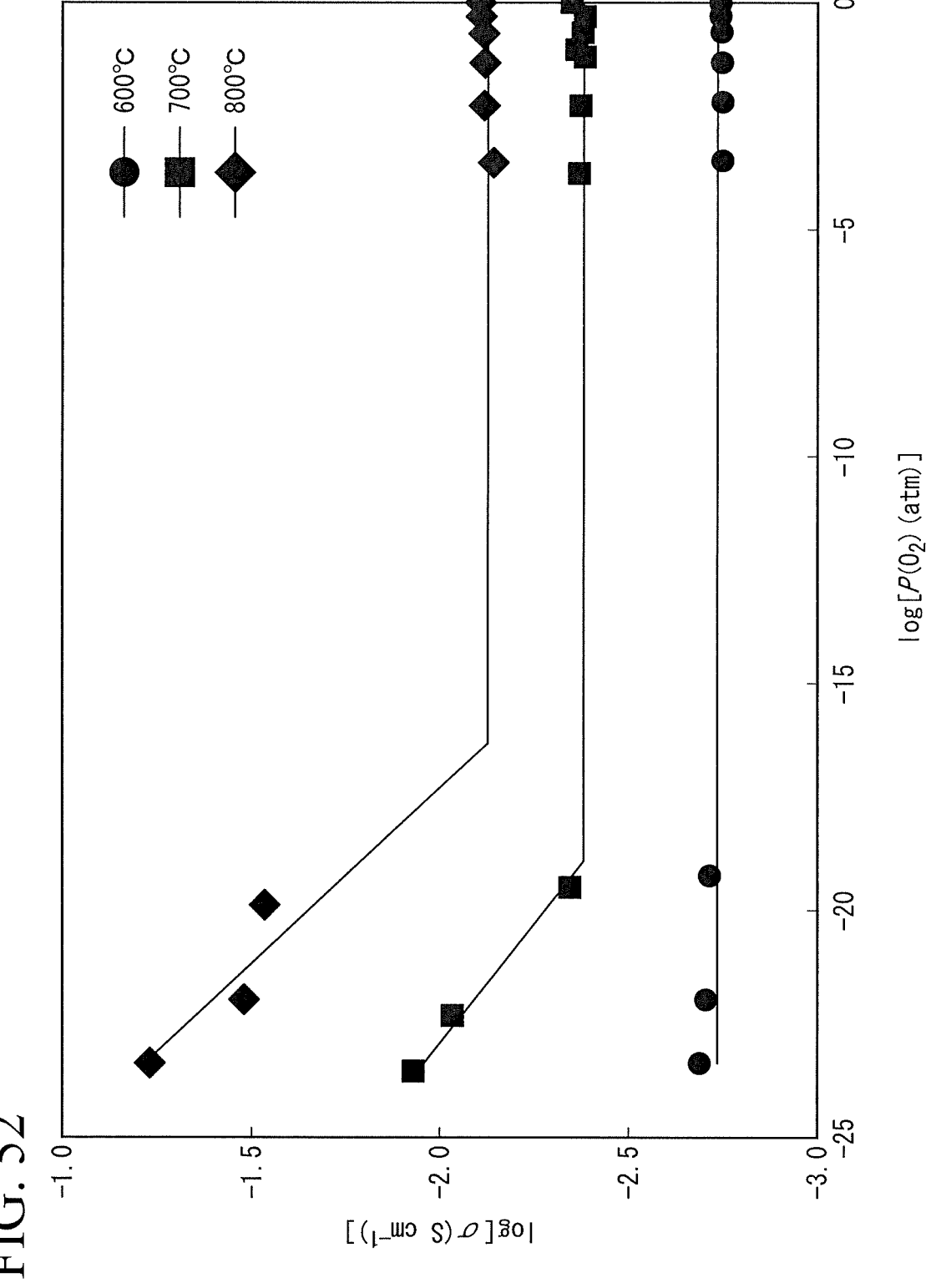
FIG. 52 shows the P ($O_2$) dependence of total electrical conductivity for $Ba_3Mo_{1.1}Ti_{0.9}O_{8.1}$ of Test Example 69.

For Test Example 69, the oxygen partial pressure dependence of total electrical conductivity was measured. FIG. 52 shows a graph in which the measured electrical conductivity log $[\sigma(Scm^{-1})]$ is plotted on the vertical axis with respect to the oxygen partial pressure log $[P(O_2)/atm]$ on the horizontal axis. It was strongly suggested that oxide ions were the dominant carriers in the electrical conduction of the compound of Test Example 69 because the total electrical conductivity was almost constant regardless of the oxygen partial pressure. The same applies to Test Examples 68 and 70, which are also $Ba_3MoTiO_8$-based materials.

Figure 53:
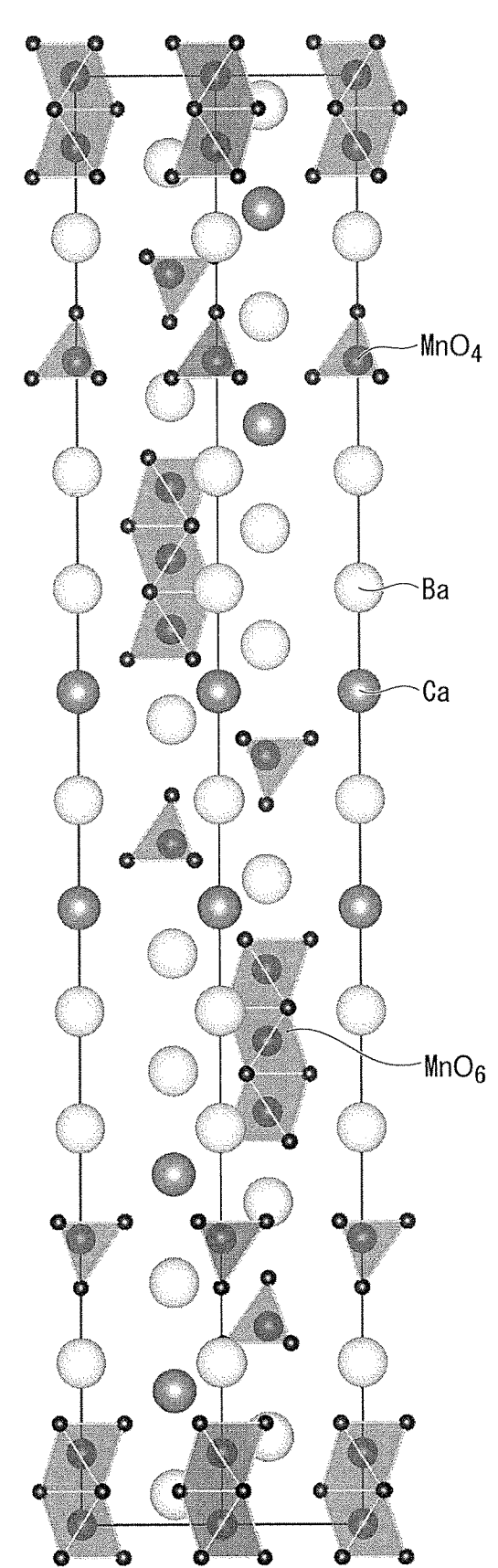
FIG. 53 shows the crystal structure of $Ba_7Ca_2Mn_5O_{20}$ of Test Example 71.
Figure 53:
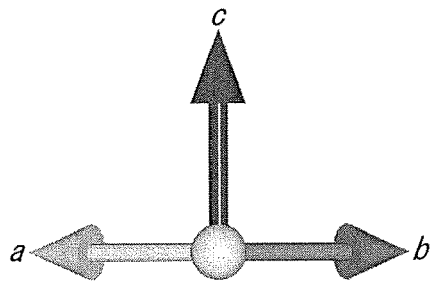
Figure 54:
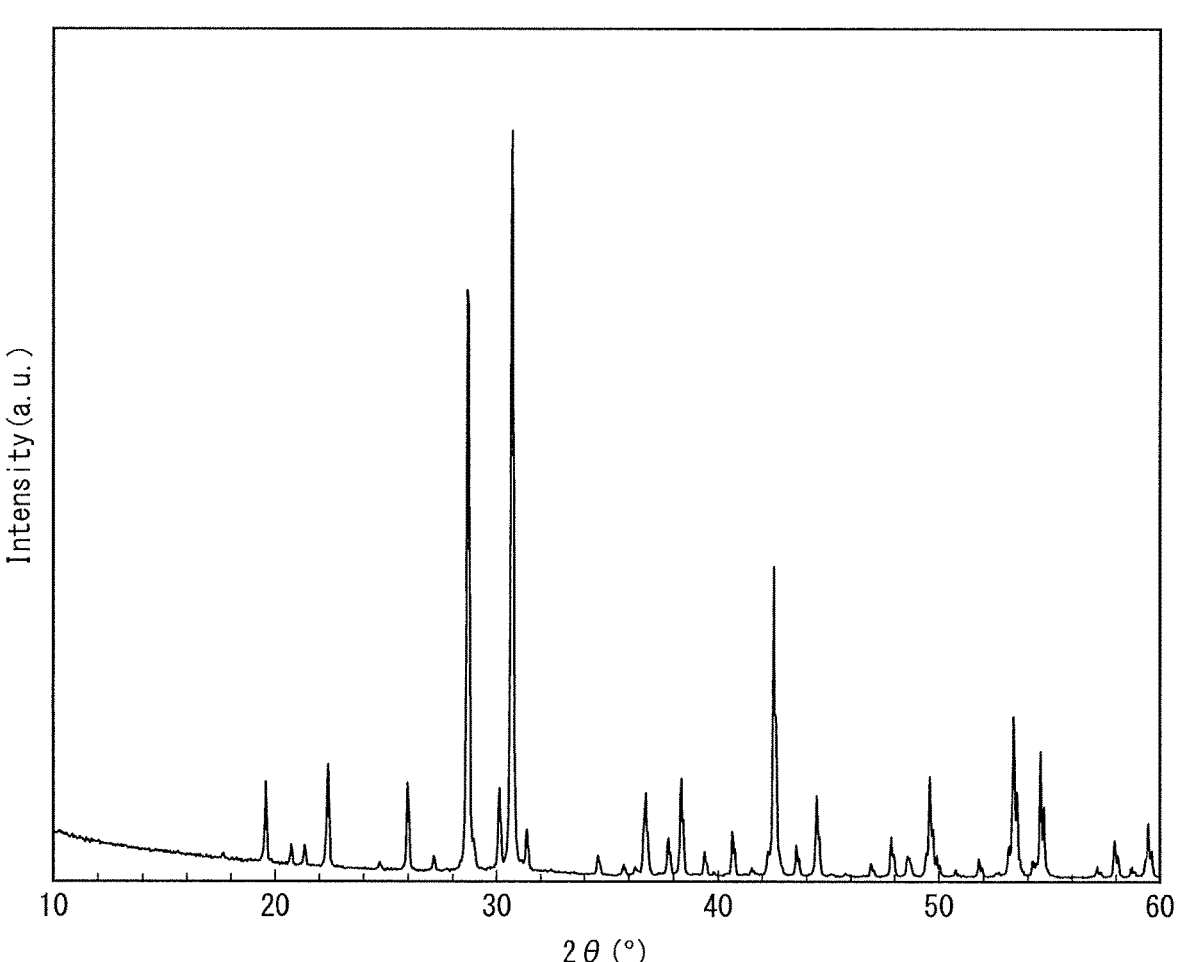
FIG. 54 is a graph showing the XRD pattern of $Ba_7Ca_2Mn_5O_{20}$ of Test Example 71.
Figure 55:
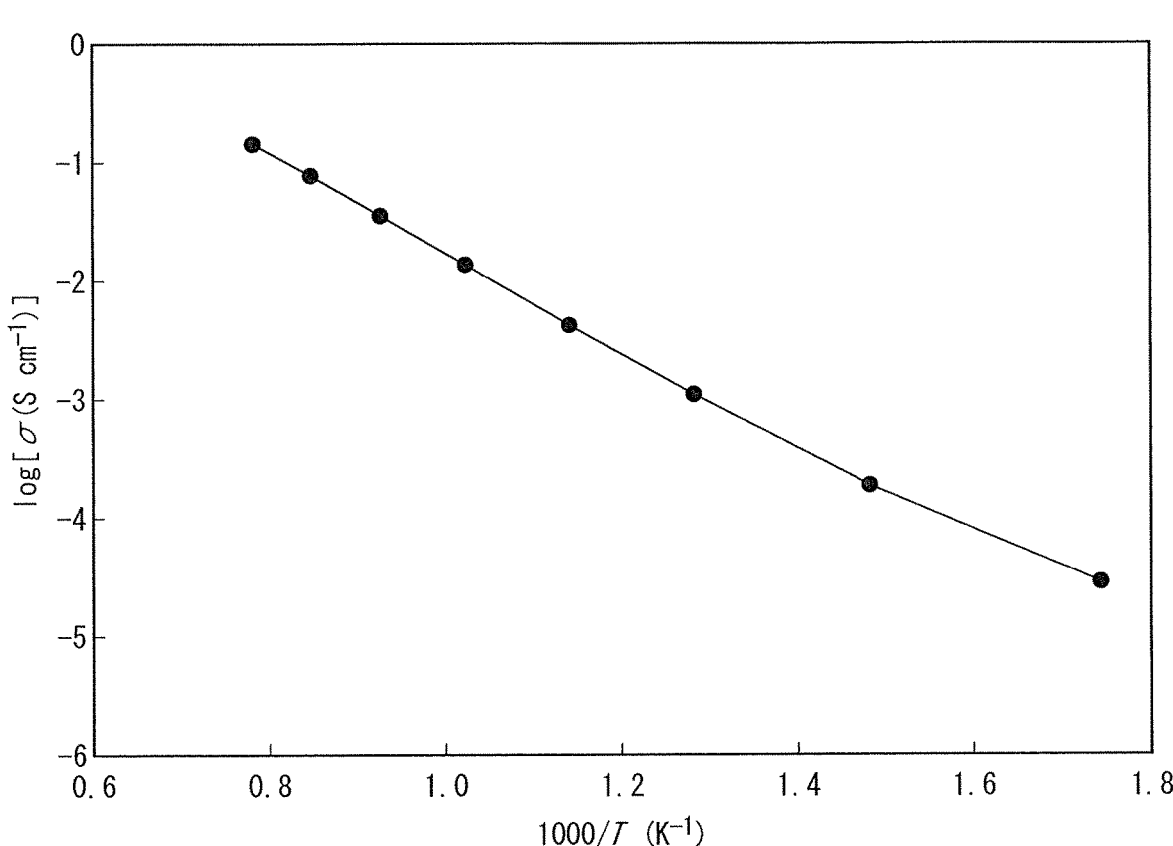
FIG. 55 shows the total electrical conductivity of $Ba_7Ca_2Mn_5O_{20}$ of Test Example 71 in a temperature-dependent manner.

FIG. 53 shows the crystal structure of a $Ba_7Ca_2Mn_5O_{20}$-based material used in Test Example 71. In this figure, the space group R-3m (No. 166), the lattice constants a=b=5.8195 Å, and c=51.3701 Å. FIG. 54 is a graph showing the XRD pattern of $Ba_7Ca_2Mn_5O_{20}$. FIG. 55 shows the total electrical conductivity of $Ba_7Ca_2Mn_5O_{20}$ in a temperature-dependent manner.

Figure 56:
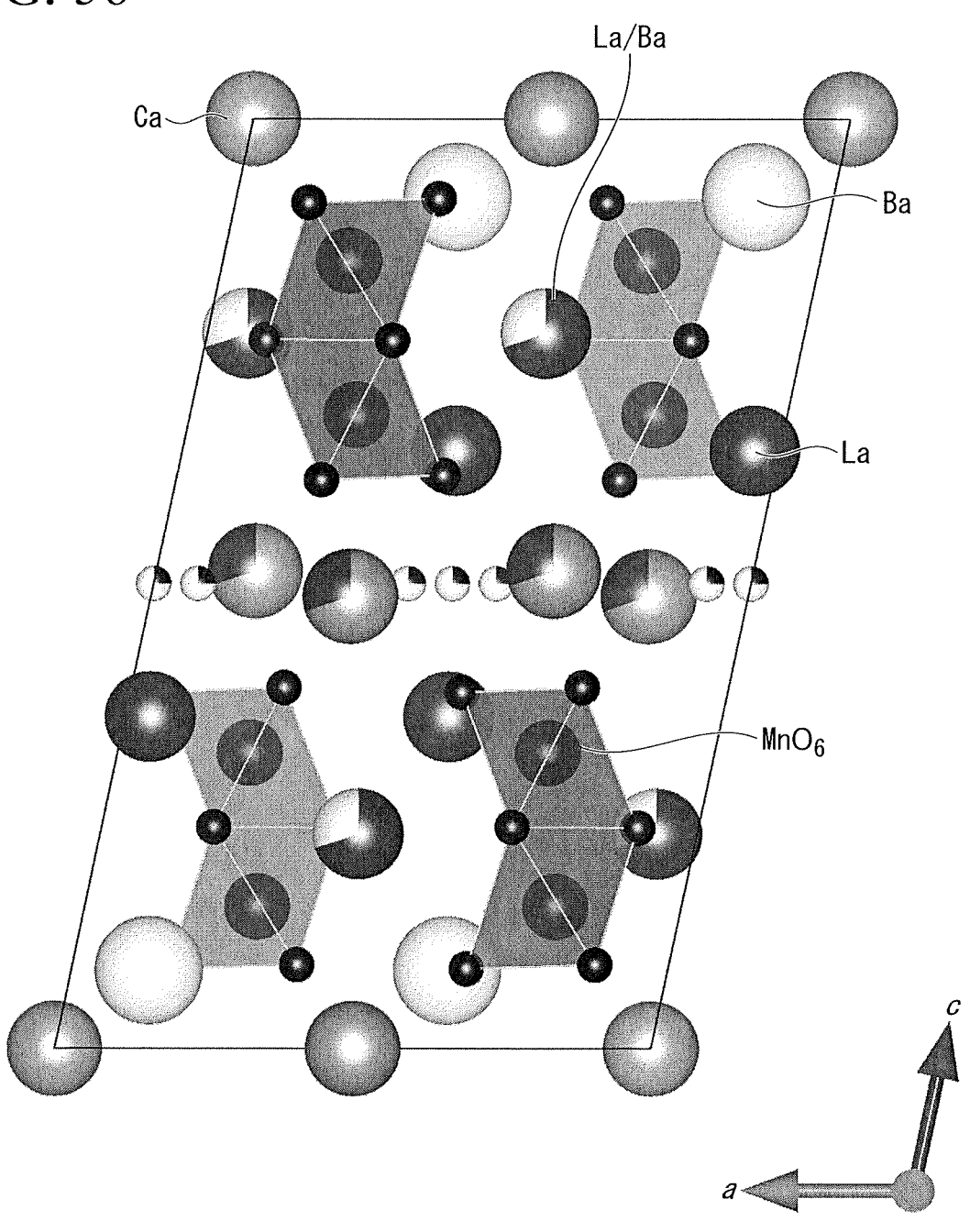
FIG. 56 shows the crystal structure of $Ba_{26}Ca_{24}La_4Mn_4O_{19}$ of Test Example 72.
Figure 57:
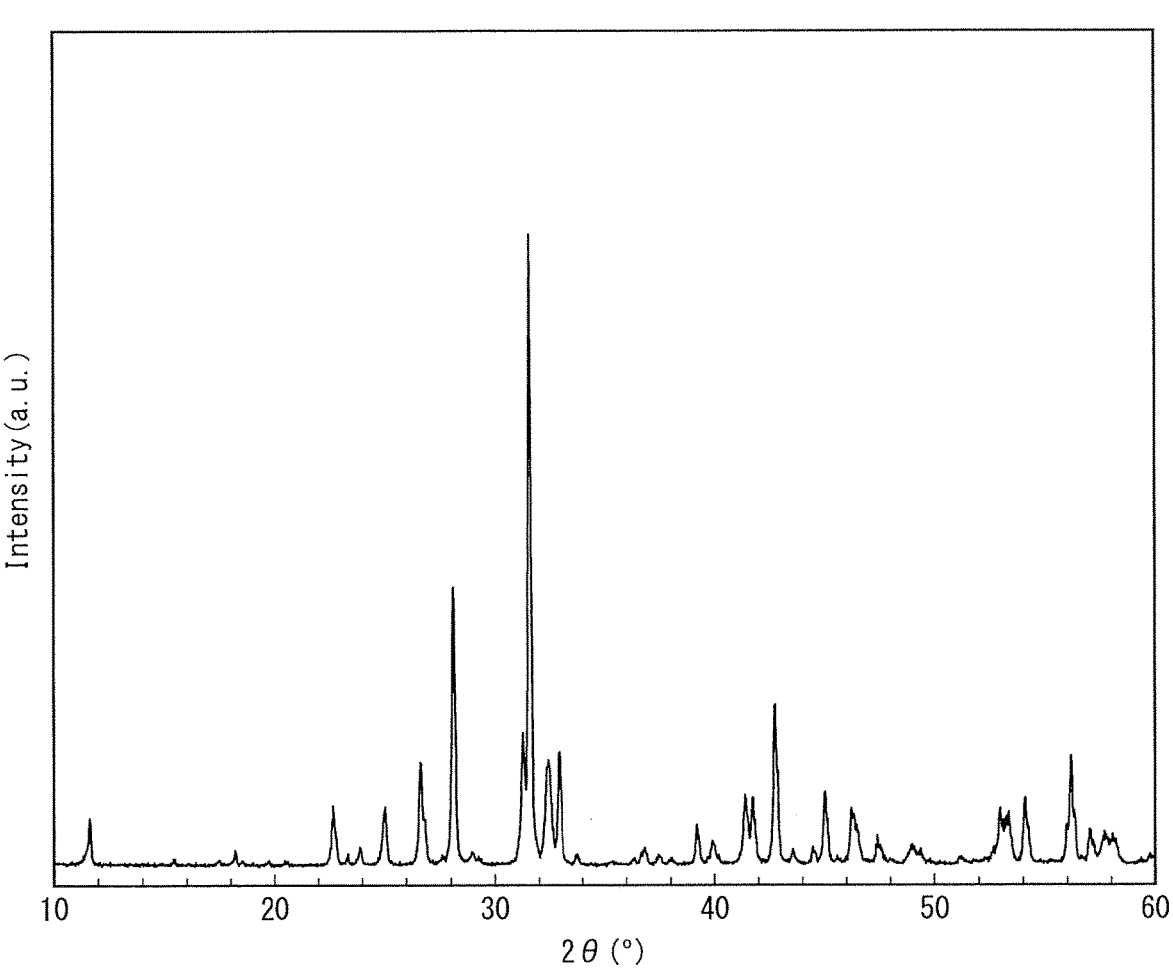
FIG. 57 is a graph showing the XRD pattern of $Ba_{2.6}Ca_{1.4}La_4Mn_4O_{19}$ of Test Example 72.
Figure 58:
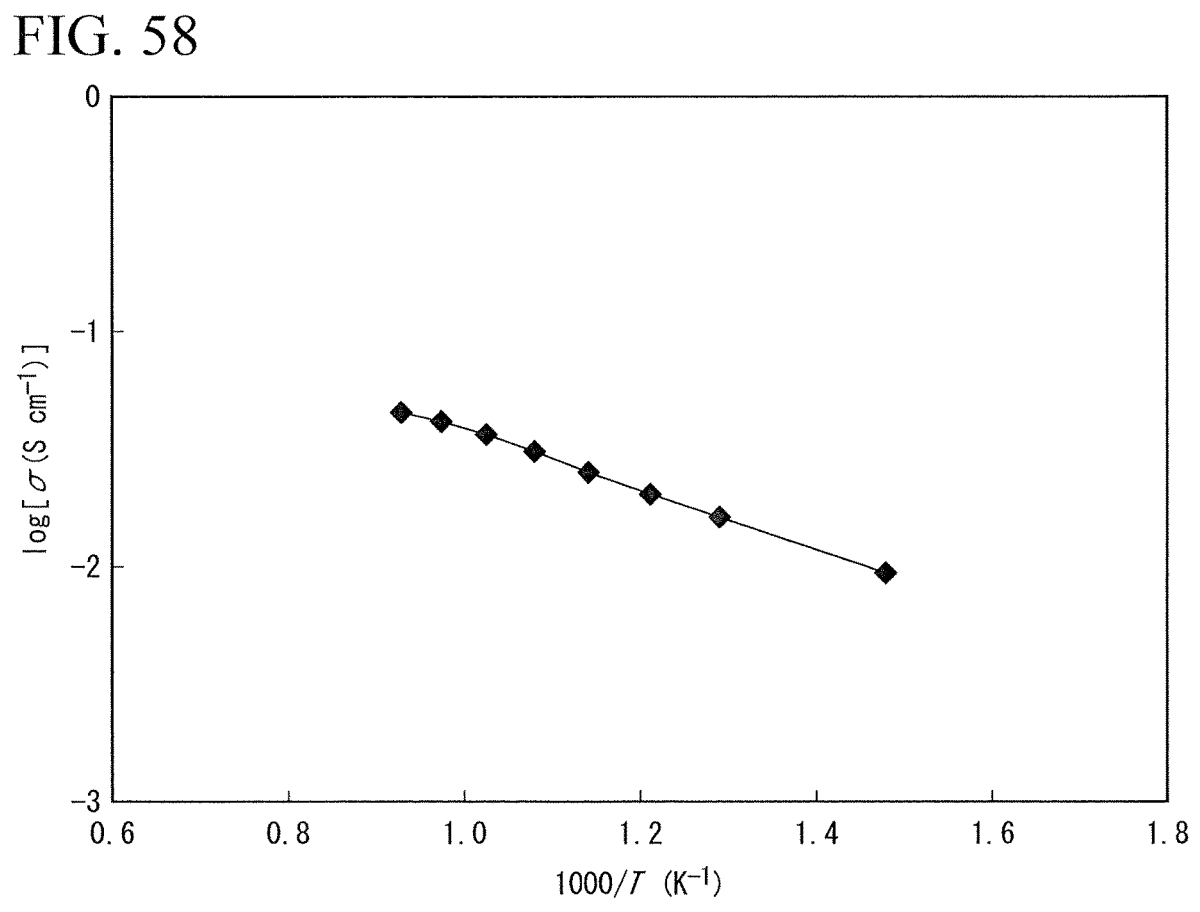

FIG. 56 shows the crystal structure of a $Ba_{2.6}Ca_{1.4}La_4Mn_4O_{19}$-based material used in Test Example 72. The space group of $Ba_{2.6}Ca_{1.4}La_4Mn_4O_{19}$ is C2/m (No. 12), and the lattice constants are a=9.8394 Å, b=5.6823 Å, c=15.6435 Å, and β=102.09°. FIG. 57 is a graph showing the XRD pattern of $Ba_{2.6}Ca_{1.4}La_4Mn_4O_{19}$. FIG. 58 shows the total electrical conductivity of $Ba_{2.6}Ca_{1.4}La_4Mn_4O_{19}$ in a temperature-dependent manner.

Figure 59:
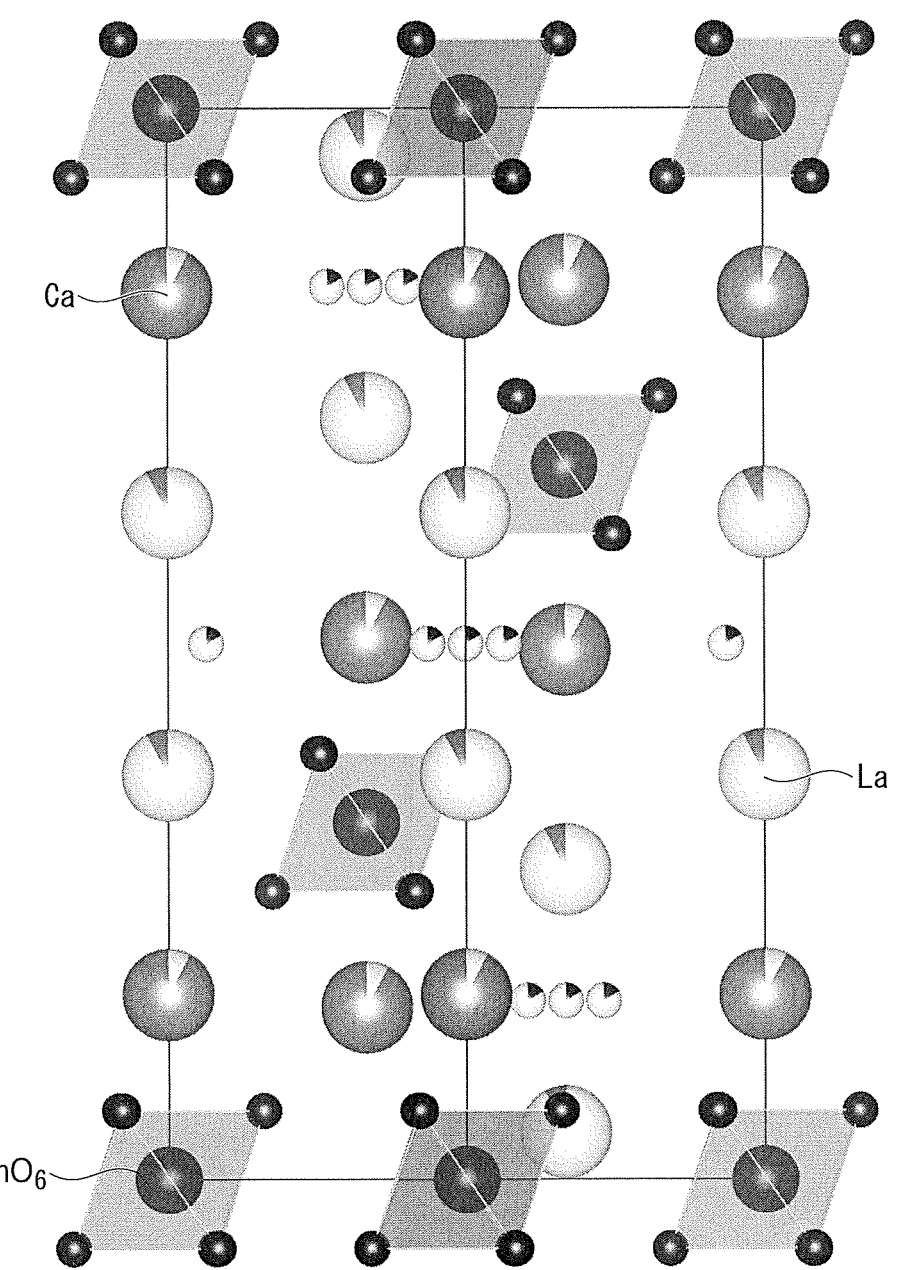
FIG. 59 shows the crystal structure of $La_2Ca_2MnO_7$ of Test Example 73.
Figure 59:
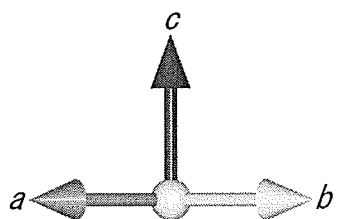
Figure 60:
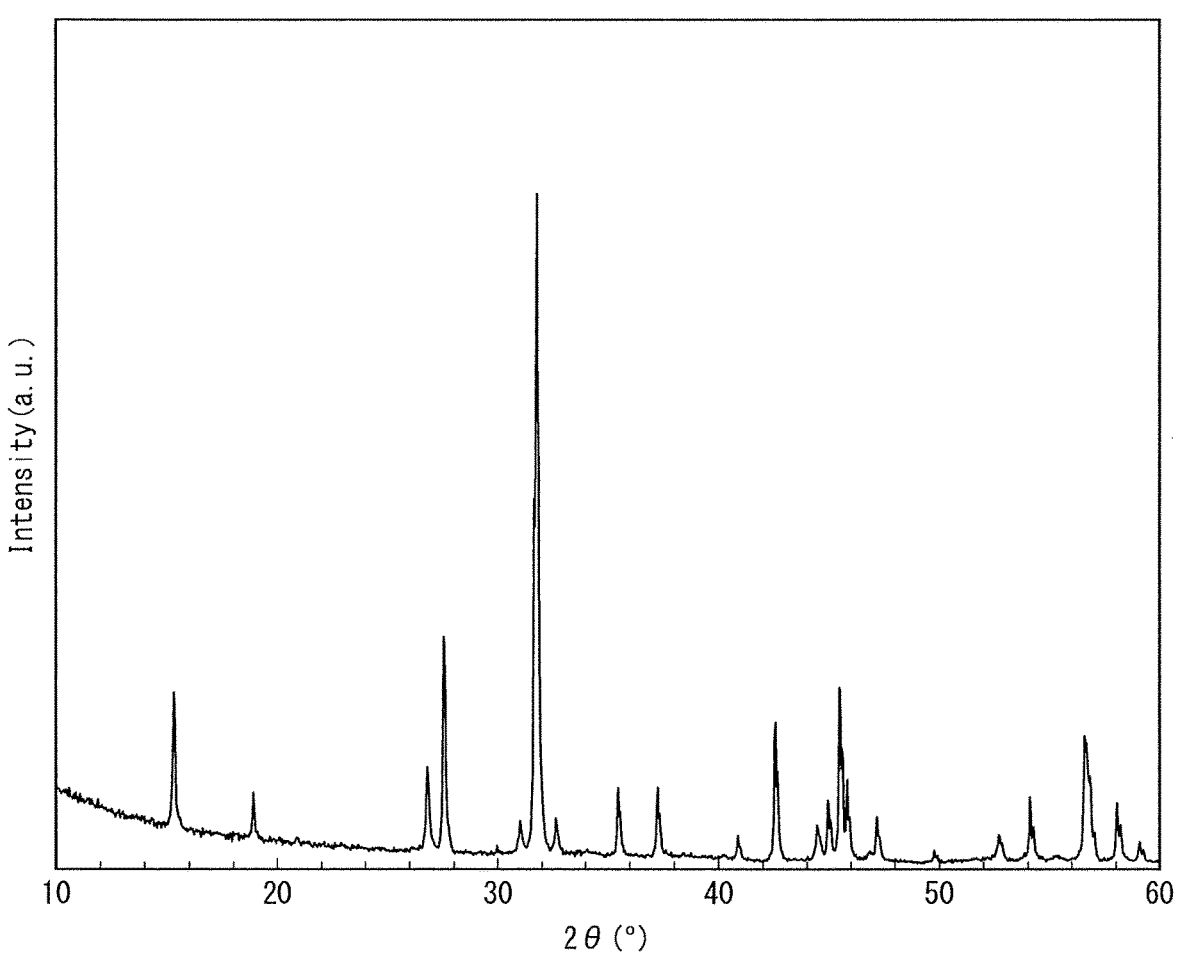
FIG. 60 is a graph showing the XRD pattern of $La_2Ca_2MnO_7$ of Test Example 73.

FIG. 59 shows the crystal structure of a $La_2Ca_2MnO_7$-based material used in Test Example 73. In this figure, the space group is R-3m (No. 166), and the lattice constants are a=b=5.6200 Å and c=17.2954 Å. FIG. 60 is a graph showing the XRD pattern of $La_2Ca_2MnO_7$.

Figure 61:
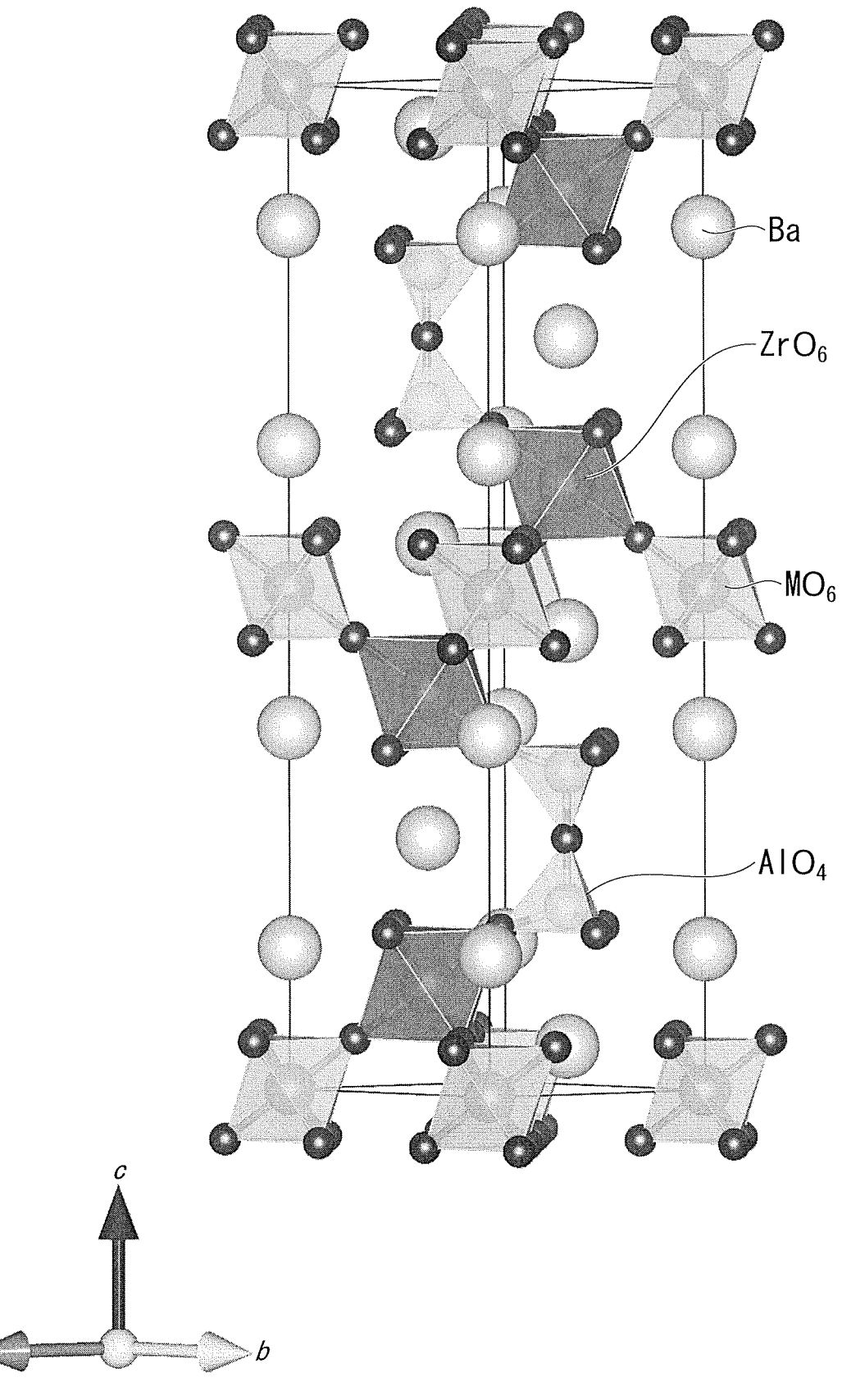
FIG. 61 shows the crystal structure of a $Ba_5M_2Al_2ZrO_{13}$-based material of Test Examples 74 to 80.
Figure 62:
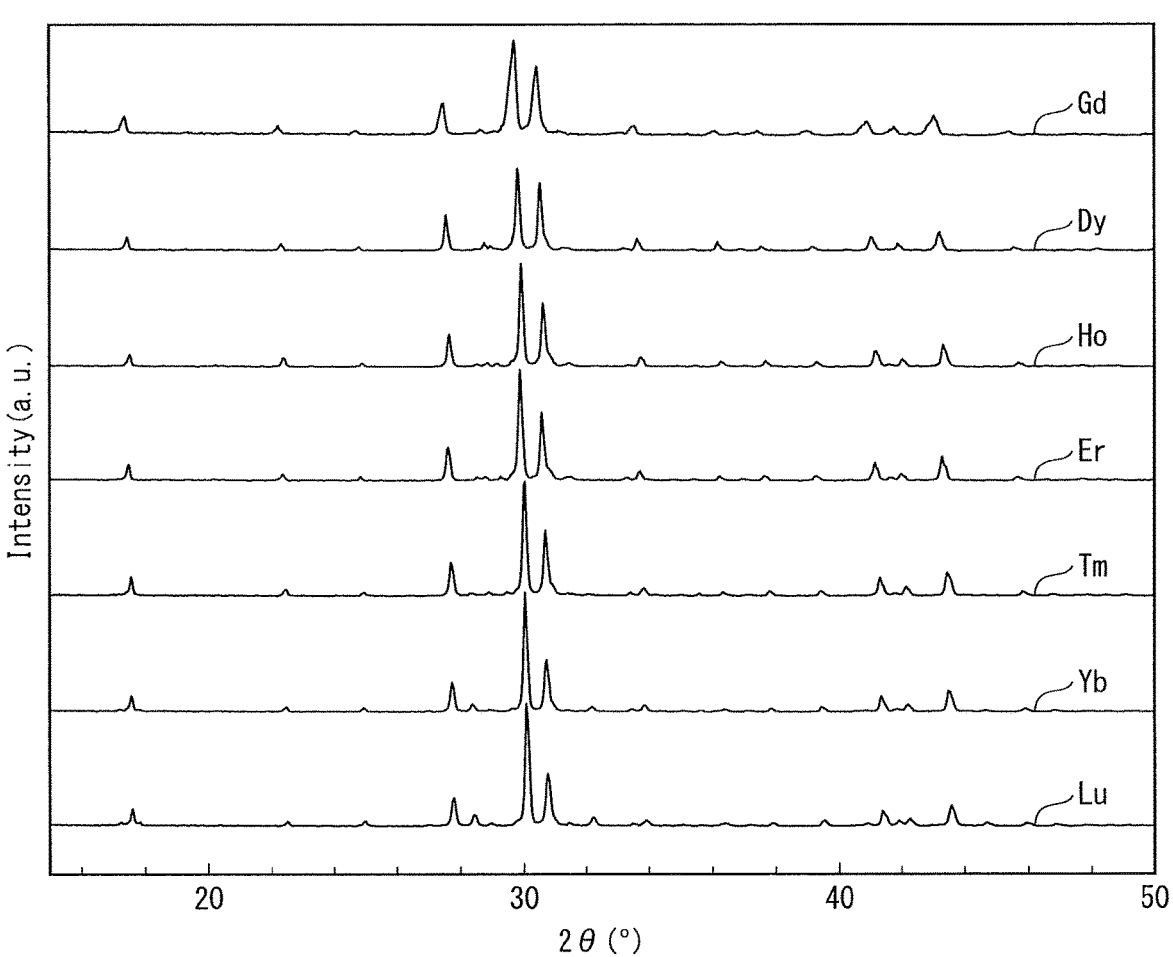
FIG. 62 is a graph showing the XRD patterns of $Ba_5M_2Al_2ZrO_{13}$ of Test Examples 74 to 80.
Figure 63:
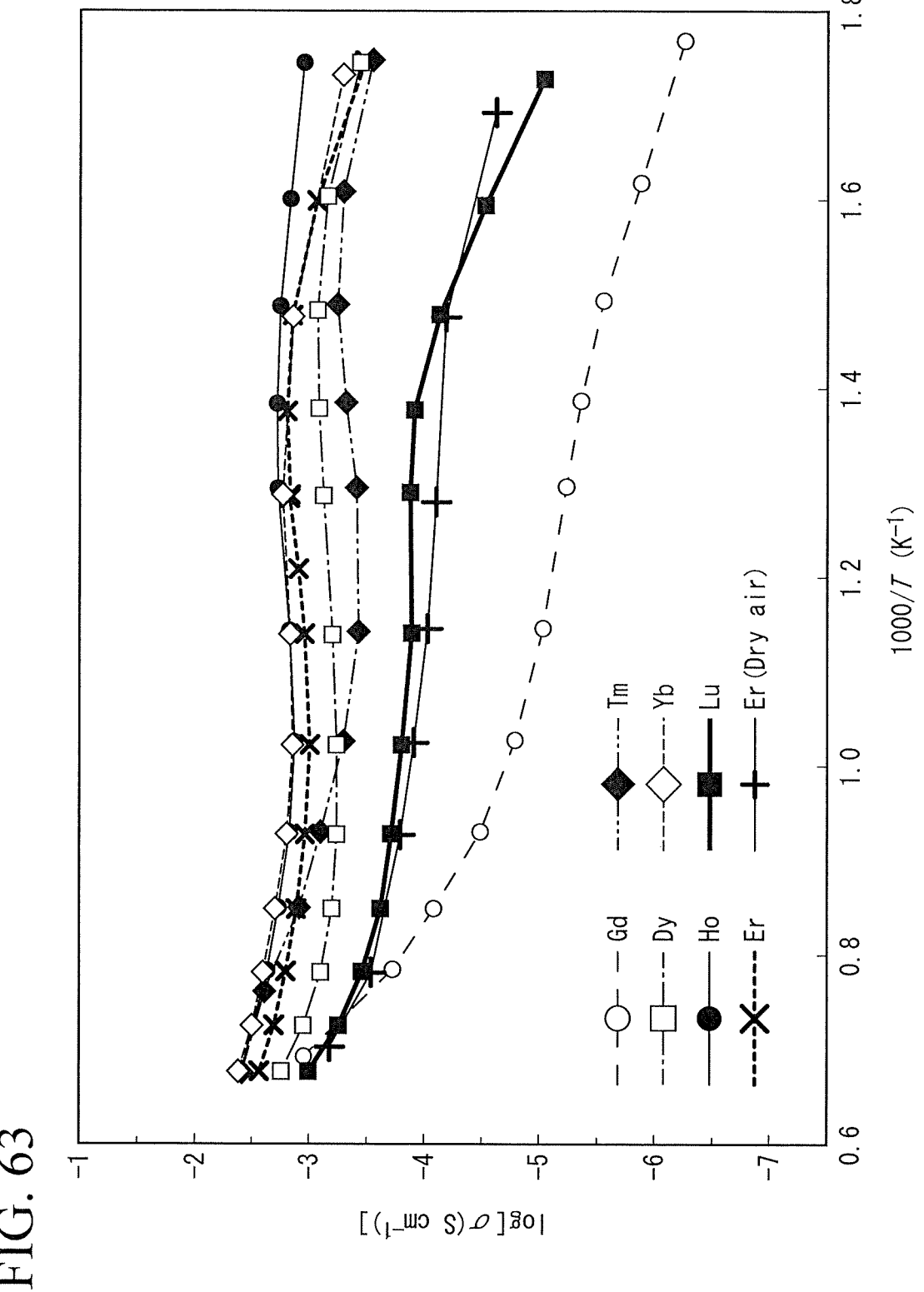
FIG. 63 shows the total electrical conductivity of $Ba_5M_2Al_2ZrO_{13}$ of Test Examples 74 to 80 in a temperature-dependent manner.

FIG. 61 shows the crystal structure of the $Ba_5M_2Al_2ZrO_{13}$-based material used in Test Examples 74 to 80. In this figure, the space group is P63/mmc (No. 194), and the lattice constants are a=b=5.9629 Å and c=24.7340 Å. FIG. 62 is a graph showing the XRD patterns of $Ba_5M_2Al_2ZrO_{13}$ (M is Gd, Dy, Er, Ho, Tm, Yb, Lu). FIG. 63 shows the total electrical conductivity of $Ba_5M_2Al_2ZrO_{13}$ measured in the air in a temperature-dependent manner. For Test Example 76, the total electrical conductivity in dry air was also shown in a temperature-dependent manner. The reduced conductivity in dry air suggests that Test Example 76 exhibits proton conduction. The same applies to Test Examples 74, 75, and 77 to 80, which are also $Ba_5M_2Al_2ZrO_{13}$-based materials.

TABLE 13

| | Composition | Lattice constant | | | | | | | Activation energy |
| | | a[Å] | b[Å] | c[Å] | α[°] | β[°] | γ[°] | V[Å³] | $E_a$(eV) |
|---|---|---|---|---|---|---|---|---|---|
| Example 22 | $Ba_7Nb_4MoO_{20}$ | 5.8602 | 5.8602 | 16.5311 | 90 | 90 | 120 | 491.72 | 0.52 |
| Example 23 | $Ba_7Nb_{3.98}Mo_{1.02}O_{20.01}$ | 5.8606 | 5.8606 | 16.5361 | 90 | 90 | 120 | 491.87 | 0.49 |
| Example 24 | $Ba_7Nb_{3.96}Mo_{1.04}O_{20.02}$ | 5.8605 | 5.8605 | 16.5406 | 90 | 90 | 120 | 491.99 | 0.49 |
| Example 25 | $Ba_7Nb_{3.94}Mo_{1.06}O_{20.03}$ | 5.8622 | 5.8622 | 16.5337 | 90 | 90 | 120 | 492.06 | 0.47 |
| Example 26 | $Ba_7Nb_{3.92}Mo_{1.08}O_{20.04}$ | 5.8598 | 5.8598 | 16.5288 | 90 | 90 | 120 | 491.50 | 0.51 |
| Example 27 | $Ba_7Nb_{3.9}Mo_{1.1}O_{20.05}$ | 5.8585 | 5.8585 | 16.5408 | 90 | 90 | 120 | 491.65 | 0.44 |
| Example 28 | $Ba_7Nb_{3.88}Mo_{1.12}O_{20.06}$ | 5.8601 | 5.8601 | 16.5315 | 90 | 90 | 120 | 491.65 | 0.48 |
| Example 29 | $Ba_7Nb_{3.86}Mo_{1.14}O_{20.07}$ | 5.8608 | 5.8608 | 16.5339 | 90 | 90 | 120 | 491.83 | 0.54 |
| Example 30 | $Ba_7Nb_{3.84}Mo_{1.16}O_{20.08}$ | 5.8605 | 5.8605 | 16.5337 | 90 | 90 | 120 | 491.78 | 0.52 |
| Example 31 | $Ba_7Nb_{3.82}Mo_{1.18}O_{20.09}$ | 5.8604 | 5.8604 | 16.5347 | 90 | 90 | 120 | 491.79 | 0.47 |
| Example 32 | $Ba_7Nb_{3.8}Mo_{1.2}O_{20.1}$ | 5.8611 | 5.8611 | 16.5362 | 90 | 90 | 120 | 491.95 | 0.41 |
| Example 33 | $Ba_7Nb_{3.78}Mo_{1.22}O_{20.11}$ | 5.8594 | 5.8594 | 16.5364 | 90 | 90 | 120 | 491.67 | 0.42 |
| Example 34 | $Ba_7Nb_{3.75}Mo_{1.25}O_{20.125}$ | 5.8631 | 5.8631 | 16.5417 | 90 | 90 | 120 | 492.45 | 0.43 |
| Example 35 | $Ba_7Nb_{3.7}Mo_{1.3}O_{20.15}$ | 5.8721 | 5.8721 | 16.519 | 90 | 90 | 120 | 493.29 | 0.44 |
| Example 36 | $Ba_7Nb_{3.6}Mo_{1.4}O_{20.2}$ | 5.865 | 5.8650 | 16.544 | 90 | 90 | 120 | 492.84 | |
| Example 37 | $Ba_7Nb_{3.5}Mo_{1.5}O_{20.25}$ | 5.8759 | 5.8759 | 16.5215 | 90 | 90 | 120 | 494.00 | |
| Example 38 | $Ba_7Nb_4Mo_{0.9}V_{0.1}O_{19.95}$ | 5.8584 | 5.8584 | 16.5259 | 90 | 90 | 120 | 491.19 | 0.53 |
| Example 39 | $Ba_7Nb_{3.9}MoV_{0.1}O_{20}$ | 5.8557 | 5.8557 | 16.5114 | 90 | 90 | 120 | 490.32 | 0.69 |
| Example 40 | $Ba_7Nb_{3.9}MoCr_{0.1}O_{20.05}$ | 5.8539 | 5.8539 | 16.5122 | 90 | 90 | 120 | 490.04 | 0.59 |
| Example 41 | $Ba_7Nb_{3.8}MoCr_{0.2}O_{20.1}$ | 5.8474 | 5.8474 | 16.4985 | 90 | 90 | 120 | 488.54 | 0.43 |

TABLE 14

| | Composition | Lattice constant | | | | | | | Activation energy |
| | | a[Å] | b[Å] | c[Å] | a[Å] | b[Å] | γ[°] | a[Å] | b[Å] |
|---|---|---|---|---|---|---|---|---|---|
| Example 42 | $Ba_7Nb_{3.75}MoCr_{0.25}O_{20.125}$ | 5.8546 | 5.8546 | 16.5319 | 90 | 90 | 120 | 490.74 | 0.58 |
| Example 43 | $Ba_7Nb_{3.7}MoCr_{0.3}O_{20.15}$ | 5.8474 | 5.8474 | 16.5084 | 90 | 90 | 120 | 488.84 | 0.47 |

TABLE 14-continued

| | | Lattice constant | | | | | | | Activation energy |
| | Composition | a[Å] | b[Å] | c[Å] | a[Å] | b[Å] | γ[°] | a[Å] | b[Å] |
|---|---|---|---|---|---|---|---|---|---|
| Example 44 | $Ba_7Nb_{3.6}MoCr_{0.4}O_{20.2}$ | 5.8491 | 5.8491 | 16.5353 | 90 | 90 | 120 | 489.92 | 0.48 |
| Example 45 | $Ba_7Nb_4Mo_{0.9}Mn_{0.1}O_{20.05}$ | 5.8550 | 5.8550 | 16.5218 | 90 | 90 | 120 | 490.50 | |
| Example 46 | $Ba_7Nb_{3.5}MoCr_{0.5}O_{20.25}$ | 5.8483 | 5.8483 | 16.5368 | 90 | 90 | 120 | 489.83 | 0.44 |
| Example 47 | $Ba_7Nb_{3.9}MoGe_{0.1}O_{19.95}$ | 5.8555 | 5.8555 | 16.5156 | 90 | 90 | 120 | 490.41 | 0.59 |
| Example 48 | $Ba_7Nb_{3.9}MoSi_{0.1}O_{19.95}$ | 5.8579 | 5.8579 | 16.5257 | 90 | 90 | 120 | 491.10 | 0.38 |
| Example 49 | $Ba_7Nb_{3.9}MoZr_{0.1}O_{19.95}$ | 5.8597 | 5.8597 | 16.5204 | 90 | 90 | 120 | 491.26 | 0.69 |
| Example 50 | $Ba_7Nb_{4.05}Mo_{0.95}O_{19.975}$ | 5.8557 | 5.8557 | 16.5206 | 90 | 90 | 120 | 490.59 | 0.52 |
| Example 51 | $Ba_7Nb_{3.9}MoMn_{0.1}O_{19.95}$ | 5.8609 | 5.8609 | 16.5533 | 90 | 90 | 120 | 492.4292484 | |
| Example 52 | $Ba_7Nb_{3.9}MoW_{0.1}O_{20.05}$ | 5.877557 | 5.877557 | 16.5703 | 90 | 90 | 120 | 495.741 | 0.48 |
| Example 53 | $Ba_7Nb_{3.8}MoW_{0.2}O_{20.1}$ | 5.86035 | 5.86035 | 16.5186 | 90 | 90 | 120 | 491.31 | 0.51 |
| Example 54 | $Ba_7Nb_{3.7}MoW_{0.3}O_{20.15}$ | 5.856966 | 5.856966 | 16.522297 | 90 | 90 | 120 | 490.87 | 0.59 |
| Example 55 | $Ba_7Nb_{3.6}MoW_{0.4}O_{20.2}$ | 5.86134 | 5.86134 | 16.53054 | 90 | 90 | 120 | 491.83 | 0.59 |
| Example 56 | $Ba_7Nb_{3.5}MoW_{0.5}O_{20.25}$ | 5.857308 | 5.857308 | 16.51766 | 90 | 90 | 120 | 490.77 | 0.54 |
| Example 57 | $Ba_7Nb_{3.4}MoW_{0.6}O_{20.3}$ | 5.857222 | 5.857222 | 16.5199 | 90 | 90 | 120 | 490.82 | 0.60 |
| Example 58 | $Ba_7Nb_{3.2}MoW_{0.8}O_{20.4}$ | 5.853921 | 5.853921 | 16.52247 | 90 | 90 | 120 | 490.34 | 0.66 |
| Example 59 | $Ba_3WVO_{8.5}$ | 5.808130(19) | 5.808130(19) | 21.094919(21) | 90 | 90 | 120 | 615.4(9) | 1.72 |
| Example 60 | $Ba_3W_{0.9}V_{1.1}O_{8.45}$ | 5.822 | 5.822 | 21.159 | 90 | 90 | 120 | 621.19 | 1.67 |
| Example 61 | $Ba_3W_{0.95}V_{1.05}O_{8.475}$ | 5.822 | 5.822 | 21.149 | 90 | 90 | 120 | 620.80 | 1.81 |

TABLE 15

| | | Lattice constant | | | | | | | Activation energy |
| | Composition | a[Å] | b[Å] | c[Å] | a[Å] | b[Å] | γ[°] | a[Å] | b[Å] |
|---|---|---|---|---|---|---|---|---|---|
| Test Example 62 | $Ba_3W_{1.05}V_{0.95}O_{8.525}$ | 5.823 | 5.823 | 21.132 | 90 | 90 | 120 | 620.61 | 1.73 |
| Test Example 63 | $Ba_3W_{1.1}V_{0.9}O_{8.55}$ | 5.824 | 5.824 | 21.119 | 90 | 90 | 120 | 620.31 | 1.67 |
| Test Example 64 | $Ba_3W_{1.25}V_{0.75}O_{8.625}$ | 5.816 | 5.816 | 21.021 | 90 | 90 | 120 | 615.81 | 1.40 |
| Test Example 65 | $Ba_3W_{1.5}V_{0.5}O_{8.75}$ | 5.821 | 5.821 | 21.054 | 90 | 90 | 120 | 617.88 | 1.11 |
| Test Example 66 | $Ba_3W_{1.6}V_{0.4}O_{8.8}$ | 5.821531(7) | 5.821531(7) | 21.03203(9) | 90 | 90 | 120 | 617.290(4) | 1.02 |
| Test Example 67 | $Ba_3W_{1.75}V_{0.25}O_{8.875}$ | 5.8185566 | 5.8185566 | 20.9976252 | 90 | 90 | 120 | 615.65 | 1.17 |
| Test Example 68 | $Ba_3MoTiO_8$ | 5.9548 | 5.9548 | 21.2924 | 90 | 90 | 120 | 653.89 | 1.00 |
| Test Example 69 | $Ba_3Mo_{1.1}Ti_{0.9}O_{8.1}$ | 5.9484 | 5.9484 | 21.2626 | 90 | 90 | 120 | 651.56 | 0.78 |
| Test Example 70 | $Ba_3Mo_{1.2}Ti_{0.8}O_{8.2}$ | 5.9343 | 5.9343 | 21.2216 | 90 | 90 | 120 | 647.21 | 1.03 |
| Test Example 71 | $Ba_7Ca_2Mn_5O_{20}$ | 5.8195 | 5.8195 | 51.3701 | 90 | 90 | 120 | 1506.66 | 0.85 |
| Test Example 72 | $Ba_{2.6}Ca_{2.4}La_4Mn_4O_{19}$ | 9.8394 | 5.6823 | 15.6435 | 90 | 102.093 | 90 | 855.23 | |
| Test Example 73 | $La_2Ca_2MnO_7$ | 5.6200 | 5.6200 | 17.2954 | 90 | 90 | 120 | 473.09 | |
| Test Example 74 | $Ba_5Gd_2Al_2ZrO_{13}$ | 5.9807 | 5.9807 | 24.661 | 90 | 90 | 120 | 776.68 | 1.28 |
| Test Example 75 | $Ba_5Dy_2Al_2ZrO_{13}$ | 5.947 | 5.947 | 24.817 | 90 | 90 | 120 | 774.07 | 0.19 |
| Test Example 76 | $Ba_5Er_2Al_2ZrO_{13}$ | 5.9547 | 5.9462 | 24.709 | 90 | 90 | 120 | 761.62 | 0.25 |
| Test Example 77 | $Ba_5Ho_2Al_2ZrO_{13}$ | 5.9462 | 5.9348 | 24.672 | 90 | 90 | 120 | 763.68 | 0.26 |
| Test Example 78 | $Ba_5Tm_2Al_2ZrO_{13}$ | 5.9348 | 5.9269 | 24.635 | 90 | 90 | 120 | 759.31 | 0.52 |
| Test Example 79 | $Ba_5Yb_2Al_2ZrO_{13}$ | 5.9269 | 5.9262 | 24.603 | 90 | 90 | 120 | 754.39 | 0.27 |
| Test Example 80 | $Ba_5Lu_2Al_2ZrO_{13}$ | 5.9262 | 5.9269 | 24.611 | 90 | 90 | 120 | 753.88 | 0.24 |
| Test Example 81 | $Ba_7Nb_3MoWO_{20.5}$ | 5.853355 | 5.853355 | 16.5167 | 90 | 90 | 120 | 490.08 | |
| Test Example 82 | $Ba_7Nb_{3.85}W_{0.15}MoO_{20.075}$ | 5.860241 | 5.860241 | 16.5322 | 90 | 90 | 120 | 491.69 | |
| Test Example 83 | $Ba_7Nb_{3.75}W_{0.25}MoO_{20.125}$ | 5.857922 | 5.857922 | 16.51918 | 90 | 90 | 120 | 490.92 | |

Tables 16 to 32 show the results of Test Examples in which electrical conductivity was measured among Test Examples 22 to 83. In the composition shown in Tables 16 to 32, the oxygen amount calculated from the electrically neutral conditions is shown assuming that the oxidation number of Ba is +2, the oxidation number of Nb is +5, the oxidation number of Mo is +6, the oxidation number of oxygen O is −2, the oxidation number of W is +6, the oxidation number of V is +5, the oxidation number of Cr is +6, the oxidation number of Ge is +4, the oxidation number of Si is +4, the oxidation number of Zr is +4, the oxidation number of Ti is +4, the oxidation number of Al is +3, the oxidation number of Gd is +3, the oxidation number of Dy is +3, the oxidation number of Er is +3, the oxidation number of Ho is +3, the oxidation number of Tm is +3, the oxidation number of Yb is +3, and the oxidation number of Lu is +3, but the oxygen amount (20+z) is not limited to the values shown because the oxygen non-stoichiometry z depends on the cation molar ratio, temperature, oxygen partial pressure, synthesis method, and thermal history.

TABLE 16

| | | Total electrical conductivity (~oxide ion conductivity) and measured temperature | |
| | Composition | Temperature | $\log (\sigma_{total}(S\ cm^{-1}))$ |
|---|---|---|---|
| Example 22 | $Ba_7Nb_4MoO_{20}$ | 306° C. | −4.6 |
| Example 22 | $Ba_7Nb_4MoO_{20}$ | 406° C. | −3.9 |
| Example 22 | $Ba_7Nb_4MoO_{20}$ | 506° C. | −3.4 |
| Example 22 | $Ba_7Nb_4MoO_{20}$ | 606° C. | −3.0 |
| Example 22 | $Ba_7Nb_4MoO_{20}$ | 706° C. | −2.7 |
| Example 22 | $Ba_7Nb_4MoO_{20}$ | 807° C. | −2.5 |
| Example 22 | $Ba_7Nb_4MoO_{20}$ | 907° C. | −2.3 |

TABLE 16-continued

| | Composition | Temperature | log ($\sigma_{total}$(S cm$^{-1}$)) |
|---|---|---|---|
| | | Total electrical conductivity (~oxide ion conductivity) and measured temperature | |
| Example 23 | Ba$_7$Nb$_{3.98}$Mo$_{1.02}$O$_{20.01}$ | 306° C. | −4.5 |
| Example 23 | Ba$_7$Nb$_{3.98}$Mo$_{1.02}$O$_{20.01}$ | 406° C. | −3.8 |
| Example 23 | Ba$_7$Nb$_{3.98}$Mo$_{1.02}$O$_{20.01}$ | 506° C. | −3.3 |
| Example 23 | Ba$_7$Nb$_{3.98}$Mo$_{1.02}$O$_{20.01}$ | 606° C. | −2.9 |
| Example 23 | Ba$_7$Nb$_{3.98}$Mo$_{1.02}$O$_{20.01}$ | 706° C. | −2.7 |
| Example 23 | Ba$_7$Nb$_{3.98}$Mo$_{1.02}$O$_{20.01}$ | 806° C. | −2.5 |
| Example 23 | Ba$_7$Nb$_{3.98}$Mo$_{1.02}$O$_{20.01}$ | 906° C. | −2.3 |
| Example 24 | Ba$_7$Nb$_{3.96}$Mo$_{1.04}$O$_{20.02}$ | 307° C. | −4.7 |
| Example 24 | Ba$_7$Nb$_{3.96}$Mo$_{1.04}$O$_{20.02}$ | 410° C. | −3.6 |
| Example 24 | Ba$_7$Nb$_{3.96}$Mo$_{1.04}$O$_{20.02}$ | 510° C. | −2.9 |
| Example 24 | Ba$_7$Nb$_{3.96}$Mo$_{1.04}$O$_{20.02}$ | 610° C. | −2.6 |
| Example 24 | Ba$_7$Nb$_{3.96}$Mo$_{1.04}$O$_{20.02}$ | 710° C. | −2.5 |
| Example 24 | Ba$_7$Nb$_{3.96}$Mo$_{1.04}$O$_{20.02}$ | 809° C. | −2.4 |
| Example 24 | Ba$_7$Nb$_{3.96}$Mo$_{1.04}$O$_{20.02}$ | 909° C. | −2.3 |

TABLE 17

| | Composition | Temperature | log ($\sigma_{total}$(S cm$^{-1}$)) |
|---|---|---|---|
| | | Total electrical conductivity (~oxide ion conductivity) and measured temperature | |
| Example 25 | Ba$_7$Nb$_{3.94}$Mo$_{1.06}$O$_{20.03}$ | 304° C. | −4.3 |
| Example 25 | Ba$_7$Nb$_{3.94}$Mo$_{1.06}$O$_{20.03}$ | 406° C. | −3.6 |
| Example 25 | Ba$_7$Nb$_{3.94}$Mo$_{1.06}$O$_{20.03}$ | 506° C. | −3.1 |
| Example 25 | Ba$_7$Nb$_{3.94}$Mo$_{1.06}$O$_{20.03}$ | 606° C. | −2.8 |
| Example 25 | Ba$_7$Nb$_{3.94}$Mo$_{1.06}$O$_{20.03}$ | 706° C. | −2.6 |
| Example 25 | Ba$_7$Nb$_{3.94}$Mo$_{1.06}$O$_{20.03}$ | 806° C. | −2.4 |
| Example 25 | Ba$_7$Nb$_{3.94}$Mo$_{1.06}$O$_{20.03}$ | 906° C. | −2.2 |
| Example 26 | Ba$_7$Nb$_{3.92}$Mo$_{1.08}$O$_{20.04}$ | 306° C. | −4.4 |
| Example 26 | Ba$_7$Nb$_{3.92}$Mo$_{1.08}$O$_{20.04}$ | 408° C. | −3.7 |
| Example 26 | Ba$_7$Nb$_{3.92}$Mo$_{1.08}$O$_{20.04}$ | 510° C | −3.1 |
| Example 26 | Ba$_7$Nb$_{3.92}$Mo$_{1.08}$O$_{20.04}$ | 609° C. | −2.8 |
| Example 26 | Ba$_7$Nb$_{3.92}$Mo$_{1.08}$O$_{20.04}$ | 709° C. | −2.5 |
| Example 26 | Ba$_7$Nb$_{3.92}$Mo$_{1.08}$O$_{20.04}$ | 809° C. | −2.3 |
| Example 26 | Ba$_7$Nb$_{3.92}$Mo$_{1.08}$O$_{20.04}$ | 908° C. | −2.1 |
| Example 27 | Ba$_7$Nb$_{3.9}$Mo$_{1.1}$O$_{20.05}$ | 305° C. | −4.1 |
| Example 27 | Ba$_7$Nb$_{3.9}$Mo$_{1.1}$O$_{20.05}$ | 407° C. | −3.4 |
| Example 27 | Ba$_7$Nb$_{3.9}$Mo$_{1.1}$O$_{20.05}$ | 505° C. | −2.9 |
| Example 27 | Ba$_7$Nb$_{3.9}$Mo$_{1.1}$O$_{20.05}$ | 606° C. | −2.6 |
| Example 27 | Ba$_7$Nb$_{3.9}$Mo$_{1.1}$O$_{20.05}$ | 706° C. | −2.4 |
| Example 27 | Ba$_7$Nb$_{3.9}$Mo$_{1.1}$O$_{20.05}$ | 807° C. | −2.2 |
| Example 27 | Ba$_7$Nb$_{3.9}$Mo$_{1.1}$O$_{20.05}$ | 906° C. | −2.1 |

TABLE 18

| | Composition | Temperature | log ($\sigma_{total}$(S cm$^{-1}$)) |
|---|---|---|---|
| | | Total electrical conductivity (~oxide ion conductivity) and measured temperature | |
| Example 28 | Ba7Nb$_{3.88}$Mo$_{1.12}$O$_{20.06}$ | 307° C. | −4.3 |
| Example 28 | Ba7Nb$_{3.88}$Mo$_{1.12}$O$_{20.06}$ | 406° C. | −3.6 |
| Example 28 | Ba7Nb$_{3.88}$Mo$_{1.12}$O$_{20.06}$ | 507° C. | −3.1 |
| Example 28 | Ba7Nb$_{3.88}$Mo$_{1.12}$O$_{20.06}$ | 607° C. | −2.7 |
| Example 28 | Ba7Nb$_{3.88}$Mo$_{1.12}$O$_{20.06}$ | 707° C. | −2.5 |
| Example 28 | Ba7Nb$_{3.88}$Mo$_{1.12}$O$_{20.06}$ | 807° C. | −2.3 |
| Example 28 | Ba7Nb$_{3.88}$Mo$_{1.12}$O$_{20.06}$ | 906° C. | −2.2 |
| Example 29 | Ba7Nb$_{3.86}$Mo$_{1.14}$O$_{20.07}$ | 306° C. | −4.2 |
| Example 29 | Ba7Nb$_{3.86}$Mo$_{1.14}$O$_{20.07}$ | 407° C. | −3.3 |
| Example 29 | Ba7Nb$_{3.86}$Mo$_{1.14}$O$_{20.07}$ | 506° C. | −2.8 |
| Example 29 | Ba7Nb$_{3.86}$Mo$_{1.14}$O$_{20.07}$ | 606° C. | −2.3 |
| Example 29 | Ba7Nb$_{3.86}$Mo$_{1.14}$O$_{20.07}$ | 706° C. | −2.1 |
| Example 29 | Ba7Nb$_{3.86}$Mo$_{1.14}$O$_{20.07}$ | 806° C. | −1.9 |
| Example 29 | Ba7Nb$_{3.86}$Mo$_{1.14}$O$_{20.07}$ | 907° C. | −1.8 |
| Example 30 | Ba7Nb$_{3.84}$Mo$_{1.16}$O$_{20.08}$ | 305° C. | −4.0 |
| Example 30 | Ba7Nb$_{3.84}$Mo$_{1.16}$O$_{20.08}$ | 406° C. | −3.3 |
| Example 30 | Ba7Nb$_{3.84}$Mo$_{1.16}$O$_{20.08}$ | 506° C. | −2.7 |
| Example 30 | Ba7Nb$_{3.84}$Mo$_{1.16}$O$_{20.08}$ | 606° C. | −2.3 |
| Example 30 | Ba7Nb$_{3.84}$Mo$_{1.16}$O$_{20.08}$ | 706° C. | −2.1 |
| Example 30 | Ba7Nb$_{3.84}$Mo$_{1.16}$O$_{20.08}$ | 806° C. | −1.9 |
| Example 30 | Ba7Nb$_{3.84}$Mo$_{1.16}$O$_{20.08}$ | 906° C. | −1.8 |

TABLE 19

| | Composition | Temperature | log ($\sigma_{total}$(S cm$^{-1}$)) |
|---|---|---|---|
| | | Total electrical conductivity (~oxide ion conductivity) and measured temperature | |
| Example 31 | Ba$_7$Nb$_{3.82}$Mo$_{1.18}$O$_{20.09}$ | 307° C. | −3.7 |
| Example 31 | Ba$_7$Nb$_{3.82}$Mo$_{1.18}$O$_{20.09}$ | 408° C. | −3.0 |
| Example 31 | Ba$_7$Nb$_{3.82}$Mo$_{1.18}$O$_{20.09}$ | 509° C. | −2.5 |
| Example 31 | Ba$_7$Nb$_{3.82}$Mo$_{1.18}$O$_{20.09}$ | 610° C. | −2.1 |
| Example 31 | Ba$_7$Nb$_{3.82}$Mo$_{1.18}$O$_{20.09}$ | 709° C. | −2.0 |
| Example 31 | Ba$_7$Nb$_{3.82}$Mo$_{1.18}$O$_{20.09}$ | 809° C. | −1.8 |
| Example 31 | Ba$_7$Nb$_{3.82}$Mo$_{1.18}$O$_{20.09}$ | 908° C. | −1.7 |
| Example 32 | Ba$_7$Nb$_{3.8}$Mo$_{1.2}$O$_{20.1}$ | 306° C. | −3.4 |
| Example 32 | Ba$_7$Nb$_{3.8}$Mo$_{1.2}$O$_{20.1}$ | 406° C. | −2.8 |
| Example 32 | Ba$_7$Nb$_{3.8}$Mo$_{1.2}$O$_{20.1}$ | 506° C. | −2.3 |
| Example 32 | Ba$_7$Nb$_{3.8}$Mo$_{1.2}$O$_{20.1}$ | 606° C. | −2.0 |
| Example 32 | Ba$_7$Nb$_{3.8}$Mo$_{1.2}$O$_{20.1}$ | 706° C. | −1.8 |
| Example 32 | Ba$_7$Nb$_{3.8}$Mo$_{1.2}$O$_{20.1}$ | 807° C. | −1.7 |
| Example 32 | Ba$_7$Nb$_{3.8}$Mo$_{1.2}$O$_{20.1}$ | 906° C. | −1.6 |
| Example 33 | Ba$_7$Nb$_{3.78}$Mo$_{1.22}$O$_{20.11}$ | 304° C. | −3.8 |
| Example 33 | Ba$_7$Nb$_{3.78}$Mo$_{1.22}$O$_{20.11}$ | 406° C. | −3.1 |
| Example 33 | Ba$_7$Nb$_{3.78}$Mo$_{1.22}$O$_{20.11}$ | 505° C. | −2.7 |
| Example 33 | Ba$_7$Nb$_{3.78}$Mo$_{1.22}$O$_{20.11}$ | 606° C. | −2.4 |
| Example 33 | Ba$_7$Nb$_{3.78}$Mo$_{1.22}$O$_{20.11}$ | 706° C. | −2.2 |
| Example 33 | Ba$_7$Nb$_{3.78}$Mo$_{1.22}$O$_{20.11}$ | 807° C. | −2.0 |
| Example 33 | Ba$_7$Nb$_{3.78}$Mo$_{1.22}$O$_{20.11}$ | 907° C. | −1.9 |

TABLE 20

| | Composition | Temperature | log ($\sigma_{total}$(S cm$^{-1}$)) |
|---|---|---|---|
| | | Total electrical conductivity (~oxide ion conductivity) and measured temperature | |
| Example 34 | Ba$_7$Nb$_{3.75}$Mo$_{1.25}$O$_{20.125}$ | 305° C. | −3.8 |
| Example 34 | Ba$_7$Nb$_{3.75}$Mo$_{1.25}$O$_{20.125}$ | 407° C. | −3.1 |
| Example 34 | Ba$_7$Nb$_{3.75}$Mo$_{1.25}$O$_{20.125}$ | 507° C. | −2.7 |
| Example 34 | Ba$_7$Nb$_{3.75}$Mo$_{1.25}$O$_{20.125}$ | 607° C. | −2.4 |
| Example 34 | Ba$_7$Nb$_{3.75}$Mo$_{1.25}$O$_{20.125}$ | 706° C. | −2.2 |
| Example 34 | Ba$_7$Nb$_{3.75}$Mo$_{1.25}$O$_{20.125}$ | 807° C. | −2.0 |
| Example 34 | Ba$_7$Nb$_{3.75}$Mo$_{1.25}$O$_{20.125}$ | 907° C. | −1.9 |
| Example 35 | Ba$_7$Nb$_{3.7}$Mo$_{1.3}$O$_{20.15}$ | 305° C. | −3.8 |
| Example 35 | Ba$_7$Nb$_{3.7}$Mo$_{1.3}$O$_{20.15}$ | 406° C. | −3.1 |
| Example 35 | Ba$_7$Nb$_{3.7}$Mo$_{1.3}$O$_{20.15}$ | 506° C. | −2.7 |

TABLE 20-continued

| | Composition | Temperature | log ($\sigma_{total}$(S cm$^{-1}$)) |
|---|---|---|---|
| | | Total electrical conductivity (~oxide ion conductivity) and measured temperature | |
| Example 35 | $Ba_7Nb_{3.7}Mo_{1.3}O_{20.15}$ | 607° C. | −2.4 |
| Example 35 | $Ba_7Nb_{3.7}Mo_{1.3}O_{20.15}$ | 706° C. | −2.2 |
| Example 35 | $Ba_7Nb_{3.7}Mo_{1.3}O_{20.15}$ | 807° C. | −2.0 |
| Example 35 | $Ba_7Nb_{3.7}Mo_{1.3}O_{20.15}$ | 907° C. | −1.9 |
| Example 38 | $Ba_7Nb_4Mo_{0.9}V_{0.1}O_{19.95}$ | 306° C. | −5.4 |
| Example 38 | $Ba_7Nb_4Mo_{0.9}V_{0.1}O_{19.95}$ | 409° C. | −4.2 |
| Example 38 | $Ba_7Nb_4Mo_{0.9}V_{0.1}O_{19.95}$ | 508° C. | −3.5 |
| Example 38 | $Ba_7Nb_4Mo_{0.9}V_{0.1}O_{19.95}$ | 608° C. | −3.2 |
| Example 38 | $Ba_7Nb_4Mo_{0.9}V_{0.1}O_{19.95}$ | 707° C. | −3.2 |
| Example 38 | $Ba_7Nb_4Mo_{0.9}V_{0.1}O_{19.95}$ | 806° C. | −3.1 |
| Example 38 | $Ba_7Nb_4Mo_{0.9}V_{0.1}O_{19.95}$ | 908° C. | −2.9 |

TABLE 21

| | Composition | Temperature | log ($\sigma_{total}$(S cm$^{-1}$)) |
|---|---|---|---|
| | | Total electrical conductivity (~oxide ion conductivity) and measured temperature | |
| Example 39 | $Ba_7Nb_{3.9}MoV_{0.1}O_{20}$ | 304° C. | −5.8 |
| Example 39 | $Ba_7Nb_{3.9}MoV_{0.1}O_{20}$ | 405° C. | −4.8 |
| Example 39 | $Ba_7Nb_{3.9}MoV_{0.1}O_{20}$ | 506° C. | −4.2 |
| Example 39 | $Ba_7Nb_{3.9}MoV_{0.1}O_{20}$ | 607° C. | −3.6 |
| Example 39 | $Ba_7Nb_{3.9}MoV_{0.1}O_{20}$ | 707° C. | −3.1 |
| Example 39 | $Ba_7Nb_{3.9}MoV_{0.1}O_{20}$ | 807° C. | −2.9 |
| Example 39 | $Ba_7Nb_{3.9}MoV_{0.1}O_{20}$ | 908° C. | −2.8 |
| Example 40 | $Ba_7Nb_{3.9}MoCr_{0.1}O_{20.05}$ | 306° C. | −4.5 |
| Example 40 | $Ba_7Nb_{3.9}MoCr_{0.1}O_{20.05}$ | 406° C. | −3.6 |
| Example 40 | $Ba_7Nb_{3.9}MoCr_{0.1}O_{20.05}$ | 507° C. | −3.0 |
| Example 40 | $Ba_7Nb_{3.9}MoCr_{0.1}O_{20.05}$ | 607° C. | −2.6 |
| Example 40 | $Ba_7Nb_{3.9}MoCr_{0.1}O_{20.05}$ | 707° C. | −2.2 |
| Example 40 | $Ba_7Nb_{3.9}MoCr_{0.1}O_{20.05}$ | 807° C. | −2.1 |
| Example 40 | $Ba_7Nb_{3.9}MoCr_{0.1}O_{20.05}$ | 907° C. | −2.0 |
| Example 41 | $Ba_7Nb_{3.8}MoCr_{0.2}O_{20.1}$ | 303° C. | −3.9 |
| Example 41 | $Ba_7Nb_{3.8}MoCr_{0.2}O_{20.1}$ | 403° C. | −3.2 |
| Example 41 | $Ba_7Nb_{3.8}MoCr_{0.2}O_{20.1}$ | 504° C. | −2.7 |
| Example 41 | $Ba_7Nb_{3.8}MoCr_{0.2}O_{20.1}$ | 605° C. | −2.4 |
| Example 41 | $Ba_7Nb_{3.8}MoCr_{0.2}O_{20.1}$ | 705° C. | −2.2 |
| Example 41 | $Ba_7Nb_{3.8}MoCr_{0.2}O_{20.1}$ | 806° C. | −2.1 |
| Example 41 | $Ba_7Nb_{3.8}MoCr_{0.2}O_{20.1}$ | 906° C. | −2.0 |

TABLE 22

| | Composition | Temperature | log ($\sigma_{total}$(S cm$^{-1}$)) |
|---|---|---|---|
| | | Total electrical conductivity (~oxide ion conductivity) and measured temperature | |
| Example 42 | $Ba_7Nb_{3.75}MoCr_{0.25}O_{20.125}$ | 307° C. | −4.6 |
| Example 42 | $Ba_7Nb_{3.75}MoCr_{0.25}O_{20.125}$ | 407° C. | −3.8 |
| Example 42 | $Ba_7Nb_{3.75}MoCr_{0.25}O_{20.125}$ | 507° C. | −3.2 |
| Example 42 | $Ba_7Nb_{3.75}MoCr_{0.25}O_{20.125}$ | 607° C. | −2.7 |
| Example 42 | $Ba_7Nb_{3.75}MoCr_{0.25}O_{20.125}$ | 707° C. | −2.4 |
| Example 42 | $Ba_7Nb_{3.75}MoCr_{0.25}O_{20.125}$ | 807° C. | −2.2 |
| Example 42 | $Ba_7Nb_{3.75}MoCr_{0.25}O_{20.125}$ | 907° C. | −2.1 |
| Example 43 | $Ba_7Nb_{3.7}MoCr_{0.3}O_{20.15}$ | 307° C. | −4.0 |
| Example 43 | $Ba_7Nb_{3.7}MoCr_{0.3}O_{20.15}$ | 407° C. | −3.2 |
| Example 43 | $Ba_7Nb_{3.7}MoCr_{0.3}O_{20.15}$ | 507° C. | −2.7 |
| Example 43 | $Ba_7Nb_{3.7}MoCr_{0.3}O_{20.15}$ | 607° C. | −2.4 |
| Example 43 | $Ba_7Nb_{3.7}MoCr_{0.3}O_{20.15}$ | 707° C. | −2.1 |
| Example 43 | $Ba_7Nb_{3.7}MoCr_{0.3}O_{20.15}$ | 807° C. | −2.0 |

TABLE 22-continued

| | | Total electrical conductivity (~oxide ion conductivity) and measured temperature | |
| | Composition | Temperature | log $(\sigma_{total}$(S cm$^{-1}$)) |
|---|---|---|---|
| Example 43 | $Ba_7Nb_{3.7}MoCr_{0.3}O_{20.15}$ | 906° C. | −2.0 |
| Example 44 | $Ba_7Nb_{3.6}MoCr_{0.4}O_{20.2}$ | 307° C. | −4.2 |
| Example 44 | $Ba_7Nb_{3.6}MoCr_{0.4}O_{20.2}$ | 407° C. | −3.4 |
| Example 44 | $Ba_7Nb_{3.6}MoCr_{0.4}O_{20.2}$ | 507° C. | −2.9 |
| Example 44 | $Ba_7Nb_{3.6}MoCr_{0.4}O_{20.2}$ | 607° C. | −2.5 |
| Example 44 | $Ba_7Nb_{3.6}MoCr_{0.4}O_{20.2}$ | 707° C. | −2.2 |
| Example 44 | $Ba_7Nb_{3.6}MoCr_{0.4}O_{20.2}$ | 807° C. | −2.1 |
| Example 44 | $Ba_7Nb_{3.6}MoCr_{0.4}O_{20.2}$ | 907° C. | −2.2 |

TABLE 23

| | | Total electrical conductivity (~oxide ion conductivity) and measured temperature | |
| | Composition | Temperature | log $(\sigma_{total}$(S cm$^{-1}$)) |
|---|---|---|---|
| Example 46 | $Ba_7Nb_{3.5}MoCr_{0.5}O_{20.25}$ | 305° C. | −4.2 |
| Example 46 | $Ba_7Nb_{3.5}MoCr_{0.5}O_{20.25}$ | 406° C. | −3.5 |
| Example 46 | $Ba_7Nb_{3.5}MoCr_{0.5}O_{20.25}$ | 506° C. | −3.0 |
| Example 46 | $Ba_7Nb_{3.5}MoCr_{0.5}O_{20.25}$ | 606° C. | −2.6 |
| Example 46 | $Ba_7Nb_{3.5}MoCr_{0.5}O_{20.25}$ | 706° C. | −2.3 |
| Example 46 | $Ba_7Nb_{3.5}MoCr_{0.5}O_{20.25}$ | 806° C. | −2.3 |
| Example 46 | $Ba_7Nb_{3.5}MoCr_{0.5}O_{20.25}$ | 907° C. | −2.3 |
| Example 47 | $Ba_7Nb_{3.9}MoGe_{0.1}O_{19.95}$ | 303° C. | −5.6 |
| Example 47 | $Ba_7Nb_{3.9}MoGe_{0.1}O_{19.95}$ | 406° C. | −4.7 |
| Example 47 | $Ba_7Nb_{3.9}MoGe_{0.1}O_{19.95}$ | 506° C. | −4.0 |
| Example 47 | $Ba_7Nb_{3.9}MoGe_{0.1}O_{19.95}$ | 607° C. | −3.5 |
| Example 47 | $Ba_7Nb_{3.9}MoGe_{0.1}O_{19.95}$ | 707° C. | −3.3 |
| Example 47 | $Ba_7Nb_{3.9}MoGe_{0.1}O_{19.95}$ | 808° C. | −3.1 |
| Example 47 | $Ba_7Nb_{3.9}MoGe_{0.1}O_{19.95}$ | 908° C. | −2.9 |
| Example 48 | $Ba_7Nb_{3.9}MoSi_{0.1}O_{19.95}$ | 309° C. | −5.2 |
| Example 48 | $Ba_7Nb_{3.9}MoSi_{0.1}O_{19.95}$ | 409° C. | −4.1 |
| Example 48 | $Ba_7Nb_{3.9}MoSi_{0.1}O_{19.95}$ | 510° C. | −4.1 |
| Example 48 | $Ba_7Nb_{3.9}MoSi_{0.1}O_{19.95}$ | 610° C. | −4.0 |
| Example 48 | $Ba_7Nb_{3.9}MoSi_{0.1}O_{19.95}$ | 709° C. | −3.6 |
| Example 48 | $Ba_7Nb_{3.9}MoSi_{0.1}O_{19.95}$ | 809° C. | −3.5 |
| Example 48 | $Ba_7Nb_{3.9}MoSi_{0.1}O_{19.95}$ | 908° C. | −3.3 |

TABLE 24

| | | Total electrical conductivity (~oxide ion conductivity) and measured temperature | |
| | Composition | Temperature | log $(\sigma_{total}$(S cm$^{-1}$)) |
|---|---|---|---|
| Example 49 | $Ba_7Nb_{3.9}MoZr_{0.1}O_{19.95}$ | 305° C. | −6.2 |
| Example 49 | $Ba_7Nb_{3.9}MoZr_{0.1}O_{19.95}$ | 404° C. | −5.5 |
| Example 49 | $Ba_7Nb_{3.9}MoZr_{0.1}O_{19.95}$ | 504° C. | −4.6 |
| Example 49 | $Ba_7Nb_{3.9}MoZr_{0.1}O_{19.95}$ | 606° C. | −4.0 |
| Example 49 | $Ba_7Nb_{3.9}MoZr_{0.1}O_{19.95}$ | 707° C. | −3.6 |
| Example 49 | $Ba_7Nb_{3.9}MoZr_{0.1}O_{19.95}$ | 807° C. | −3.4 |
| Example 49 | $Ba_7Nb_{3.9}MoZr_{0.1}O_{19.95}$ | 907° C. | −3.3 |
| Example 50 | $Ba_7Nb_{4.05}Mo_{0.95}O_{19.975}$ | 305° C. | −4.8 |
| Example 50 | $Ba_7Nb_{4.05}Mo_{0.95}O_{19.975}$ | 406° C. | −3.7 |
| Example 50 | $Ba_7Nb_{4.05}Mo_{0.95}O_{19.975}$ | 506° C. | −3.0 |
| Example 50 | $Ba_7Nb_{4.05}Mo_{0.95}O_{19.975}$ | 607° C. | −2.7 |
| Example 50 | $Ba_7Nb_{4.05}Mo_{0.95}O_{19.975}$ | 707° C. | −2.6 |
| Example 50 | $Ba_7Nb_{4.05}Mo_{0.95}O_{19.975}$ | 807° C. | −2.5 |
| Example 50 | $Ba_7Nb_{4.05}Mo_{0.95}O_{19.975}$ | 907° C. | −2.4 |
| Example 52 | $Ba_7Nb_{3.9}MoW_{0.1}O_{20.05}$ | 306° C. | −4.1 |
| Example 52 | $Ba_7Nb_{3.9}MoW_{0.1}O_{20.05}$ | 409° C. | −3.3 |

TABLE 24-continued

| | Composition | Total electrical conductivity (~oxide ion conductivity) and measured temperature | |
|---|---|---|---|
| | | Temperature | $\log(\sigma_{total}(S\ cm^{-1}))$ |
| Example 52 | $Ba_7Nb_{3.9}MoW_{0.1}O_{20.05}$ | 508° C. | −2.8 |
| Example 52 | $Ba_7Nb_{3.9}MoW_{0.1}O_{20.05}$ | 608° C. | −2.5 |
| Example 52 | $Ba_7Nb_{3.9}MoW_{0.1}O_{20.05}$ | 707° C. | −2.2 |
| Example 52 | $Ba_7Nb_{3.9}MoW_{0.1}O_{20.05}$ | 808° C. | −2.0 |
| Example 52 | $Ba_7Nb_{3.9}MoW_{0.1}O_{20.05}$ | 907° C. | −1.9 |

TABLE 25

| | Composition | Total electrical conductivity (~oxide ion conductivity) and measured temperature | |
|---|---|---|---|
| | | Temperature | $\log(\sigma_{total}(S\ cm^{-1}))$ |
| Example 53 | $Ba_7Nb_{3.8}MoW_{0.2}O_{20.1}$ | 506° C. | −2.8 |
| Example 53 | $Ba_7Nb_{3.8}MoW_{0.2}O_{20.1}$ | 606° C. | −2.3 |
| Example 53 | $Ba_7Nb_{3.8}MoW_{0.2}O_{20.1}$ | 706° C. | −2.0 |
| Example 53 | $Ba_7Nb_{3.8}MoW_{0.2}O_{20.1}$ | 806° C. | −1.8 |
| Example 53 | $Ba_7Nb_{3.8}MoW_{0.2}O_{20.1}$ | 906° C. | −1.6 |
| Example 54 | $Ba_7Nb_{3.7}MoW_{0.3}O_{20.15}$ | 306° C. | −4.4 |
| Example 54 | $Ba_7Nb_{3.7}MoW_{0.3}O_{20.15}$ | 407° C. | −3.5 |
| Example 54 | $Ba_7Nb_{3.7}MoW_{0.3}O_{20.15}$ | 506° C. | −2.9 |
| Example 54 | $Ba_7Nb_{3.7}MoW_{0.3}O_{20.15}$ | 606° C. | −2.5 |
| Example 54 | $Ba_7Nb_{3.7}MoW_{0.3}O_{20.15}$ | 706° C. | −2.1 |
| Example 54 | $Ba_7Nb_{3.7}MoW_{0.3}O_{20.15}$ | 806° C. | −1.9 |
| Example 54 | $Ba_7Nb_{3.7}MoW_{0.3}O_{20.15}$ | 906° C. | −1.7 |
| Example 56 | $Ba_7Nb_{3.5}MoW_{0.5}O_{20.25}$ | 506° C. | −2.9 |
| Example 56 | $Ba_7Nb_{3.5}MoW_{0.5}O_{20.25}$ | 606° C. | −2.4 |
| Example 56 | $Ba_7Nb_{3.5}MoW_{0.5}O_{20.25}$ | 706° C. | −2.1 |
| Example 56 | $Ba_7Nb_{3.5}MoW_{0.5}O_{20.25}$ | 806° C. | −1.8 |
| Example 56 | $Ba_7Nb_{3.5}MoW_{0.5}O_{20.25}$ | 906° C. | −1.6 |

TABLE 26

| | Composition | Total electrical conductivity (~oxide ion conductivity) and measured temperature | |
|---|---|---|---|
| | | Temperature | $\log(\sigma_{total}(S\ cm^{-1}))$ |
| Example 57 | $Ba_7Nb_{3.4}MoW_{0.6}O_{20.3}$ | 306° C. | −4.8 |
| Example 57 | $Ba_7Nb_{3.4}MoW_{0.6}O_{20.3}$ | 407° C. | −3.6 |
| Example 57 | $Ba_7Nb_{3.4}MoW_{0.6}O_{20.3}$ | 506° C. | −3.0 |
| Example 57 | $Ba_7Nb_{3.4}MoW_{0.6}O_{20.3}$ | 606° C. | −2.5 |
| Example 57 | $Ba_7Nb_{3.4}MoW_{0.6}O_{20.3}$ | 706° C. | −2.1 |
| Example 57 | $Ba_7Nb_{3.4}MoW_{0.6}O_{20.3}$ | 806° C. | −1.9 |
| Example 57 | $Ba_7Nb_{3.4}MoW_{0.6}O_{20.3}$ | 906° C. | −1.7 |
| Example 58 | $Ba_7Nb_{3.2}MoW_{0.8}O_{20.4}$ | 506° C. | −2.9 |
| Example 58 | $Ba_7Nb_{3.2}MoW_{0.8}O_{20.4}$ | 606° C. | −2.4 |
| Example 58 | $Ba_7Nb_{3.2}MoW_{0.8}O_{20.4}$ | 706° C. | −2.0 |
| Example 58 | $Ba_7Nb_{3.2}MoW_{0.8}O_{20.4}$ | 806° C. | −1.7 |
| Example 58 | $Ba_7Nb_{3.2}MoW_{0.8}O_{20.4}$ | 906° C. | −1.5 |
| Example 59 | $Ba_3WVO_{8.5}$ | 602.8° C. | −5.5 |
| Example 59 | $Ba_3WVO_{8.5}$ | 653° C. | −5.1 |
| Example 59 | $Ba_3WVO_{8.5}$ | 703.2° C. | −4.6 |
| Example 59 | $Ba_3WVO_{8.5}$ | 753.6° C. | −4.2 |
| Example 59 | $Ba_3WVO_{8.5}$ | 803.9° C. | −3.9 |
| Example 59 | $Ba_3WVO_{8.5}$ | 854.2° C. | −3.5 |
| Example 59 | $Ba_3WVO_{8.5}$ | 904.2° C. | −3.2 |
| Example 59 | $Ba_3WVO_{8.5}$ | 954.5° C. | −2.9 |
| Example 59 | $Ba_3WVO_{8.5}$ | 1004.6° C. | −2.6 |

TABLE 27

| | Composition | Total electrical conductivity (~oxide ion conductivity) and measured temperature | |
|---|---|---|---|
| | | Temperature | $\log(\sigma_{total}(S\ cm^{-1}))$ |
| Example 60 | $Ba_3W_{0.9}V_{1.1}O_{8.45}$ | 602.3° C. | −6.1 |
| Example 60 | $Ba_3W_{0.9}V_{1.1}O_{8.45}$ | 652.4° C. | −5.3 |
| Example 60 | $Ba_3W_{0.9}V_{1.1}O_{8.45}$ | 702.8° C. | −5.1 |
| Example 60 | $Ba_3W_{0.9}V_{1.1}O_{8.45}$ | 753.1° C. | −4.7 |
| Example 60 | $Ba_3W_{0.9}V_{1.1}O_{8.45}$ | 803.4° C. | −4.3 |
| Example 60 | $Ba_3W_{0.9}V_{1.1}O_{8.45}$ | 853.5° C. | −4.7 |
| Example 60 | $Ba_3W_{0.9}V_{1.1}O_{8.45}$ | 903.9° C. | −5.1 |
| Example 60 | $Ba_3W_{0.9}V_{1.1}O_{8.45}$ | 953.8° C. | −5.3 |
| Example 60 | $Ba_3W_{0.9}V_{1.1}O_{8.45}$ | 1004° C. | −6.1 |
| Example 61 | $Ba_3W_{0.95}V_{1.05}O_{8.475}$ | 602.8° C. | −5.6 |
| Example 61 | $Ba_3W_{0.95}V_{1.05}O_{8.475}$ | 653° C. | −5.2 |
| Example 61 | $Ba_3W_{0.95}V_{1.05}O_{8.475}$ | 703.2° C. | −4.8 |
| Example 61 | $Ba_3W_{0.95}V_{1.05}O_{8.475}$ | 753.6° C. | −4.5 |
| Example 61 | $Ba_3W_{0.95}V_{1.05}O_{8.475}$ | 803.9° C. | −4.1 |
| Example 61 | $Ba_3W_{0.95}V_{1.05}O_{8.475}$ | 854.2° C. | −3.8 |
| Example 61 | $Ba_3W_{0.95}V_{1.05}O_{8.475}$ | 904.2° C. | −3.5 |
| Example 61 | $Ba_3W_{0.95}V_{1.05}O_{8.475}$ | 954.5° C. | −3.2 |
| Example 61 | $Ba_3W_{0.95}V_{1.05}O_{8.475}$ | 1004.6° C. | −2.9 |
| Example 62 | $Ba_3W_{1.05}V_{0.95}O_{8.525}$ | 603° C. | −5.3 |
| Example 62 | $Ba_3W_{1.05}V_{0.95}O_{8.525}$ | 653.1° C. | −5.0 |
| Example 62 | $Ba_3W_{1.05}V_{0.95}O_{8.525}$ | 703.4° C. | −4.7 |
| Example 62 | $Ba_3W_{1.05}V_{0.95}O_{8.525}$ | 754° C. | −4.4 |
| Example 62 | $Ba_3W_{1.05}V_{0.95}O_{8.525}$ | 804.3° C. | −4.0 |
| Example 62 | $Ba_3W_{1.05}V_{0.95}O_{8.525}$ | 854.6° C. | −3.7 |
| Example 62 | $Ba_3W_{1.05}V_{0.95}O_{8.525}$ | 904.7° C. | −3.3 |
| Example 62 | $Ba_3W_{1.05}V_{0.95}O_{8.525}$ | 954.9° C. | −3.0 |
| Example 62 | $Ba_3W_{1.05}V_{0.95}O_{8.525}$ | 1004.9° C. | −2.7 |

TABLE 28

| | Composition | Total electrical conductivity (~oxide ion conductivity) and measured temperature | |
|---|---|---|---|
| | | Temperature | $\log(\sigma_{total}(S\ cm^{-1}))$ |
| Example 63 | $Ba_3W_{1.1}V_{0.9}O_{8.55}$ | 602.7° C. | −5.2 |
| Example 63 | $Ba_3W_{1.1}V_{0.9}O_{8.55}$ | 653.1° C. | −4.9 |
| Example 63 | $Ba_3W_{1.1}V_{0.9}O_{8.55}$ | 703.6° C. | −4.6 |
| Example 63 | $Ba_3W_{1.1}V_{0.9}O_{8.55}$ | 754° C. | −4.2 |
| Example 63 | $Ba_3W_{1.1}V_{0.9}O_{8.55}$ | 804.1° C. | −3.9 |
| Example 63 | $Ba_3W_{1.1}V_{0.9}O_{8.55}$ | 854.5° C. | −3.5 |
| Example 63 | $Ba_3W_{1.1}V_{0.9}O_{8.55}$ | 904.7° C. | −3.2 |
| Example 63 | $Ba_3W_{1.1}V_{0.9}O_{8.55}$ | 955.1° C. | −2.9 |
| Example 63 | $Ba_3W_{1.1}V_{0.9}O_{8.55}$ | 1005.2° C. | −2.6 |
| Example 64 | $Ba_3W_{1.25}V_{0.75}O_{8.625}$ | 602.8° C. | −4.9 |
| Example 64 | $Ba_3W_{1.25}V_{0.75}O_{8.625}$ | 653° C. | −4.5 |
| Example 64 | $Ba_3W_{1.25}V_{0.75}O_{8.625}$ | 703.3° C. | −4.1 |
| Example 64 | $Ba_3W_{1.25}V_{0.75}O_{8.625}$ | 753.9° C. | −3.8 |
| Example 64 | $Ba_3W_{1.25}V_{0.75}O_{8.625}$ | 804.4° C. | −3.5 |
| Example 64 | $Ba_3W_{1.25}V_{0.75}O_{8.625}$ | 854.6° C. | −3.2 |
| Example 64 | $Ba_3W_{1.25}V_{0.75}O_{8.625}$ | 902.8° C. | −2.9 |
| Example 64 | $Ba_3W_{1.25}V_{0.75}O_{8.625}$ | 952.5° C. | −2.7 |
| Example 64 | $Ba_3W_{1.25}V_{0.75}O_{8.625}$ | 1004.3° C. | −2.4 |
| Example 65 | $Ba_3W_{1.5}V_{0.5}O_{8.75}$ | 602.9° C. | −4.1 |
| Example 65 | $Ba_3W_{1.5}V_{0.5}O_{8.75}$ | 653.1° C. | −3.8 |
| Example 65 | $Ba_3W_{1.5}V_{0.5}O_{8.75}$ | 703.4° C. | −3.5 |

TABLE 28-continued

| | Composition | Total electrical conductivity (~oxide ion conductivity) and measured temperature | |
| | | Temperature | log ($\sigma_{total}$(S cm$^{-1}$)) |
|---|---|---|---|
| Example 65 | Ba$_3$W$_{1.5}$V$_{0.5}$O$_{8.75}$ | 753.9° C. | −3.2 |
| Example 65 | Ba$_3$W$_{1.5}$V$_{0.5}$O$_{8.75}$ | 804.2° C. | −2.9 |
| Example 65 | Ba$_3$W$_{1.5}$V$_{0.5}$O$_{8.75}$ | 854.4° C. | −2.7 |
| Example 65 | Ba$_3$W$_{1.5}$V$_{0.5}$O$_{8.75}$ | 904.8° C. | −2.5 |

TABLE 28-continued

| | Composition | Total electrical conductivity (~oxide ion conductivity) and measured temperature | |
| | | Temperature | log ($\sigma_{total}$(S cm$^{-1}$)) |
|---|---|---|---|
| Example 65 | Ba$_3$W$_{1.5}$V$_{0.5}$O$_{8.75}$ | 955° C. | −2.3 |
| Example 65 | Ba$_3$W$_{1.5}$V$_{0.5}$O$_{8.75}$ | 1005° C. | −2.1 |

TABLE 29

| | Composition | Total electrical conductivity (~oxide ion conductivity) and measured temperature | |
| | | Temperature | log ($\sigma_{total}$(S cm$^{-1}$)) |
|---|---|---|---|
| Test Example 66 | Ba$_3$W$_{1.6}$V$_{0.4}$O$_{8.8}$ | 602.6° C. | −3.5 |
| Test Example 66 | Ba$_3$W$_{1.6}$V$_{0.4}$O$_{8.8}$ | 653° C. | −3.2 |
| Test Example 66 | Ba$_3$W$_{1.6}$V$_{0.4}$O$_{8.8}$ | 703.3° C. | −2.9 |
| Test Example 66 | Ba$_3$W$_{1.6}$V$_{0.4}$O$_{8.8}$ | 753.7° C. | −2.7 |
| Test Example 66 | Ba$_3$W$_{1.6}$V$_{0.4}$O$_{8.8}$ | 804° C. | −2.4 |
| Test Example 66 | Ba$_3$W$_{1.6}$V$_{0.4}$O$_{8.8}$ | 854.1° C. | −2.2 |
| Test Example 66 | Ba$_3$W$_{1.6}$V$_{0.4}$O$_{8.8}$ | 904.5° C. | −2.0 |
| Test Example 66 | Ba$_3$W$_{1.6}$V$_{0.4}$O$_{8.8}$ | 954.9° C. | −1.9 |
| Test Example 66 | Ba$_3$W$_{1.6}$V$_{0.4}$O$_{8.8}$ | 1004° C. | −1.7 |
| Test Example 67 | Ba$_3$W$_{1.75}$V$_{0.25}$O$_{8.875}$ | 602.55° C. | −4.7 |
| Test Example 67 | Ba$_3$W$_{1.75}$V$_{0.25}$O$_{8.875}$ | 652.35° C. | −4.4 |
| Test Example 67 | Ba$_3$W$_{1.75}$V$_{0.25}$O$_{8.875}$ | 702.85° C. | −4.1 |
| Test Example 67 | Ba$_3$W$_{1.75}$V$_{0.25}$O$_{8.875}$ | 753.15° C. | −3.9 |
| Test Example 67 | Ba$_3$W$_{1.75}$V$_{0.25}$O$_{8.875}$ | 803.65° C. | −3.6 |
| Test Example 67 | Ba$_3$W$_{1.75}$V$_{0.25}$O$_{8.875}$ | 854.05° C. | −3.4 |
| Test Example 67 | Ba$_3$W$_{1.75}$V$_{0.25}$O$_{8.875}$ | 904.25° C. | −3.2 |
| Test Example 67 | Ba$_3$W$_{1.75}$V$_{0.25}$O$_{8.875}$ | 954.35° C. | −2.9 |
| Test Example 67 | Ba$_3$W$_{1.75}$V$_{0.25}$O$_{8.875}$ | 1004.65° C. | −2.8 |
| Test Example 68 | Ba$_3$MoTiO$_8$ | 902.7° C. | −2.9 |
| Test Example 68 | Ba$_3$MoTiO$_8$ | 854.4° C. | −3.0 |
| Test Example 68 | Ba$_3$MoTiO$_8$ | 803.6° C. | −3.1 |
| Test Example 68 | Ba$_3$MoTiO$_8$ | 753.2° C. | −3.4 |
| Test Example 68 | Ba$_3$MoTiO$_8$ | 702.1° C. | −3.7 |
| Test Example 68 | Ba$_3$MoTiO$_8$ | 651.4° C. | −4.0 |
| Test Example 68 | Ba$_3$MoTiO$_8$ | 600.9° C. | −4.3 |
| Test Example 68 | Ba$_3$MoTiO$_8$ | 549.9° C. | −4.7 |
| Test Example 68 | Ba$_3$MoTiO$_8$ | 495.2° C. | −5.0 |
| Test Example 68 | Ba$_3$MoTiO$_8$ | 450.2° C. | −5.5 |

TABLE 30

| | Composition | Total electrical conductivity (~oxide ion conductivity) and measured temperature | |
| | | Temperature | log ($\sigma_{total}$(S cm$^{-1}$)) |
|---|---|---|---|
| Test Example 69 | Ba$_3$Mo$_{1.1}$Ti$_{0.9}$O$_{8.1}$ | 904.2° C. | −2.2 |
| Test Example 69 | Ba$_3$Mo$_{1.1}$Ti$_{0.9}$O$_{8.1}$ | 853.6° C. | −2.2 |
| Test Example 69 | Ba$_3$Mo$_{1.1}$Ti$_{0.9}$O$_{8.1}$ | 802.9° C. | −2.3 |
| Test Example 69 | Ba$_3$Mo$_{1.1}$Ti$_{0.9}$O$_{8.1}$ | 752.6° C. | −2.5 |
| Test Example 69 | Ba$_3$Mo$_{1.1}$Ti$_{0.9}$O$_{8.1}$ | 701.7° C. | −2.6 |
| Test Example 69 | Ba$_3$Mo$_{1.1}$Ti$_{0.9}$O$_{8.1}$ | 651.5° C. | −2.8 |
| Test Example 69 | Ba$_3$Mo$_{1.1}$Ti$_{0.9}$O$_{8.1}$ | 601° C. | −3.0 |
| Test Example 69 | Ba$_3$Mo$_{1.1}$Ti$_{0.9}$O$_{8.1}$ | 550.4° C. | −3.3 |
| Test Example 69 | Ba$_3$Mo$_{1.1}$Ti$_{0.9}$O$_{8.1}$ | 449.5° C. | −3.8 |
| Test Example 69 | Ba$_3$Mo$_{1.1}$Ti$_{0.9}$O$_{8.1}$ | 395.5° C. | −4.3 |
| Test Example 69 | Ba$_3$Mo$_{1.1}$Ti$_{0.9}$O$_{8.1}$ | 347.5° C. | −4.7 |
| Test Example 69 | Ba$_3$Mo$_{1.1}$Ti$_{0.9}$O$_{8.1}$ | 295.8° C. | −5.2 |
| Test Example 70 | Ba$_3$Mo$_{1.2}$Ti$_{0.8}$O$_{8.2}$ | 804.7° C. | −2.2 |
| Test Example 70 | Ba$_3$Mo$_{1.2}$Ti$_{0.8}$O$_{8.2}$ | 753.3° C. | −2.4 |
| Test Example 70 | Ba$_3$Mo$_{1.2}$Ti$_{0.8}$O$_{8.2}$ | 703.1° C. | −2.5 |
| Test Example 70 | Ba$_3$Mo$_{1.2}$Ti$_{0.8}$O$_{8.2}$ | 653° C. | −2.8 |
| Test Example 70 | Ba$_3$Mo$_{1.2}$Ti$_{0.8}$O$_{8.2}$ | 602.3° C. | −3.1 |
| Test Example 70 | Ba$_3$Mo$_{1.2}$Ti$_{0.8}$O$_{8.2}$ | 552.5° C. | −3.4 |
| Test Example 70 | Ba$_3$Mo$_{1.2}$Ti$_{0.8}$O$_{8.2}$ | 501.8° C. | −3.7 |
| Test Example 70 | Ba$_3$Mo$_{1.2}$Ti$_{0.8}$O$_{8.2}$ | 456.8° C. | −4.2 |
| Test Example 70 | Ba$_3$Mo$_{1.2}$Ti$_{0.8}$O$_{8.2}$ | 419° C. | −4.5 |

TABLE 30-continued

| | Composition | Total electrical conductivity (~oxide ion conductivity) and measured temperature | |
|---|---|---|---|
| | | Temperature | $\log(\sigma_{total}(\text{S cm}^{-1}))$ |
| Test Example 71 | $Ba_7Ca_2Mn_5O_{20}$ | 300.7° C. | −4.5 |
| Test Example 71 | $Ba_7Ca_2Mn_5O_{20}$ | 401.2° C. | −3.7 |
| Test Example 71 | $Ba_7Ca_2Mn_5O_{20}$ | 506.3° C. | −3.0 |
| Test Example 71 | $Ba_7Ca_2Mn_5O_{20}$ | 603.6° C. | −2.4 |
| Test Example 71 | $Ba_7Ca_2Mn_5O_{20}$ | 704.2° C. | −1.9 |
| Test Example 71 | $Ba_7Ca_2Mn_5O_{20}$ | 804.9° C. | −1.4 |
| Test Example 71 | $Ba_7Ca_2Mn_5O_{20}$ | 905.5° C. | −1.1 |
| Test Example 71 | $Ba_7Ca_2Mn_5O_{20}$ | 1005.6° C. | −0.8 |
| Test Example 72 | $Ba_{2.6}Ca_{1.4}La_4Mn_4O_{19}$ | 676° C. | −2 |
| Test Example 72 | $Ba_{2.6}Ca_{1.4}La_4Mn_4O_{19}$ | 775° C. | −1.8 |
| Test Example 72 | $Ba_{2.6}Ca_{1.4}La_4Mn_4O_{19}$ | 826° C. | −1.7 |
| Test Example 72 | $Ba_{2.6}Ca_{1.4}La_4Mn_4O_{19}$ | 876° C. | −1.6 |
| Test Example 72 | $Ba_{2.6}Ca_{1.4}La_4Mn_4O_{19}$ | 926° C. | −1.5 |
| Test Example 72 | $Ba_{2.6}Ca_{1.4}La_4Mn_4O_{19}$ | 976° C. | −1.4 |
| Test Example 72 | $Ba_{2.6}Ca_{1.4}La_4Mn_4O_{19}$ | 1027° C. | −1.4 |

TABLE 31

| | Composition | Total electrical conductivity (~oxide ion conductivity) and measured temperature | |
|---|---|---|---|
| | | Temperature | $\log(\sigma_{total}(\text{S cm}^{-1}))$ |
| Test Example 74 | $Ba_5Gd_2Al_2ZrO_{13}$ | 292.4° C. | −6.3 |
| Test Example 74 | $Ba_5Gd_2Al_2ZrO_{13}$ | 345.1° C. | −5.9 |
| Test Example 74 | $Ba_5Gd_2Al_2ZrO_{13}$ | 396.8° C. | −5.6 |
| Test Example 74 | $Ba_5Gd_2Al_2ZrO_{13}$ | 447.9° C. | −5.4 |
| Test Example 74 | $Ba_5Gd_2Al_2ZrO_{13}$ | 498.4° C. | −5.2 |
| Test Example 74 | $Ba_5Gd_2Al_2ZrO_{13}$ | 599.7° C. | −5.0 |
| Test Example 74 | $Ba_5Gd_2Al_2ZrO_{13}$ | 700.5° C. | −4.8 |
| Test Example 74 | $Ba_5Gd_2Al_2ZrO_{13}$ | 801.6° C. | −4.5 |
| Test Example 74 | $Ba_5Gd_2Al_2ZrO_{13}$ | 904.8° C. | −4.1 |
| Test Example 74 | $Ba_5Gd_2Al_2ZrO_{13}$ | 1001.1° C. | −3.7 |
| Test Example 74 | $Ba_5Gd_2Al_2ZrO_{13}$ | 1170.3° C. | −3.0 |
| Test Example 75 | $Ba_5Dy_2Al_2ZrO_{13}$ | 299.9° C. | −3.4 |
| Test Example 75 | $Ba_5Dy_2Al_2ZrO_{13}$ | 350.5° C. | −3.2 |
| Test Example 75 | $Ba_5Dy_2Al_2ZrO_{13}$ | 401.3° C. | −3.1 |
| Test Example 75 | $Ba_5Dy_2Al_2ZrO_{13}$ | 452.1° C. | −3.1 |
| Test Example 75 | $Ba_5Dy_2Al_2ZrO_{13}$ | 504.3° C. | −3.1 |
| Test Example 75 | $Ba_5Dy_2Al_2ZrO_{13}$ | 604.9° C. | −3.2 |
| Test Example 75 | $Ba_5Dy_2Al_2ZrO_{13}$ | 704.9° C. | −3.2 |
| Test Example 75 | $Ba_5Dy_2Al_2ZrO_{13}$ | 804.9° C. | −3.2 |
| Test Example 75 | $Ba_5Dy_2Al_2ZrO_{13}$ | 905.2° C. | −3.2 |
| Test Example 75 | $Ba_5Dy_2Al_2ZrO_{13}$ | 1005.6° C. | −3.1 |
| Test Example 75 | $Ba_5Dy_2Al_2ZrO_{13}$ | 1105.5° C. | −3.0 |
| Test Example 75 | $Ba_5Dy_2Al_2ZrO_{13}$ | 1204.9° C. | −2.8 |
| Test Example 76 (in air) | $Ba_5Er_2Al_2ZrO_{13}$ | 299.2° C. | −3.5 |
| Test Example 76 (in air) | $Ba_5Er_2Al_2ZrO_{13}$ | 352.4° C. | −3.1 |
| Test Example 76 (in air) | $Ba_5Er_2Al_2ZrO_{13}$ | 403.9° C. | −2.8 |
| Test Example 76 (in air) | $Ba_5Er_2Al_2ZrO_{13}$ | 453.9° C. | −2.8 |
| Test Example 76 (in air) | $Ba_5Er_2Al_2ZrO_{13}$ | 503.8° C. | −2.8 |
| Test Example 76 (in air) | $Ba_5Er_2Al_2ZrO_{13}$ | 505.8° C. | −2.8 |
| Test Example 76 (in air) | $Ba_5Er_2Al_2ZrO_{13}$ | 554.2° C. | −2.9 |
| Test Example 76 (in air) | $Ba_5Er_2Al_2ZrO_{13}$ | 604.5° C. | −3.0 |
| Test Example 76 (in air) | $Ba_5Er_2Al_2ZrO_{13}$ | 705° C. | −3.0 |
| Test Example 76 (in air) | $Ba_5Er_2Al_2ZrO_{13}$ | 805.3° C. | −3.0 |
| Test Example 76 (in air) | $Ba_5Er_2Al_2ZrO_{13}$ | 905.6° C. | −2.9 |
| Test Example 76 (in air) | $Ba_5Er_2Al_2ZrO_{13}$ | 1005.5° C. | −2.8 |
| Test Example 76 (in air) | $Ba_5Er_2Al_2ZrO_{13}$ | 1105.3° C. | −2.7 |
| Test Example 76 (in air) | $Ba_5Er_2Al_2ZrO_{13}$ | 1204.8° C. | −2.6 |
| Test Example 76 (in dry air) | $Ba_5Er_2Al_2ZrO_{13}$ | 317.8° C. | −4.6 |
| Test Example 76 (in dry air) | $Ba_5Er_2Al_2ZrO_{13}$ | 404.7° C. | −4.2 |
| Test Example 76 (in dry air) | $Ba_5Er_2Al_2ZrO_{13}$ | 508.2° C. | −4.1 |
| Test Example 76 (in dry air) | $Ba_5Er_2Al_2ZrO_{13}$ | 600° C. | −4.0 |
| Test Example 76 (in dry air) | $Ba_5Er_2Al_2ZrO_{13}$ | 702.9° C. | −3.9 |
| Test Example 76 (in dry air) | $Ba_5Er_2Al_2ZrO_{13}$ | 805.7° C. | −3.8 |
| Test Example 76 (in dry air) | $Ba_5Er_2Al_2ZrO_{13}$ | 1007.4° C. | −3.5 |
| Test Example 76 (in dry air) | $Ba_5Er_2Al_2ZrO_{13}$ | 1150.1° C. | −3.2 |
| Test Example 77 | $Ba_5Ho_2Al_2ZrO_{13}$ | 299.9° C. | −2.9 |
| Test Example 77 | $Ba_5Ho_2Al_2ZrO_{13}$ | 351.6° C. | −2.8 |
| Test Example 77 | $Ba_5Ho_2Al_2ZrO_{13}$ | 399.2° C. | −2.7 |
| Test Example 77 | $Ba_5Ho_2Al_2ZrO_{13}$ | 449.3° C. | −2.7 |

TABLE 31-continued

| | Composition | Total electrical conductivity (~oxide ion conductivity) and measured temperature | |
| | | Temperature | log ($\sigma_{total}$(S cm$^{-1}$)) |
| --- | --- | --- | --- |
| Test Example 77 | $Ba_5Ho_2Al_2ZrO_{13}$ | 499.6° C. | −2.7 |
| Test Example 77 | $Ba_5Ho_2Al_2ZrO_{13}$ | 601.2° C. | −2.8 |
| Test Example 77 | $Ba_5Ho_2Al_2ZrO_{13}$ | 701.8° C. | −2.9 |
| Test Example 77 | $Ba_5Ho_2Al_2ZrO_{13}$ | 802.5° C. | −2.8 |
| Test Example 77 | $Ba_5Ho_2Al_2ZrO_{13}$ | 903.2° C. | −2.7 |
| Test Example 77 | $Ba_5Ho_2Al_2ZrO_{13}$ | 1003.7° C. | −2.6 |
| Test Example 77 | $Ba_5Ho_2Al_2ZrO_{13}$ | 1203.9° C. | −2.4 |

TABLE 32

| | Composition | Total electrical conductivity (~oxide ion conductivity) and measured temperature | |
| | | Temperature | log ($\sigma_{total}$(S cm$^{-1}$)) |
| --- | --- | --- | --- |
| Test Example 78 | $Ba_5Tm_2Al_2ZrO_{13}$ | 299° C. | −3.5 |
| Test Example 78 | $Ba_5Tm_2Al_2ZrO_{13}$ | 348.4° C. | −3.3 |
| Test Example 78 | $Ba_5Tm_2Al_2ZrO_{13}$ | 398.4° C. | −3.2 |
| Test Example 78 | $Ba_5Tm_2Al_2ZrO_{13}$ | 448.7° C. | −3.3 |
| Test Example 78 | $Ba_5Tm_2Al_2ZrO_{13}$ | 499.2° C. | −3.4 |
| Test Example 78 | $Ba_5Tm_2Al_2ZrO_{13}$ | 602.4° C. | −3.4 |
| Test Example 78 | $Ba_5Tm_2Al_2ZrO_{13}$ | 701.3° C. | −3.3 |
| Test Example 78 | $Ba_5Tm_2Al_2ZrO_{13}$ | 801.9° C. | −3.1 |
| Test Example 78 | $Ba_5Tm_2Al_2ZrO_{13}$ | 903.1° C. | −2.9 |
| Test Example 78 | $Ba_5Tm_2Al_2ZrO_{13}$ | 1039.8° C. | −2.6 |
| Test Example 78 | $Ba_5Tm_2Al_2ZrO_{13}$ | 1206.5° C. | −2.4 |
| Test Example 79 | $Ba_5Yb_2Al_2ZrO_{13}$ | 304.1° C. | −3.3 |
| Test Example 79 | $Ba_5Yb_2Al_2ZrO_{13}$ | 404.3° C. | −2.9 |
| Test Example 79 | $Ba_5Yb_2Al_2ZrO_{13}$ | 503.7° C. | −2.8 |
| Test Example 79 | $Ba_5Yb_2Al_2ZrO_{13}$ | 604.2° C. | −2.8 |
| Test Example 79 | $Ba_5Yb_2Al_2ZrO_{13}$ | 704.9° C. | −2.9 |
| Test Example 79 | $Ba_5Yb_2Al_2ZrO_{13}$ | 804.5° C. | −2.8 |
| Test Example 79 | $Ba_5Yb_2Al_2ZrO_{13}$ | 904.9° C. | −2.7 |
| Test Example 79 | $Ba_5Yb_2Al_2ZrO_{13}$ | 1005.6° C. | −2.6 |
| Test Example 79 | $Ba_5Yb_2Al_2ZrO_{13}$ | 1105.1° C. | −2.5 |
| Test Example 79 | $Ba_5Yb_2Al_2ZrO_{13}$ | 1204.6° C. | −2.4 |
| Test Example 80 | $Ba_5Lu_2Al_2ZrO_{13}$ | 305.7° C. | −5.0 |
| Test Example 80 | $Ba_5Lu_2Al_2ZrO_{13}$ | 354.3° C. | −4.5 |
| Test Example 80 | $Ba_5Lu_2Al_2ZrO_{13}$ | 403.4° C. | −4.1 |
| Test Example 80 | $Ba_5Lu_2Al_2ZrO_{13}$ | 452.9° C. | −3.9 |
| Test Example 80 | $Ba_5Lu_2Al_2ZrO_{13}$ | 502.1° C. | −3.9 |
| Test Example 80 | $Ba_5Lu_2Al_2ZrO_{13}$ | 603.6° C. | −3.9 |
| Test Example 80 | $Ba_5Lu_2Al_2ZrO_{13}$ | 705.4° C. | −3.8 |
| Test Example 80 | $Ba_5Lu_2Al_2ZrO_{13}$ | 804.6° C. | −3.7 |
| Test Example 80 | $Ba_5Lu_2Al_2ZrO_{13}$ | 904.8° C. | −3.6 |
| Test Example 80 | $Ba_5Lu_2Al_2ZrO_{13}$ | 1005.3° C. | −3.5 |
| Test Example 80 | $Ba_5Lu_2Al_2ZrO_{13}$ | 1105.3° C. | −3.3 |
| Test Example 80 | $Ba_5Lu_2Al_2ZrO_{13}$ | 1204.3° C. | −3.0 |
| Test Example 82 | $Ba_7Nb_{3.85}W_{0.15}MoO_{20.075}$ | 355.85° C. | −3.7 |
| Test Example 82 | $Ba_7Nb_{3.85}W_{0.15}MoO_{20.076}$ | 405.85° C. | −3.3 |
| Test Example 82 | $Ba_7Nb_{3.85}W_{0.15}MoO_{20.077}$ | 454.85° C. | −3.0 |
| Test Example 82 | $Ba_7Nb_{3.85}W_{0.15}MoO_{20.078}$ | 504.85° C. | −2.7 |
| Test Example 82 | $Ba_7Nb_{3.85}W_{0.15}MoO_{20.079}$ | 554.85° C. | −2.5 |
| Test Example 82 | $Ba_7Nb_{3.85}W_{0.15}MoO_{20.080}$ | 604.85° C. | −2.3 |
| Test Example 82 | $Ba_7Nb_{3.85}W_{0.15}MoO_{20.081}$ | 654.85° C. | −2.1 |
| Test Example 82 | $Ba_7Nb_{3.85}W_{0.15}MoO_{20.082}$ | 704.85° C. | −2.0 |
| Test Example 82 | $Ba_7Nb_{3.85}W_{0.15}MoO_{20.083}$ | 755.85° C. | −1.9 |
| Test Example 82 | $Ba_7Nb_{3.85}W_{0.15}MoO_{20.084}$ | 805.85° C. | −1.8 |
| Test Example 82 | $Ba_7Nb_{3.85}W_{0.15}MoO_{20.085}$ | 855.85° C. | −1.7 |
| Test Example 82 | $Ba_7Nb_{3.85}W_{0.15}MoO_{20.086}$ | 905.85° C. | −1.6 |
| Test Example 83 | $Ba_7Nb_{3.75}W_{0.25}MoO_{20.125}$ | 355.85° C. | −4.0 |
| Test Example 83 | $Ba_7Nb_{3.75}W_{0.25}MoO_{20.126}$ | 405.85° C. | −3.7 |
| Test Example 83 | $Ba_7Nb_{3.75}W_{0.25}MoO_{20.127}$ | 454.85° C. | −3.3 |
| Test Example 83 | $Ba_7Nb_{3.75}W_{0.25}MoO_{20.128}$ | 504.85° C. | −3.1 |
| Test Example 83 | $Ba_7Nb_{3.75}W_{0.25}MoO_{20.129}$ | 554.85° C. | −2.8 |
| Test Example 83 | $Ba_7Nb_{3.75}W_{0.25}MoO_{20.130}$ | 604.85° C. | −2.6 |
| Test Example 83 | $Ba_7Nb_{3.75}W_{0.25}MoO_{20.131}$ | 654.85° C. | −2.4 |
| Test Example 83 | $Ba_7Nb_{3.75}W_{0.25}MoO_{20.132}$ | 704.85° C. | −2.3 |
| Test Example 83 | $Ba_7Nb_{3.75}W_{0.25}MoO_{20.133}$ | 755.85° C. | −2.2 |
| Test Example 83 | $Ba_7Nb_{3.75}W_{0.25}MoO_{20.134}$ | 805.85° C. | −2.1 |
| Test Example 83 | $Ba_7Nb_{3.75}W_{0.25}MoO_{20.135}$ | 855.85° C. | −2.0 |

For all of Test Examples shown in Tables 16 to 32, the electrical conductivity represented by log [σ(Scm$^{-1}$)] in the temperature range of 280 to 909° C. was within the range of −7.0 to −1.0. Among these, for example, Test Example 32 exhibited high electrical conductivity at a low temperature of −3.4 to −2.0 at 306 to 606° C.

Calculation Example

For Ba$_7$Nb$_4$MoO$_{20}$, a structure in which a part of Nb was substituted with another element was designed, and the a-axis length, b-axis length, c-axis length (Å), α-angle, β-angle, and γ-angle (o) of the lattice constants were obtained by calculation.

Test Examples 84 to 152, Tables 33 to 36

TABLE 33

| | | Lattice constant | | | | | | |
|---|---|---|---|---|---|---|---|---|
| | Composition | a[Å] | b[Å] | c[Å] | α[°] | β[°] | γ[°] | V[Å$^3$] |
| Test Example 84 | Ba$_7$Nb$_3$AgMoO | 5.9399 | 5.9399 | 16.7929 | 90 | 90 | 120 | 513.1154 |
| Test Example 85 | Ba$_7$Nb$_3$AlMoO$_{20}$ | 5.9004 | 5.9004 | 16.7432 | 90 | 90 | 120 | 504.8147 |
| Test Example 86 | Ba$_7$Nb$_3$AtMoO$_{20}$ | 6.0105 | 6.0105 | 16.8606 | 90 | 90 | 120 | 527.5049 |
| Test Example 87 | Ba$_7$Nb$_3$AuMoO$_{20}$ | 5.9405 | 5.9405 | 16.7767 | 90 | 90 | 120 | 512.7134 |
| Test Example 88 | Ba$_7$Nb$_3$BeMoO$_{20}$ | 5.9043 | 5.9043 | 17.1673 | 90 | 90 | 120 | 518.2808 |
| Test Example 89 | Ba$_7$Nb$_3$BiMoO$_{20}$ | 5.9920 | 5.9920 | 16.8362 | 90 | 90 | 120 | 523.5022 |
| Test Example 90 | Ba$_7$Nb$_3$BrMoO$_{20}$ | 5.9449 | 5.9449 | 16.8107 | 90 | 90 | 120 | 514.5259 |
| Test Example 91 | Ba$_7$Nb$_3$CaMoO$_{20}$ | 6.0137 | 6.0137 | 16.8462 | 90 | 90 | 120 | 527.6174 |
| Test Example 92 | Ba$_7$Nb$_3$CdMoO$_{20}$ | 6.0044 | 6.0044 | 16.9154 | 90 | 90 | 120 | 528.1425 |
| Test Example 93 | Ba$_7$Nb$_3$CeMoO$_{20}$ | 6.0494 | 6.0494 | 17.0041 | 90 | 90 | 120 | 538.9045 |
| Test Example 94 | Ba$_7$Nb$_3$CoMoO$_{20}$ | 5.8816 | 5.8816 | 16.7377 | 90 | 90 | 120 | 501.4317 |
| Test Example 95 | Ba$_7$Nb$_3$CrMoO$_{20}$ | 5.8835 | 5.8835 | 16.7383 | 90 | 90 | 120 | 501.7814 |
| Test Example 96 | Ba$_7$Nb$_3$CuMoO$_{20}$ | 5.9062 | 5.9062 | 16.7619 | 90 | 90 | 120 | 506.3652 |
| Test Example 97 | Ba$_7$Nb$_3$DyMoO$_{20}$ | 6.0139 | 6.0139 | 16.8020 | 90 | 90 | 120 | 526.2740 |
| Test Example 98 | Ba$_7$Nb$_3$ErMoO$_{20}$ | 6.0051 | 6.0051 | 16.7818 | 90 | 90 | 120 | 524.0937 |
| Test Example 99 | Ba$_7$Nb$_3$EuMoO$_{20}$ | 6.0274 | 6.0274 | 16.9215 | 90 | 90 | 120 | 532.3955 |
| Test Example 100 | Ba$_7$Nb$_3$FeMoO$_{20}$ | 5.8833 | 5.8833 | 16.7350 | 90 | 90 | 120 | 501.6530 |
| Test Example 101 | Ba$_7$Nb$_3$GaMoO$_{20}$ | 5.9337 | 5.9337 | 16.7641 | 90 | 90 | 120 | 511.1718 |
| Test Example 102 | Ba$_7$Nb$_3$GdMoO$_{20}$ | 6.0233 | 6.0233 | 16.8252 | 90 | 90 | 120 | 528.6394 |
| Test Example 103 | Ba$_7$Nb$_3$GeMoO$_{20}$ | 5.9023 | 5.9023 | 16.7687 | 90 | 90 | 120 | 505.9081 |

TABLE 34

| | | Lattice constant | | | | | | |
|---|---|---|---|---|---|---|---|---|
| | Composition | a[Å] | b[Å] | c[Å] | α[°] | β[°] | γ[°] | V[Å$^3$] |
| Test Example 104 | Ba$_7$Nb$_3$HgMoO$_{20}$ | 5.9874 | 5.9874 | 16.8641 | 90 | 90 | 120 | 523.5637 |
| Test Example 105 | Ba$_7$Nb$_3$HoMoO$_{20}$ | 6.0093 | 6.0093 | 16.7906 | 90 | 90 | 120 | 525.1054 |
| Test Example 106 | Ba$_7$Nb$_3$IMoO$_{20}$ | 5.9893 | 5.9893 | 16.8244 | 90 | 90 | 120 | 522.6582 |
| Test Example 107 | Ba$_7$Nb$_3$InMoO$_{20}$ | 5.9935 | 5.9935 | 16.8234 | 90 | 90 | 120 | 523.3607 |
| Test Example 108 | Ba$_7$Nb$_3$IrMoO$_{20}$ | 5.9210 | 5.9210 | 16.7764 | 90 | 90 | 120 | 509.3578 |
| Test Example 109 | Ba$_7$Nb$_3$LaMoO$_{20}$ | 6.0475 | 6.0475 | 16.9785 | 90 | 90 | 120 | 537.7646 |
| Test Example 110 | Ba$_7$Nb$_3$LiMoO$_{20}$ | 5.9735 | 5.9735 | 16.8486 | 90 | 90 | 120 | 520.6503 |
| Test Example 111 | Ba$_7$Nb$_3$LuMoO$_{20}$ | 5.9926 | 5.9926 | 16.7608 | 90 | 90 | 120 | 521.2621 |
| Test Example 112 | Ba$_7$Nb$_3$MgMoO$_{20}$ | 5.9622 | 5.9622 | 16.7701 | 90 | 90 | 120 | 516.2773 |
| Test Example 113 | Ba$_7$Nb$_3$MnMoO$_{20}$ | 5.8856 | 5.8856 | 16.7469 | 90 | 90 | 120 | 502.3922 |
| Test Example 114 | Ba$_7$Nb$_3$NaMoO$_{20}$ | 5.9690 | 5.9690 | 16.7910 | 90 | 90 | 120 | 518.0919 |
| Test Example 115 | Ba$_7$Nb$_3$NbMoO$_{20}$ | 5.9880 | 5.9880 | 16.8980 | 90 | 90 | 120 | 524.7378 |
| Test Example 116 | Ba$_7$Nb$_3$NdMoO$_{20}$ | 6.0421 | 6.0421 | 16.9181 | 90 | 90 | 120 | 534.8888 |
| Test Example 117 | Ba$_7$Nb$_3$NiMoO$_{20}$ | 5.8855 | 5.8855 | 16.7436 | 90 | 90 | 120 | 502.2851 |
| Test Example 118 | Ba$_7$Nb$_3$NpMoO$_{20}$ | 6.0064 | 6.0064 | 16.8218 | 90 | 90 | 120 | 525.5746 |
| Test Example 119 | Ba$_7$Nb$_3$OsMoO$_{20}$ | 5.9244 | 5.9244 | 16.7650 | 90 | 90 | 120 | 509.6000 |
| Test Example 120 | Ba$_7$Nb$_3$PMoO$_{20}$ | 5.8411 | 5.8411 | 16.7130 | 90 | 90 | 120 | 493.8210 |
| Test Example 121 | Ba$_7$Nb$_3$PbMoO$_{20}$ | 6.0062 | 6.0062 | 16.8558 | 90 | 90 | 120 | 526.6073 |
| Test Example 122 | Ba$_7$Nb$_3$PdMoO$_{20}$ | 5.9240 | 5.9240 | 16.7783 | 90 | 90 | 120 | 509.9204 |
| Test Example 123 | Ba$_7$Nb$_3$PoMoO$_{20}$ | 6.0070 | 6.0070 | 16.8671 | 90 | 90 | 120 | 527.0855 |

TABLE 35

| | | Lattice constant | | | | | | |
|---|---|---|---|---|---|---|---|---|
| | Composition | a[Å] | b[Å] | c[Å] | α[°] | β[°] | γ[°] | V[Å³] |
| Test Example 124 | $Ba_7Nb_3PrMoO_{20}$ | 6.0458 | 6.0458 | 16.9520 | 90 | 90 | 120 | 536.6149 |
| Test Example 125 | $Ba_7Nb_3PtMoO_{20}$ | 5.9252 | 5.9252 | 16.7798 | 90 | 90 | 120 | 510.1879 |
| Test Example 126 | $Ba_7Nb_3PuMoO_{20}$ | 6.0042 | 6.0042 | 16.8270 | 90 | 90 | 120 | 525.3532 |
| Test Example 127 | $Ba_7Nb_3ReMoO_{20}$ | 5.9247 | 5.9247 | 16.7657 | 90 | 90 | 120 | 509.6719 |
| Test Example 128 | $Ba_7Nb_3RhMoO_{20}$ | 5.9152 | 5.9152 | 16.7801 | 90 | 90 | 120 | 508.4750 |
| Test Example 129 | $Ba_7Nb_3RuMoO_{20}$ | 5.9179 | 5.9179 | 16.7682 | 90 | 90 | 120 | 508.5669 |
| Test Example 130 | $Ba_7Nb_3SMoO_{20}$ | 5.9932 | 5.9932 | 17.0627 | 90 | 90 | 120 | 530.7513 |
| Test Example 131 | $Ba_7Nb_3SbMoO_{20}$ | 5.9456 | 5.9456 | 16.7884 | 90 | 90 | 120 | 513.9662 |
| Test Example 132 | $Ba_7Nb_3ScMoO_{20}$ | 5.9717 | 5.9717 | 16.7853 | 90 | 90 | 120 | 518.3833 |
| Test Example 133 | $Ba_7Nb_3SeMoO_{20}$ | 5.9265 | 5.9265 | 16.7973 | 90 | 90 | 120 | 510.9378 |
| Test Example 134 | $Ba_7Nb_3SiMoO_{20}$ | 5.8604 | 5.8604 | 16.7114 | 90 | 90 | 120 | 497.0433 |
| Test Example 135 | $Ba_7Nb_3SmMoO_{20}$ | 6.0338 | 6.0338 | 16.8651 | 90 | 90 | 120 | 531.7507 |
| Test Example 136 | $Ba_7Nb_3SnMoO_{20}$ | 5.9669 | 5.9669 | 16.7860 | 90 | 90 | 120 | 517.5743 |
| Test Example 137 | $Ba_7Nb_3SrMoO_{20}$ | 6.0420 | 6.0420 | 17.0497 | 90 | 90 | 120 | 539.0294 |
| Test Example 138 | $Ba_7Nb_3TaMoO_{20}$ | 5.9404 | 5.9404 | 16.7921 | 90 | 90 | 120 | 513.1733 |
| Test Example 139 | $Ba_7Nb_3TbMoO_{20}$ | 6.0335 | 6.0335 | 16.8976 | 90 | 90 | 120 | 532.7175 |
| Test Example 140 | $Ba_7Nb_3TcMoO_{20}$ | 5.9169 | 5.9169 | 16.7632 | 90 | 90 | 120 | 508.2433 |
| Test Example 141 | $Ba_7Nb_3TeMoO_{20}$ | 5.9765 | 5.9765 | 16.8042 | 90 | 90 | 120 | 519.8019 |
| Test Example 142 | $Ba_7Nb_3TiMoO_{20}$ | 5.9210 | 5.9210 | 16.7664 | 90 | 90 | 120 | 509.0554 |

TABLE 36

| | | Lattice constant | | | | | | |
|---|---|---|---|---|---|---|---|---|
| | Composition | a[Å] | b[Å] | c[Å] | α[°] | β[°] | γ[°] | V[Å³] |
| Test Example 143 | $Ba_7Nb_3TiMoO_{20}$ | 6.0148 | 6.0148 | 16.9154 | 90 | 90 | 120 | 529.9799 |
| Test Example 144 | $Ba_7Nb_3TmMoO_{20}$ | 6.0010 | 6.0010 | 16.7754 | 90 | 90 | 120 | 523.1813 |
| Test Example 145 | $Ba_7Nb_3UMoO_{20}$ | 6.0076 | 6.0076 | 16.8261 | 90 | 90 | 120 | 525.9239 |
| Test Example 146 | $Ba_7Nb_3VMoO_{20}$ | 5.8923 | 5.8923 | 16.7503 | 90 | 90 | 120 | 503.6431 |
| Test Example 147 | $Ba_7Nb_3WMoO_{20}$ | 5.8644 | 5.8644 | 16.7512 | 90 | 90 | 120 | 503.6431 |
| Test Example 148 | $Ba_7Nb_3XeMoO_{20}$ | 6.0688 | 6.0688 | 16.7427 | 90 | 90 | 120 | 534.0269 |
| Test Example 149 | $Ba_7Nb_3YbMoO_{20}$ | 6.0037 | 6.0037 | 16.8261 | 90 | 90 | 120 | 525.2420 |
| Test Example 150 | $Ba_7Nb_3ZnMoO_{20}$ | 5.9552 | 5.9552 | 16.7849 | 90 | 90 | 120 | 515.5207 |
| Test Example 151 | $Ba_7Nb_3ZrMoO_{20}$ | 5.9782 | 5.9785 | 16.7934 | 90 | 90 | 120 | 519.7711 |
| Test Example 152 | $Ba_7Nb_3YMoO_{20}$ | 5.9985 | 5.9985 | 16.7934 | 90 | 90 | 120 | 523.3099 |

According to the calculation examples, the optimized structures of the compounds having the compositions of Test Examples 84 to 152 retain the crystal structure of the original hexagonal perovskite-related compounds, indicating the possibility that these compositions can be synthesized. Similar to Test Examples 1 to 83, it is considered that these compositions also exhibit excellent characteristics in, for example, electrical conductivity at a low temperature when used in a solid electrolyte.

INDUSTRIAL APPLICABILITY

According to the solid electrolyte, and the electrolyte layer and battery using the solid electrolyte of the present invention, a solid electrolyte having high electrical conductivity even in a low-temperature region, an electrolyte layer, and a battery using the solid electrolyte can be obtained. The solid electrolyte according to the present invention can also be used in a solid oxide fuel cell, a sensor, a battery, an electrode, an electrolyte, an oxygen concentrator, an oxygen separation membrane, an oxygen permeation membrane, an oxygen pump, a catalyst, a photocatalyst, an electric/electronic/communication device, an energy/environment-related device, an optical device or the like.

What is claimed is:

1. A solid electrolyte comprising a hexagonal perovskite-related compound of formula (1):

$$Ba_{7-\alpha}Nb_{(4-x-y)}Mo_{(1+x)}M_yO_{(20+z)} \qquad (1)$$

wherein

M is a cation of at least one element selected from the group consisting of Ag, Al, At, Au, Be, Bi, Br, Ca, Cd, Ce, Co, Cr, Cu, Dy, Er, Eu, Fe, Ga, Gd, Ge, Hf, Hg, Ho, I, In, Ir, La, Li, Lu, Mg, Mn, Na, Nb, Nd, Ni, Np, Os, P, Pb, Pd, Po, Pr, Pt, Pu, Re, Rh, Ru, S, Sb, Sc, Se, Si, Sm, Sn, Sr, Ta, Tb, Tc, Te, Ti, Tl, Tm, U, V, Xe, Y, Yb, Zn, and Zr, α represents a value of 0 or more and 0.5 or less, x represents a value of −1.1 or more and 1.1 or less, y represents a value of more than 0 and 1.1 or less, and z represents a value of −2.0 or more and 2.0 or less, with the proviso that |x|+y≥0.01.

2. A solid electrolyte comprising a hexagonal perovskite-related compound of formula (2):

$$Ba_{7-\alpha}Nb_{(4-x-y)}Mo_{(1+x)}M_yO_{(20+z)} \qquad (2)$$

wherein

M is a cation of at least one element selected from the group consisting of V, Cr, Mn, Ge, Si, and Zr, α represents a value of 0 or more and 0.5 or less, x represents a value of −1.1 or more and 1.1 or less, y represents a value of more than 0 and 1.1 or less, z represents a value of −2.0 or more and 2.0 or less, with the proviso that $|x|+y \geq 0.01$.

3. The solid electrolyte of claim 1, wherein x is 0.06 or more and 0.30 or less.

4. The solid electrolyte of claim 3, wherein x is 0.19 or more and 0.21 or less.

5. The solid electrolyte of claim 2, wherein in the compound of formula (2), an a-axis length (Å), a b-axis length (Å), a c-axis length (Å), an α-angle (°), a β-angle (°), and a γ-angle (°) of a lattice constant are:

5.35<a<6.56, 5.35<b<6.56, 12.14<c<18.52,

89<α<91,

89<β<91, and

119<γ<121.

6. The solid electrolyte of claim 1, wherein the solid electrolyte is an oxide ion ($O^{2-}$) conductor at a temperature of 300 to 1200° C.

7. The solid electrolyte of claim 1, wherein the solid electrolyte has an electrical conductivity of −7 or more, wherein the electrical conductivity is represented by log $[\sigma(Scm^{-1})]$ and when measured at 300° C.

8. A solid oxide fuel cell (SOFC), a sensor, a battery, an electrode, an electrolyte, an oxygen concentrator, an oxygen separation membrane, an oxygen permeation membrane, an oxygen pump, a catalyst, a photocatalyst, an electric/electronic/communication device, an energy/environment-related device, or an optical device comprising the solid electrolyte of claim 1.

9. The solid electrolyte of claim 1, wherein the solid electrolyte is in an electrolyte layer in a solid oxide fuel cell (SOFC), a sensor, an oxygen concentrator, an oxygen separation membrane, an oxygen permeation membrane, or an oxygen pump.

10. An electrolyte layer comprising the solid electrolyte of claim 1.

11. A battery comprising the electrolyte layer of claim 10.

12. The battery of claim 11, wherein the battery is a solid oxide fuel cell (SOFC).

13. The electrolyte layer of claim 10, wherein the electrolyte layer comprises 50% or greater by mass of the solid electrolyte.

14. The battery of claim 12, wherein the solid oxide fuel cell (SOFC) operates at a temperature of between 300° C. and 600° C.

15. A solid electrolyte comprising a hexagonal perovskite-related compound of formula (1):

$$Ba_{7-\alpha}Nb_{(4-x-y)}Mo_{(1+x)}M_yO_{(20+z)} \quad (1)$$

wherein

M is a cation of at least one element selected from the group consisting of Ag, Al, At, Au, Be, Bi, Br, Ca, Cd, Ce, Co, Cr, Cu, Dy, Er, Eu, Fe, Ga, Gd, Ge, Hf, Hg, Ho, I, In, Ir, La, Li, Lu, Mg, Mn, Na, Nb, Nd, Ni, Np, Os, P, Pb, Pd, Po, Pr, Pt, Pu, Re, Rh, Ru, S, Sb, Sc, Se, Si, Sm, Sn, Sr, Ta, Tb, Tc, Te, Ti, Tl, Tm, U, V, W, Xe, Y, Yb, Zn, and Zr, $0 \leq \alpha \geq 0.5$, $-1.1 \leq x \leq 0.35$, $0 < y \leq 0.35$, and $-2.0 \leq z \leq 2.0$, with the proviso that $|x|+y \geq 0.01$.

16. A solid electrolyte comprising a hexagonal perovskite-related compound of formula (1):

$$Ba_{7-\alpha}Nb_{(4-x-y)}Mo_{(1+x)}M_yO_{(20+z)} \quad (1)$$

wherein

M is a cation of at least one element selected from the group consisting of Ag, Al, At, Au, Be, Bi, Br, Ca, Cd, Ce, Co, Cr, Cu, Dy, Er, Eu, Fe, Ga, Gd, Ge, Hf, Hg, Ho, I, In, Ir, La, Li, Lu, Mg, Mn, Na, Nb, Nd, Ni, Np, Os, P, Pb, Pd, Po, Pr, Pt, Pu, Re, Rh, Ru, S, Sb, Sc, Se, Si, Sm, Sn, Sr, Ta, Tb, Tc, Te, Ti, Tl, Tm, U, V, W, Xe, Y, Yb, Zn, and Zr, α represents a value of 0 or more and 0.5 or less, x represents a value of −1.1 or more and 1.1 or less, y represents a value of more than 0 and 1.1 or less, z represents a value of −2.0 or more and 2.0 or less, with the proviso that, $|x|+y \geq 0.01$, and wherein the compound's space group is not R-3m.

17. A solid electrolyte comprising a hexagonal perovskite-related compound of formula (1):

$$Ba_{7-\alpha}Nb_{(4-x-y)}Mo_{(1+x)}M_yO_{(20+z)} \quad (1)$$

wherein

M is a cation of at least one element selected from the group consisting of Ag, Al, At, Au, Be, Bi, Br, Ca, Cd, Ce, Co, Cr, Cu, Dy, Er, Eu, Fe, Ga, Gd, Ge, Hf, Hg, Ho, I, In, Ir, La, Li, Lu, Mg, Mn, Na, Nb, Nd, Ni, Np, Os, P, Pb, Pd, Po, Pr, Pt, Pu, Re, Rh, Ru, S, Sb, Sc, Se, Si, Sm, Sn, Sr, Ta, Tb, Tc, Te, Ti, Tl, Tm, U, V, W, Xe, Y, Yb, Zn, and Zr, α represents a value of 0 or more and 0.5 or less, x represents a value of −1.1 or more and 1.1 or less, y represents a value of more than 0 and 1.1 or less, and z represents a value of −2.0 or more and 2.0 or less, with the proviso that, $|x|+y=0.01$, and wherein the compound's space group is P-3m1.

* * * * *